US012454705B2

United States Patent
Baram et al.

(10) Patent No.: US 12,454,705 B2
(45) Date of Patent: Oct. 28, 2025

(54) DIFFERENTIAL KNOCKOUT OF AN ALLELE OF A HETEROZYGOUS APOLIPOPROTEIN A1 (APO1A) GENE

(71) Applicant: EMENDOBIO INC., Wilmington, DE (US)

(72) Inventors: David Baram, Tel Aviv (IL); Lior Izhar, Tel Aviv (IL); Asael Herman, Ness Ziona (IL); Rafi Emmanuel, Ramla (IL); Michal Golan Mashiach, Ness Ziona (IL); Joseph Georgeson, Rehovot (IL)

(73) Assignee: EMENDOBIO INC., Wilmington, DE (US)

( * ) Notice: Subject to any disclaimer, the term of this patent is extended or adjusted under 35 U.S.C. 154(b) by 1255 days.

(21) Appl. No.: 17/041,661

(22) PCT Filed: Mar. 22, 2019

(86) PCT No.: PCT/US2019/023715
§ 371 (c)(1),
(2) Date: Sep. 25, 2020

(87) PCT Pub. No.: WO2019/190930
PCT Pub. Date: Oct. 3, 2019

(65) Prior Publication Data
US 2021/0032663 A1 Feb. 4, 2021

Related U.S. Application Data

(60) Provisional application No. 62/647,745, filed on Mar. 25, 2018.

(51) Int. Cl.
*C12N 15/90* (2006.01)
*A61K 35/13* (2015.01)
*C12N 15/11* (2006.01)

(52) U.S. Cl.
CPC ............ *C12N 15/907* (2013.01); *A61K 35/13* (2013.01); *C12N 15/11* (2013.01); *C12N 2310/20* (2017.05); *C12N 2800/80* (2013.01)

(58) Field of Classification Search
None
See application file for complete search history.

(56) References Cited

U.S. PATENT DOCUMENTS

2005/0172359 A1  8/2005  Moloney et al.
2010/0168006 A1  7/2010  Fogher et al.

FOREIGN PATENT DOCUMENTS

JP   2011-022146 A   2/2011

OTHER PUBLICATIONS

Doench et al. "Rational design of highly active sgRNAs for CRISPR-Cas9-mediated gene inactivation" (2014), Nature Biotech, vol. 32, No. 12: 1262-1267 (Year: 2014).*
Wiles et al. "CRISPR-Cas9-mediated genome editing and guide RNA design", (2015), Mamm Genome, vol. 26: 501-510. (Year: 2015).*
Delgrado-Lista, J. et al. "Effects of Variations in the Apoa1/C3/A4/A5 Gene Cluster on Different Parameters of Postprandial Lipid Metabolism in Healthy Young Men, " Journal of Lipid Research. Jan. 2010, vol. 51, No. 1; pp. 63-73.
Eriksson, M. et al. "Hereditary Apolipoprotein AI-Associated Amyloidosis in Surgical Pathology Specimens: Identification of Three Novel Mutations in the APOA1 Gene, " The Journal of Molecular Diagnostics. May 2009, Epub Mar. 26, 2009, vol. 11, No. 3; p. 257-262.
International Search Report issued Sep. 17, 2019 in connection with PCT International Application No. PCT/US2019/023715.
Monteys, A.M. et al., "CRISPR/Cas9 Editing of the Mutant Huntingtin Allele In Vitro and In Vivo, " Molecular Therapy. Jan. 4, 2017, vol. 25, No. 1; pp. 12-23.
Notification of Transmittal of the International Search Report and the Written Opinion of the International Searching Authority, or the Declaration (form PCT/ISA/220) issued Sep. 17, 2019 in connection with PCT International Application No. PCT/US2019/023715.
Written Opinion (form PCT/ISA/237) issued Sep. 17, 2019 in connection with PCT International Application No. PCT/US2019/023715.
International Preliminary Report on Patentability issued Sep. 29, 2020 in connection with PCT International Application No. PCT/US2019/023715.

* cited by examiner

*Primary Examiner* — Teresa E Knight
(74) *Attorney, Agent, or Firm* — Potomac Law Group, PLLC; Jamaica Potts Szeliga

(57) ABSTRACT

RNA molecules comprising a guide sequence portion having 17-20 nucleotides in the sequence of 17-20 contiguous nucleotides set forth in any one of SEQ ID NOs: 1-1313 and compositions, methods, and uses thereof.

14 Claims, 5 Drawing Sheets
Specification includes a Sequence Listing.

| rs5076 | Intron_3 of 3 |
| --- | --- |
| rs7116797 | Intron_3 of 3 |
| rs5072 | Intron_3 of 3 |
| rs2070665 | Intron_3 of 3 |
| rs5070 | Intron_2 of 3 |
| rs5069 | Intron_1 of 3 |
| rs670 | Exon_1 of 4 |

DIFFERENTIAL KNOCKOUT OF AN ALLELE OF A HETEROZYGOUS APOLIPOPROTEIN A1 (APO1A) GENE

CROSS-REFERENCE TO RELATED APPLICATIONS

This application is a § 371 national stage of PCT International Application No. PCT/US2019/023715, filed Mar. 22, 2019, claiming the benefit of U.S. Provisional Application No. 62/647,745, filed Mar. 25, 2018, the contents of each of which are hereby incorporated by reference into the application.

Throughout this application, various publications are referenced, including referenced in parenthesis. The disclosures of all publications mentioned in this application in their entireties are hereby incorporated by reference into this application in order to provide additional description of the art to which this invention pertains and of the features in the art which can be employed with this invention.

REFERENCE TO SEQUENCE LISTING

This application incorporates-by-reference nucleotide sequences which are present in the filed named "200925 90429-A-PCT-US Substitute Sequence Listing LMO.txt", which is 249 kilobytes in size, and which was created on Sep. 24, 2020 in the IBM-PC machine format, having an operating system compatibility with MS-Windows, which is contained in the text file filed Sep. 25, 2020 as part of this application.

BACKGROUND OF INVENTION

There are several classes of DNA variation in the human genome, including insertions and deletions, differences in the copy number of repeated sequences, and single nucleotide polymorphisms (SNPs). A SNP is a DNA sequence variation occurring when a single nucleotide (adenine (A), thymine (T), cytosine (C), or guanine (G)) in the genome differs between human subjects or paired chromosomes in an individual. Over the years, the different types of DNA variations have been the focus of the research community either as markers in studies to pinpoint traits or disease causation or as potential causes of genetic disorders.

A genetic disorder is caused by one or more abnormalities in the genome. Genetic disorders may be regarded as either "dominant" or "recessive." Recessive genetic disorders are those which require two copies (i.e., two alleles) of the abnormal/defective gene to be present. In contrast, a dominant genetic disorder involves a gene or genes which exhibit(s) dominance over a normal (functional/healthy) gene or genes. As such, in dominant genetic disorders only a single copy (i.e., allele) of an abnormal gene is required to cause or contribute to the symptoms of a particular genetic disorder. Such mutations include, for example, gain-of-function mutations in which the altered gene product possesses a new molecular function or a new pattern of gene expression. Other examples include dominant negative mutations, which have a gene product that acts antagonistically to the wild-type allele.

Amyloidosis

Amyloidosis is a protein mis-folding disorder, in which normally soluble proteins undergo conformational changes and are deposited in the extracellular space as abnormal insoluble fibrils that progressively disrupt tissue structure and function. apoA-1 is a plasma protein of 28 kDa synthesized by the liver and the small intestine. ApoA-1 is the main protein of high-density lipoprotein particles and important for the formation and metabolism of high-density lipoprotein cholesterol esters. Mature apoA-1 consist of 243 amino acids encoded by exons 3 and 4 of the APOA1 gene. Mutations in the APOA1 gene were shown to be associated with apoA-1 related amyloidosis (AApoA1) which is an autosomal dominant disease that may cause, inter alia, hereditary renal amyloidosis.

SUMMARY OF THE INVENTION

Disclosed is an approach for knocking out the expression of a dominant-mutant allele by disrupting the dominant-mutant allele or degrading the resulting mRNA.

The present disclosure provides a method for utilizing at least one naturally occurring heterozygous nucleotide difference or polymorphism (e.g., single nucleotide polymorphism (SNP)) for distinguishing/discriminating between two alleles of a gene, one allele bearing a mutation such that it encodes a mutated protein causing a disease phenotype ("mutant allele"), and the other allele encoding for a functional protein ("functional allele").

As used herein, the term "heterozygous single nucleotide polymorphism" or "SNP" refers to a single nucleotide position in a genome that differs between paired chromosomes within a population. As used herein the most common or most prevalent nucleotide base at the position is referred to as the reference (REF), wild-type (WT), common, or major form. Less prevalent nucleotide bases at the position are referred to as the alternative (ALT), minor, rare, or variant forms.

Embodiments of the present invention provide methods for utilizing at least one heterozygous SNP in a gene expressing a dominant mutant allele in a given cell or subject. In embodiments of the present invention, the SNP utilized may or may not be associated with a disease phenotype. In embodiments of the present invention, an RNA molecule comprising a guide sequence targets only the mutant allele of the gene by targeting the nucleotide base present at a heterozygous SNP in the mutant allele of the gene and therefore having a different nucleotide base in the functional allele of the gene.

In some embodiments, the method further comprises the step of knocking out expression of the mutated protein and allowing expression of the functional protein.

According to embodiments of the present invention, there is provided a first RNA molecule comprising a guide sequence portion having 17-20 nucleotides in the sequence of 17-20 contiguous nucleotides set forth in any one of SEQ ID NOs: 1-1313.

According to embodiments of the present invention, there is provided a first RNA molecule comprising a guide sequence portion having 17-20 contiguous nucleotides set forth in any one of SEQ ID NOs: 1-1313.

According to some embodiments of the present invention, there is provided a composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided a method for inactivating a mutant APOA1 allele in a cell, the method comprising delivering to the cell a composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided a method for treating apoA-1 related amyloidosis, the method comprising delivering to a subject having apoA-1 related amyloidosis a composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided use of a composition comprising an RNA molecule comprising a guide sequence portion having 17-20 nucleotides in the sequence of 17-20 contiguous nucleotides set forth in any one of SEQ ID NOs: 1-1313 and a CRISPR nuclease for inactivating a mutant APOA1 allele in a cell, comprising delivering to the cell the composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to embodiments of the present invention, there is provided a medicament comprising an RNA molecule comprising a guide sequence portion having 17-20 nucleotides in the sequence of 17-20 contiguous nucleotides set forth in any one of SEQ ID NOs: 1-1313 and a CRISPR nuclease for use in inactivating a mutant APOA1 allele in a cell, wherein the medicament is administered by delivering to the cell the composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided use of a composition comprising an RNA molecule comprising a guide sequence portion having 17-20 nucleotides in the sequence of 17-20 contiguous nucleotides set forth in any one of SEQ ID NOs: 1-1313 and a CRISPR nuclease for treating ameliorating or preventing apoA-1 related amyloidosis, comprising delivering to a subject having or at risk of having apoA-1 related amyloidosis the composition of comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided a medicament comprising the composition comprising an RNA molecule comprising a guide sequence portion having 17-20 nucleotides in the sequence of 17-20 contiguous nucleotides set forth in any one of SEQ ID NOs: 1-1313 and a CRISPR nuclease for use in treating ameliorating or preventing apoA-1 related amyloidosis, wherein the medicament is administered by delivering to a subject having or at risk of having apoA-1 related amyloidosis the composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided a kit for inactivating a mutant APOA1 allele in a cell, comprising an RNA molecule comprising a guide sequence portion having 17-20 nucleotides in the sequence of 17-20 contiguous nucleotides set forth in any one of SEQ ID NOs: 1-1313, a CRISPR nuclease, and/or a tracrRNA molecule; and instructions for delivering the RNA molecule; CRISPR nuclease, and/or the tracrRNA to the cell.

According to some embodiments of the present invention, there is provided a kit for treating apoA-1 related amyloidosis in a subject, comprising an RNA molecule comprising a guide sequence portion having 17-20 nucleotides in the sequence of 17-20 contiguous nucleotides set forth in any one of SEQ ID NOs: 1-1313, a CRISPR nuclease, and/or a tracrRNA molecule; and instructions for delivering the RNA molecule; CRISPR nuclease, and/or the tracrRNA to a subject having or at risk of having apoA-related amyloidosis.

According to some embodiments of the present invention, there are provided cells modified by the RNA molecules, compositions, or methods of the present invention.

According to some embodiments of the present invention, there are provided cells modified by the RNA molecules, compositions, or methods of the present invention for use in treating apoA-1 related amyloidosis in a subject having or at risk of having apoA-1 related amyloidosis.

According to some embodiments of the present invention, there is provided a medicament comprising the modified cells of the present invention for treating apoA-1 related amyloidosis in a subject having or at risk of having apoA-1 related amyloidosis.

According to some embodiments of the present invention, there is provided a method for inactivating a mutant allele of the APOA1 gene in a cell, the method comprising the steps of:
  a) selecting a cell with an APOA1 gene mutation associated with in apoA-1 related amyloidosis and which cell is heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076;
  b) introducing to the cell a composition comprising:
    a CRISPR nuclease, and
    a first RNA molecule comprising a guide sequence portion having 17-20 nucleotides,
    wherein a complex of the CRISPR nuclease and the first RNA molecule affects a double strand break in only the mutant allele of the APO1 gene and not in the functional allele of the APOA1 gene in the cell;
  thereby inactivating only the mutant allele of the APOA1 gene in the cell.

According to embodiments of the present invention, there is provided a method for inactivating a mutant allele of the APOA1 gene in a cell, the method comprising the steps of:
  a) selecting a cell with an APOA1 gene mutation associated with an apoA-1 related amyloidosis and which cell is heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076, rs28931574;
  b) introducing to the cell a composition comprising:
    a CRISPR nuclease, and
    a first RNA molecule comprising a guide sequence portion having 17-20 nucleotides,
    wherein a complex of the CRISPR nuclease and the first RNA molecule affects a double strand break in only the mutant allele of the APO1 gene and not in the functional allele of the APOA1 gene in the cell;
    and wherein the method further comprises introduction of a second RNA molecule comprising a guide sequence portion capable of complexing with a CRISPR nuclease, wherein the complex of second RNA molecule and the CRISPR nuclease affects a second double strand break in the APOA1 gene;

thereby inactivating only the mutant allele of the APOA1 gene in the cell.

According to embodiments of the present invention, there is provided a method for inactivating a mutant allele of the APOA1 gene in a cell with an APOA1 gene mutation associated with apoA-1 related amyloidosis and which cell is heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076, the method comprising
   introducing to the cell a composition comprising:
      a CRISPR nuclease, and
      a first RNA molecule comprising a guide sequence portion having 17-20 nucleotides,
   wherein a complex of the CRISPR nuclease and the first RNA molecule affects a double strand break in only the mutant allele of the APO1 gene and not in the functional allele of the APOA1 gene in the cell;
   thereby inactivating only the mutant allele of the APOA1 gene in the cell.

According to embodiments of the present invention, there is provided a method for inactivating a mutant allele of the APOA1 gene in a cell with an APOA1 gene mutation associated with apoA-1 related amyloidosis and heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076, rs28931574, the method comprising:
   introducing to the cell a composition comprising:
      a CRISPR nuclease, and
      a first RNA molecule comprising a guide sequence portion having 17-20 nucleotides,
   wherein a complex of the CRISPR nuclease and the first RNA molecule affects a double strand break in only the mutant allele of the APO1 gene and not in the functional allele of the APOA1 gene in the cell;
   and wherein the method further comprises introduction of a second RNA molecule comprising a guide sequence portion capable of complexing with a CRISPR nuclease, wherein the complex of the second RNA molecule and CRISPR nuclease affects a second double strand break in the APOA1 gene;
   thereby inactivating only the mutant allele of the APOA1 gene in the cell.

DETAILED DESCRIPTION

Definitions

Figure 1:
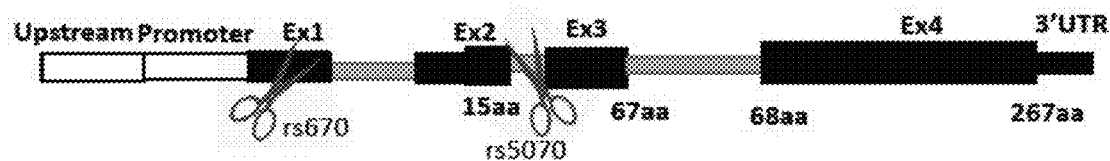
FIG. 1: Removal of, inter alia, exon 2 of the APOA1 gene which encodes at least a portion of the signal peptide (residues 1-18) may result in a protein that will not be secreted or alternatively RNA decay may be triggered resulting in knockout of the expression of the mutant allele. For example, utilization of two guide sequences, one targeting a heterozygous SNP present in the APOA1 gene and located at exon 1 and the other targeting a heterozygous SNP present on the APOA1 gene located at intron 2, wherein each RNA molecule targets the nucleotide base, REF or ALT, of each SNP present in only the mutant allele of the APOA1 gene to remove at least a portion of exon 1 which encodes the 5' UTR and exon 2.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term"about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of items it conjoins.

In the description and claims of the present application, each of the verbs, "comprise," "include" and "have" and conjugates thereof, are used to indicate that the object or objects of the verb are not necessarily a complete listing of components, elements or parts of the subject or subjects of the verb. Other terms as used herein are meant to be defined by their well-known meanings in the art.

The "guide sequence portion" of an RNA molecule refers to a nucleotide sequence that is capable of hybridizing to a specific target DNA sequence, e.g., the guide sequence portion has a nucleotide sequence which is fully complementary to said target DNA sequence. In some embodiments, the guide sequence portion is 17, 18, 19, 20, 21, 22, 23, or 24 nucleotides in length, or approximately 17-24, 18-22, 19-22, 18-20, or 17-20 nucleotides in length. The guide sequence portion may be part of an RNA molecule that can form a complex with a CRISPR nuclease with the guide sequence portion serving as the DNA targeting portion of the CRISPR complex. When the DNA molecule having the guide sequence portion is present contemporaneously with the CRISPR molecule the RNA molecule is capable of targeting the CRISPR nuclease to the specific target DNA sequence. Each possibility represents a separate embodiment. An RNA molecule can be custom designed to target any desired sequence.

In embodiments of the present invention, an RNA molecule comprises a guide sequence portion having 17-20 nucleotides in the sequence of 17-20 contiguous nucleotides set forth in any one of SEQ ID NOs: 1-1313, or SEQ ID NOs: 1-269, or SEQ ID NOs: 270-1056, or SEQ ID NOs: 1057-1102, or SEQ ID NOs: 1103-1313, or SEQ ID NOs: 1-269 and SEQ ID NOs: 1057-1102, or SEQ ID NOs 270-1056 and SEQ ID NOs: 1103-1313. It is understood that in any of the embodiments of the present invention the guide sequence portion of an RNA molecule may comprise 17-20 contiguous nucleotides set forth in any single sequence of SEQ ID NOs: 1-1313, or in any single sequence from the following groups of sequences SEQ ID NOs: 1-269, or SEQ ID NOs: 270-1056, or, or SEQ ID NOs: 1057-1102, or SEQ ID NOs: 1103-1313, or SEQ ID NOs:1-269 and SEQ ID NOs: 1057-1102, or SEQ ID NOs 270-1056 and SEQ ID NOs: 1103-1313, or SEQ ID NOs: 1-1313.

As used herein, "contiguous nucleotides" set forth in a SEQ ID NO refers to nucleotides in a sequence of nucleotides in the order set forth in the SEQ ID NO without any intervening nucleotides.

In embodiments of the present invention, the guide sequence portion may be 20 nucleotides in length and consists of 20 nucleotides in the sequence of 20 contiguous nucleotides set forth in any one of SEQ ID NOs: 1-1313. In embodiments of the present invention, the guide sequence portion may be less than 20 nucleotides in length. For example, in embodiments of the present invention the guide sequence portion may be 17, 18, or 19 nucleotides in length. In such embodiments the guide sequence portion may consist of 17, 18, or 19 nucleotides, respectively, in the sequence of 17-20 contiguous nucleotides set forth in any one of SEQ ID NOs: 1-1313. For example, a guide sequence portion having 17 nucleotides in the sequence of 17 contiguous nucleotides set forth in SEQ ID NO: 1 may consist of any one of the following nucleotide sequences (nucleotides excluded from the contiguous sequence are marked in strike-through):

```
                                           SEQ ID NO: 1
AAAGCUGCAGGCUCCGCAAG 17 nucleotide guide sequence 1:
AAAGCUGCAGGCUCCGCAAG 17 nucleotide guide sequence 2:
AAAGCUGCAGGCUCCGCAAG 17 nucleotide guide sequence 3:
AAAGCUGCAGGCUCCGCAAG 17 nucleotide guide sequence 4:
AAAGCUGCAGGCUCCGCAAG
```

In embodiments of the present invention, the guide sequence portion may be greater than 20 nucleotides in length. For example, in embodiments of the present invention the guide sequence portion may be 21, 22, 23, or 24 nucleotides in length. In such embodiments the guide sequence portion comprises 20 nucleotides in the sequence of 20 contiguous nucleotides set forth in any one of SEQ ID NOs: 1-1313 and additional nucleotides fully complimentary to a nucleotide or sequence of nucleotides adjacent to the 3' end of the target sequence, 5' end of the target sequence, or both.

In embodiments of the present invention, a CRISPR nuclease and an RNA molecule comprising a guide sequence portion form a CRISPR complex that binds to a target DNA sequence to effect cleavage of the target DNA sequence. CRISPR nucleases, e.g. Cpf1, may form a CRISPR complex comprising a CRISPR nuclease and RNA molecule without a further tracrRNA molecule. Alternatively, CRISPR nucleases, e.g. Cas9, may form a CRISPR complex between the CRISPR nuclease, an RNA molecule, and a tracrRNA molecule.

In embodiments of the present invention, the RNA molecule may further comprise the sequence of a tracrRNA molecule. Such embodiments may be designed as a synthetic fusion of the guide portion of the RNA molecule and the trans-activating crRNA (tracrRNA). (See Jinek (2012) Science). Embodiments of the present invention may also form CRISPR complexes utilizing a separate tracrRNA molecule and a separate RNA molecule comprising a guide sequence portion. In such embodiments the tracrRNA molecule may hybridize with the RNA molecule via base pairing and may be advantageous in certain applications of the invention described herein.

The term "tracr mate sequence" refers to a sequence sufficiently complementary to a tracrRNA molecule so as to hybridize to the tracrRNA via basepairing and promote the formation of a CRISPR complex. (See U.S. Pat. No. 8,906, 616). In embodiments of the present invention, the RNA molecule may further comprise a portion having a tracr mate sequence.

A "gene," for the purposes of the present disclosure, includes a DNA region encoding a gene product, as well as all DNA regions which regulate the production of the gene product, whether or not such regulatory sequences are adjacent to coding and/or transcribed sequences. Accordingly, a gene includes, but is not necessarily limited to, promoter sequences, terminators, translational regulatory sequences such as ribosome binding sites and internal ribosome entry sites, enhancers, silencers, insulators, boundary elements, replication origins, matrix attachment sites and locus control regions.

"Eukaryotic" cells include, but are not limited to, fungal cells (such as yeast), plant cells, animal cells, mammalian cells and human cells.

The term "nuclease" as used herein refers to an enzyme capable of cleaving the phosphodister bonds between the nucleotide subunits of nucleic acid. A nuclease may be isolated or derived from a natural source. The natural source may be any living organism. Alternatively, a nuclease may be a modified or a synthetic protein which retains the phosphodiester bond cleaving activity. Gene modification can be achieved using a nuclease, for example a CRISPR nuclease.

A skilled artisan will appreciate that in all of the embodiments of the present invention, each of the RNA molecules of the present invention are capable of complexing with a CRISPR nuclease such as to associate with a target genomic DNA sequence of interest next to a protospacer adjacent motif (PAM). The CRISPR nuclease then mediates cleavage of target DNA to create a double-stranded break within the protospacer. Accordingly, in embodiments of the present invention, the guide sequences and RNA molecules of the present invention may target a location 1, 2, 3, 4, 5, 6, 7, 8, 9, 10, 11, 12, 13, 14, 15, 16, 17, 18, 19, 20, 21, 22, 23, 24, 25, 26, 27, or 28 nucleotides upstream or downstream from a PAM site In embodiments of the present invention, the guide sequences and RNA molecules of the present invention may target a location that is within the PAM site.

Therefore, in embodiments of the present invention, the RNA molecules of the present invention may affect a double strand break in an allele of a gene 1, 2, 3, 4, 5, 6, 7, 8, 9, 10, 11, 12, 13, 14, 15, 16, 17, 18, 19, 20, 21, 22, 23, 24, 25, 26, 27, 28 upstream or downstream from a polymorphic site. In further embodiments of the invention, the polymorphic site is within the PAM site. A skilled artisan will appreciate that where a heterozygous polymorphic site is present, an RNA molecule may be designed to affect a double stranded break in only the REF or ALT nucleotide base of the heterozygous polymorphic site.

In embodiments of the present invention, an RNA molecule is designed to target a heterozygous polymorphic site present in the APOA1 gene, wherein the RNA molecule targets only the nucleotide base, REF or ALT, of the heterozygous polymorphic site present in only the mutant allele of the APOA1 gene

EMBODIMENTS

The present disclosure provides a method for utilizing at least one naturally occurring nucleotide difference or polymorphism (e.g., single nucleotide polymorphism (SNP)) for distinguishing/discriminating between two alleles of a gene, one allele bearing a mutation such that it encodes a mutated protein causing a disease phenotype ("mutant allele"), and the other allele encoding for a functional protein ("functional allele"). The method further comprises the step of knocking out expression of the mutated protein and allowing expression of the functional protein. In some embodiments, the method is for treating, ameliorating, or preventing a dominant negative genetic disorder.

Embodiments of the present invention provide methods for utilizing at least one heterozygous SNP in a gene expressing a dominant mutant allele in a given cell or subject. In embodiments of the present invention, the SNP utilized may or may not be associated with a disease phenotype. In embodiments of the present invention, an RNA molecule comprising a guide sequence targets only the mutant allele of the gene by targeting the nucleotide base present at a heterozygous SNP in the mutant allele of the gene and therefore having a different nucleotide base in the functional allele of the gene.

According to embodiments of the present invention, there is provided a first RNA molecule comprising a guide sequence portion having 17-20 nucleotides in the sequence of 17-20 contiguous nucleotides set forth in any one of SEQ ID NOs: 1-1313.

According to embodiments of the present invention, there is provided a first RNA molecule comprising a guide sequence portion having 17-20 contiguous nucleotides set forth in any one of SEQ ID NOs: 1-1313.

According to embodiments of the present invention, an RNA molecule may further comprise a portion having a sequence which binds to a CRISPR nuclease.

According to embodiments of the present invention, the sequence which binds to a CRISPR nuclease is a tracrRNA sequence.

According to embodiments of the present invention, an RNA molecule may further comprise a portion having a tracr mate sequence.

According to embodiments of the present invention, an RNA molecule may further comprise one or more linker portions.

According to embodiments of the present invention, an RNA molecule may be up to 300, 290, 280, 270, 260, 250, 240, 230, 220, 210, 200, 190, 180, 170, 160, 150, 140, 130, 120, 110, or 100 nucleotides in length. Each possibility represents a separate embodiment. In embodiments of the present invention, the RNA molecule may be 17 up to 300 nucleotides in length, 100 up to 300 nucleotides in length, 150 up to 300 nucleotides in length, 200 up to 300 nucleotides in length, 100 to 200 nucleotides in length, or 150 up to 250 nucleotides in length. Each possibility represents a separate embodiment.

According to some embodiments of the present invention, there is provided a composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to embodiments of the present invention, the composition may comprise a second RNA molecule comprising a guide sequence portion.

According to embodiments of the present invention, the guide sequence portion of the second RNA molecule comprises 17-20 nucleotides in the sequence of 17-20 contiguous nucleotides set forth in any one of SEQ ID NOs: 1-1313.

According to embodiments of the present invention, the 17-20 nucleotides of the guide sequence portion of the second RNA molecule are in a different sequence from the sequence of the guide sequence portion of the first RNA molecule.

According to embodiments of the present, invention, the 17-20 nucleotides of the guide sequence portion of the second RNA molecule, when complexed with a CRISPR nuclease, target a non-coding region of the APOA1 gene. In some embodiments, the non-coding regions selected from, exon 1, intron 1, intron 2, and intron 3.

Embodiments of the present invention may comprise a tracrRNA molecule.

According to some embodiments of the present invention, there is provided a method for inactivating a mutant APOA1 allele in a cell, the method comprising delivering to the cell a composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided a method for treating apoA-1 related amyloidosis, the method comprising delivering to a subject having apoA-1 related amyloidosis a composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to embodiments of the present invention, the composition comprises a second RNA molecule comprising a guide sequence portion having 17-20 nucleotides in the sequence of 17-20 contiguous nucleotides set forth in any one of SEQ ID NOs: 1-1313.

According to embodiments of the present invention, the 17-20 nucleotides of the guide sequence portion of the second RNA molecule are in a different sequence from the sequence of the guide sequence portion of the first RNA molecule According to embodiments of the present invention, the CRISPR nuclease and the RNA molecule or RNA molecules are delivered to the subject and/or cells substantially at the same time or at different times.

According to embodiments of the present invention, the tracrRNA is delivered to the subject and/or cells substantially at the same time or at different times as the CRISPR nuclease and RNA molecule or RNA molecules.

According to embodiments of the present invention, the first RNA molecule targets a first heterozygous SNP present in an exon or promoter of the APOA1 gene wherein the first RNA molecule targets the nucleotide base, REF or ALT, of the first SNP present in only the mutant allele of the APOA1 gene, and wherein the second RNA molecule targets a second heterozygous SNP present in the same or a different exon or an intron of the APOA1 gene wherein the second RNA molecule targets the nucleotide base, REF or ALT, of the second SNP present in only the mutant allele of the APOA1 gene, or a the second RNA molecule targets a sequence in an intron present in both the mutant or functional allele.

According to embodiments of the present invention, the first RNA molecule or the first and the second RNA molecules target a heterozygous SNP present in the promoter region, the start codon, or the untranslated region (UTR) of the APOA1 gene wherein the RNA molecule targets the nucleotide base, REF or ALT, of the SNP present in only the mutant allele of the APOA1 gene.

According to embodiments of the present invention, the first RNA molecule or the first and the second RNA molecules targets at least a portion of the promoter and/or the start codon and/or a portion of the UTR of the mutant allele of the APOA1 gene.

According to embodiments of the present invention, the first RNA molecule targets a portion of the promoter, a first heterozygous SNP present in the promoter of the APOA1 gene, or a heterozygous SNP present upstream to the promoter of the APOA1 gene and the second RNA molecule targets a second heterozygous SNP, which is present in the APOA1 gene downstream of the first heterozygous SNP, and is in the promoter, in the UTR, or in an intron or in an exon of the APOA1 gene, wherein the first RNA molecule targets the nucleotide base, REF or ALT, of the first SNP present in only the mutant allele of the of the APOA1 gene, wherein the second RNA molecule targets the nucleotide base, REF or ALT, of the second SNP present in only the mutant allele of the APOA1 gene.

According to embodiments of the present invention, the first RNA molecule targets a heterozygous SNP present in the promoter, upstream of the promoter, or the UTR of a the APO1 gene wherein the RNA molecule targets the nucleotide base, REF or ALT, of the SNP present in only the mutant allele of the APOA1 gene and the second RNA molecule is designed to target a sequence which is present in an intron of both the mutant allele and the functional allele of the APOA1 gene.

According to embodiments of the present invention, the first RNA molecule targets a sequence upstream of the promotor which is present in both a mutant and functional allele of the APOA1 gene and the second RNA molecule targets a heterozygous SNP present in any location of the of the APOA1 gene wherein the second RNA molecule targets the nucleotide base, REF or ALT, of the SNP present in only the mutant allele of the APOA1 gene.

According to embodiments of the present invention, there is provided a method comprising removing an exon containing a disease-causing mutation from a mutant allele, wherein the first RNA molecule or the first and the second RNA molecules target regions flanking an entire exon or a portion of the exon.

According to embodiments of the present invention, there is provided a method comprising removing multiple exons, the entire open reading frame of a gene, or removing the entire gene.

According to embodiments of the present invention, the first RNA molecule targets a first heterozygous SNP present in an exon or promoter of the APOA1 gene, and wherein the second RNA molecule targets a second heterozygous SNP present in the same or a different exon or in an intron of the APOA1 gene wherein the second RNA molecule targets the nucleotide base, REF or ALT, of the second SNP present in only the mutant allele of the APOA1 gene, or the second RNA molecule targets a sequence in an intron present in both the mutant and functional allele of the APOA1 gene.

According to embodiments of the present invention, the first RNA molecule or the first and the second RNA molecules target an alternative splicing signal sequence between an exon and an intron of a mutant allele.

According to embodiments of the present invention, the second RNA molecule targets a sequence present in both a mutant allele and a functional allele of the APOA1 gene.

According to embodiments of the present invention, the second RNA molecule targets an intron.

According to embodiments of the present invention, there is provided a method comprising subjecting the mutant allele to insertion or deletion by an error prone non-homologous end joining (NHEJ) mechanism, generating a frameshift in the mutant allele's sequence.

According to embodiments of the present invention, the frameshift results in inactivation or knockout of the mutant allele.

According to embodiments of the present invention, the frameshift creates an early stop codon in the mutant allele.

According to embodiments of the present invention, the frameshift results in nonsense-mediated mRNA decay of the transcript of the mutant allele.

According to embodiments of the present invention, the inactivating or treating results in a truncated protein encoded by the mutant allele and a functional protein encoded by the functional allele.

According to some embodiments of the present invention, there is provided use of a composition comprising an RNA molecule comprising a guide sequence portion having 17-20 nucleotides in the sequence of 17-20 contiguous nucleotides set forth in any one of SEQ ID NOs: 1-1313 and a CRISPR nuclease inactivating a mutant APOA1 allele in a cell, comprising delivering to the cell the RNA molecule comprising a guide sequence portion having 17-20 nucleotides in the sequence of 17-20 contiguous nucleotides set forth in any one of SEQ ID NOs: 1-1313 and the CRISPR nuclease.

According to embodiments of the present invention, there is provided a medicament comprising an RNA molecule comprising a guide sequence portion having 17-20 nucleotides in the sequence of 17-20 contiguous nucleotides set forth in any one of SEQ ID NOs: 1-1313 and a CRISPR nuclease for use in inactivating a mutant APOA1 allele in a cell, wherein the medicament is administered by delivering to the cell the composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided use of a composition comprising an RNA molecule comprising a guide sequence portion having 17-20 nucleotides in the sequence of 17-20 contiguous nucleotides set forth in any one of SEQ ID NOs: 1-1313 and a CRISPR nuclease for treating ameliorating or preventing apoA-1 related amyloidosis, comprising delivering to a subject having or at risk of having apoA-1 related amyloidosis the composition of comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided a medicament comprising the composition comprising an RNA molecule comprising a guide sequence portion having 17-20 nucleotides in the sequence of 17-20 contiguous nucleotides set forth in any one of SEQ ID NOs: 1-1313 and a CRISPR nuclease for use in treating ameliorating or preventing apoA-1 related amyloidosis, wherein the medicament is administered by delivering to a subject having or at risk of having apoA-1 related amyloidosis: the composition comprising an RNA molecule comprising a guide sequence portion having 17-20 nucleotides in the sequence of 17-20 contiguous nucleotides set forth in any one of SEQ ID NOs: 1-1313 and a CRISPR nuclease.

According to some embodiments of the present invention, there is provided a kit for inactivating a mutant APOA1 allele in a cell, comprising an RNA molecule comprising a guide sequence portion having 17-20 nucleotides in the sequence of 17-20 contiguous nucleotides set forth in any one of SEQ ID NOs: 1-1313, a CRISPR nuclease, and/or a tracrRNA molecule; and instructions for delivering the RNA molecule; CRISPR nuclease, and/or the tracrRNA to the cell.

According to some embodiments of the present invention, there is provided a kit for treating apoA-1 related amyloidosis in a subject, comprising an RNA molecule comprising a guide sequence portion having 17-20 nucleotides in the sequence of 17-20 contiguous nucleotides set forth in any one of SEQ ID NOs: 1-1313, a CRISPR nuclease, and/or a tracrRNA molecule; and instructions for delivering the RNA molecule; CRISPR nuclease, and/or the tracrRNA to a subject having or at risk of having apoA-1 related amyloidosis.

In embodiments of the present invention, the RNA molecule comprises a guide sequence portion having 17-20 nucleotides in the sequence of 17-20 contiguous nucleotides set forth in any one of SEQ ID NOs: 1-269, or SEQ ID NOs: 270-1056, or SEQ ID NOs: 1057-1102, or SEQ ID NOs: 1103-1313, or SEQ ID NOs:1-269 and SEQ ID NOs: 1057-1102, or SEQ ID NOs 270-1056 and SEQ ID NOs: 1103-1313, or SEQ ID NOs 1-1313. It is understood that in any of the embodiments of the present invention the guide sequence portion of an RNA molecule may comprise 17-20 contiguous nucleotides set forth in any single sequence of SEQ ID NOs: 1-1313, or in any single sequence from the following groups of sequences SEQ ID NOs: 1-269, SEQ ID NOs: 270-1056, or SEQ ID NOs: 1057-1102, or SEQ ID NOs: 1103-1313, or SEQ ID NOs:1-269 and SEQ ID NOs: 1057-1102, or SEQ ID NOs 270-1056 and SEQ ID NOs: 1103-1313, or SEQ ID NOs: 1-1313.

The compositions and methods of the present disclosure may be utilized for treating, preventing, ameliorating, or slowing progression of amyloidosis, such as renal amyloidosis.

In some embodiments, a mutant allele is deactivated by delivering to a cell an RNA molecule which targets a heterozygous SNP present in the promoter region, the start codon, or the untranslated region (UTR) of the APOA1 gene wherein the RNA molecule targets the nucleotide base, REF or ALT, of the SNP present in only the mutant allele of the APOA1 gene.

In some embodiments, a mutant allele is inactivated by removing at least a portion of the promoter and/or removing the start codon and/or a portion of the UTR. In some embodiments, the method of deactivating a mutant allele comprises removing at least a portion of the promoter. In such embodiments one RNA molecule may be designed for targeting a first heterozygous SNP present in the promoter or upstream to the promoter of the APOA1 gene and another RNA molecule is designed to target a second heterozygous SNP, which is downstream of the first SNP, and is present in the promoter, in the UTR, or in an intron or in an exon of the APO1 gene. Alternatively, one RNA molecule may be designed for targeting a heterozygous SNP present in the promoter, or upstream of the promoter, or the UTR of the APOA1 gene and another RNA molecule is designed to target a sequence which is present in an intron of both the mutant allele and the functional allele of the APOA1 gene. Alternatively, one RNA molecule may be designed for targeting a sequence upstream of the promotor which is present in both the mutant and functional allele and the other guide is designed to target a heterozygous SNP present in any location of the APOA1 gene e.g., in an exon, intron, UTR, or downstream of the promoter of the APOA1 gene wherein the RNA molecule targets the nucleotide base, REF or ALT, of the SNP present in only the mutant allele of the APOA1 gene.

In some embodiments, the method of deactivating a mutant allele comprises an exon skipping step comprising removing an exon containing a disease-causing mutation from the mutant allele. Removing an exon containing a disease-causing mutation in the mutant allele requires two RNA molecules which target regions flanking the entire exon or a portion of the exon. Removal of an exon containing the disease-causing mutation may be designed to eliminate the disease-causing action of the protein while allowing for expression of the remaining protein product which retains some or all of the wild-type activity. As an alternative to single exon skipping, multiple exons, the entire open reading frame or the entire gene can be excised using two RNA molecules flanking the region desired to be excised.

In some embodiments, the method of deactivating a mutant allele comprises delivering two RNA molecules to a cell, wherein one RNA molecule targets a first heterozygous SNP present in an exon or promoter of the APOA1 gene wherein the RNA molecule targets the nucleotide base, REF or ALT, of the first SNP present in only the mutant allele of the APOA1 gene, and wherein the other RNA molecule targets a second heterozygous SNP present in the same or a different exon or in an intron of the APOA1 gene wherein the RNA molecule targets the nucleotide base, REF or ALT, of the second SNP present in only the mutant allele of the APOA1 gene, or the second RNA molecule targets a sequence in an intron present in both the mutant or functional allele.

In some embodiments, an RNA molecule is used to target a CRISPR nuclease to an alternative splicing signal sequence between an exon and an intron of a mutant allele, thereby destroying the alternative splicing signal sequence in the mutant allele.

Anyone of, or combination of, the above-mentioned strategies for deactivating a mutant allele may be used in the context of the invention.

Additional strategies may be used to deactivate a mutant allele. For example, in embodiments of the present invention, an RNA molecule is used to direct a CRISPR nuclease to an exon or a splice site of a mutant allele in order to create a double-stranded break (DSB), leading to insertion or deletion of nucleotides by an error-prone non-homologous end-joining (NHEJ) mechanism and formation of a frameshift mutation in the mutant allele. The frameshift mutation may result in: (1) inactivation or knockout of the mutant allele by generation of an early stop codon in the mutant allele, resulting in generation of a truncated protein; or (2) nonsense mediated mRNA decay of the transcript of the mutant allele. In further embodiments, one RNA molecule is used to direct a CRISPR nuclease to a promotor of a mutant allele.

In some embodiments, the method of deactivating a mutant allele further comprises enhancing activity of the functional protein such as by providing a protein/peptide, a nucleic acid encoding a protein/peptide, or a small molecule such as a chemical compound, capable of activating/enhancing activity of the functional protein.

According to some embodiments, the present disclosure provides an RNA molecule which binds to/associates with and/or directs the RNA guided DNA nuclease e.g., CRISPR nuclease to a sequence comprising at least one nucleotide which differs between a mutant allele and a functional allele (e.g., heterozygous SNP) of a gene of interest (i.e., a sequence of the mutant allele which is not present in the functional allele).

In some embodiments, the method comprises the steps of: contacting a mutant allele of a gene of interest with an allele-specific RNA molecule and a CRISPR nuclease e.g., a Cas9 protein, wherein the allele-specific RNA molecule and the CRISPR nuclease e.g., Cas9 associate with a nucleotide sequence of the mutant allele of the gene of interest which differs by at least one nucleotide from a nucleotide sequence of a functional allele of the gene of interest, thereby modifying or knocking-out the mutant allele.

In some embodiments, the allele-specific RNA molecule and a CRISPR nuclease is introduced to a cell encoding the gene of interest. In some embodiments, the cell encoding the gene of interest is in a mammalian subject. In some embodiments, the cell encoding the gene of interest is in a plant.

In some embodiments, the cleaved mutant allele is further subjected to insertion or deletion (indel) by an error prone non-homologous end joining (NHFJ) mechanism, generating a frameshift in the mutant allele's sequence. In some embodiments, the generated frameshift results in inactivation or knockout of the mutant allele. In some embodiments, the generated frameshift creates an early stop codon in the mutant allele and results in generation of a truncated protein. In such embodiments, the method results in the generation of a truncated protein encoded by the mutant allele and a functional protein encoded by the functional allele. In some embodiments, a frameshift generated in a mutant allele using the methods of the invention results in nonsense-mediated mRNA decay of the transcript of the mutant allele.

In some embodiments, the mutant allele is an allele of apolipoprotein A1 (APOA1) gene. In some embodiments, the RNA molecule targets a heterozygous SNP of the APOA1 gene which co-exists with/is genetically linked to the mutated sequence associated with apoA-1 related amyloidosis genetic disorder. In some embodiments, the RNA molecule targets a heterozygous SNP of the APOA1 gene, wherein the heterozygosity of said SNP is highly prevalent in the population. In embodiments of the present invention, the REF nucleotide is prevalent in the mutant allele and not in the functional allele of an individual subject to be treated. In embodiments of the present invention, the ALT nucleotide is prevalent in the mutant allele and not in the functional allele of an individual subject to be treated. In some embodiments, a disease-causing mutation within a mutant APOA1 allele is targeted.

In embodiments of the present invention, the heterozygous SNP may or may not be associated with an APOA1 related disease phenotype. In embodiments of the present invention, the heterozygous SNP is associated with an APOA1 related disease phenotype. In embodiments of the present invention, the SNP is not associated with an APOA1 related disease phenotype In some embodiments, the heterozygous SNP is within an exon of the gene of interest. In such embodiments, a guide sequence portion of an RNA molecule may be designed to associate with a sequence of the exon of the gene of interest.

In some embodiments, a heterozygous SNP is within an intron or an exon of the gene of interest. In some embodiments, a heterozygous SNP is in a splice site between the intron and the exon:

A skilled artisan will appreciate that in all of the embodiments of the present invention, each of the RNA molecules of the present invention are capable of complexing with a CRISPR nuclease such as to associate with a target genomic DNA sequence of interest next to a protospacer adjacent motif (PAM). The CRISPR nuclease then mediates cleavage of target DNA to create a double-stranded break within the protospacer. Accordingly, in embodiments of the present invention, the guide sequences and RNA molecules of the present invention may target a location 1, 2, 3, 4, 5, 6, 7, 8, 9, 10, 11, 12, 13, 14, 15, 16, 17, 18, 19, 20, 21, 22, 23, 24, 25, 26, 27, or 28 nucleotides upstream or downstream from a PAM site. In embodiments of the present invention, the guide sequences and RNA molecules of the present invention may target a location that is within the PAM site.

Therefore, in embodiments of the present invention, the RNA molecules of the present invention may affect a double strand break in an allele of a gene 1, 2, 3, 4, 5, 6, 7, 8, 9, 10, 11, 12, 13, 14, 15, 16, 17, 18, 19, 20, 21, 22, 23, 24, 25, 26, 27, 28 upstream or downstream from a polymorphic site. In further embodiments of the invention, the polymorphic site is within the PAM site. A skilled artisan will appreciate that where a heterozygous polymorphic site is present, an RNA molecule may be designed to affect a double stranded break in only the REF or ALT nucleotide base of the heterozygous polymorphic site.

In embodiments of the present invention, an RNA molecule is designed to target a heterozygous polymorphic site present in the APOA1 gene, wherein the RNA molecule targets only the nucleotide base, REF or ALT, of the heterozygous polymorphic site present in only the mutant allele of the APOA1 gene Each possibility represents a separate embodiment of the present invention. In some embodiments, a guide sequence portion of an RNA molecule may be designed to associate with a sequence of the gene of interest which comprises the splice site.

In some embodiments, the method is utilized for treating a subject having a disease phenotype resulting from the heterozygote APOA1 gene. In such embodiments, the method results in improvement, amelioration or prevention of the disease phenotype.

Embodiments referred to above refer to a CRISPR nuclease, RNA molecule(s), and tracrRNA being effective in a subject or cells at the same time. The CRISPR, RNA molecule(s), and tracrRNA can be delivered substantially at the same time or can be delivered at different times but have effect at the same time. For example, this includes delivering the CRISPR nuclease to the subject or cells before the RNA molecule and/or tracr RNA is substantially extant in the subject or cells.

In some embodiments, the cell is a liver cell. In some embodiments, the cell is a hepatocyte cell.

According to embodiments of the present invention, there is provided a method for inactivating a mutant allele of the APOA1 gene in a cell, the method comprising the steps of:
  a) selecting a cell with an APOA1 gene mutation associate with apoA-1 related amyloidosis and who is heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076;
  b) introducing to the cell a composition comprising:
    a CRISPR nuclease, and
    a first RNA molecule comprising a guide sequence portion having 17-20 nucleotides,
  wherein a complex of the CRISPR nuclease and the first RNA molecule affects a double strand break in only the mutant allele of the APO1 gene and not in the functional allele of the APOA1 gene in the cell;
  thereby inactivating only the mutant allele of the APOA1 gene in the cell.

According to embodiments of the present invention, there is provided a method for inactivating a mutant allele of the APOA1 gene in a cell, the method comprising the steps of:
  a) selecting a cell with an APOA1 gene mutation associated with apoA-1 related amyloidosis and who is heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076, rs28931574;

b) introducing to the cell a composition comprising:
   a CRISPR nuclease, and
   a first RNA molecule comprising a guide sequence portion having 17-20 nucleotides,
   wherein a complex of the CRISPR nuclease and the first RNA molecule affects a double strand break in only the mutant allele of the APO1 gene and not in the functional allele of the APOA1 gene in the cell;
   and wherein the method further comprises introduction of a second RNA molecule comprising a guide sequence portion capable of complexing with a CRISPR nuclease, wherein the complex of the second RNA molecule and the CRISPR nuclease affects a second double strand break in the APOA1 gene;
thereby inactivating only the mutant allele of the APOA1 gene in the cell.

According to embodiments of the present invention, there is provided a method for inactivating a mutant allele of the APOA1 gene in a cell with an APOA1 gene mutation associated with apoA-1 related amyloidosis and which cell is heterozygous at one or more polymorphic sites in the APOA1 gene selected from: rs11216158, rs1216157, rs2727784, rs613808, rs4018880, rs1374117, rs670, rs5069, rs5070, rs2070665, rs5072, rs7116797, rs5076, the method comprising
   introducing to the cell a composition comprising:
      a CRISPR nuclease, and
      a first RNA molecule comprising a guide sequence portion having 17-20 nucleotides,
      wherein a complex of the CRISPR nuclease and the first RNA molecule affects a double strand break in only the mutant allele of the APO1 gene and not in the functional allele of the APOA1 gene in the cell;
   thereby inactivating only the mutant allele of the APOA1 gene in the cell.

According to embodiments of the present invention, there is provided a method for inactivating a mutant allele of the APOA1 gene in a cell with an APOA1 gene mutation associated with apoA-1 related amyloidosis and heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076, rs28931574, the method comprising:
   introducing to the cell a composition comprising:
      a CRISPR nuclease, and
      a first RNA molecule comprising a guide sequence portion having 17-20 nucleotides,
      wherein a complex of the CRISPR nuclease and the first RNA molecule affects a double strand break in only the mutant allele of the APO1 gene and not in the functional allele of the APOA1 gene in the cell;
   and wherein the method further comprises introduction of a second RNA molecule comprising a guide sequence portion capable of complexing with a CRISPR nuclease, wherein the complex of the second RNA molecule and CRISPR nuclease affects a second double strand break in the APOA1 gene;
   thereby inactivating only the mutant allele of the APOA1 gene in the cell.

In embodiments of the present invention, the guide sequence portion of the first RNA molecule comprises 17-20 contiguous nucleotides as set forth in any one of SEQ ID NOs: 1-1313.

In embodiments of the present invention, the second double strand break is within a non-coding region of the APOA1 gene.

In embodiments of the present invention, the non-coding region of the APOA1 gene is exon 1, intron 1, intron 2, or intron 3.

In embodiments of the present invention, the cell is also heterozygous at least one additional polymorphic site in the APOA1 gene selected from: rs11216158, rs11216157, rs2727784, rs613808, rs4018880, rs1374117, rs670, rs5069, rs5070, rs2070665, rs5072, rs7116797, rs5076, rs28931574.

In embodiments of the present invention, the complex of the second RNA molecule and CRISPR nuclease affects a double-stranded break in only the mutant allele of the APOA1 gene of the cell.

In embodiments of the present invention, the composition may comprise 1, 2, 3 or more CRISPR nucleases. In embodiments of the present invention, introducing a composition to the cell may comprise introducing 1, 2, 3, or more compositions to the cell. In embodiments of the present invention, each composition may comprise a different CRISPR nuclease or the same CRISPR nuclease. In embodiments of the present invention involving two RNA molecules, the second RNA molecule may form a complex with the same CRISPR nuclease as the first RNA molecule, or may form a complex with another CRISPR nuclease.

In embodiments of the present invention, the guide sequence portion of the second RNA molecule comprises 17-20 nucleotides of a sequence of 17-20 contiguous nucleotides as set forth in any one of SEQ ID NOs: 1-1313.

In embodiments of the present invention, a cell with an APOA1 gene mutation associated with apoA-1 related amyloidosis may be from a subject with the APOA1 gene mutation and/or afflicted with apoA-1 related amyloidosis. Accordingly, selecting a cell with an APOA1 gene mutation may comprise selecting a subject with the APOA1 gene mutation. In further embodiments of the present invention, selecting a cell may comprise selecting a cell from a subject with the APOA1 gene mutation. In embodiments of the present invention, introducing the compositions of the subject invention to the cell may comprise introducing the compositions of the invention to the cell of a subject afflicted with the APOA1 gene mutation.

Accordingly, in embodiments of the present invention, there is provided a method for inactivating a mutant allele of the APOA1 gene in the cell of a subject, the method comprising the step of selecting a subject with an APOA1 gene mutation resulting in apoA-1 related amyloidosis and who is heterozygous at one or more polymorphic sites in the APOA1 gene selected from: rs11216158, rs11216157, rs2727784, rs613808, rs4018880, rs1374117, rs670, rs5069, rs5070, rs2070665, rs5072, rs7116797, rs5076, rs28931574; and introducing into the cell of the subject the compositions of the instant invention.

Accordingly, embodiments of the present invention encompass the screening of subjects or cells for the APOA1 gene. A person having ordinary skill in the art would readily understand methods of screening for mutations within the APOA1 gene in the art, by way of non-limiting examples, e.g., karyotyping, Fluorescence In situ Hybridization, and/or microarray testing.

In embodiments of the present invention, the cell is heterozygous at one or more polymorphic sites in the APOA1 gene selected from: rs670 and rs5069, and wherein the complex of the second RNA molecule and the CRISPR nuclease affects a double strand break in a non-coding region of the APOA1 gene selected from: intron 2 and intron 3.

In some embodiments, the cell is heterozygous at one or more polymorphic sites in the APOA1 gene selected from: rs670 and rs5069, and a complex of a first RNA molecule comprising a guide sequence portion having 17-20 nucleotides and a CRISPR nuclease affects a double strand break in only the mutant allele of the APO1 gene and not in the functional allele of the APOA1 gene, and wherein a complex of the second RNA molecule and the CRISPR nuclease affects a double strand break in a non-coding region of the APOA1 gene selected from: intron 2 and intron 3. In such embodiments the guide sequence portion of the first RNA molecule comprises having 17-20 nucleotides may comprise a sequence of 17-20 contiguous nucleotides as set forth in any one of SEQ ID NOs: 10, 11, 17, 24, 28, 35, 39, 43, 48, 49, 70, 71, 75, 82, 85, 89, 91, 100, 101, 113, 120, 134, 141, 142, 146, 148, 150, 161, 176, 178, 180, 186, 194, 195, 201, 203, 204, 214, 260, 261, 267, 268, 279, 280, 295, 305, 329, 330, 331, 367, 372, 377, 378, 380, 381, 398, 400, 403, 404, 405, 410, 411, 415, 429, 430, 457, 458, 480, 481, 484, 485, 488, 496, 498, 499, 500, 503, 505, 512, 513, 542, 543, 546, 547, 550, 552, 553, 555, 564, 566, 567, 572, 573, 583, 597, 598, 599, 603, 621, 643, 644, 645, 649, 667, 683, 705, 731, 732, 744, 745, 752, 753, 757, 758, 769, 770, 781, 784, 785, 787, 788, 791, 792, 794, 805, 806, 817, 818, 837, 851, 854, 859, 861, 864, 865, 867, 883, 884, 913, 914, 925, 926, 927, 928, 951, 952, 955, 956, 989, 990, 994, 995, 1002, 1003, 1029, 1031, 1057, 1064, 1078, 1110, 1130, 1136, 1163, 1174, 1200, 1254, 1300, 1068, 1070, 1077, 1128, 1134, 1176, 1181, 1197, and 1255.

In some embodiments, the cell is heterozygous at one or more polymorphic sites in the APOA1 gene selected from: rs11216158, rs11216157, rs2727784, rs613808, rs4018880, and rs1374117, and a complex of a first RNA molecule comprising a guide sequence portion having 17-20 nucleotides and a CRISPR nuclease affects a double strand break in only the mutant allele of the APO1 gene and not in the functional allele of the APOA1 gene, and wherein a complex of the second RNA molecule and the CRISPR nuclease affects a double strand break in a non-coding region of the APOA1 gene selected from: intron 2 and intron 3. In such embodiments the guide sequence portion of the first RNA molecule comprises having 17-20 nucleotides may comprise a sequence of 17-20 contiguous nucleotides as set forth in any one of SEQ ID NOs: 2, 4, 7, 8, 9, 19, 21, 22, 23, 25, 26, 27, 31, 32, 33, 34, 36, 44, 45, 46, 47, 51, 52, 53, 54, 55, 56, 57, 58, 62, 63, 64, 65, 66, 67, 68, 69, 72, 73, 74, 76, 77, 78, 86, 87, 88, 94, 95, 97, 98, 99, 104, 105, 106, 107, 116, 117, 118, 121, 124, 125, 126, 127, 128, 129, 130, 131, 133, 135, 136, 137, 143, 147, 153, 154, 159, 160, 163, 164, 165, 166, 172, 174, 175, 177, 185, 187, 197, 202, 206, 207, 208, 209, 215, 216, 217, 218, 219, 220, 221, 223, 226, 227, 228, 229, 232, 233, 234, 235, 236, 237, 239, 241, 242, 243, 244, 250, 256, 257, 262, 263, 264, 265, 266, 276, 277, 278, 284, 285, 291, 292, 297, 298, 299, 300, 301, 302, 303, 306, 307, 308, 309, 310, 311, 325, 334, 335, 336, 337, 338, 339, 345, 346, 351, 352, 357, 358, 363, 364, 368, 373, 374, 383, 384, 387, 388, 389, 392, 393, 394, 396, 397, 406, 407, 413, 416, 417, 418, 419, 422, 424, 425, 426, 427, 431, 433, 434, 435, 437, 438, 442, 445, 446, 447, 462, 463, 471, 474, 475, 476, 482, 483, 490, 491, 494, 495, 501, 502, 514, 517, 518, 519, 520, 522, 525, 529, 530, 531, 538, 539, 540, 541, 544, 545, 551, 559, 562, 563, 570, 576, 577, 578, 581, 582, 585, 586, 587, 590, 591, 592, 593, 594, 601, 602, 604, 605, 606, 607, 608, 611, 612, 613, 614, 615, 617, 618, 622, 623, 625, 626, 627, 629, 630, 631, 633, 635, 636, 641, 646, 655, 661, 662, 663, 668, 669, 670, 671, 672, 674, 675, 676, 679, 680, 681, 682, 684, 685, 686, 687, 688, 694, 695, 697, 698, 699, 700, 707, 708, 709, 710, 711, 712, 714, 716, 717, 718, 720, 734, 741, 749, 756, 759, 761, 762, 765, 768, 772, 774, 775, 776, 777, 778, 782, 783, 795, 796, 799, 803, 804, 807, 809, 814, 815, 816, 821, 822, 823, 828, 833, 838, 840, 852, 853, 855, 856, 862, 863, 866, 873, 885, 899, 904, 907, 908, 917, 918, 933, 938, 939, 940, 943, 946, 947, 948, 949, 950, 957, 958, 959, 960, 961, 962, 963, 964, 966, 967, 969, 970, 971, 973, 974, 977, 978, 979, 986, 987, 991, 992, 993, 996, 997, 998, 999, 1000, 1001, 1009, 1012, 1013, 1014, 1015, 1019, 1020, 1022, 1023, 1024, 1025, 1026, 1032, 1036, 1037, 1040, 1041, 1042, 1044, 1049, 1050, 1051, 1053, 1054, 1055, 1056, 1061, 1062, 1063, 1083, 1095, 1104, 1105, 1108, 1109, 1111, 1124, 1127, 1144, 1145, 1150, 1151, 1186, 1193, 1198, 1214, 1216, 1217, 1222, 1225, 1246, 1268, 1272, 1273, 1307, 1312, 1313, 1079, 1081, 1187, 1284, 1310, 1059, 1066, 1067, 1073, 1074, 1075, 1082, 1087, 1088, 1090, 1119, 1125, 1146, 1182, 1184, 1188, 1189, 1191, 1192, 1201, 1202, 1203, 1215, 1223, 1227, 1232, 1242, 1243, 1245, 1277, 1285, 1289, 1290, 1291, 1294, 1308, 1311, 1099, 1102, 1114, 1143, 1149, 1170, 1194, 1211, 1212, 1264, 1266, 1270, 1271, 1304, 1084, 1086, 1116, 1120, 1126, 1129, 1133, 1140, 1142, 1147, 1155, 1156, 1158, 1161, 1164, 1165, 1166, 1168, 1169, 1171, 1179, 1180, 1183, 1190, 1210, 1213, 1224, 1226, 1229, 1236, 1237, 1238, 1239, 1240, 1248, 1249, 1252, 1260, 1267, 1269, 1275, 1276, 1278, 1280, 1281, 1282, 1298, 1299, 1303, 1306, 1092, 1097, 1098, 1123, 1173, 1196, 1204, 1209, 1219, and 1279.

In some embodiments, the cell is heterozygous at one or more polymorphic sites in the APOA1 gene selected from: rs670, and rs5069, and a complex of a first RNA molecule comprising a guide sequence portion having 17-20 nucleotides and a CRISPR nuclease affects a double strand break in only the mutant allele of the APO1 gene and not in the functional allele of the APOA1 gene, and wherein a complex of the second RNA molecule and the CRISPR nuclease affects a double strand break in a non-coding region of the APOA1 gene selected from: intron 2 and intron 3. In such embodiments the guide sequence portion of the first RNA molecule having 17-20 nucleotides may comprise a sequence of 17-20 contiguous nucleotides as set forth in any one of SEQ ID NOs: 10, 11, 17, 24, 28, 35, 39, 43, 48, 49, 70, 71, 75, 82, 85, 89, 91, 100, 101, 113, 120, 134, 141, 142, 146, 148, 150, 161, 176, 178, 180, 186, 194, 195, 201, 203, 204, 214, 260, 261, 267, 268, 279, 280, 295, 305, 329, 330, 331, 367, 372, 377, 378, 380, 381, 398, 400, 403, 404, 405, 410, 411, 415, 429, 430, 457, 458, 480, 481, 484, 485, 488, 496, 498, 499, 500, 503, 505, 512, 513, 542, 543, 546, 547, 550, 552, 553, 555, 564, 566, 567, 572, 573, 583, 597, 598, 599, 603, 621, 643, 644, 645, 649, 667, 683, 705, 731, 732, 744, 745, 752, 753, 757, 758, 769, 770, 781, 784, 785, 787, 788, 791, 792, 794, 805, 806, 817, 818, 837, 851, 854, 859, 861, 864, 865, 867, 883, 884, 913, 914, 925, 926, 927, 928, 951, 952, 955, 956, 989, 990, 994, 995, 1002, 1003, 1029, 1031, 1057, 1064, 1078, 1110, 1130, 1136, 1163, 1174, 1200, 1254, 1300, 1068, 1070, 1077, 1128, 1134, 1176, 1181, 1197, and 1255.

In some embodiments, cell is heterozygous at the polymorphic site in the APOA1 gene, rs5070, and a complex of a first RNA molecule comprising a guide sequence portion having 17-20 nucleotides and a CRISPR nuclease affects a double strand break in only the mutant allele of the APO1 gene and not in the functional allele of the APOA1 gene, and wherein a complex of the second RNA molecule and the CRISPR nuclease affects a double strand break in a non-coding region of the APOA1 gene selected from: exon 1, intron 1, and intron 3. In such embodiments, the guide sequence portion having 17-20 nucleotides of the first RNA molecule may comprise a sequence of 17-20 contiguous nucleotides as set forth in any one of SEQ ID NOs: 12, 13, 119, 139, 140, 145, 155, 162, 169, 170, 182, 183, 258, 259, 269, 275, 281, 282, 296, 304, 340, 341, 355, 356, 375, 376, 379, 399, 408, 409, 443, 444, 453, 454, 459, 472, 527, 528, 532, 533, 537, 560, 628, 647, 648, 650, 651, 713, 719, 736, 737, 746, 747, 779, 780, 836, 843, 844, 850, 860, 868, 874, 875, 876, 877, 878, 886, 888, 889, 890, 891, 892, 930, 931, 932, 975, 976, 1052, 1091, 1137, 1153, 1157, 1172, 1218, 1253, 1257, 1258, and 1309.

In some embodiments, the cell is heterozygous at one or more polymorphic sites in the APOA1 gene selected from: rs2070665, rs5072, rs7116797, and rs5076, and a complex of a first RNA molecule comprising a guide sequence portion having 17-20 nucleotides and a CRISPR nuclease affects a double strand break in only the mutant allele of the APO1 gene and not in the functional allele of the APOA1 gene, and wherein a complex of the second RNA molecule and the CRISPR nuclease affects a double strand break in a non-coding region of the APOA1 gene selected from: exon 1, intron 1 and intron 2. In such embodiments, the guide sequence portion having 17-20 nucleotides of the first RNA molecule may comprise a sequence of 17-20 contiguous nucleotides as set forth in any one of SEQ ID NOs: 3, 5, 6, 14, 15, 16, 20, 29, 30, 37, 38, 40, 41, 42, 59, 60, 80, 81, 83, 84, 90, 92, 93, 96, 102, 103, 108, 109, 110, 111, 112, 114, 115, 122, 123, 132, 138, 144, 151, 152, 156, 157, 158, 167, 168, 171, 173, 179, 181, 184, 188, 189, 190, 191, 192, 193, 196, 198, 199, 200, 205, 213, 224, 225, 230, 231, 238, 240, 245, 246, 247, 248, 249, 251, 252, 253, 254, 255, 270, 271, 272, 283, 286, 287, 289, 290, 314, 315, 316, 319, 320, 321, 322, 326, 327, 328, 332, 333, 342, 343, 344, 348, 349, 350, 353, 354, 359, 362, 365, 366, 369, 370, 371, 382, 390, 391, 395, 401, 402, 412, 414, 423, 428, 436, 439, 440, 441, 448, 449, 451, 452, 460, 461, 464, 465, 468, 469, 470, 473, 477, 478, 479, 486, 487, 489, 497, 504, 506, 507, 508, 509, 510, 511, 515, 516, 521, 523, 526, 534, 535, 536, 548, 549, 554, 556, 557, 558, 561, 565, 568, 569, 571, 574, 575, 579, 580, 584, 588, 589, 595, 600, 609, 610, 616, 619, 620, 624, 637, 638, 640, 652, 653, 654, 657, 658, 659, 660, 666, 689, 690, 692, 696, 702, 703, 704, 706, 715, 723, 724, 727, 728, 729, 730, 733, 735, 738, 739, 740, 742, 743, 748, 750, 754, 755, 760, 763, 764, 771, 773, 786, 789, 790, 793, 797, 798, 800, 801, 802, 819, 820, 826, 827, 829, 830, 831, 832, 834, 835, 839, 845, 846, 848, 849, 857, 858, 871, 872, 879, 880, 881, 882, 887, 893, 894, 895, 896, 897, 898, 900, 901, 902, 903, 905, 906, 910, 911, 912, 915, 919, 920, 921, 922, 923, 924, 929, 934, 935, 937, 944, 945, 953, 954, 965, 968, 982, 983, 988, 1004, 1005, 1007, 1016, 1017, 1018, 1030, 1033, 1034, 1035, 1043, 1045, 1046, 1047, and 1048, 1058, 1080, 1100, 1162, 1167, 1185, 1235, 1241, 1259, 1262, 1292, 1106, 1118, 1121, 1135, 1208, 1228, 1233, 1261, 1265, 1302, 1085, 1103, 1178, 1207, 1230, 1250, 1263, 1283, 1293, 1065, 1069, 1101, 1117, 1138, 1139, 1148, 1175, 1177, and 1288.

In embodiments of the present invention, the cell is heterozygous at the polymorphic sites in the APOA1 gene rs28931574. In such embodiments the guide sequence portion having 17-20 nucleotides of the first or second RNA molecule may comprise a sequence of 17-20 contiguous nucleotides as set forth in any one of SEQ ID NOs: 1, 18, 50, 61, 79, 149, 210, 211, 212, 222, 273, 274, 288, 293, 294, 312, 313, 317, 318, 323, 324, 347, 360, 361, 385, 386, 420, 421, 432, 450, 455, 456, 466, 467, 492, 493, 524, 596, 632, 634, 639, 642, 656, 664, 665, 673, 677, 678, 691, 693, 701, 721, 722, 725, 726, 751, 766, 767, 808, 810, 811, 812, 813, 824, 825, 841, 842, 847, 869, 870, 909, 916, 936, 941, 942, 972, 980, 981, 984, 985, 1006, 1008, 1010, 1011, 1021, 1027, 1028, 1038, 1039, 1060, 1071, 1072, 1076, 1089, 1093, 1094, 1096, 1107, 1112, 1113, 1115, 1122, 1131, 1132, 1141, 1152, 1154, 1159, 1160, 1195, 1199, 1205, 1206, 1220, 1221, 1231, 1234, 1244, 1247, 1251, 1256, 1274, 1286, 1287, 1295, 1296, 1297, 1301, and 1305.

In embodiments of the present invention, the double strand break is 1, 2, 3, 4, 5, 6, 7, 8, 9, 10, 11, 12, 13, 14, 15, 16, 17, 18, 19, 20, 21, 22, 23, 24, 25, 26, 27, 28 nucleotides upstream or downstream from the heterozygous polymorphic site.

Dominant Genetic Disorders

One of skill in the art will appreciate that all subjects with any type of heterozygote genetic disorder (e.g., dominant genetic disorder) may be subjected to the methods described herein. In one embodiment, the present invention may be used to target a gene involved in, associated with, or causative of dominant genetic disorders such as, for example, apoA-1 related amyloidosis. In some embodiments, the dominant genetic disorder is apoA-1 related amyloidosis. In some embodiments, the target gene is the APOA1 gene (Entrez Gene, gene ID No: 335).

CRISPR Nucleases and PAM Recognition

In some embodiments, the sequence specific nuclease is sleeted from CRISPR nucleases, or a functional variant thereof. In some embodiments, the sequence specific nuclease is an RNA guided DNA nuclease. In such embodiments, the RNA sequence which guides the RNA guided DNA nuclease (e.g., Cpf1) binds to and/or directs the RNA guided DNA nuclease to the sequence comprising at least one nucleotide which differs between a mutant allele and its counterpart functional allele (e.g., SNP). In some embodiments, the CRISPR complex does not further comprise a tracrRNA. In a non-limiting example, in which the RNA guided DNA nuclease is a CRISPR protein, the at least one nucleotide which differs between the dominant mutant allele and the functional allele may be within the PAM site and/or proximal to the PAM site within the region that the RNA molecule is designed to hybridize to. A skilled artisan will appreciate that RNA molecules can be engineered to bind to a target of choice in a genome by commonly known methods in the art.

In embodiments of the present invention, a type II CRISPR system utilizes a mature crRNA:tracrRNA complex directs a CRISPR nuclease, e.g. Cas9, to the target DNA via Watson-Crick base-pairing between the crRNA and the protospacer on the target DNA next to the protospacer adjacent motif (PAM), an additional requirement for target recognition. The CRISPR nuclease then mediates cleavage of target DNA to create a double-stranded break within the protospacer. A skilled artisan will appreciate that each of the engineered RNA molecule of the present invention is further designed such as to associate with a target genomic DNA sequence of interest next to a protospacer adjacent motif (PAM), e.g., a PAM matching the sequence relevant for the type of CRISPR nuclease utilized, such as for a non-limiting example, NGG or NAG, wherein "N" is any nucleobase, for Streptococcus pyogenes Cas9 WT (SpCAS9); NNGRRT for Staphylococcus aureus (SaCas9); NNNVRYM for Jejuni Cas9 WT; NGAN or NGNG for SpCas9-VQR variant; NGCG for SpCas9-VRER variant; NGAG for SpCas9-EQR variant; NNNNGATT for Neisseria meningitidis (NmCas9); or TTTV for Cpf1. RNA molecules of the present invention are each designed to form complexes in conjunction with one or more different CRISPR nucleases and designed to target polynucleotide sequences of interest utilizing one or more different PAM sequences respective to the CRISPR nuclease utilized.

In some embodiments, an RNA-guided DNA nuclease e.g., a CRISPR nuclease, may be used to cause a DNA break at a desired location in the genome of a cell. The most commonly used RNA-guided DNA nucleases are derived from CRISPR systems, however, other RNA-guided DNA nucleases are also contemplated for use in the genome editing compositions and methods described herein. For instance, see U.S. Patent Publication No. 2015-0211023, incorporated herein by reference.

CRISPR systems that may be used in the practice of the invention vary greatly. CRISPR systems can be a type I, a type II, or a type III system. Non-limiting examples of suitable CRISPR proteins include Cas3, Cas4, Cas5, Cas5e (or CasD), Cas6, Cas6e, Cas6f, Cas7, Cas8a1, Cas8a2, Cas8b, Cas8c, Cas9, Cas10, Cas1 Od, CasF, CasG, CasH, Csy1, Csy2, Csy3, Cse1 (or CasA), Cse2 (or CasB), Cse3 (or CasE), Cse4 (or CasC), Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csz1, Csx15, Csf1, Csf2, Csf3, Csf4, and Cu1966.

In some embodiments, the RNA-guided DNA nuclease is a CRISPR nuclease derived from a type II CRISPR system (e.g., Cas9). The CRISPR nuclease may be derived from *Streptococcus pyogenes, Streptococcus thermophilus, Streptococcus sp., Staphylococcus aureus, Neisseria meningitidis, Treponema denticola, Nocardiopsis dassonvillei, Streptomyces pristinaespiralis, Streptomyces viridochromogenes, Streptomyces viridochromogenes, Streptosporangium roseum, Streptosporangium roseum, Alicyclobacillus acidocaldarius, Bacillus pseudomycoides, Bacillus selenitireducens, Exiguobacterium sibiricum, Lactobacillus delbrueckii, Lactobacillus salivarius, Microscilla marina, Burkholderiales bacterium, Polaromonas naphihalenivorans, Polaromonas sp., Crocosphaera watsonii, Cyanothece sp., Microcystis aeruginosa,* Synechococcus sp., *Acetohalobium arabaticum, Ammonifex degensii, Caldicelulosiruptor becscii, Candidatus Desulforudis, Clostridium botulinum, Clostridium difficile, Finegoldia magna, Natranaerobius thermophilus, Pelotomaculum thermopropionicum, Acidithiobacillus caldus, Acidithiobacillus ferrooxidans, Allochromatium vinosum, Marinobacter sp., Nitrosococcus halophilus, Nitrosococcus watsoni, Pseudoalteromonas haloplanktis, Ktedonobacter racemifer, Methanohalobium evestigatum, Anabaena variabilis, Nodularia spumigena,* Nostoc sp., *Arthrospira maxima, Arthrospira platensis, Arthrospira* sp., *Lyngbya* sp., *Microcoleus chthonoplastes, Oscillatoria* sp., *Petrotoga mobilis, Thermosipho africanus, Acaryochloris marina,* or any species which encodes a CRISPR nuclease with a known PAM sequence. CRISPR nucleases encoded by uncultured bacteria may also be used in the context of the invention. (See Burstein et al. Nature, 2017). Variants of CRIPSR proteins having known PAM sequences e.g., spCas9 DI1135E variant, spCas9 VQR variant, spCas9 EQR variant, or spCas9 VRER variant may also be used in the context of the invention.

Thus, an RNA guided DNA nuclease of a CRISPR system, such as a Cas9 protein or modified Cas9 or homolog or ortholog of Cas9, or other RNA guided DNA nucleases belonging to other types of CRISPR systems, such as Cpf1 and its homologs and orthologs, may be used in the compositions of the present invention.

In certain embodiments, the CRIPSR nuclease may be a "functional derivative" of a naturally occurring Cas protein. A "functional derivative" of a native sequence polypeptide is a compound having a qualitative biological property in common with a native sequence polypeptide. "Functional derivatives" include, but are not limited to, fragments of a native sequence and derivatives of a native sequence polypeptide and its fragments, provided that they have a biological activity in common with a corresponding native sequence polypeptide. A biological activity contemplated herein is the ability of the functional derivative to hydrolyze a DNA substrate into fragments. The term "derivative" encompasses both amino acid sequence variants of polypeptide, covalent modifications, and fusions thereof. Suitable derivatives of a Cas polypeptide or a fragment thereof include but are not limited to mutants, fusions, covalent modifications of Cas protein or a fragment thereof. Cas protein, which includes Cas protein or a fragment thereof, as well as derivatives of Cas protein or a fragment thereof, may be obtainable from a cell or synthesized chemically or by a combination of these two procedures. The cell may be a cell that naturally produces Cas protein, or a cell that naturally produces Cas protein and is genetically engineered to produce the endogenous Cas protein at a higher expression level or to produce a Cas protein from an exogenously introduced nucleic acid, which nucleic acid encodes a Cas that is same or different from the endogenous Cas. In some cases, the cell does not naturally produce Cas protein and is genetically engineered to produce a Cas protein.

In some embodiments, the CRISPR nuclease is Cpf1. Cpf1 is a single RNA-guided endonuclease which utilizes a T-rich protospacer-adjacent motif. Cpf1 cleaves DNA via a staggered DNA double-stranded break. Two Cpf1 enzymes from Acidaminococcus and Lachnospiraceae have been shown to carry out efficient genome-editing activity in human cells. (See Zetsche et al. (2015) Cell.).

Thus, an RNA guided DNA nuclease of a Type II CRISPR System, such as a Cas9 protein or modified Cas9 or homologs, orthologues, or variants of Cas9, or other RNA guided DNA nucleases belonging to other types of CRISPR systems, such as Cpf1 and its homologs, orthologues, or variants, may be used in the present invention.

In some embodiments, the guide molecule comprises one or more chemical modifications which imparts a new or improved property (e.g., improved stability from degradation, improved hybridization energetics, or improved binding properties with an RNA guided DNA nuclease). Suitable chemical modifications include, but are not limited to: modified bases, modified sugar moieties, or modified internucleoside linkages. Non-limiting examples of suitable chemical modifications include: 4-acetylcytidine, 5-(carboxyhydroxymethyl)uridine, 2'-O-methylcytidine, 5-carboxymethylaminomethyl-2-thiouridine, 5-carboxymethylaminomethyluridine, dihydrouridine, 2'-O-methylpseudouridine, "beta,D-galactosylqueuosine", 2'-O-methylguanosine, inosine, N6-isopentenyladenosine, 1-methyladenosine, 1-methylpseudouridine, 1-methylguanosine, 1-methylinosine, "2,2-dimethylguanosine", 2-methyladenosine, 2-methylguanosine, 3-methylcytidine, 5-methylcytidine, N6-methyladenosine, 7-methylguanosine, 5-methylaminomethyluridine, 5-methoxyaminomethyl-2-thiouridine, "beta, D-mannosylqueuosine", 5-methoxycarbonylmethyl-2-thiouridine, 5-methoxycarbonylmethyluridine, 5-methoxyuridine, 2-methylthio-N6-isopentenyladenosine, N-((9-beta-D-ribofuranosyl-2-methylthiopurine-6-yl)carbamoyl)threonine, N-((9-beta-D-ribofuranosylpurine-6-yl)N-methylcarbamoyl)threonine, uridine-5-oxyacetic acid-methylester, uridine-5-oxyacetic acid, wybutoxosine, queuosine, 2-thiocytidine, 5-methyl-2-thiouridine, 2-thiouridine, 4-thiouridine, 5-methyluridine, N-((9-beta-D-ribofuranosylpurine-6-yl)-carbamoyl)threonine, 2'-O-methyl-5-methyluridine, 2'-O-methyluridine, wybutosine, "3-(3-amino-3-carboxy-propyl)uridine, (acp3) u", 2-O-methyl (M), 3'-phosphorothioate (MS), 3'-thio- PACE (MSP), pseudouridine, or 1-methyl pseudo-uridine. Each possibility represents a separate embodiment of the present invention.

Guide Sequences which Specifically Target a Mutant Allele

A given gene may contain thousands of SNPs. Utilizing a 24 base pair target window for targeting each SNP in a gene would require hundreds of thousands of guide sequences. Any given guide sequence when utilized to target a SNP may result in degradation of the guide sequence, limited activity, no activity, or off-target effects. Accordingly, suitable guide sequences are necessary for targeting a given gene. By the present invention, a novel set of guide sequences have been identified for knocking out expression of a mutated apoA-1 protein, inactivating a mutant APOA1 gene allele, and treating apoA-1 related amyloidosis.

The present disclosure provides guide sequences capable of specifically targeting a mutant allele for inactivation while leaving the functional allele unmodified. The guide sequences of the present invention are designed to, and are most likely to, specifically differentiate between a mutant allele and a functional allele. Of all possible guide sequences which target a mutant allele desired to be inactivated, the specific guide sequences disclosed herein are specifically effective to function with the disclosed embodiments.

Briefly, the guide sequences may have properties as follows: (1) target a heterozygous SNP/insertion/deletion/indel with a high prevalence in the general population, in a specific ethnic population or in a patient population is above 1% and the SNP/insertion/deletion/indel heterozygosity rate in the same population is above 1%; (2) target a location of a SNP/insertion/deletion/indel proximal to a portion of the gene e.g., within 5 k bases of any portion of the gene, for example, a promoter, a UTR, an exon or an intron; and (3) target a mutant allele using an RNA molecule which targets a founder or common pathogenic mutations for the disease/gene. In some embodiments, the prevalence of the SNP/insertion/deletion/indel in the general population, in a specific ethnic population or in a patient population is above 1%, 2%, 3%, 4%, 5%, 6%, 7%, 8%, 9%, 10%, 11%, 12%, 13%, 14%, or 15% and the SNP/insertion/deletion/indel heterozygosity rate in the same population is above 1%, 2%, 3%, 4%, 5%, 6%, 7%, 8%, 9%, 10%, 11%, 12%, 13%, 14%, or 15%. Each possibility represents a separate embodiment and may be combined at will.

For each gene, according to SNP/insertion/deletion/indel any one of the following strategies may be used to deactivate the mutant allele: (1) Knockout strategy using one RNA molecule—one RNA molecule is utilized to direct a CRISPR nuclease to a mutant allele and create a double-strand break (DSB) leading to formation of a frameshift mutation in an exon or in a splice site region of the mutant allele; (2) Knockout strategy using two RNA molecules—two RNA molecules are utilized. A first RNA molecule targets a region in the promoter or an upstream region of a mutant allele and another RNA molecule targets downstream of the first RNA molecule in a promoter, exon, or intron of the mutant allele; (3) Exon(s) skipping strategy—one RNA molecule may be used to target a CRISPR nuclease to a splice site region, either at the 5'end of an intron (donor sequence) or the 3' end of an intron (acceptor sequence), in order to destroy the splice site. Alternatively, two RNA molecules may be utilized such that a first RNA molecule targets an upstream region of an exon and a second RNA molecule targets a region downstream of the first RNA molecule, thereby excising the exon(s). Based on the locations of identified SNPs/insertions/deletions/indels for each mutant allele, any one of, or a combination of, the above-mentioned methods to deactivate the mutant allele may be utilized.

When only one RNA molecule is used is that the location of the SNP is in an exon or in close proximity (e.g., within 20 basepairs) to a splice site between the intron and the exon. When two RNA molecules are used, guide sequences may target two SNPs such that the first SNP is upstream of exon 1 e.g., within the 5' untranslated region, or within the promoter or within the first 2 kilobases 5' of the transcription start site, and the second SNP is downstream of the first SNP e.g., within the first 2 kilobases 5' of the transcription start site, or within intron 1, 2 or 3, or within exon 1, exon 2, or exon 3.

Guide sequences of the present invention may target a SNP in the upstream portion of the targeted gene, preferably upstream of the last exon of the targeted gene. Guide sequences may target a SNP upstream to exon 1, for example within the 5' untranslated region, or within the promoter or within the first 4-5 kilobases 5' of the transcription start site.

Guide sequences of the present invention may also target a SNP within close proximity (e.g., within 50 basepairs, more preferably with 20 basepairs) to a known protospacer adjacent motif (PAM) site.

Guide sequences of the present invention also may target: (1) a heterozygous SNP for the targeted gene; (2) a heterozygous SNPs upstream and downstream of the gene; (3) a SNPs with a prevalence of the SNP/insertion/deletion/indel in the general population, in a specific ethnic population, or in a patient population above 1%; (4) have a guanine-cytosine content of greater than 30% and less than 85%; (5) have no repeat of 4 or more thymine/uracil or 8 or more guanine, cytosine, or adenine; (6) having no off-target identified by off-target analysis; and (7) preferably target Exons over Introns or be upstream of a SNP rather than downstream of a SNP.

In embodiments of the present invention, the SNP may be upstream or downstream of the gene. In embodiments of the present invention, the SNP is within 4,000 base pairs upstream or downstream of the gene.

The at least one nucleotide which differs between the mutant allele and the functional allele, may be upstream, downstream or within the sequence of the disease-causing mutation of the gene of interest. The at least one nucleotide which differs between the mutant allele and the functional allele, may be within an exon or within an intron of the gene of interest. In some embodiments, the at least one nucleotide which differs between the mutant allele and the functional allele is within an exon of the gene of interest. In some embodiments, the at least one nucleotide which differs between the mutant allele and the functional allele is within an intron or an exon of the gene of interest, in close proximity to a splice site between the intron and the exon e.g., 1, 2, 3, 4, 5, 6, 7, 8, 9, 10, 11, 12, 13, 14, 15, 16, 17, 18, 19, or 20 nucleotides upstream or downstream to the splice site.

In some embodiments, the at least one nucleotide is a single nucleotide polymorphisms (SNPs). In some embodiments, each of the nucleotide variants of the SNP may be expressed in the mutant allele. In some embodiments, the SNP may be a founder or common pathogenic mutation.

Guide sequences may target a SNP which has both (1) a high prevalence in the general population e.g., above 1% in the population; and (2) a high heterozygosity rate in the population, e.g., above 1%. Guide sequences may target a SNP that is globally distributed. A SNP may be a founder or common pathogenic mutation. In some embodiments, the prevalence in the general population is above 1%, 2%, 3%, 4%, 5%, 6%, 7%, 8%, 9%, 10%, 11%, 12%, 13%, 14%, or 15%. Each possibility represents a separate embodiment. In some embodiments, the heterozygosity rate in the population is above 1%, 2%, 3%, 4%, 5%, 6%, 7%, 8%, 9%, 10%, 11%, 12%, 13%, 14%, or 15%. Each possibility represents a separate embodiment.

In some embodiments, the at least one nucleotide which differs between the mutant allele and the functional allele is linked to/co-exists with the disease-causing mutation in high prevalence in a population. In such embodiments, "high prevalence" refers to at least 92%, 93%, 94%, 95%, 96%, 97%, 98%, 99%, or 100%. Each possibility represents a separate embodiment of the present invention. In one embodiment, the at least one nucleotide which differs between the mutant allele and the functional allele, is a disease-associated mutation. In some embodiments, the SNP is highly prevalent in the population. In such embodiments, "highly prevalent" refers to at least 10%, 11%, 12%, 13%, 14%, 15%, 20%, 30%, 40%, 50%, 60%, or 70% of a population. Each possibility represents a separate embodiment of the present invention.

Guide sequences of the present invention may satisfy anyone of the above criteria and are most likely to differentiate between a mutant allele from its corresponding functional allele.

In some embodiments the RNA molecule targets a heterozygous SNP present in the APOA1 gene from the SNPs as shown in Table 1 below. The SNP details are indicated in the 1$^{st}$ column and include: SNP ID No. (based on NCBI's 2018 database of Single Nucleotide Polymorphisms (dbSNP)). For variants with no available rs number variants characteristic are indicated based on gnomAD 2018 browser database. The 2$^{nd}$ column indicates an assigned identifier for each SNP. The 3$^{rd}$ column indicates the location of each SNP on the APOA1 gene.

TABLE 1

APOA1 gene SNPs

| RSID | SNP No. | SNP location in the gene |
|---|---|---|
| rs7116797 | s1 | Intron_3 of 3 |
| rs5072 | s2 | Intron_3 of 3 |
| rs28931574 | s3 | Exon_3_of_4 |
| rs5070 | s4 | Intron_2 of 3 |
| rs2727784 | s5 | upstream -2475 bp |
| rs11216158 | s6 | upstream -2684 bp |
| rs613808 | s7 | upstream -2302 bp |
| rs670 | s8 | Exon_1 of 4 |
| rs5076 | s9 | Intron_3 of 3 |
| rs1374117 | s10 | upstream -772 bp |
| rs5069 | s11 | Intron_1 of 3 |
| rs2070665 | s12 | Intron_3 of 3 |
| rs4018880 | s13 | upstream -1501 bp |
| rs11216157 | s14 | upstream -2514 bp |

Figure 11:
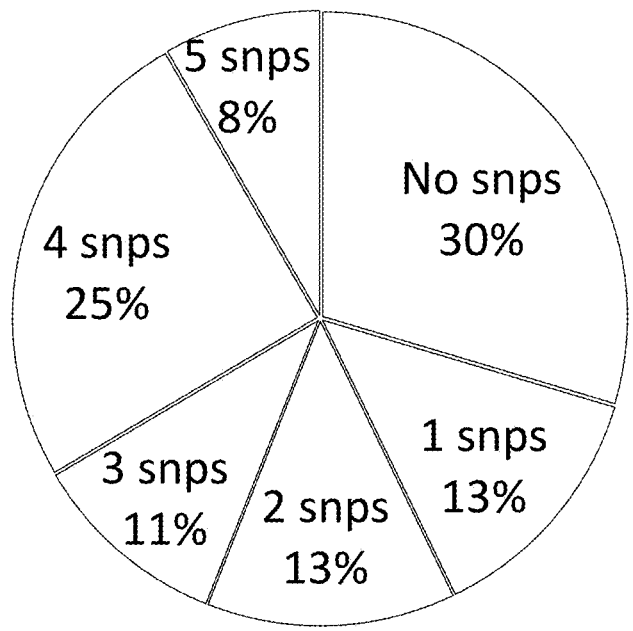
FIG. 11: Seven SNPs located on the APOA1 gene and total heterozygosity in the population from the selected SNPs.
Figure 12:
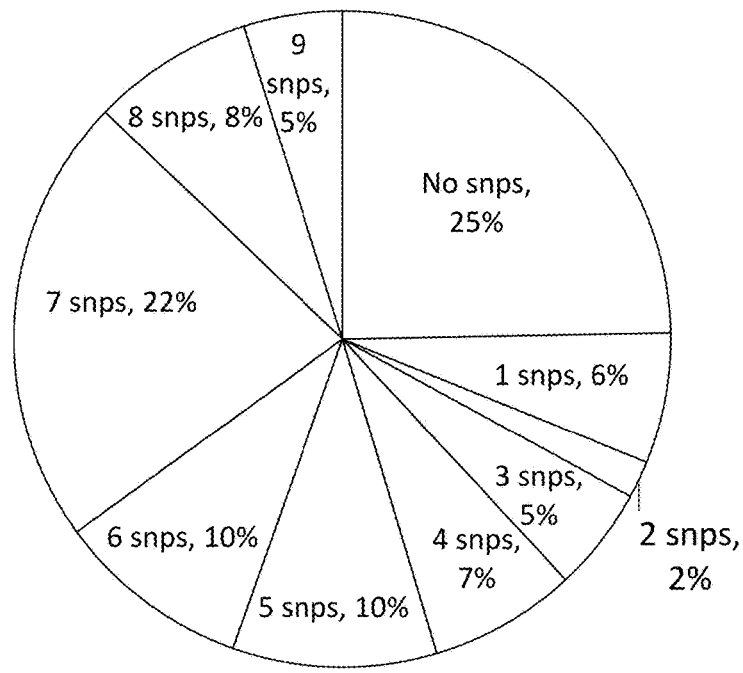
FIG. 12: Thirteen SNPs located on the APOA1 gene and total heterozygosity in the population from the selected SNPs.

FIG. 11 and FIG. 12 disclose the heterogenicity of given selections of SNPs from Table 1 in the human population.

In some embodiments removal of, inter alia, exon 2 of the APOA1 gene which encodes at least a portion of the signal peptide (residues 1-18) may result in a protein that will not be secreted or alternatively RNA decay may be triggered resulting in knockout of the expression of the mutant allele. In embodiments of the present invention, two guide sequences are utilized, one targeting a heterozygous SNP present in the APOA1 gene and located at exon 1, e.g. at rs670, and the other targeting a heterozygous SNP present in the APOA1 gene located at intron 2 e.g. at rs5070, wherein each RNA molecule targets the nucleotide base, REF or ALT, of each SNP present in only the mutant allele of the APOA1 gene to remove at least a portion of exon 1 which encodes the 5' UTR and exon 2, e.g. at rs5070. (FIG. 1)

Figure 2:
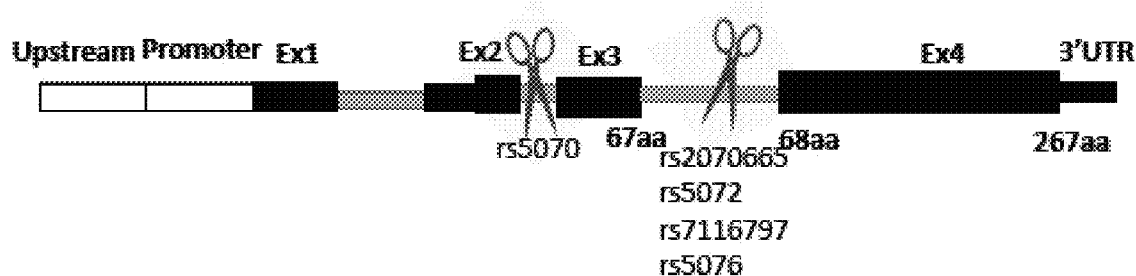
FIG. 2: Utilization of two guide sequences, one targeting intron 2 of the APOA1 gene and the other targeting intron 3 of the APOA1 gene, to remove exon 3 of the APOA1 gene, which encodes a region prone to amyloidosis, to form a truncated apoA-1 which will not form aggregates/deposition as fibrils, or alternatively RNA decay may be triggered resulting in knockout of the expression of the mutant allele, wherein at least one of the guide sequences targets a heterozygous SNP present in the APOA1 gene wherein the RNA molecule targets the nucleotide base, REF or ALT, of the SNP present in only the mutant allele of the APOA1 gene.

In some embodiments, two guide sequences are utilized, one targeting intron 2 of the APOA1 gene and the other targeting intron 3 of the APOA1 gene to remove exon 3 of the APOA1 gene, which encodes a region prone to amyloidosis, to form a truncated apoA-1 which will not form aggregates/deposition as fibrils, or alternatively RNA decay may be triggered resulting in knockout of the expression of the mutant allele, wherein at least one of the guide sequences targets a heterozygous SNP present in the APOA1 gene wherein the RNA molecule targets the nucleotide base, REF or ALT, of the SNP present in only the mutant allele of the APOA1 gene. (FIG. 2)

Figure 3:
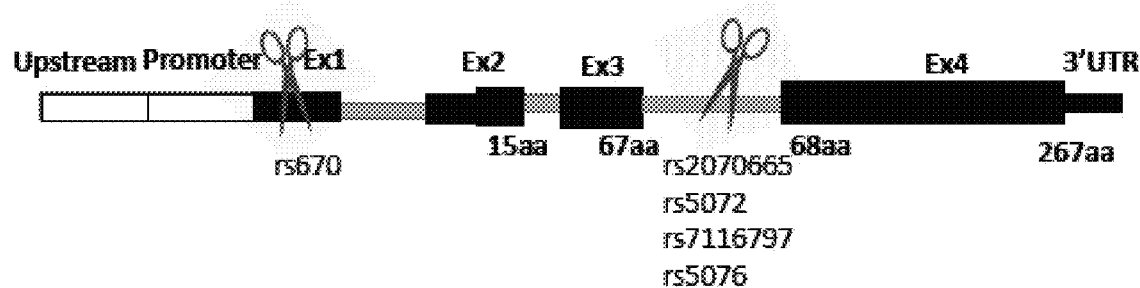
FIG. 3: Utilization of two guide sequences to remove exon 2, intron 2, and exons 3 of the APOA1 gene may result in the formation of a truncated apoA-1 which optionally will not secrete from the cells and/or form aggregates/deposit as fibrils, or alternatively RNA decay may be triggered resulting in knockout of the expression of the mutant allele. For example, utilization of a first guide sequence targeting a sequence located at exon 1 of the APOA1 gene and a second guide sequence targeting a sequence of intron of the APOA1 gene, wherein at least one of the guide sequences targets a heterozygous SNP present in the APOA1 gene wherein the RNA molecule targets the nucleotide base, REF or ALT, of the SNP present in only the mutant allele of the APOA1 gene.

In some embodiments, removal of exon 2, intron 2, and exons 3 of the APOA1 gene may result in the formation of a truncated apoA-1 which optionally will not secrete from the cells and/or form aggregates/deposit as fibrils, or alternatively RNA decay may be triggered resulting in knockout of the expression of the mutant allele. In embodiments of the present invention, two guide sequence are utilized, a first guide sequence targeting a sequence located at exon 1 of the APOA1 gene and a second guide sequence targeting a sequence of intron of the APOA1 gene, wherein at least one of the guide sequences targets a heterozygous SNP present in the APOA1 gene wherein the RNA molecule targets the nucleotide base, REF or ALT, of the SNP present in only the mutant allele of the APOA1 gene (FIG. 3).

Figure 4:
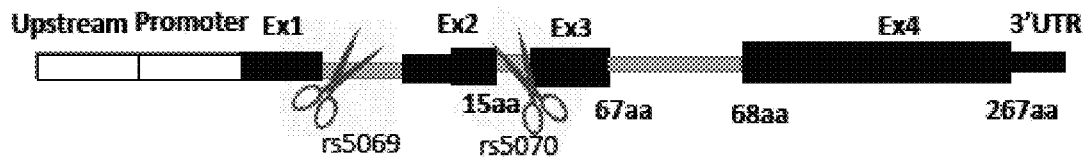
FIG. 4: Removal of, inter alia, exon 2 of the APOA1 gene which encodes at least a portion of the signal peptide (residues 1-18) may result in a protein that will not be secreted or alternatively RNA decay may be triggered resulting in knockout of the expression of the mutant allele. For example, utilization of two guide sequences, one targeting a sequence of intron 1 of the APOA1 gene and the other targeting a sequence of intron 2 of the APOA1 gene, to remove at least a portion of exon 1 which encodes the 5' UTR and exon 2, wherein at least one of the guide sequences targets a heterozygous SNP present in the APOA1 gene wherein the RNA molecule targets the nucleotide base, REF or ALT, of the SNP present in only the mutant allele of the APOA1 gene.

In some embodiments, removal of, inter alia, exon 2 of the APOA1 gene which encodes at least a portion of the signal peptide (residues 1-18) may result in a protein that will not be secreted or alternatively RNA decay may be triggered resulting in knockout of the expression of the mutant allele. In embodiments of the present invention, a two guide sequences are utilized, one targeting a sequence of intron 1 of the APOA1 gene and the other targeting a sequence of intron 2 of the APOA1 gene, to remove at least a portion of exon 1 which encodes the 5' UTR and exon 2, wherein at least one of the guide sequences targets a heterozygous SNP present in the APOA1 gene wherein the RNA molecule targets the nucleotide base, REF or ALT, of the SNP present in only the mutant allele of the APOA1 gene. (FIG. 4).

Figure 5:
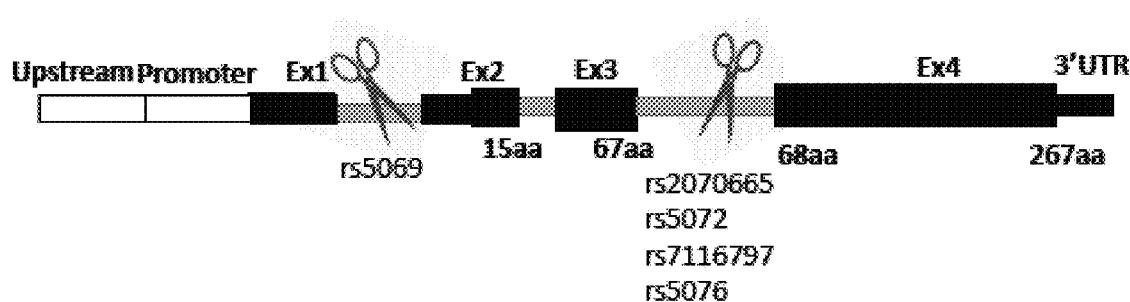
FIG. 5: Utilization of two guide sequences to remove exon 2, intron 2, and exons 3 of the APOA1 may result in the formation of a truncated apoA-1 which optionally will not secrete from the cells and/or form aggregates/deposit as fibrils, or alternatively RNA decay may be triggered resulting in knockout of the expression of the mutant allele. For example, utilization of two guide sequences, one targeting a sequence of intron 1 of the APOA1 gene and the other targeting a sequence of intron 3 of the APOA1 gene, wherein at least one of the guide sequences targets a heterozygous SNP present in the APOA1 gene wherein the RNA molecule targets the nucleotide base, REF or ALT, of the SNP present in only the mutant allele of the APOA1 gene.

In some embodiments, removal of exon 2, intron 2, and exons 3 of the APOA1 may result in the formation of a truncated apoA-1 which optionally will not secrete from the cells and/or form aggregates/deposit as fibrils, or alternatively RNA decay may be triggered resulting in knockout of the expression of the mutant allele. In embodiments of the present invention, two guide sequences are utilized, one targeting a sequence of intron 1 of the APOA1 gene and the other targeting a sequence of intron 3 of the APOA1 gene, wherein at least one of the guide sequences targets a heterozygous SNP present in the APOA1 gene wherein the RNA molecule targets the nucleotide base, REF or ALT, of the SNP present in only the mutant allele of the APOA1 gene. (FIG. 5).

Figure 6:
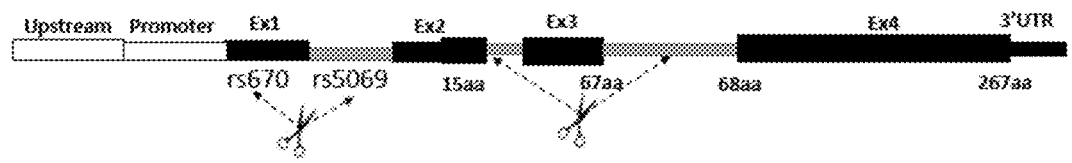
FIG. 6: Utilization of two guide sequences to remove exon 2 or exons 2 and 3 of the APOA1 gene by targeting rs670 in exon 1 or rs5069 in intron 1 of the mutant allele of APOA1 gene and a non-coding sequence in intron 2 of the mutant allele of APOA1 gene or common to both alleles of the APOA1 gene.

In some embodiments, two guide sequences are utilized to remove exon 2 or exons 2 and 3 of the APOA1 gene by targeting rs670 in exon 1 or rs5069 in intron 1 of the mutant allele of APOA1 gene and a non-coding sequence in intron 2 of the mutant allele of APOA1 gene or common to both alleles of the APOA1 gene. (FIG. 6).

Figure 7:
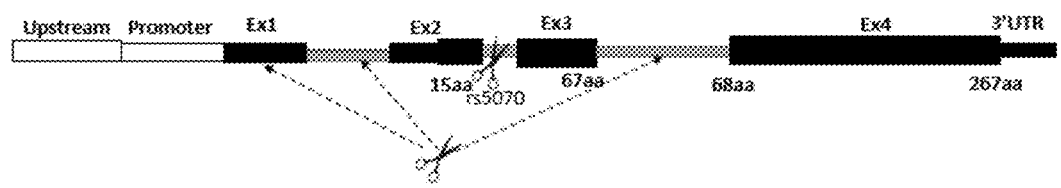
FIG. 7: Utilization of two guide sequences to remove exon 2, exon 3, or exons 2 and 3 of the APOA1 gene by targeting a non-coding sequence in exon 1 (5' UTR), intron 1 or intron 3 of the mutant allele of APOA1 gene or common to both alleles of the APOA1 gene and rs5070 of intron 2 of the mutant allele of APOA1 gene.

In some embodiments, two guide sequences are utilized to remove exon 2, exon 3, or exons 2 and 3 of the APOA1 gene by targeting a non-coding sequence in exon 1 (5' UTR), intron 1 or intron 3 of the mutant allele of APOA1 gene or common to both alleles of the APOA1 gene and rs5070 of intron 2 of the mutant allele of APOA1 gene. (FIG. 7).

Figure 8:
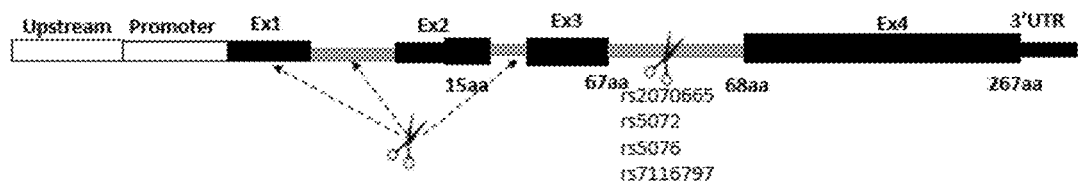
FIG. 8: Utilization of two guide sequences to remove exons 1-3, exons 2 and 3, or exon 3 of the APOA1 gene by targeting a non-coding sequence in exon 1 (5' UTR), intron 1, or intron 2 of the mutant allele of APOA1 gene or common to both alleles of the APOA1 gene and one of rs2070665, rs5072, rs5076, or rs7116797 in intron 9 of the mutant allele of APOA1 gene.

In some embodiments, two guide sequences are utilized to remove exons 1-3, exons 2 and 3, or exon 3 of the APOA1 gene by targeting a non-coding sequence in exon 1 (5' UTR), intron 1, or intron 2 of the mutant allele of APOA1 gene or common to both alleles of the APOA1 gene and one of rs2070665, rs5072, rs5076, or rs7116797 in intron 9 of the mutant allele of APOA1 gene. (FIG. 8).

Figure 9:
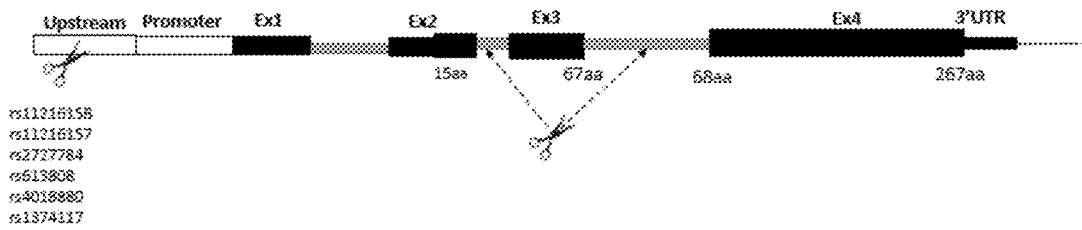
FIG. 9: Utilization of two guide sequences to remove exons 1 and 2, or exons 1-3 of the APOA1 gene by targeting a non-coding sequence in intron 2 or intron 3 of the mutant allele of APOA1 gene or common to both alleles of the APO1 gene and one of rs1216158, rs11216157, rs2727784, rs613808, rs4018880, or rs1374117 upstream of intron 2 or intron 3 on the mutant allele of APOA1 gene.

In some embodiments, two guide sequences are utilized to remove exons 1 and 2, or exons 1-3 of the APOA1 gene by targeting a non-coding sequence in intron 2 or intron 3 of the mutant allele of APOA1 gene or common to both alleles of the APOA1 gene and one of rs11216158, rs11216157, rs2727784, rs613808, rs4018880, or rs1374117 upstream of intron 2 or intron 3 on the mutant allele of APOA1 gene. (FIG. 9).

Figure 10:
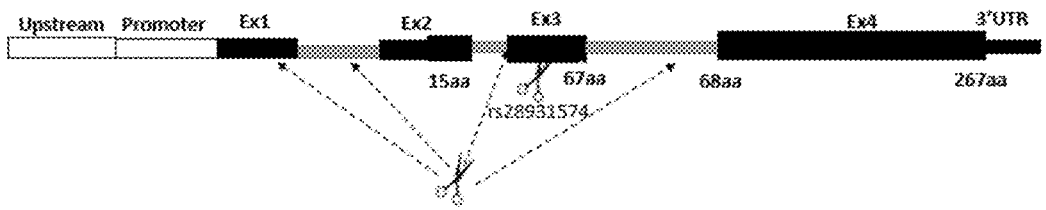
FIG. 10: Utilization of two guide sequences to remove exons 1 and 2, or exons 2 or 3 of the APOA1 gene by targeting a non-coding sequence in exon 1 (5' UTR), intron 1, intron 2 or intron 3 of the mutant allele of APOA1 gene or common to both alleles of the APOA1 gene and rs28931574 in exon 3 of the mutant allele of APOA1 gene.

In some embodiments, two guide sequences are utilized to remove exons 1 and 2, or exons 2 or 3 of the APOA1 gene by targeting a non-coding sequence in exon 1 (5' UTR), intron 1, intron 2 or intron 3 of the mutant allele of APOA1 gene or common to both alleles of the APOA1 gene and rs28931574 in exon 3 of the mutant allele of APOA1 gene. (FIG. 10).

Delivery to Cells

It is understood that in the methods embodied, the RNA molecules and compositions described herein may be delivered to a target cell or subject by any suitable means. The following embodiments provide non-limiting examples of methods of delivery of the RNA molecules and composition of the present invention.

In some embodiments, RNA molecule compositions of the present invention may be targeted to any cell which contains and/or expresses a dominant negative allele, including any mammalian or plant cell. For example, in one embodiment the RNA molecule specifically targets a mutant APOA1 allele and the target cell is a hepatocyte cell.

In some embodiments, the RNA molecule comprises a chemical modification. Non-limiting examples of suitable chemical modifications include 2'-O-methyl (M), 2'-O-methyl, 3'phosphorothioate (MS) or 2'-O-methyl, 3'thio-PACE (MSP), pseudouridine, and 1-methyl pseudo-uridine. Each possibility represents a separate embodiment of the present invention.

Any suitable viral vector system may be used to deliver nucleic acid compositions e.g., the RNA molecule compositions of the subject invention. Conventional viral and non-viral based gene transfer methods can be used to introduce nucleic acids and target tissues. In certain embodiments, nucleic acids are administered for in vivo or ex vivo gene therapy uses. Non-viral vector delivery systems include naked nucleic acid, and nucleic acid complexed with a delivery vehicle such as a liposome or poloxamer. For a review of gene therapy procedures, see Anderson (1992) Science 256:808-813; Nabel & Felgner (1993) TIBTECH 11:211-217; Mitani & Caskey (1993) TIBTECH 11:162-166; Dillon (1993) TIBTECH 11:167-175; Miller (1992) Nature 357:455-460; Van Brunt (1988) Biotechnology 6(10):1149-1154; Vigne (1995) Restorative Neurology and Neuroscience 8:35-36; Kremer & Perricaudet (1995) British Medical Bulletin 51(1):31-44; Haddada et al. (1995) in Current Topics in Microbiology and Immunology Doerfler and Bohm (eds.); and Yu et al. (1994) Gene Therapy 1:13-26.

Methods of non-viral delivery of nucleic acids and/or proteins include electroporation, lipofection, microinjection, biolistics, particle gun acceleration, virosomes, liposomes, immunoliposomes, lipid nanoparticles (LNPs), polycation or lipid:nucleic acid conjugates, artificial virions, and agent-enhanced uptake of nucleic acids or can be delivered to plant cells by bacteria or viruses (e.g., Agrobacterium, Rhizobium sp. NGR234, Sinorhizoboium meliloti, Mesorhizobium loti, tobacco mosaic virus, potato virus X, cauliflower mosaic virus and cassava vein mosaic virus). (See, e.g., Chung et al. (2006) Trends Plant Sci. 11(1):1-4). Sonoporation using, e.g., the Sonitron 2000 system (Rich-Mar), can also be used for delivery of nucleic acids. Cationic-lipid mediated delivery of proteins and/or nucleic acids is also contemplated as an in vivo or in vitro delivery method. (See Zuris et al. (2015) Nat. Biotechnol. 33(1):73-80; see also Coelho et al. (2013) N. Engl. J. Med. 369, 819-829; Judge et al. (2006) Mol. Ther. 13, 494-505; and Basha et al. (2011) Mol. Ther. 19, 2186-2200).

Additional exemplary nucleic acid delivery systems include those provided by Amaxa® Biosystems (Cologne, Germany), Maxcyte, Inc. (Rockville, Md.), BTX Molecular Delivery Systems (Holliston, Mass.) and Copernicus Therapeutics Inc., (see, e.g., U.S. Pat. No. 6,008,336). Lipofection is described in e.g., U.S. Pat. Nos. 5,049,386, 4,946,787; and 4,897,355, and lipofection reagents are sold commercially (e.g., Transfectam®, Lipofectin™ and Lipofectamine™ RNAiMAX). Cationic and neutral lipids that are suitable for efficient receptor-recognition lipofection of polynucleotides include those of Felgner, WO 91/17424, WO 91/16024. Delivery can be to cells (ex vivo administration) or target tissues (in vivo administration).

The preparation of lipid:nucleic acid complexes, including targeted liposomes such as immunolipid complexes, is well known to one of skill in the art (See, e.g., Crystal (1995) Science 270:404-410; Blaese et al. (1995) Cancer Gene Ther. 2:291-297; Behr et al. (1994) Bioconjugate Chem. 5:382-389; Remy et al. (1994) Bioconjugate Chem. 5:647-654; Gao et al. (1995) Gene Therapy 2:710-722; Ahmad et al. (1992) Cancer Res. 52:4817-4820; U.S. Pat. Nos. 4,186,183, 4,217,344, 4,235,871, 4,261,975, 4,485,054, 4,501,728, 4,774,085, 4,837,028, and 4,946,787).

Additional methods of delivery include the use of packaging the nucleic acids to be delivered into EnGeneIC delivery vehicles (EDVs). These EDVs are specifically delivered to target tissues using bispecific antibodies where one arm of the antibody has specificity for the target tissue and the other has specificity for the EDV. The antibody brings the EDVs to the target cell surface and then the EDV is brought into the cell by endocytosis. Once in the cell, the contents are released (See MacDiarmid et al (2009) Nature Biotechnology 27(7):643).

The use of RNA or DNA viral based systems for viral mediated delivery of nucleic acids take advantage of highly evolved processes for targeting a virus to specific cells in the body and trafficking the viral payload to the nucleus. Viral vectors can be administered directly to patients (in vivo) or they can be used to treat cells in vitro and the modified cells are administered to patients (ex vivo). Conventional viral based systems for the delivery of nucleic acids include, but are not limited to, retroviral, lentivirus, adenoviral, adeno-associated, vaccinia and herpes simplex virus vectors for gene transfer.

The tropism of a retrovirus can be altered by incorporating foreign envelope proteins, expanding the potential target population of target cells. Lentiviral vectors are retroviral vectors that are able to transduce or infect non-dividing cells and typically produce high viral titers. Selection of a retroviral gene transfer system depends on the target tissue.

Retroviral vectors are comprised of cis-acting long terminal repeats with packaging capacity for up to 6-10 kb of foreign sequence. The minimum cis-acting LTRs are sufficient for replication and packaging of the vectors, which are then used to integrate the therapeutic gene into the target cell to provide permanent transgene expression. Widely used retroviral vectors include those based upon murine leukemia virus (MuLV), gibbon ape leukemia virus (GaLV), Simian Immunodeficiency virus (SIV), human immunodeficiency virus (HIV), and combinations thereof (See, e.g., Buchschacher et al. (1992) J. Virol. 66:2731-2739; Johann et al. (1992) J. Virol. 66:1635-1640; Sommerfelt et al. (1990) Virol. 176:58-59; Wilson et al. (1989) J. Virol. 63:2374-2378; Miller et al. (1991) J. Virol. 65:2220-2224; PCT/US94/05700).

At least six viral vector approaches are currently available for gene transfer in clinical trials, which utilize approaches that involve complementation of defective vectors by genes inserted into helper cell lines to generate the transducing agent.

pLASN and MFG-S are examples of retroviral vectors that have been used in clinical trials (Dunbar et al. (1995) Blood 85:3048-305; Kohn et al. (1995) Nat. Med. 1:1017-102; Malech et al. (1997) PNAS 94:22 12133-12138). PA317/pLASN was the first therapeutic vector used in a gene therapy trial. (Blaese et al. (1995). Transduction efficiencies of 50% or greater have been observed for MFG-S packaged vectors. (Ellem et al. (1997) Immunol Immunother. 44(1):10-20; Dranoff et al. (1997) Hum. Gene Ther. 1:111-2).

Packaging cells are used to form virus particles that are capable of infecting a host cell. Such cells include 293 cells, which package adenovirus, AAV, and Psi-2 cells or PA317 cells, which package retrovirus. Viral vectors used in gene therapy are usually generated by a producer cell line that packages a nucleic acid vector into a viral particle. The vectors typically contain the minimal viral sequences required for packaging and subsequent integration into a host (if applicable), other viral sequences being replaced by an expression cassette encoding the protein to be expressed. The missing viral functions are supplied in trans by the packaging cell line. For example, AAV vectors used in gene therapy typically only possess inverted terminal repeat (ITR) sequences from the AAV genome which are required for packaging and integration into the host genome. Viral DNA is packaged in a cell line, which contains a helper plasmid encoding the other AAV genes, namely rep and cap, but lacking ITR sequences. The cell line is also infected with adenovirus as a helper. The helper virus promotes replication of the AAV vector and expression of AAV genes from the helper plasmid. The helper plasmid is not packaged in significant amounts due to a lack of ITR sequences. Contamination with adenovirus can be reduced by, e.g., heat treatment to which adenovirus is more sensitive than AAV. Additionally, AAV can be produced at clinical scale using baculovirus systems (see U.S. Pat. No. 7,479,554).

In many gene therapy applications, it is desirable that the gene therapy vector be delivered with a high degree of specificity to a particular tissue type. Accordingly, a viral vector can be modified to have specificity for a given cell type by expressing a ligand as a fusion protein with a viral coat protein on the outer surface of the virus. The ligand is chosen to have affinity for a receptor known to be present on the cell type of interest. For example, Han et al. (1995) Proc. Natl. Acad. Sci. USA 92:9747-9751, reported that Moloney murine leukemia virus can be modified to express human heregulin fused to gp70, and the recombinant virus infects certain human breast cancer cells expressing human epidermal growth factor receptor. This principle can be extended to other virus-target cell pairs, in which the target cell expresses a receptor and the virus expresses a fusion protein comprising a ligand for the cell-surface receptor. For example, filamentous phage can be engineered to display antibody fragments (e.g., FAB or Fv) having specific binding affinity for virtually any chosen cellular receptor. Although the above description applies primarily to viral vectors, the same principles can be applied to nonviral vectors. Such vectors can be engineered to contain specific uptake sequences which favor uptake by specific target cells.

Gene therapy vectors can be delivered in vivo by administration to an individual patient, typically by systemic administration (e.g., intravitreal, intravenous, intraperitoneal, intramuscular, subdermal, or intracranial infusion) or topical application, as described below. Alternatively, vectors can be delivered to cells ex vivo, such as cells explanted from an individual patient (e.g., lymphocytes, bone marrow aspirates, tissue biopsy) or universal donor hematopoietic stem cells, followed by reimplantation of the cells into a patient, usually after selection for cells which have incorporated the vector.

Ex & vivo cell transfection for diagnostics, research, or for gene therapy (e.g., via re-infusion of the transfected cells into the host organism) is well known to those of skill in the art. In a preferred embodiment, cells are isolated from the subject organism, transfected with a nucleic acid composition, and re-infused back into the subject organism (e.g., patient). Various cell types suitable for ex vivo transfection are well known to those of skill in the art (See, e.g., Freshney et al. (1994) Culture of Animal Cells, A Manual of Basic Technique, 3rd ed, and the references cited therein for a discussion of how to isolate and culture cells from patients).

Suitable cells include, but are not limited to, eukaryotic cells and/or cell lines. Non-limiting examples of such cells or cell lines generated from such cells include COS, CHO (e.g., CHO-S, CHO-K1, CHO-DG44, CHO-DUXB11, CHO-DUKX, CHOKISV), VERO, MDCK, W138, V79, B14AF28-G3, BHK, HaK, NSO, SP2/0-Agl4, HeLa, HEK293 (e.g., HEK293-F, HEK293-H, HEK293-T), perC6 cells, any plant cell (differentiated or undifferentiated), as well as insect cells such as Spodopterafugiperda (Sf), or fungal cells such as *Saccharomyces, Pichia* and *Schizosaccharomyces*. In certain embodiments, the cell line is a CHO-K1, MDCK or HEK293 cell line. Additionally, primary cells may be isolated and used ex vivo for reintroduction into the subject to be treated following treatment with a guided nuclease system (e.g. CRISPR/Cas). Suitable primary cells include peripheral blood mononuclear cells (PBMC), and other blood cell subsets such as, but not limited to, CD4+ T cells or CD8+ T cells. Suitable cells also include stem cells such as, by way of example, embryonic stem cells, induced pluripotent stem cells, hematopoietic stem cells (CD34+), neuronal stem cells and mesenchymal stem cells.

In one embodiment, stem cells are used in ex vivo procedures for cell transfection and gene therapy. The advantage to using stem cells is that they can be differentiated into other cell types in vitro, or can be introduced into a mammal (such as the donor of the cells) where they will engraft in the bone marrow. Methods for differentiating CD34+ cells in vitro into clinically important immune cell types using cytokines such a GM-CSF, IFN-gamma, and TNF-alpha are known (as a non-limiting example see, Inaba et al., J. Exp. Med. 176:1693-1702 (1992)).

Stem cells are isolated for transduction and differentiation using known methods. For example, stem cells are isolated from bone marrow cells by panning the bone marrow cells with antibodies which bind unwanted cells, such as CD4+ and CD8+(T cells), CD45+(panB cells), GR-1 (granulocytes), and Iad (differentiated antigen presenting cells) (as a non-limiting example see Inaba et al. (1992) J. Exp. Med. 176:1693-1702). Stem cells that have been modified may also be used in some embodiments.

Any one of the RNA molecule compositions described herein is suitable for genome editing in post-mitotic cells or any cell which is not actively dividing, e.g., arrested cells. Examples of post-mitotic cells which may be edited using an RNA molecule composition of the present invention include, but are not limited to, a hepatocyte cell.

Vectors (e.g., retroviruses, liposomes, etc.) containing therapeutic nucleic acid compositions can also be administered directly to an organism for transduction of cells in vivo. Administration is by any of the routes normally used for introducing a molecule into ultimate contact with blood or tissue cells including, but not limited to, injection, infusion, topical application (e.g., eye drops and cream) and electroporation. Suitable methods of administering such nucleic acids are available and well known to those of skill in the art, and, although more than one route can be used to administer a particular composition, a particular route can often provide a more immediate and more effective reaction than another route. According to some embodiments, the composition is delivered via IV injection.

Vectors suitable for introduction of transgenes into immune cells (e.g., T-cells) include non-integrating lentivius vectors. See, e.g., U.S. Patent Publication No. 2009-0117617.

Pharmaceutically acceptable carriers are determined in part by the particular composition being administered, as well as by the particular method used to administer the composition. Accordingly, there is a wide variety of suitable formulations of pharmaceutical compositions available, as described below (See, e.g., Remington's Pharmaceutical Sciences, 17th ed., 1989).

In accordance with some embodiments, there is provided an RNA molecule which binds to/associates with and/or directs the RNA guided DNA nuclease to a sequence comprising at least one nucleotide which differs between a mutant allele and a functional allele (e.g., SNP) of a gene of interest (i.e., a sequence of the mutant allele which is not present in the functional allele). The sequence may be within the disease associated mutation. The sequence may be upstream or downstream to the disease associated mutation. Any sequence difference between the mutant allele and the functional allele may be targeted by an RNA molecule of the present invention to inactivate the mutant allele, or otherwise disable its dominant disease-causing effects, while preserving the activity of the functional allele.

The disclosed compositions and methods may also be used in the manufacture of a medicament for treating dominant genetic disorders in a patient.

Mechanisms of Action for Several Embodiments Disclosed Herein

APOA1 encodes a 267 amino acid prepropeptide, which is sequentially cleaved to yield the mature 243 amino acid protein (exons 3 and 4). Typically, about 95% of plasma apoA-1 circulates in a stable α-helical conformation bound to HDL and remaining portion forms a lipid free monomer ("free"). Free apoA-1 is a transient species that rapidly binds to lipoproteins or is recruited to the plasma membrane for HDL biogenesis.

Alternatively, free apoA-I may be either or alternatively misfolds and deposits as fibrils in two human diseases. It was previously demonstrated that fragments 1-83 to 1-93 of mutant apoA-1 deposit as fibers in vital organs (kidney, liver, heart, nerves, 5 skin, spleen, testes, etc.) causing organ damage. Studies showed patients with gene mutations affecting residues 1 to 75 may suffer from hepatic and renal amyloidosis, while mutations in codons 173 to 178 mainly cause AApoA1 amyloidosis of the heart, larynx, and skin. Typically, AApoA1 patients have lower than normal plasma levels of apoA-I and HDL resulting from reduced secretion or enhanced degradation of the protein. Hence, unlike many other amyloid diseases, AApoA1 is not due to protein overproduction.

Without being bound by any theory or mechanism, the instant invention may be utilized to apply a CRISPR nuclease to process the mutant pathogenic APOA1 allele and not the functional APOA1 allele, such as to prevent expression of the mutant pathogenic allele or to produce a truncated non-pathogenic peptide from the mutant pathogenic allele, in order to prevent apoA-I related amyloidosis.

In some embodiments, particularly those targeting exon 2 of the APOA1 gene, the resultant peptide will lack at least a portion of the signal peptide essential for secretion. In some embodiments, particularly those targeting exon 3 of the APOA1 gene, the resultant peptide will lack a region demonstrated as prone to amyloidosis.

Outcomes of the embodiments disclosed herein may be examined to identify whether the mutant allele is expressed. In case the mutant allele is expressed, its effect on cells, such as induced stress/toxicity, may be examined by the creation of amyloids. Further its ability to secrete from cells, may be assessed, inter alia, by the presence of aggregates outside the cells. In addition, residual activity of a resultant truncated apoA-1 may be assessed.

Examples of RNA Guide Sequences which Specifically Target Mutant Alleles of ApoA1 Gene Although a large number of guide sequences can be designed to target a mutant allele, the nucleotide sequences described in Tables 2 identified by SEQ ID NOs: 1-1313 below were specifically selected to effectively implement the methods set forth herein and to effectively discriminate between alleles.

Referring to columns 1-4, each of SEQ ID NOs: 1-1313 indicated in column 1 corresponds to an engineered guide sequence. The corresponding SNP details are indicated in column 2. The SNP details indicated in the 2nd column include the assigned identifier for each SNP corresponding to a SNP ID indicated in Table 1. Column 3 indicates whether the target of each guide sequence is the APOA1 gene polymorph or wild type sequence where indicated. Column 4 indicates the guanine-cytosine content of each guide sequence where indicated.

Table 2 shows guide sequences designed for use as described in the embodiments above to associate with different SNPs within a sequence of a mutant APOA1 allele. Each engineered guide molecule is further designed such as to associate with a target genomic DNA sequence of interest that lies next to a protospacer adjacent motif (PAM), e.g., a PAM matching the sequence NGG or NAG, where "N" is any nucleobase. The guide sequences were designed to work in conjunction with one or more different CRISPR nucleases, including, but not limited to, e.g. SpCas9WT (PAM SEQ: NGG), SpCas9.VQR.1 (PAM SEQ: NGAN), SpCas9.VQR.2 (PAM SEQ: NGNG), SpCas9.EQR (PAM SEQ: NGAG), SpCas9.VRER (PAM SEQ: NGCG), SaCas9WT (PAM SEQ: NNGRRT), NmCas9WT (PAM SEQ: NNNNGATT), Cpf1 (PAM SEQ: TTTV), or JeCas9WT (PAM SEQ: NNNVRYM). RNA molecules of the present invention are each designed to form complexes in conjunction with one or more different CRISPR nucleases and designed to target polynucleotide sequences of interest utilizing one or more different PAM sequences respective to the CRISPR nuclease utilized.

TABLE 2

Guide sequences designed associate with specific SNPs of the APOA1 gene

| SEQ ID NO: | SNP ID (Table 1) | Target (ALT/REF) | % GC |
|---|---|---|---|
| 1 | s3 | REF | 50% |
| 2 | s5 | ALT | 60% |
| 3 | s1 | BOTH | 55% |
| 4 | s5 | REF | 60% |
| 5 | s9 | ALT | 60% |
| 6 | s1 | BOTH | 55% |
| 7 | s5 | REF | 65% |
| 8 | s7 | ALT | 55% |
| 9 | s7 | REF | 50% |
| 10 | s8 | ALT | 70% |
| 11 | s8 | REF | 75% |
| 12 | s4 | ALT | 70% |
| 13 | s4 | REF | 65% |
| 14 | s9 | REF | 65% |
| 15 | s9 | ALT | 60% |
| 16 | s2 | ALT | 60% |
| 17 | s11 | BOTH | 65% |
| 18 | s3 | REF | 50% |
| 19 | s13 | ALT | 50% |
| 20 | s2 | REF | 55% |
| 21 | s14 | BOTH | 50% |
| 22 | s6 | REF | 45% |
| 23 | s6 | ALT | 40% |
| 24 | s11 | BOTH | 60% |
| 25 | s13 | ALT | 50% |
| 26 | s13 | REF | 55% |
| 27 | s13 | REF | 50% |
| 28 | s8 | REF | 75% |
| 29 | s9 | REF | 65% |
| 30 | s9 | REF | 65% |
| 31 | s5 | REF | 60% |
| 32 | s5 | REF | 50% |
| 33 | s10 | REF | 75% |
| 34 | s10 | ALT | 70% |
| 35 | s11 | ALT | 70% |
| 36 | s10 | ALT | 65% |
| 37 | s12 | ALT | 80% |
| 38 | s12 | REF | 75% |
| 39 | s8 | ALT | 60% |
| 40 | s12 | ALT | 80% |
| 41 | s12 | REF | 75% |
| 42 | s9 | ALT | 60% |
| 43 | s11 | REF | 75% |
| 44 | s10 | REF | 50% |
| 45 | s10 | ALT | 55% |
| 46 | s10 | REF | 60% |
| 47 | s5 | REF | 50% |
| 48 | s8 | ALT | 60% |
| 49 | s8 | REF | 65% |
| 50 | s3 | REF | 50% |
| 51 | s7 | REF | 45% |
| 52 | s7 | ALT | 50% |
| 53 | s13 | ALT | 45% |
| 54 | s14 | BOTH | 60% |
| 55 | s7 | ALT | 55% |
| 56 | s7 | REF | 50% |
| 57 | s13 | ALT | 50% |
| 58 | s13 | REF | 65% |
| 59 | s2 | ALT | 50% |
| 60 | s2 | REF | 45% |
| 61 | s3 | REF | 55% |
| 62 | s5 | REF | 65% |
| 63 | s7 | REF | 30% |
| 64 | s7 | ALT | 35% |
| 65 | s13 | ALT | 50% |
| 66 | s10 | REF | 65% |
| 67 | s10 | ALT | 60% |
| 68 | s13 | REF | 55% |
| 69 | s5 | REF | 60% |
| 70 | s11 | ALT | 75% |
| 71 | s11 | REF | 80% |
| 72 | s5 | REF | 50% |
| 73 | s14 | ALT | 65% |
| 74 | s14 | REF | 60% |
| 75 | s8 | ALT | 65% |
| 76 | s13 | ALT | 50% |
| 77 | s14 | REF | 60% |
| 78 | s14 | ALT | 65% |
| 79 | s3 | REF | 55% |
| 80 | s2 | REF | 45% |
| 81 | s2 | ALT | 50% |
| 82 | s8 | BOTH | 65% |
| 83 | s2 | REF | 50% |
| 84 | s2 | ALT | 55% |
| 85 | s11 | ALT | 80% |
| 86 | s10 | REF | 55% |
| 87 | s13 | REF | 65% |
| 88 | s10 | ALT | 50% |
| 89 | s8 | ALT | 70% |
| 90 | s2 | ALT | 65% |
| 91 | s8 | REF | 70% |
| 92 | s9 | ALT | 60% |
| 93 | s9 | REF | 65% |
| 94 | s10 | ALT | 50% |
| 95 | s10 | REF | 55% |
| 96 | s2 | BOTH | 60% |
| 97 | s10 | BOTH | 70% |
| 98 | s13 | ALT | 55% |
| 99 | s13 | REF | 60% |
| 100 | s11 | REF | 80% |
| 101 | s11 | ALT | 75% |
| 102 | s2 | ALT | 60% |
| 103 | s12 | REF | 70% |
| 104 | s14 | REF | 65% |
| 105 | s13 | ALT | 55% |
| 106 | s10 | REF | 60% |
| 107 | s10 | ALT | 55% |
| 108 | s12 | ALT | 80% |
| 109 | s12 | ALT | 75% |
| 110 | s2 | REF | 60% |
| 111 | s2 | ALT | 50% |
| 112 | s2 | REF | 45% |
| 113 | s8 | ALT | 65% |
| 114 | s12 | ALT | 75% |
| 115 | s12 | REF | 70% |
| 116 | s7 | ALT | 35% |
| 117 | s7 | REF | 30% |
| 118 | s14 | REF | 50% |
| 119 | s4 | ALT | 55% |
| 120 | s11 | ALT | 75% |
| 121 | s5 | REF | 65% |
| 122 | s2 | ALT | 55% |
| 123 | s2 | REF | 50% |
| 124 | s6 | REF | 45% |
| 125 | s6 | ALT | 50% |
| 126 | s7 | REF | 45% |
| 127 | s7 | ALT | 50% |
| 128 | s10 | REF | 65% |
| 129 | s10 | ALT | 60% |
| 130 | s13 | ALT | 50% |
| 131 | s14 | BOTH | 50% |
| 132 | s2 | REF | 45% |
| 133 | s13 | REF | 55% |
| 134 | s8 | BOTH | 65% |
| 135 | s10 | ALT | 70% |
| 136 | s6 | REF | 55% |
| 137 | s5 | REF | 55% |
| 138 | s2 | ALT | 50% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 139 | s4 | REF | 55% |
| 140 | s4 | ALT | 60% |
| 141 | s8 | ALT | 70% |
| 142 | s8 | REF | 75% |
| 143 | s5 | REF | 55% |
| 144 | s12 | ALT | 75% |
| 145 | s4 | BOTH | 60% |
| 146 | s11 | ALT | 80% |
| 147 | s13 | ALT | 65% |
| 148 | s11 | REF | 85% |
| 149 | s3 | REF | 55% |
| 150 | s11 | REF | 75% |
| 151 | s9 | ALT | 60% |
| 152 | s9 | REF | 65% |
| 153 | s14 | ALT | 75% |
| 154 | s14 | REF | 70% |
| 155 | s4 | ALT | 60% |
| 156 | s9 | BOTH | 75% |
| 157 | s9 | BOTH | 70% |
| 158 | s9 | REF | 65% |
| 159 | s14 | REF | 65% |
| 160 | s14 | ALT | 70% |
| 161 | s11 | ALT | 70% |
| 162 | s4 | REF | 55% |
| 163 | s6 | ALT | 45% |
| 164 | s6 | REF | 50% |
| 165 | s6 | ALT | 50% |
| 166 | s6 | REF | 55% |
| 167 | s1 | REF | 55% |
| 168 | s1 | ALT | 60% |
| 169 | s4 | REF | 65% |
| 170 | s4 | ALT | 70% |
| 171 | s1 | BOTH | 60% |
| 172 | s5 | REF | 65% |
| 173 | s12 | ALT | 75% |
| 174 | s13 | ALT | 55% |
| 175 | s13 | REF | 60% |
| 176 | s11 | ALT | 80% |
| 177 | s13 | REF | 70% |
| 178 | s11 | REF | 85% |
| 179 | s9 | REF | 65% |
| 180 | s8 | BOTH | 65% |
| 181 | s12 | ALT | 80% |
| 182 | s4 | BOTH | 65% |
| 183 | s4 | ALT | 60% |
| 184 | s9 | REF | 65% |
| 185 | s10 | REF | 70% |
| 186 | s8 | REF | 65% |
| 187 | s10 | REF | 75% |
| 188 | s12 | ALT | 75% |
| 189 | s12 | REF | 70% |
| 190 | s12 | REF | 75% |
| 191 | s9 | ALT | 60% |
| 192 | s12 | ALT | 75% |
| 193 | s12 | REF | 70% |
| 194 | s11 | ALT | 70% |
| 195 | s11 | REF | 75% |
| 196 | s12 | REF | 70% |
| 197 | s10 | BOTH | 50% |
| 198 | s9 | REF | 70% |
| 199 | s9 | ALT | 65% |
| 200 | s9 | ALT | 60% |
| 201 | s11 | BOTH | 70% |
| 202 | s10 | ALT | 60% |
| 203 | s11 | ALT | 70% |
| 204 | s11 | REF | 75% |
| 205 | s12 | REF | 70% |
| 206 | s13 | REF | 55% |
| 207 | s14 | ALT | 65% |
| 208 | s14 | REF | 60% |
| 209 | s10 | BOTH | 50% |
| 210 | s3 | REF | 55% |
| 211 | s3 | REF | 60% |
| 212 | s3 | BOTH | 50% |
| 213 | s9 | ALT | 60% |
| 214 | s11 | ALT | 70% |
| 215 | s14 | REF | 60% |
| 216 | s14 | ALT | 65% |
| 217 | s10 | ALT | 55% |
| 218 | s10 | REF | 60% |
| 219 | s7 | ALT | 35% |
| 220 | s7 | REF | 35% |
| 221 | s7 | ALT | 40% |
| 222 | s3 | REF | 50% |
| 223 | s7 | REF | 30% |
| 224 | s9 | ALT | 60% |
| 225 | s9 | REF | 65% |
| 226 | s10 | ALT | 50% |
| 227 | s10 | REF | 55% |
| 228 | s13 | REF | 55% |
| 229 | s14 | REF | 60% |
| 230 | s2 | REF | 45% |
| 231 | s2 | ALT | 50% |
| 232 | s7 | REF | 60% |
| 233 | s10 | ALT | 50% |
| 234 | s7 | ALT | 65% |
| 235 | s10 | ALT | 45% |
| 236 | s14 | REF | 65% |
| 237 | s14 | ALT | 65% |
| 238 | s2 | REF | 45% |
| 239 | s7 | REF | 55% |
| 240 | s12 | ALT | 80% |
| 241 | s14 | ALT | 75% |
| 242 | s14 | REF | 70% |
| 243 | s6 | ALT | 40% |
| 244 | s6 | REF | 45% |
| 245 | s2 | REF | 55% |
| 246 | s2 | REF | 45% |
| 247 | s2 | ALT | 50% |
| 248 | s2 | ALT | 50% |
| 249 | s2 | REF | 45% |
| 250 | s13 | BOTH | 65% |
| 251 | s1 | REF | 55% |
| 252 | s1 | ALT | 60% |
| 253 | s12 | ALT | 70% |
| 254 | s12 | REF | 65% |
| 255 | s9 | ALT | 65% |
| 256 | s7 | REF | 35% |
| 257 | s7 | ALT | 40% |
| 258 | s4 | REF | 60% |
| 259 | s4 | ALT | 65% |
| 260 | s11 | REF | 70% |
| 261 | s11 | ALT | 65% |
| 262 | s13 | ALT | 50% |
| 263 | s14 | REF | 65% |
| 264 | s14 | ALT | 70% |
| 265 | s14 | REF | 50% |
| 266 | s14 | ALT | 55% |
| 267 | s11 | REF | 75% |
| 268 | s11 | ALT | 70% |
| 269 | s4 | REF | 50% |
| 270 | s1 | BOTH | 50% |
| 271 | s1 | BOTH | 50% |
| 272 | s2 | ALT | 50% |
| 273 | s3 | BOTH | 45% |
| 274 | s3 | ALT | 50% |
| 275 | s4 | REF | 65% |
| 276 | s6 | ALT | 40% |
| 277 | s6 | REF | 45% |
| 278 | s7 | BOTH | 50% |
| 279 | s8 | ALT | 70% |
| 280 | s8 | REF | 75% |
| 281 | s4 | ALT | 65% |
| 282 | s4 | REF | 60% |
| 283 | s2 | ALT | 55% |
| 284 | s10 | ALT | 60% |
| 285 | s10 | REF | 65% |
| 286 | s1 | REF | 50% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 287 | s2 | REF | 50% |
| 288 | s3 | BOTH | 45% |
| 289 | s1 | ALT | 65% |
| 290 | s1 | REF | 60% |
| 291 | s7 | REF | 25% |
| 292 | s7 | ALT | 30% |
| 293 | s3 | REF | 50% |
| 294 | s3 | ALT | 50% |
| 295 | s8 | ALT | 70% |
| 296 | s4 | REF | 65% |
| 297 | s5 | ALT | 65% |
| 298 | s6 | ALT | 45% |
| 299 | s6 | REF | 50% |
| 300 | s6 | ALT | 45% |
| 301 | s6 | REF | 50% |
| 302 | s10 | REF | 70% |
| 303 | s10 | ALT | 65% |
| 304 | s4 | ALT | 70% |
| 305 | s11 | REF | 60% |
| 306 | s5 | REF | 50% |
| 307 | s6 | ALT | 45% |
| 308 | s7 | REF | 40% |
| 309 | s7 | ALT | 45% |
| 310 | s7 | REF | 30% |
| 311 | s7 | ALT | 35% |
| 312 | s3 | REF | 55% |
| 313 | s3 | ALT | 50% |
| 314 | s1 | REF | 60% |
| 315 | s1 | ALT | 65% |
| 316 | s2 | REF | 50% |
| 317 | s3 | REF | 55% |
| 318 | s3 | ALT | 50% |
| 319 | s12 | REF | 70% |
| 320 | s12 | ALT | 75% |
| 321 | s9 | REF | 65% |
| 322 | s9 | ALT | 60% |
| 323 | s3 | REF | 55% |
| 324 | s3 | ALT | 50% |
| 325 | s13 | ALT | 45% |
| 326 | s1 | ALT | 55% |
| 327 | s1 | REF | 50% |
| 328 | s1 | ALT | 60% |
| 329 | s8 | BOTH | 60% |
| 330 | s11 | ALT | 75% |
| 331 | s11 | REF | 80% |
| 332 | s12 | REF | 70% |
| 333 | s2 | BOTH | 60% |
| 334 | s5 | REF | 70% |
| 335 | s10 | REF | 60% |
| 336 | s10 | ALT | 55% |
| 337 | s10 | ALT | 65% |
| 338 | s10 | REF | 70% |
| 339 | s13 | REF | 55% |
| 340 | s4 | REF | 50% |
| 341 | s4 | ALT | 55% |
| 342 | s1 | ALT | 60% |
| 343 | s1 | REF | 55% |
| 344 | s1 | REF | 55% |
| 345 | s13 | REF | 60% |
| 346 | s5 | REF | 60% |
| 347 | s3 | BOTH | 50% |
| 348 | s1 | ALT | 65% |
| 349 | s1 | REF | 60% |
| 350 | s1 | ALT | 55% |
| 351 | s7 | REF | 30% |
| 352 | s7 | ALT | 35% |
| 353 | s2 | ALT | 50% |
| 354 | s2 | REF | 45% |
| 355 | s4 | REF | 60% |
| 356 | s4 | ALT | 65% |
| 357 | s7 | REF | 40% |
| 358 | s7 | ALT | 45% |
| 359 | s1 | REF | 55% |
| 360 | s3 | REF | 55% |
| 361 | s3 | ALT | 50% |
| 362 | s1 | ALT | 55% |
| 363 | s10 | REF | 60% |
| 364 | s5 | REF | 60% |
| 365 | s1 | REF | 60% |
| 366 | s1 | ALT | 65% |
| 367 | s11 | REF | 75% |
| 368 | s13 | ALT | 45% |
| 369 | s2 | REF | 45% |
| 370 | s2 | ALT | 50% |
| 371 | s2 | BOTH | 45% |
| 372 | s8 | ALT | 70% |
| 373 | s13 | ALT | 45% |
| 374 | s13 | REF | 50% |
| 375 | s4 | ALT | 70% |
| 376 | s4 | REF | 65% |
| 377 | s8 | REF | 75% |
| 378 | s8 | ALT | 70% |
| 379 | s4 | REF | 70% |
| 380 | s8 | REF | 75% |
| 381 | s8 | ALT | 70% |
| 382 | s12 | BOTH | 70% |
| 383 | s7 | ALT | 40% |
| 384 | s7 | REF | 35% |
| 385 | s3 | REF | 55% |
| 386 | s3 | ALT | 50% |
| 387 | s6 | REF | 50% |
| 388 | s6 | ALT | 45% |
| 389 | s5 | ALT | 70% |
| 390 | s1 | REF | 60% |
| 391 | s1 | ALT | 65% |
| 392 | s6 | ALT | 45% |
| 393 | s6 | REF | 50% |
| 394 | s6 | ALT | 45% |
| 395 | s1 | ALT | 60% |
| 396 | s6 | REF | 50% |
| 397 | s13 | BOTH | 55% |
| 398 | s11 | ALT | 75% |
| 399 | s4 | ALT | 70% |
| 400 | s11 | REF | 80% |
| 401 | s12 | REF | 75% |
| 402 | s12 | ALT | 80% |
| 403 | s11 | REF | 80% |
| 404 | s11 | ALT | 75% |
| 405 | s8 | ALT | 60% |
| 406 | s5 | REF | 70% |
| 407 | s14 | REF | 65% |
| 408 | s4 | REF | 65% |
| 409 | s4 | BOTH | 70% |
| 410 | s8 | ALT | 65% |
| 411 | s8 | REF | 70% |
| 412 | s9 | REF | 70% |
| 413 | s6 | REF | 50% |
| 414 | s9 | REF | 65% |
| 415 | s11 | BOTH | 65% |
| 416 | s13 | ALT | 45% |
| 417 | s13 | REF | 50% |
| 418 | s14 | ALT | 60% |
| 419 | s14 | REF | 55% |
| 420 | s3 | REF | 55% |
| 421 | s3 | ALT | 50% |
| 422 | s6 | ALT | 50% |
| 423 | s1 | REF | 55% |
| 424 | s13 | ALT | 45% |
| 425 | s13 | REF | 50% |
| 426 | s14 | REF | 55% |
| 427 | s14 | ALT | 60% |
| 428 | s2 | REF | 45% |
| 429 | s8 | REF | 70% |
| 430 | s8 | ALT | 65% |
| 431 | s7 | REF | 30% |
| 432 | s3 | ALT | 50% |
| 433 | s13 | REF | 55% |
| 434 | s5 | REF | 50% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 435 | s6 | BOTH | 45% |
| 436 | s9 | ALT | 60% |
| 437 | s10 | ALT | 50% |
| 438 | s10 | REF | 55% |
| 439 | s12 | BOTH | 70% |
| 440 | s2 | REF | 45% |
| 441 | s2 | ALT | 50% |
| 442 | s7 | REF | 55% |
| 443 | s4 | ALT | 65% |
| 444 | s4 | REF | 60% |
| 445 | s13 | ALT | 50% |
| 446 | s14 | ALT | 70% |
| 447 | s14 | REF | 65% |
| 448 | s2 | ALT | 50% |
| 449 | s2 | REF | 45% |
| 450 | s3 | ALT | 50% |
| 451 | s2 | REF | 45% |
| 452 | s2 | ALT | 50% |
| 453 | s4 | REF | 55% |
| 454 | s4 | ALT | 60% |
| 455 | s3 | REF | 55% |
| 456 | s3 | ALT | 55% |
| 457 | s8 | ALT | 75% |
| 458 | s8 | REF | 80% |
| 459 | s4 | REF | 60% |
| 460 | s1 | ALT | 55% |
| 461 | s1 | REF | 50% |
| 462 | s7 | REF | 35% |
| 463 | s7 | ALT | 40% |
| 464 | s12 | REF | 70% |
| 465 | s12 | ALT | 75% |
| 466 | s3 | REF | 55% |
| 467 | s3 | ALT | 55% |
| 468 | s1 | ALT | 60% |
| 469 | s9 | REF | 70% |
| 470 | s9 | ALT | 65% |
| 471 | s5 | BOTH | 70% |
| 472 | s4 | ALT | 55% |
| 473 | s1 | REF | 55% |
| 474 | s6 | REF | 45% |
| 475 | s6 | ALT | 40% |
| 476 | s13 | ALT | 55% |
| 477 | s1 | REF | 65% |
| 478 | s1 | ALT | 70% |
| 479 | s2 | BOTH | 50% |
| 480 | s8 | ALT | 70% |
| 481 | s8 | REF | 75% |
| 482 | s13 | ALT | 50% |
| 483 | s13 | REF | 55% |
| 484 | s8 | REF | 75% |
| 485 | s8 | ALT | 70% |
| 486 | s9 | ALT | 60% |
| 487 | s9 | REF | 65% |
| 488 | s11 | ALT | 70% |
| 489 | s12 | REF | 70% |
| 490 | s7 | ALT | 45% |
| 491 | s7 | REF | 40% |
| 492 | s3 | REF | 55% |
| 493 | s3 | ALT | 55% |
| 494 | s6 | REF | 55% |
| 495 | s6 | ALT | 50% |
| 496 | s11 | REF | 75% |
| 497 | s12 | REF | 75% |
| 498 | s11 | REF | 80% |
| 499 | s11 | ALT | 75% |
| 500 | s11 | ALT | 70% |
| 501 | s14 | REF | 65% |
| 502 | s7 | ALT | 40% |
| 503 | s8 | REF | 75% |
| 504 | s9 | REF | 65% |
| 505 | s8 | ALT | 65% |
| 506 | s12 | ALT | 80% |
| 507 | s12 | ALT | 75% |
| 508 | s12 | REF | 75% |
| 509 | s9 | ALT | 65% |
| 510 | s9 | REF | 70% |
| 511 | s9 | ALT | 60% |
| 512 | s11 | ALT | 70% |
| 513 | s11 | REF | 75% |
| 514 | s10 | BOTH | 50% |
| 515 | s9 | REF | 65% |
| 516 | s9 | ALT | 60% |
| 517 | s10 | ALT | 60% |
| 518 | s10 | REF | 65% |
| 519 | s13 | ALT | 45% |
| 520 | s13 | REF | 55% |
| 521 | s1 | ALT | 60% |
| 522 | s13 | REF | 55% |
| 523 | s2 | REF | 50% |
| 524 | s3 | ALT | 55% |
| 525 | s6 | BOTH | 50% |
| 526 | s12 | BOTH | 70% |
| 527 | s4 | ALT | 70% |
| 528 | s4 | REF | 65% |
| 529 | s13 | ALT | 50% |
| 530 | s13 | REF | 65% |
| 531 | s13 | ALT | 60% |
| 532 | s4 | ALT | 70% |
| 533 | s4 | REF | 65% |
| 534 | s1 | ALT | 60% |
| 535 | s1 | REF | 55% |
| 536 | s12 | ALT | 75% |
| 537 | s4 | BOTH | 55% |
| 538 | s6 | REF | 50% |
| 539 | s6 | ALT | 45% |
| 540 | s10 | REF | 70% |
| 541 | s10 | ALT | 65% |
| 542 | s11 | ALT | 80% |
| 543 | s11 | REF | 85% |
| 544 | s10 | REF | 50% |
| 545 | s13 | ALT | 55% |
| 546 | s8 | REF | 75% |
| 547 | s8 | ALT | 70% |
| 548 | s9 | ALT | 60% |
| 549 | s9 | REF | 65% |
| 550 | s11 | ALT | 75% |
| 551 | s7 | REF | 45% |
| 552 | s11 | REF | 75% |
| 553 | s11 | ALT | 70% |
| 554 | s9 | REF | 65% |
| 555 | s8 | ALT | 65% |
| 556 | s9 | ALT | 60% |
| 557 | s1 | ALT | 65% |
| 558 | s2 | REF | 55% |
| 559 | s6 | BOTH | 50% |
| 560 | s4 | ALT | 75% |
| 561 | s12 | BOTH | 75% |
| 562 | s10 | ALT | 70% |
| 563 | s10 | REF | 55% |
| 564 | s8 | REF | 80% |
| 565 | s9 | ALT | 60% |
| 566 | s11 | ALT | 75% |
| 567 | s11 | REF | 80% |
| 568 | s9 | REF | 65% |
| 569 | s2 | REF | 50% |
| 570 | s10 | REF | 55% |
| 571 | s9 | BOTH | 65% |
| 572 | s11 | REF | 85% |
| 573 | s11 | ALT | 80% |
| 574 | s12 | REF | 70% |
| 575 | s12 | ALT | 75% |
| 576 | s13 | ALT | 60% |
| 577 | s13 | REF | 65% |
| 578 | s14 | ALT | 65% |
| 579 | s12 | REF | 70% |
| 580 | s12 | ALT | 75% |
| 581 | s13 | ALT | 60% |
| 582 | s14 | ALT | 60% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 583 | s8 | REF | 70% |
| 584 | s12 | REF | 70% |
| 585 | s7 | REF | 60% |
| 586 | s14 | REF | 60% |
| 587 | s5 | REF | 55% |
| 588 | s12 | ALT | 75% |
| 589 | s2 | BOTH | 60% |
| 590 | s7 | ALT | 65% |
| 591 | s13 | ALT | 55% |
| 592 | s13 | REF | 60% |
| 593 | s5 | REF | 75% |
| 594 | s14 | ALT | 55% |
| 595 | s9 | REF | 70% |
| 596 | s3 | REF | 55% |
| 597 | s11 | REF | 80% |
| 598 | s11 | REF | 70% |
| 599 | s8 | REF | 70% |
| 600 | s2 | ALT | 60% |
| 601 | s7 | REF | 60% |
| 602 | s10 | ALT | 50% |
| 603 | s11 | BOTH | 70% |
| 604 | s7 | ALT | 55% |
| 605 | s7 | REF | 50% |
| 606 | s10 | REF | 65% |
| 607 | s10 | ALT | 60% |
| 608 | s14 | REF | 70% |
| 609 | s12 | REF | 75% |
| 610 | s12 | ALT | 80% |
| 611 | s14 | REF | 55% |
| 612 | s5 | REF | 55% |
| 613 | s14 | ALT | 70% |
| 614 | s14 | REF | '65% |
| 615 | s5 | REF | 60% |
| 616 | s12 | ALT | 75% |
| 617 | s10 | ALT | 70% |
| 618 | s10 | REF | 75% |
| 619 | s2 | REF | 55% |
| 620 | s2 | ALT | 60% |
| 621 | s8 | ALT | 65% |
| 622 | s14 | REF | 70% |
| 623 | s14 | ALT | 75% |
| 624 | s12 | ALT | 75% |
| 625 | s7 | ALT | 65% |
| 626 | s7 | ALT | 40% |
| 627 | s7 | REF | 35% |
| 628 | s4 | ALT | 55% |
| 629 | s5 | REF | 70% |
| 630 | s5 | REF | 55% |
| 631 | s14 | ALT | 55% |
| 632 | s3 | ALT | 50% |
| 633 | s13 | REF | 60% |
| 634 | s3 | ALT | 55% |
| 635 | s14 | ALT | 70% |
| 636 | s14 | REF | 65% |
| 637 | s9 | BOTH | 70% |
| 638 | s9 | BOTH | 70% |
| 639 | s3 | REF | 55% |
| 640 | s9 | ALT | 70% |
| 641 | s5 | REF | 65% |
| 642 | s3 | REF | 60% |
| 643 | s8 | REF | 65% |
| 644 | s11 | REF | 75% |
| 645 | s11 | REF | 70% |
| 646 | s14 | ALT | 70% |
| 647 | s4 | REF | 55% |
| 648 | s4 | ALT | 60% |
| 649 | s8 | REF | 70% |
| 650 | s4 | ALT | 65% |
| 651 | s4 | REF | 60% |
| 652 | s2 | ALT | 55% |
| 653 | s1 | ALT | 65% |
| 654 | s1 | REF | 60% |
| 655 | s13 | REF | 70% |
| 656 | s3 | BOTH | 50% |
| 657 | s1 | REF | 60% |
| 658 | s1 | REF | 55% |
| 659 | s9 | ALT | 60% |
| 660 | s9 | REF | 65% |
| 661 | s10 | ALT | 50% |
| 662 | s10 | REF | 55% |
| 663 | s14 | BOTH | 55% |
| 664 | s3 | REF | 55% |
| 665 | s3 | ALT | 55% |
| 666 | s9 | REF | 65% |
| 667 | s11 | ALT | 65% |
| 668 | s14 | REF | 60% |
| 669 | s14 | ALT | 65% |
| 670 | s7 | ALT | 50% |
| 671 | s7 | REF | 45% |
| 672 | s10 | BOTH | 65% |
| 673 | s3 | ALT | 55% |
| 674 | s14 | ALT | 75% |
| 675 | s14 | REF | 70% |
| 676 | s13 | REF | 65% |
| 677 | s3 | REF | 60% |
| 678 | s3 | ALT | 55% |
| 679 | s6 | REF | 55% |
| 680 | s6 | ALT | 50% |
| 681 | s14 | REF | 50% |
| 682 | s10 | ALT | 65% |
| 683 | s8 | REF | 70% |
| 684 | s5 | REF | 50% |
| 685 | s14 | ALT | 70% |
| 686 | s14 | REF | 65% |
| 687 | s5 | REF | 65% |
| 688 | s5 | REF | 55% |
| 689 | s12 | REF | 75% |
| 690 | s12 | ALT | 80% |
| 691 | s3 | REF | 60% |
| 692 | s2 | BOTH | 60% |
| 693 | s3 | ALT | 55% |
| 694 | s10 | REF | 75% |
| 695 | s10 | ALT | 70% |
| 696 | s2 | REF | 50% |
| 697 | s7 | ALT | 65% |
| 698 | s7 | REF | 60% |
| 699 | s14 | REF | 70% |
| 700 | s14 | ALT | 75% |
| 701 | s3 | BOTH | 55% |
| 702 | s1 | REF | 55% |
| 703 | s1 | ALT | 70% |
| 704 | s1 | REF | 65% |
| 705 | s11 | ALT | 65% |
| 706 | s1 | ALT | 60% |
| 707 | s6 | REF | 50% |
| 708 | s6 | ALT | 45% |
| 709 | s7 | REF | 35% |
| 710 | s13 | ALT | 50% |
| 711 | s13 | REF | 55% |
| 712 | s7 | BOTH | 30% |
| 713 | s4 | REF | 50% |
| 714 | s5 | REF | 50% |
| 715 | s9 | ALT | 60% |
| 716 | s6 | ALT | 45% |
| 717 | s6 | REF | 50% |
| 718 | s10 | REF | 70% |
| 719 | s4 | ALT | 70% |
| 720 | s5 | REF | 55% |
| 721 | s3 | REF | 55% |
| 722 | s3 | ALT | 55% |
| 723 | s1 | REF | 60% |
| 724 | s1 | ALT | 65% |
| 725 | s3 | REF | 55% |
| 726 | s3 | ALT | 55% |
| 727 | s9 | REF | 65% |
| 728 | s9 | ALT | 60% |
| 729 | s1 | ALT | 60% |
| 730 | s1 | REF | 55% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 731 | s8 | REF | 60% |
| 732 | s11 | BOTH | 65% |
| 733 | s1 | REF | 50% |
| 734 | s5 | REF | 60% |
| 735 | s1 | ALT | 55% |
| 736 | s4 | REF | 60% |
| 737 | s4 | ALT | 65% |
| 738 | s1 | REF | 55% |
| 739 | s1 | ALT | 60% |
| 740 | s1 | BOTH | 55% |
| 741 | s13 | ALT | 45% |
| 742 | s2 | REF | 45% |
| 743 | s2 | ALT | 50% |
| 744 | s8 | ALT | 70% |
| 745 | s8 | REF | 75% |
| 746 | s4 | ALT | 75% |
| 747 | s4 | REF | 70% |
| 748 | s9 | REF | 65% |
| 749 | s5 | REF | 60% |
| 750 | s1 | ALT | 70% |
| 751 | s3 | ALT | 50% |
| 752 | s11 | ALT | 75% |
| 753 | s11 | REF | 80% |
| 754 | s12 | ALT | 80% |
| 755 | s12 | REF | 75% |
| 756 | s13 | BOTH | 55% |
| 757 | s8 | REF | 75% |
| 758 | s8 | ALT | 70% |
| 759 | s13 | REF | 55% |
| 760 | s2 | ALT | 55% |
| 761 | s14 | ALT | 70% |
| 762 | s14 | REF | 65% |
| 763 | s2 | ALT | 55% |
| 764 | s2 | REF | 50% |
| 765 | s13 | BOTH | 55% |
| 766 | s3 | REF | 55% |
| 767 | s3 | ALT | 50% |
| 768 | s5 | REF | 70% |
| 769 | s8 | ALT | 75% |
| 770 | s8 | REF | 80% |
| 771 | s1 | ALT | 65% |
| 772 | s5 | BOTH | 70% |
| 773 | s12 | REF | 75% |
| 774 | s13 | ALT | 50% |
| 775 | s13 | REF | 55% |
| 776 | s14 | ALT | 65% |
| 777 | s14 | REF | 60% |
| 778 | s13 | REF | 55% |
| 779 | s4 | ALT | 70% |
| 780 | s4 | REF | 65% |
| 781 | s8 | ALT | 65% |
| 782 | s10 | REF | 75% |
| 783 | s10 | ALT | 70% |
| 784 | s8 | REF | 80% |
| 785 | s8 | ALT | 75% |
| 786 | s9 | BOTH | 70% |
| 787 | s11 | REF | 85% |
| 788 | s11 | ALT | 80% |
| 789 | s12 | REF | 75% |
| 790 | s12 | ALT | 80% |
| 791 | s8 | REF | 75% |
| 792 | s8 | ALT | 70% |
| 793 | s9 | REF | 70% |
| 794 | s8 | REF | 70% |
| 795 | s7 | ALT | 60% |
| 796 | s7 | REF | 55% |
| 797 | s12 | REF | 75% |
| 798 | s12 | ALT | 80% |
| 799 | s5 | REF | 60% |
| 800 | s2 | REF | 60% |
| 801 | s2 | ALT | 65% |
| 802 | s12 | BOTH | 75% |
| 803 | s7 | ALT | 40% |
| 804 | s7 | REF | 35% |
| 805 | s11 | REF | 85% |
| 806 | s11 | ALT | 80% |
| 807 | s5 | REF | 55% |
| 808 | s3 | ALT | 55% |
| 809 | s5 | REF | 70% |
| 810 | s3 | REF | 60% |
| 811 | s3 | REF | 60% |
| 812 | s3 | ALT | 55% |
| 813 | s3 | ALT | 55% |
| 814 | s6 | REF | 55% |
| 815 | s6 | ALT | 50% |
| 816 | s10 | ALT | 70% |
| 817 | s8 | REF | 70% |
| 818 | s8 | ALT | 65% |
| 819 | s1 | REF | 60% |
| 820 | s1 | ALT | 65% |
| 821 | s10 | REF | 75% |
| 822 | s10 | REF | 75% |
| 823 | s10 | ALT | 70% |
| 824 | s3 | REF | 60% |
| 825 | s3 | ALT | 55% |
| 826 | s9 | REF | 70% |
| 827 | s9 | ALT | 65% |
| 828 | s14 | BOTH | 55% |
| 829 | s2 | ALT | 55% |
| 830 | s2 | REF | 50% |
| 831 | s1 | REF | 60% |
| 832 | s1 | ALT | 65% |
| 833 | s13 | ALT | 50% |
| 834 | s2 | REF | 50% |
| 835 | s2 | ALT | 55% |
| 836 | s4 | ALT | 75% |
| 837 | s8 | BOTH | 65% |
| 838 | s6 | REF | 55% |
| 839 | s2 | ALT | 55% |
| 840 | s13 | BOTH | 55% |
| 841 | s3 | REF | 55% |
| 842 | s3 | ALT | 50% |
| 843 | s4 | REF | 55% |
| 844 | s4 | ALT | 60% |
| 845 | s1 | ALT | 65% |
| 846 | s1 | REF | 60% |
| 847 | s3 | REF | 55% |
| 848 | s12 | ALT | 80% |
| 849 | s12 | REF | 75% |
| 850 | s4 | BOTH | 65% |
| 851 | s8 | ALT | 65% |
| 852 | s10 | REF | 75% |
| 853 | s10 | ALT | 70% |
| 854 | s11 | REF | 75% |
| 855 | s7 | ALT | 65% |
| 856 | s7 | REF | 60% |
| 857 | s12 | REF | 75% |
| 858 | s12 | ALT | 80% |
| 859 | s11 | REF | 70% |
| 860 | s4 | ALT | 60% |
| 861 | s11 | REF | 85% |
| 862 | s14 | REF | 70% |
| 863 | s14 | ALT | 75% |
| 864 | s8 | REF | 70% |
| 865 | s8 | ALT | 65% |
| 866 | s5 | REF | 75% |
| 867 | s11 | ALT | 70% |
| 868 | s4 | REF | 55% |
| 869 | s3 | REF | 60% |
| 870 | s3 | ALT | 55% |
| 871 | s1 | REF | 60% |
| 872 | s1 | ALT | 65% |
| 873 | s14 | BOTH | 55% |
| 874 | s4 | REF | 70% |
| 875 | s4 | ALT | 75% |
| 876 | s4 | BOTH | 75% |
| 877 | s4 | REF | 55% |
| 878 | s4 | ALT | 60% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 879 | s1 | ALT | 70% |
| 880 | s1 | REF | 65% |
| 881 | s12 | ALT | 80% |
| 882 | s12 | REF | 75% |
| 883 | s8 | ALT | 70% |
| 884 | s8 | REF | 75% |
| 885 | s14 | ALT | 70% |
| 886 | s4 | REF | 55% |
| 887 | s12 | ALT | 80% |
| 888 | s4 | ALT | 60% |
| 889 | s4 | REF | 55% |
| 890 | s4 | ALT | 60% |
| 891 | s4 | REF | 55% |
| 892 | s4 | REF | 55% |
| 893 | s9 | ALT | 65% |
| 894 | s9 | REF | 70% |
| 895 | s9 | ALT | 65% |
| 896 | s9 | REF | 70% |
| 897 | s2 | ALT | 60% |
| 898 | s2 | REF | 55% |
| 899 | s6 | REF | 55% |
| 900 | s9 | ALT | 65% |
| 901 | s9 | REF | 70% |
| 902 | s12 | REF | 70% |
| 903 | s1 | ALT | 60% |
| 904 | s13 | ALT | 50% |
| 905 | s9 | REF | 70% |
| 906 | s9 | ALT | 65% |
| 907 | s6 | REF | 55% |
| 908 | s5 | REF | 50% |
| 909 | s3 | ALT | 55% |
| 910 | s2 | ALT | 55% |
| 911 | s2 | REF | 50% |
| 912 | s9 | ALT | 60% |
| 913 | s8 | ALT | 65% |
| 914 | s8 | REF | 70% |
| 915 | s9 | REF | 65% |
| 916 | s3 | ALT | 55% |
| 917 | s13 | ALT | 50% |
| 918 | s13 | REF | 55% |
| 919 | s9 | REF | 70% |
| 920 | s9 | ALT | 65% |
| 921 | s12 | ALT | 75% |
| 922 | s12 | REF | 70% |
| 923 | s1 | ALT | 60% |
| 924 | s1 | REF | 55% |
| 925 | s8 | REF | 75% |
| 926 | s8 | ALT | 70% |
| 927 | s11 | ALT | 70% |
| 928 | s11 | REF | 75% |
| 929 | s12 | REF | 65% |
| 930 | s4 | REF | 60% |
| 931 | s4 | ALT | 65% |
| 932 | s4 | REF | 65% |
| 933 | s7 | REF | 35% |
| 934 | s12 | REF | 70% |
| 935 | s1 | REF | 55% |
| 936 | s3 | ALT | 50% |
| 937 | s1 | REF | 50% |
| 938 | s7 | REF | 50% |
| 939 | s7 | ALT | 55% |
| 940 | s14 | BOTH | 55% |
| 941 | s3 | REF | 55% |
| 942 | s3 | ALT | 50% |
| 943 | s7 | BOTH | 35% |
| 944 | s9 | REF | 70% |
| 945 | s9 | ALT | 65% |
| 946 | s13 | REF | 50% |
| 947 | s13 | ALT | 50% |
| 948 | s5 | REF | 55% |
| 949 | s10 | ALT | 45% |
| 950 | s6 | REF | 50% |
| 951 | s11 | REF | 75% |
| 952 | s11 | ALT | 70% |
| 953 | s9 | ALT | 65% |
| 954 | s9 | REF | 70% |
| 955 | s11 | ALT | 65% |
| 956 | s11 | REF | 70% |
| 957 | s10 | REF | 60% |
| 958 | s14 | REF | 55% |
| 959 | s14 | ALT | 60% |
| 960 | s6 | REF | 50% |
| 961 | s6 | ALT | 45% |
| 962 | s13 | REF | 55% |
| 963 | s7 | ALT | 45% |
| 964 | s7 | REF | 40% |
| 965 | s12 | BOTH | 75% |
| 966 | s14 | REF | 55% |
| 967 | s5 | REF | 50% |
| 968 | s2 | ALT | 55% |
| 969 | s10 | BOTH | 65% |
| 970 | s14 | REF | 65% |
| 971 | s14 | ALT | 70% |
| 972 | s3 | ALT | 55% |
| 973 | s14 | ALT | 70% |
| 974 | s14 | REF | 65% |
| 975 | s4 | ALT | 65% |
| 976 | s4 | REF | 60% |
| 977 | s13 | REF | 65% |
| 978 | s14 | REF | 55% |
| 979 | s14 | ALT | 60% |
| 980 | s3 | REF | 55% |
| 981 | s3 | ALT | 50% |
| 982 | s12 | REF | 75% |
| 983 | s12 | ALT | 80% |
| 984 | s3 | REF | 55% |
| 985 | s3 | ALT | 55% |
| 986 | s6 | REF | 50% |
| 987 | s6 | ALT | 45% |
| 988 | s9 | ALT | 60% |
| 989 | s8 | ALT | 65% |
| 990 | s8 | REF | 70% |
| 991 | s14 | REF | 50% |
| 992 | s10 | ALT | 65% |
| 993 | s13 | ALT | 55% |
| 994 | s8 | REF | 70% |
| 995 | s8 | ALT | 65% |
| 996 | s5 | REF | 50% |
| 997 | s14 | ALT | 65% |
| 998 | s14 | REF | 60% |
| 999 | s5 | REF | 65% |
| 1000 | s5 | BOTH | 70% |
| 1001 | s5 | REF | 50% |
| 1002 | s11 | REF | 80% |
| 1003 | s11 | ALT | 75% |
| 1004 | s12 | REF | 75% |
| 1005 | s12 | ALT | 70% |
| 1006 | s3 | REF | 55% |
| 1007 | s2 | ALT | 60% |
| 1008 | s3 | ALT | 55% |
| 1009 | s5 | REF | 65% |
| 1010 | s3 | REF | 55% |
| 1011 | s3 | ALT | 55% |
| 1012 | s10 | ALT | 70% |
| 1013 | s10 | REF | 75% |
| 1014 | s10 | REF | 70% |
| 1015 | s10 | ALT | 65% |
| 1016 | s2 | ALT | 50% |
| 1017 | s2 | REF | 45% |
| 1018 | s1 | REF | 55% |
| 1019 | s13 | ALT | 45% |
| 1020 | s13 | REF | 50% |
| 1021 | s3 | BOTH | 50% |
| 1022 | s13 | BOTH | 55% |
| 1023 | s7 | ALT | 65% |
| 1024 | s7 | REF | 60% |
| 1025 | s14 | REF | 70% |
| 1026 | s14 | ALT | 75% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 1027 | s3 | REF | 55% |
| 1028 | s3 | ALT | 55% |
| 1029 | s8 | BOTH | 60% |
| 1030 | s1 | REF | 60% |
| 1031 | s11 | ALT | 65% |
| 1032 | s10 | REF | 70% |
| 1033 | s2 | ALT | 55% |
| 1034 | s2 | REF | 50% |
| 1035 | s1 | ALT | 55% |
| 1036 | s6 | REF | 50% |
| 1037 | s6 | ALT | 45% |
| 1038 | s3 | REF | 55% |
| 1039 | s3 | ALT | 55% |
| 1040 | s7 | ALT | 30% |
| 1041 | s7 | REF | 25% |
| 1042 | s7 | BOTH | 35% |
| 1043 | s9 | ALT | 60% |
| 1044 | s13 | REF | 55% |
| 1045 | s2 | REF | 45% |
| 1046 | s2 | ALT | 50% |
| 1047 | s12 | ALT | 75% |
| 1048 | s12 | REF | 70% |
| 1049 | s5 | REF | 60% |
| 1050 | s6 | ALT | 40% |
| 1051 | s6 | REF | 45% |
| 1052 | s4 | ALT | 65% |
| 1053 | s7 | REF | 30% |
| 1054 | s14 | REF | 60% |
| 1055 | s6 | ALT | 40% |
| 1056 | s6 | REF | 45% |
| 1057 | s11 | REF | 80% |
| 1058 | s2 | ALT | 50% |
| 1059 | s5 | ALT | 55% |
| 1060 | s3 | ALT | 45% |
| 1061 | s6 | REF | 40% |
| 1062 | s6 | BOTH | 25% |
| 1063 | s6 | ALT | 35% |
| 1064 | s8 | ALT | 70% |
| 1065 | s9 | ALT | 60% |
| 1066 | s5 | ALT | 55% |
| 1067 | s5 | ALT | 45% |
| 1068 | s11 | REF | 75% |
| 1069 | s9 | REF | 65% |
| 1070 | s11 | ALT | 70% |
| 1071 | s3 | ALT | 45% |
| 1072 | s3 | ALT | 50% |
| 1073 | s5 | ALT | 60% |
| 1074 | s5 | ALT | 55% |
| 1075 | s5 | ALT | 45% |
| 1076 | s3 | ALT | 50% |
| 1077 | s11 | REF | 85% |
| 1078 | s8 | REF | 75% |
| 1079 | S14 | ALT | 70% |
| 1080 | s12 | REF | 75% |
| 1081 | S14 | ALT | 55% |
| 1082 | s5 | ALT | 60% |
| 1083 | s6 | ALT | 40% |
| 1084 | s13 | REF | 60% |
| 1085 | s2 | ALT | 50% |
| 1086 | s13 | ALT | 50% |
| 1087 | s5 | ALT | 50% |
| 1088 | s5 | ALT | 50% |
| 1089 | s3 | ALT | 50% |
| 1090 | s5 | ALT | 60% |
| 1091 | s4 | REF | 55% |
| 1092 | s10 | REF | 65% |
| 1093 | s3 | ALT | 50% |
| 1094 | s3 | ALT | 55% |
| 1095 | s6 | BOTH | 30% |
| 1096 | s3 | ALT | 45% |
| 1097 | s10 | REF | 55% |
| 1098 | s10 | REF | 50% |
| 1099 | s7 | ALT | 60% |
| 1100 | s12 | REF | 75% |
| 1101 | s9 | REF | 70% |
| 1102 | s7 | BOTH | 50% |
| 1103 | s2 | REF | 45% |
| 1104 | s6 | REF | 45% |
| 1105 | s6 | ALT | 40% |
| 1106 | s1 | ALT | 55% |
| 1107 | s3 | ALT | 45% |
| 1108 | s6 | REF | 45% |
| 1109 | s6 | ALT | 40% |
| 1110 | s8 | REF | 75% |
| 1111 | s6 | BOTH | 30% |
| 1112 | s3 | ALT | 50% |
| 1113 | s3 | ALT | 50% |
| 1114 | s7 | ALT | 35% |
| 1115 | s3 | ALT | 50% |
| 1116 | s13 | ALT | 55% |
| 1117 | s9 | ALT | 65% |
| 1118 | s1 | REF | 50% |
| 1119 | s5 | ALT | 55% |
| 1120 | s13 | ALT | 60% |
| 1121 | s1 | ALT | 60% |
| 1122 | s3 | ALT | 50% |
| 1123 | s10 | ALT | 55% |
| 1124 | s6 | REF | 45% |
| 1125 | s5 | ALT | 55% |
| 1126 | s13 | ALT | 55% |
| 1127 | s6 | ALT | 40% |
| 1128 | s11 | ALT | 70% |
| 1129 | s13 | ALT | 50% |
| 1130 | s8 | REF | 75% |
| 1131 | s3 | ALT | 50% |
| 1132 | s3 | ALT | 50% |
| 1133 | s13 | ALT | 50% |
| 1134 | s11 | ALT | 65% |
| 1135 | s1 | REF | 55% |
| 1136 | s8 | REF | 65% |
| 1137 | s4 | ALT | 70% |
| 1138 | s9 | ALT | 65% |
| 1139 | s9 | ALT | 60% |
| 1140 | s13 | ALT | 50% |
| 1141 | s3 | ALT | 50% |
| 1142 | s13 | ALT | 50% |
| 1143 | s7 | REF | 50% |
| 1144 | s6 | ALT | 30% |
| 1145 | s6 | REF | 35% |
| 1146 | s5 | ALT | 45% |
| 1147 | s13 | ALT | 55% |
| 1148 | s9 | REF | 65% |
| 1149 | s7 | ALT | 60% |
| 1150 | s6 | ALT | 35% |
| 1151 | s6 | REF | 40% |
| 1152 | s3 | ALT | 50% |
| 1153 | s4 | ALT | 65% |
| 1154 | s3 | ALT | 50% |
| 1155 | s13 | ALT | 55% |
| 1156 | s13 | REF | 55% |
| 1157 | s4 | REF | 50% |
| 1158 | s13 | ALT | 55% |
| 1159 | s3 | ALT | 55% |
| 1160 | s3 | ALT | 50% |
| 1161 | s13 | ALT | 55% |
| 1162 | s12 | ALT | 80% |
| 1163 | s8 | ALT | 70% |
| 1164 | s13 | ALT | 55% |
| 1165 | s13 | ALT | 55% |
| 1166 | s13 | ALT | 55% |
| 1167 | s12 | REF | 70% |
| 1168 | s13 | ALT | 55% |
| 1169 | s13 | REF | 55% |
| 1170 | s7 | ALT | 50% |
| 1171 | s13 | ALT | 60% |
| 1172 | s4 | REF | 70% |
| 1173 | s10 | REF | 75% |
| 1174 | s8 | ALT | 75% |

TABLE 2-continued

Guide sequences designed associate with specific SNPs of the APOA1 gene

| SEQ ID NO: | SNP ID (Table 1) | Target (ALT/REF) | % GC |
|---|---|---|---|
| 1175 | s9 | REF | 65% |
| 1176 | s11 | ALT | 75% |
| 1177 | s9 | ALT | 60% |
| 1178 | s2 | ALT | 55% |
| 1179 | s13 | ALT | 65% |
| 1180 | s13 | ALT | 65% |
| 1181 | s11 | REF | 80% |
| 1182 | s5 | ALT | 50% |
| 1183 | s13 | ALT | 60% |
| 1184 | s5 | ALT | 70% |
| 1185 | s12 | REF | 70% |
| 1186 | s6 | REF | 40% |
| 1187 | S14 | ALT | 75% |
| 1188 | s5 | ALT | 50% |
| 1189 | s5 | ALT | 55% |
| 1190 | s13 | ALT | 60% |
| 1191 | s5 | ALT | 65% |
| 1192 | s5 | ALT | 60% |
| 1193 | s6 | BOTH | 30% |
| 1194 | s7 | REF | 55% |
| 1195 | s3 | ALT | 50% |
| 1196 | s10 | ALT | 50% |
| 1197 | s11 | REF | 70% |
| 1198 | s6 | REF | 35% |
| 1199 | s3 | ALT | 55% |
| 1200 | s8 | ALT | 65% |
| 1201 | s5 | ALT | 45% |
| 1202 | s5 | ALT | 60% |
| 1203 | s5 | ALT | 50% |
| 1204 | s10 | ALT | 70% |
| 1205 | s3 | ALT | 55% |
| 1206 | s3 | ALT | 50% |
| 1207 | s2 | ALT | 55% |
| 1208 | s1 | ALT | 60% |
| 1209 | s10 | REF | 70% |
| 1210 | s13 | ALT | 65% |
| 1211 | s7 | ALT | 60% |
| 1212 | s7 | ALT | 40% |
| 1213 | s13 | ALT | 55% |
| 1214 | s6 | ALT | 35% |
| 1215 | s5 | ALT | 50% |
| 1216 | s6 | REF | 50% |
| 1217 | s6 | ALT | 45% |
| 1218 | s4 | REF | 65% |
| 1219 | s10 | ALT | 65% |
| 1220 | s3 | ALT | 50% |
| 1221 | s3 | ALT | 50% |
| 1222 | s6 | REF | 45% |
| 1223 | s5 | ALT | 55% |
| 1224 | s13 | ALT | 60% |
| 1225 | s6 | ALT | 40% |
| 1226 | s13 | ALT | 55% |
| 1227 | s5 | ALT | 55% |
| 1228 | s1 | REF | 65% |
| 1229 | s13 | ALT | 55% |
| 1230 | s2 | REF | 50% |
| 1231 | s3 | ALT | 50% |
| 1232 | s5 | ALT | 65% |
| 1233 | s1 | REF | 60% |
| 1234 | s3 | ALT | 55% |
| 1235 | s12 | ALT | 80% |
| 1236 | s13 | ALT | 55% |
| 1237 | s13 | ALT | 50% |
| 1238 | s13 | ALT | 55% |
| 1239 | s13 | ALT | 70% |
| 1240 | s13 | REF | 70% |
| 1241 | s12 | ALT | 75% |
| 1242 | s5 | ALT | 55% |
| 1243 | s5 | ALT | 65% |
| 1244 | s3 | ALT | 55% |
| 1245 | s5 | ALT | 50% |
| 1246 | s6 | ALT | 50% |
| 1247 | s3 | ALT | 55% |
| 1248 | s13 | REF | 55% |
| 1249 | s13 | ALT | 55% |
| 1250 | s2 | REF | 50% |
| 1251 | s3 | ALT | 50% |
| 1252 | s13 | ALT | 60% |
| 1253 | s4 | ALT | 75% |
| 1254 | s8 | REF | 70% |
| 1255 | s11 | ALT | 80% |
| 1256 | s3 | ALT | 55% |
| 1257 | s4 | ALT | 60% |
| 1258 | s4 | ALT | 60% |
| 1259 | s12 | REF | 75% |
| 1260 | s13 | ALT | 70% |
| 1261 | s1 | ALT | 60% |
| 1262 | s12 | ALT | 75% |
| 1263 | s2 | ALT | 50% |
| 1264 | s7 | BOTH | 55% |
| 1265 | s1 | REF | 55% |
| 1266 | s7 | ALT | 55% |
| 1267 | s13 | ALT | 55% |
| 1268 | s6 | ALT | 50% |
| 1269 | s13 | ALT | 55% |
| 1270 | s7 | BOTH | 50% |
| 1271 | s7 | REF | 50% |
| 1272 | s6 | ALT | 35% |
| 1273 | s6 | REF | 40% |
| 1274 | s3 | ALT | 50% |
| 1275 | s13 | ALT | 45% |
| 1276 | s13 | ALT | 50% |
| 1277 | s5 | ALT | 50% |
| 1278 | s13 | ALT | 55% |
| 1279 | s10 | ALT | 55% |
| 1280 | s13 | ALT | 55% |
| 1281 | s13 | ALT | 50% |
| 1282 | s13 | ALT | 55% |
| 1283 | s2 | REF | 50% |
| 1284 | S14 | ALT | 60% |
| 1285 | s5 | ALT | 45% |
| 1286 | s3 | ALT | 50% |
| 1287 | s3 | ALT | 50% |
| 1288 | s9 | REF | 65% |
| 1289 | s5 | ALT | 45% |
| 1290 | s5 | ALT | 60% |
| 1291 | s5 | ALT | 45% |
| 1292 | s12 | ALT | 80% |
| 1293 | s2 | REF | 55% |
| 1294 | s5 | ALT | 60% |
| 1295 | s3 | ALT | 50% |
| 1296 | s3 | ALT | 50% |
| 1297 | s3 | ALT | 50% |
| 1298 | s13 | ALT | 50% |
| 1299 | s13 | ALT | 55% |
| 1300 | s8 | ALT | 60% |
| 1301 | s3 | ALT | 50% |
| 1302 | s1 | ALT | 65% |
| 1303 | s13 | ALT | 65% |
| 1304 | s7 | ALT | 55% |
| 1305 | s3 | ALT | 50% |
| 1306 | s13 | ALT | 55% |
| 1307 | s6 | ALT | 30% |
| 1308 | s5 | ALT | 55% |
| 1309 | s4 | REF | 60% |
| 1310 | S14 | ALT | 65% |
| 1311 | s5 | ALT | 45% |
| 1312 | s6 | ALT | 40% |
| 1313 | s6 | REF | 45% |

For the foregoing embodiments, each embodiment disclosed herein is contemplated as being applicable to each of the other disclosed embodiment. For example, it is understood that any of the RNA molecules or compositions of the present invention may be utilized in any of the methods of the present invention.

Examples are provided below to facilitate a more complete understanding of the invention. The following examples illustrate the exemplary modes of making and practicing the invention. However, the scope of the invention is not limited to specific embodiments disclosed in these Examples, which are for purposes of illustration only.

EXPERIMENTAL DETAILS

Example 1: AApoA1 Correction Strategies

Figure 13:
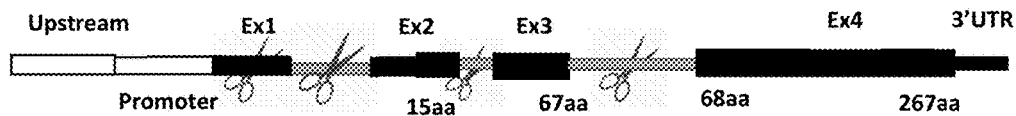
FIG. 13: Two exemplary strategies are proposed to tackle AAopA1 with spCas9 at a genomic DNA level with two guide sequences. The first strategy involves targeting exon 1 or intron 1 with a first guide sequence and intron 3 with a second guide sequence in order to excise exons 1, exon2, and exon 3 of the mutant APOA1 gene. The second strategy involves targeting intron 2 with a first guide sequence and intron 3 with a second guide sequence in order to remove exon 3 of the mutant APOA1 gene.

Two exemplary strategies are proposed to tackle AAopA1 with spCas9 at a genomic DNA level with two guide sequences. The first strategy involves targeting exon 1 or intron 1 with a first guide sequence and intron 3 with a second guide sequence in order to excise exons 1, exon2, and exon 3. The second strategy involves targeting intron 2 with a first guide sequence and intron 3 with a second guide sequence in order to remove exon 3. (FIG. 13).

Figure 14:
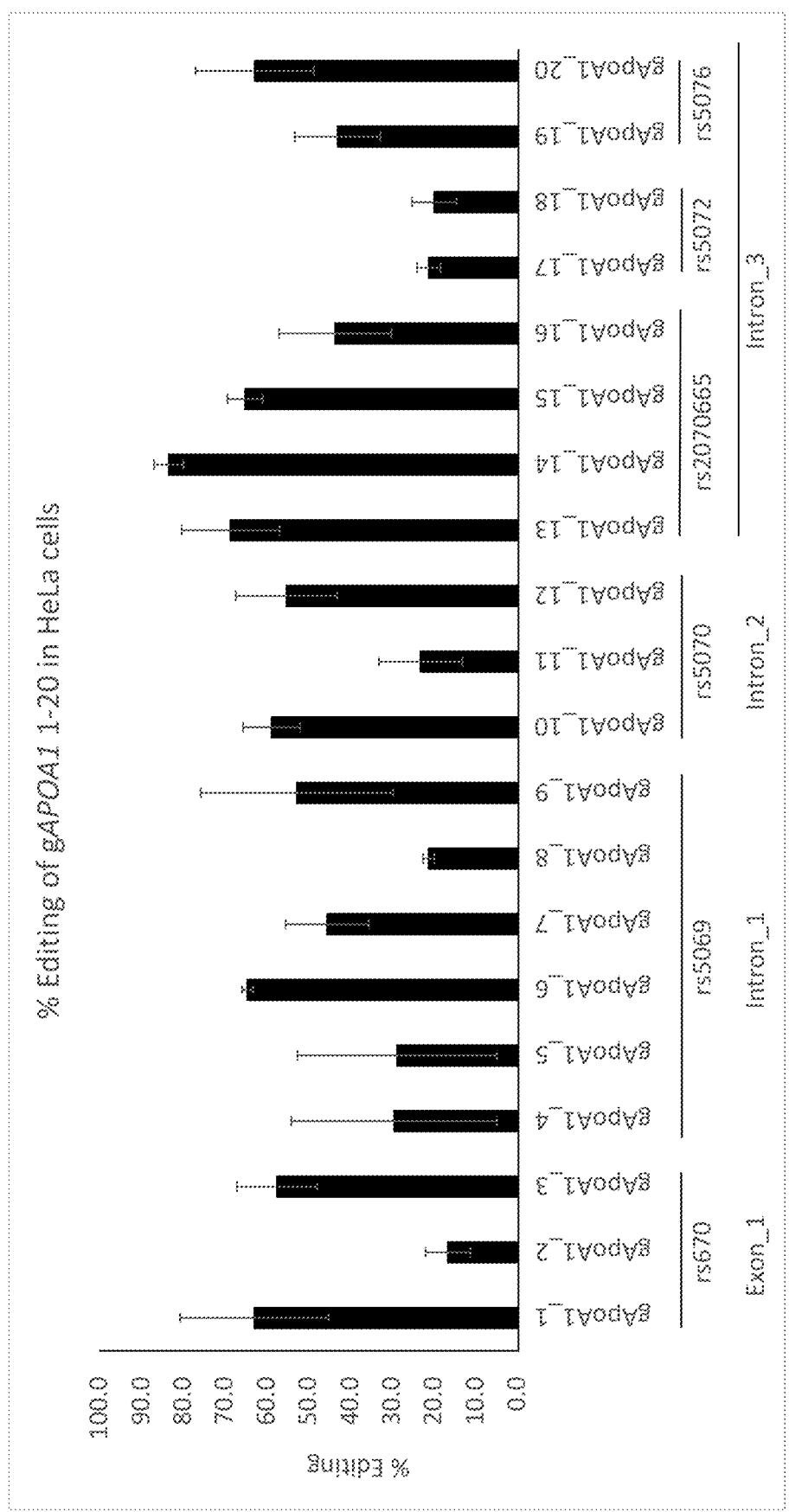
FIG. 14: 20 different guide sequences were screened for high on target activity using spCas9 in HeLa cells. In brief, spCas9 coding plasmid (390 ng) was co-transfected with each of the guide sequence expression plasmids (120 ng) in 24 well plate format using Turbofect reagent (Thermo fisher scientific). Cells were harvested 72 h post DNA transfection. On target activity was determined by capillary electroporation analysis. The graph represents the average±STDV of 2 independent experiments.

When using SpCas9, 20 different guide sequences, identified as gApoA1_1 through gApoA1_20, identified by SEQ ID NO. in Table 3, are screened in two experiment, experiment 474 and experiment 478, for high on target activity using spCas9 in HeLa cells. spCas9 coding plasmid (390 ng) was co-transfected with each of the guide sequence expression plasmids (120 ng) in 24-well plate format using Turbofect reagent (Thermo fisher scientific). Cells were harvested 72 h post DNA transfection. On target activity was determined by capillary electroporation analysis, as shown in FIG. 14. Percent editing in HeLa cells for guide sequences in experiment 474 is shown in column 4 of Table 3 below, percent editing in HeLa cells for guide sequences in experiment 478 is shown in column 5 of Table 3, the average percent editing between the experiments is shown in column 5 of Table 3, and the standard deviation of editing is shown in column 6 in Table 3.

TABLE 3 gApoA1_1 through gApoA1_20 of Example 1 as identified by SEQ ID NO.

| Guide sequence | Example 1 gAP0A1 ID | SEQ ID NO: | % Editing-HeLa, Exp474 | % Editing-HeLa, Exp478 | Ave | STDV |
|---|---|---|---|---|---|---|
| AGUGAGCAGCAACAGGGCCG | gApoA1_1 | 49 | 50.3 | 75.4 | 62.9 | 17.75 |
| AGCAGCAACAGGGCCGGGGC | gApoA1_2 | 28 | 12.8 | 20.3 | 16.5 | 5.34 |
| GCAGCAACAGGGCCGGGGCU | gApoA1_3 | 142 | 50.7 | 64.3 | 57.5 | 9.61 |
| AGGUACCCAGAGGCCCGGCC | gApoA1_4 | 43 | 46.8 | 12.0 | 29.4 | 24.62 |
| GGUACCCAGAGGCCCGGCCU | gApoA1_5 | 195 | 45.6 | 11.8 | 28.7 | 23.89 |
| GUACCCAGAGGCCCGGCCUG | gApoA1_6 | 204 | 63.6 | 65.5 | 64.6 | 1.34 |
| UUCAGGCCUUGCCCCAGGCC | gApoA1_7 | 260 | 52.5 | 38.4 | 45.4 | 9.97 |
| CUUGCCCCAGGCCGGGCCUC | gApoA1_8 | 1057 | 22.1 | 20.2 | 21.2 | 1.35 |
| UUGCCCCAGGCCGGGCCUCU | gApoA1_9 | 267 | 36.4 | 69.0 | 52.7 | 23.05 |
| UUAGGGAGAAAGCCCCCCGA | gApoA1_10 | 258 | 63.6 | 54.0 | 58.8 | 6.82 |
| GGAGAAAGCCCCCCGAUGGU | gApoA1_11 | 169 | 30.1 | 16.0 | 23.1 | 9.98 |
| GCUUUCUCCCUAAAUCCCCG | gApoA1_12 | 162 | 46.6 | 63.7 | 55.2 | 12.10 |
| CUGGGGUUGAGGGCAGGGGC | gApoA1_13 | 114 | 60.3 | 76.9 | 68.6 | 11.76 |
| UGGGGUUGAGGGCAGGGGCA | gApoA1_14 | 253 | 85.9 | 80.9 | 83.4 | 3.51 |
| GGGGUUGAGGGCAGGGGCAG | gApoA1_15 | 188 | 68.1 | 62.1 | 65.1 | 4.23 |
| GGGUUGAGGGCAGGGGCAGG | gApoA1_16 | 192 | 34.0 | 53.1 | 43.5 | 13.46 |
| UCUGGAUGGAGAAACCGGAA | gApoA1_17 | 1058 | 19.1 | 23.1 | 21.1 | 2.78 |
| CUGGAUGGAGAAACCGGAAU | gApoA1_18 | 111 | 16.0 | 23.6 | 19.8 | 5.36 |
| AGCCUAUCAGGGGUGAGCCC | gApoA1_19 | 30 | 35.7 | 50.2 | 43.0 | 10.27 |
| GCCUAUCAGGGGUGAGCCCU | gApoA1_20 | 152 | 52.8 | 72.8 | 62.8 | 14.18 |

Guide sequences comprising 17-20 nucleotides in the sequences of 17-20 contiguous nucleotides set forth in SEQ ID NOs: 1-1313 are screened for high on target activity. On target activity is determined by DNA capillary electrophoresis analysis.

According to DNA capillary electrophoresis analysis, guide sequences comprising 17-20 nucleotides in the sequences of 17-20 contiguous nucleotides set forth in SEQ ID NOs: 1-1313 are found to be suitable for correction of the APOA1 gene.

DISCUSSION

The guide sequences of the present invention are determined to be suitable for targeting the APOA1 gene.

REFERENCES

1. Ahmad and Allen (1992) "Antibody-mediated Specific Binging and Cytotoxicity of Liposome-entrapped Doxorubicin to Lung Cancer Cells in Vitro", Cancer Research 52:4817-20
2. Anders (1992) "Human gene therapy", Science 256:808-13
3. Basha et al. (2011) "Influence of Cationic Lipid Composition on Gene Silencing Properties of Lipid Nanoparticle Formulations of siRNA in Antigen-Presenting Cells", Mol. Ther. 19(12):2186-200
4. Behr (1994) Gene transfer with synthetic cationic amphiphiles: Prospects for gene therapy", Bioconjugate Chem 5:382-89
5. Blaese (1995) "Vectors in cancer therapy: how will they deliver", Cancer Gene Ther. 2:291-97
6. Blaese et al. (1995) "T lymphocyte-directed gene therapy for ADA-SCID: initial trial results after 4 years", Science 270(5235):475-80
7. Buchschacher and Panganiban (1992) "Human immunodeficiency virus vectors for inducible expression of foreign genes", J. Virol. 66:2731-39
8. Burstein et al. (2017) "New CRISPR-Cas systems from uncultivated microbes", Nature 542:237-41
9. Chung et al. (2006) "*Agrobacterium* is not alone: gene transfer to plants by viruses and other bacteria", Trends Plant Sci. 1(1):1-4
10. Coelho et al. (2013) "Safety and Efficacy of RNAi Therapy for Transthyretin Amyloidosis", N Engl J. Med 369:819-29
11. Crystal (1995) "Transfer of genes to humans: early lessons and obstacles to success", Science 270(5235): 404-10
12. Dillon (1993) "Regulation gene expression in gene therapy" Trends in Biotechnology 11(5):167-173
13. Dranoff et al. (1997) "A phase I study of vaccination with autologous, irradiated melanoma cells engineered to secrete human granulocyte macrophage colony stimulating factor", Hum. Gene Ther. 8(1):111-23
14. Dunbar et al. (1995) "Retrovirally marked CD34-enriched peripheral blood and bone marrow cells contribute to long-term engraftment after autologous transplantation", Blood 85:3048-57
15. Ellem et al. (1997) "A case report: immune responses and clinical course of the first human use of granulocyte/macrophage-colony-stimulating-factor-transduced autologous melanoma cells for immunotherapy", Cancer Immunol Immunother 44:10-20
16. Gao and Huang (1995) "Cationic liposome-mediated gene transfer" Gene Ther. 2(10):710-22
17. Haddada et al. (1995) "Gene Therapy Using Adenovirus Vectors", in: The Molecular Repertoire of Adenoviruses III: Biology and Pathogenesis, ed. Doerfler and Böhm, pp. 297-306
18. Han et al. (1995) "Ligand-directed retro-viral targeting of human breast cancer cells", Proc Natl Acad Sci U.S.A. 92(21):9747-51
19. Inaba et al. (1992) "Generation of large numbers of dendritic cells from mouse bone marrow cultures supplemented with granulocyte/macrophage colony-stimulating factor", J Exp Med. 176(6):1693-702
20. Jinek et al. (2012) "A programmable dual-RNA-guided DNA endonuclease in adaptive bacterial immunity," Science 337(6096):816-21
21. Johan et al. (1992) "GLVR1, a receptor for gibbon ape leukemia virus, is homologous to a phosphate permease of *Neurospora crassa* and is expressed at high levels in the brain and thymus", J Virol 66(3):1635-40
22. Judge et al. (2006) "Design of noninflammatory synthetic siRNA mediating potent gene silencing in vivo", Mol Ther. 13(3):494-505
23. Kohn et al. (1995) "Engraftment of gene-modified umbilical cord blood cells in neonates with adenosine deaminase deficiency", Nature Medicine 1:1017-23
24. Kremer and Perricaudet (1995) "Adenovirus and adeno-associated virus mediated gene transfer", Br. Med. Bull. 51(1):31-44
25. Macdiarmid et al. (2009) "Sequential treatment of drug-resistant tumors with targeted minicells containing siRNA or a cytotoxic drug", Nat Biotechnol. 27(7):643-51
26. Malech et al. (1997) "Prolonged production of NADPH oxidase-corrected granulocytes after gene therapy of chronic granulomatous disease", PNAS 94(22):12133-38
27. Miller et al. (1991) "Construction and properties of retrovirus packaging cells based on gibbon ape leukemia virus", J Virol. 65(5):2220-24
28. Miller (1992) "Human gene therapy comes of age", Nature 357:455-60
29. Mitani and Caskey (1993) "Delivering therapeutic genes—matching approach and application", Trends in Biotechnology 11(5):162-66
30. Nabel and Felgner (1993) "Direct gene transfer for immunotherapy and immunization", Trends in Biotechnology 11(5):211-15
31. Remy et al. (1994) "Gene Transfer with a Series of Lipophilic DNA-Binding Molecules", Bioconjugate Chem. 5(6):647-54
32. Sentmanat et al. (2018) "A Survey of Validation Strategies for CRISPR-Cas9 Editing", Scientific Reports 8:888, doi:10.1038/s41598-018-19441-8
33. Sommerfelt et al. (1990) "Localization of the receptor gene for type D simian retroviruses on human chromosome 19", J. Virol. 64(12):6214-20
34. Van Brunt (1988) "Molecular framing: transgenic animals as bioactors" Biotechnology 6:1149-54
35. Vigne et al. (1995) "Third-generation adenovectors for gene therapy", Restorative Neurology and Neuroscience 8(1,2): 35-36
36. Wilson et al. (1989) "Formation of infectious hybrid virion with gibbon ape leukemia virus and human T-cell leukemia virus retroviral envelope glycoproteins and the gag and pol proteins of Moloney murine leukemia virus", J. Virol. 63:2374-78
37. Yu et al. (1994) "Progress towards gene therapy for HIV infection", Gene Ther. 1(1):13-26
38. Zetsche et al. (2015) "Cpf1 is a single RNA-guided endonuclease of a class 2 CRISPR-Cas system" Cell 163(3):759-71
39. Zuris et al. (2015) "Cationic lipid-mediated delivery of proteins enables efficient protein based genome editing in vitro and in vivo" Nat Biotechnol. 33(1):73-80

The invention claimed is:

1. A method for inactivating a mutant allele of the Apolipoprotein A1 (APOA1), the method comprising:
   (a) delivering to an isolated human cell that comprises a mutant APOA1 allele and a functional APOA1 allele a composition comprising:
   a CRISPR nuclease, and
   an isolated guide RNA molecule (gRNA) that targets the mutant human APOA1 allele, wherein the gRNA comprises a CRISPR RNA (crRNA) comprising a nucleic acid sequence of 17-20 nucleotides which comprise 17-20 contiguous nucleotides set forth in SEQ ID NOs: 114, 188, 192, or 253; and
   (b) culturing the cell obtained in step a) such that the mutant APOA1 allele is inactivated and the functional APOA1 allele remains intact.

2. The method of claim 1, wherein the crRNA comprises 17-20 contiguous nucleotides as set forth in SEQ ID NO: 25.

3. The method of claim 1, wherein the crRNA comprises 17-20 contiguous nucleotides as set forth in SEQ ID NO: 114.

4. The method of claim 1, wherein the crRNA comprises 17-20 contiguous nucleotides as set forth in SEQ ID NO: 188.

5. The method of claim 1, wherein the crRNA comprises 17-20 contiguous nucleotides as set forth in SEQ ID NO: 192.

6. The method of claim 1, wherein the mutant APOA1 allele is inactivated by a frameshift mutation.

7. The method of claim 6, wherein the frameshift mutation creates an early stop codon in the mutant APOA1 allele.

8. The method of claim 6, wherein the frameshift mutation results in nonsense-mediated mRNA decay of a transcript of the mutant APOA1 allele.

9. The method of claim 1, wherein the inactivated mutant APOA1 allele expresses a truncated protein and the intact functional APOA1 allele expresses a functional protein.

10. A method for inactivating a mutant allele of the APOA1, the method comprising: (a) delivering to an isolated human cell that comprises a mutant APOA1 allele and a functional APOA1 allele a composition comprising:
    a CRISPR nuclease, and
    an isolated gRNA that targets a mutant human APOA1 allele, wherein the gRNA comprises a crRNA comprising a nucleic acid sequence which comprises the 17 consecutive nucleotides shared by SEQ ID NOs: 114, 188, 192, and 253; and (b) culturing the cell obtained in step a) such that the mutant APOA1 allele is inactivated and the functional APOA1 allele remains intact.

11. The method of claim 10, wherein the mutant APOA1 allele is inactivated by a frameshift mutation.

12. The method of claim 11, wherein the frameshift mutation creates an early stop codon in the mutant APOA1 allele.

13. The method of claim 11, wherein the frameshift mutation results in nonsense-mediated mRNA decay of a transcript of the mutant APOA1 allele.

14. The method of claim 10, wherein the inactivated mutant APOA1 allele expresses a truncated protein and the intact functional APOA1 allele expresses a functional protein.

* * * * *

SEQUENCE LISTING

<160> NUMBER OF SEQ ID NOS: 1313

<210> SEQ ID NO 1
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1
aaagacagcg gcagagacua                                                     20

<210> SEQ ID NO 2
<211> LENGTH: 20
<212> TYPE: RNA
<213> ORGANISM: Artificial Sequence
<220> FEATURE:
<223> OTHER INFORMATION: Synthetic Construct

<400> SEQUENCE: 2
aaagcugcag gcuccgcaag                                                     20

<210> SEQ ID NO 3
<211> LENGTH: 20
<212> TYPE: RNA
<213> ORGANISM: Artificial Sequence
<220> FEATURE:
<223> OTHER INFORMATION: Synthetic Construct

<400> SEQUENCE: 3
aaaggagaca gagcugggac                                                     20

<210> SEQ ID NO 4
<211> LENGTH: 20
<212> TYPE: RNA
<213> ORGANISM: Artificial Sequence
<220> FEATURE:
<223> OTHER INFORMATION: Synthetic Construct

<400> SEQUENCE: 4
aaaggcugca ggcuccgcaa                                                     20

<210> SEQ ID NO 5
<211> LENGTH: 20
<212> TYPE: RNA
<213> ORGANISM: Artificial Sequence
<220> FEATURE:
<223> OTHER INFORMATION: Synthetic Construct

<400> SEQUENCE: 5
aacccugggu gacaccuguc                                                     20

<210> SEQ ID NO 6
<211> LENGTH: 20
<212> TYPE: RNA
<213> ORGANISM: Artificial Sequence
<220> FEATURE:
<223> OTHER INFORMATION: Synthetic Construct

<400> SEQUENCE: 6
aaggagacag agcugggacu                                                     20

<210> SEQ ID NO 7
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 7
aaggcugcag gcuccgcaag                                              20

<210> SEQ ID NO 8
<211> LENGTH: 20
<212> TYPE: RNA
<213> ORGANISM: Artificial Sequence
<220> FEATURE:
<223> OTHER INFORMATION: Synthetic Construct

<400> SEQUENCE: 8
aaucuggccu ccagccuuac                                              20

<210> SEQ ID NO 9
<211> LENGTH: 20
<212> TYPE: RNA
<213> ORGANISM: Artificial Sequence
<220> FEATURE:
<223> OTHER INFORMATION: Synthetic Construct

<400> SEQUENCE: 9
aaucuggccu ccagccuuau                                              20

<210> SEQ ID NO 10
<211> LENGTH: 20
<212> TYPE: RNA
<213> ORGANISM: Artificial Sequence
<220> FEATURE:
<223> OTHER INFORMATION: Synthetic Construct

<400> SEQUENCE: 10
acagggccag ggcugggcuu                                              20

<210> SEQ ID NO 11
<211> LENGTH: 20
<212> TYPE: RNA
<213> ORGANISM: Artificial Sequence
<220> FEATURE:
<223> OTHER INFORMATION: Synthetic Construct

<400> SEQUENCE: 11
acagggccgg ggcugggcuu                                              20

<210> SEQ ID NO 12
<211> LENGTH: 20
<212> TYPE: RNA
<213> ORGANISM: Artificial Sequence
<220> FEATURE:
<223> OTHER INFORMATION: Synthetic Construct

<400> SEQUENCE: 12
accaucgggg ggccuucucc                                              20

<210> SEQ ID NO 13
<211> LENGTH: 20
<212> TYPE: RNA
<213> ORGANISM: Artificial Sequence
<220> FEATURE:
<223> OTHER INFORMATION: Synthetic Construct

<400> SEQUENCE: 13
accaucgggg ggcuuucucc                                              20
```

```
<210> SEQ ID NO 14
<211> LENGTH: 20
<212> TYPE: RNA
<213> ORGANISM: Artificial Sequence
<220> FEATURE:
<223> OTHER INFORMATION: Synthetic Construct

<400> SEQUENCE: 14
acccagggcu caccccugau                                                      20

<210> SEQ ID NO 15
<211> LENGTH: 20
<212> TYPE: RNA
<213> ORGANISM: Artificial Sequence
<220> FEATURE:
<223> OTHER INFORMATION: Synthetic Construct

<400> SEQUENCE: 15
acccaggguu caccccugau                                                      20

<210> SEQ ID NO 16
<211> LENGTH: 20
<212> TYPE: RNA
<213> ORGANISM: Artificial Sequence
<220> FEATURE:
<223> OTHER INFORMATION: Synthetic Construct

<400> SEQUENCE: 16
accggaaugg gaucuccagg                                                      20

<210> SEQ ID NO 17
<211> LENGTH: 20
<212> TYPE: RNA
<213> ORGANISM: Artificial Sequence
<220> FEATURE:
<223> OTHER INFORMATION: Synthetic Construct

<400> SEQUENCE: 17
accucaggua cccagaggcc                                                      20

<210> SEQ ID NO 18
<211> LENGTH: 20
<212> TYPE: RNA
<213> ORGANISM: Artificial Sequence
<220> FEATURE:
<223> OTHER INFORMATION: Synthetic Construct

<400> SEQUENCE: 18
acguggaugu gcucaaagac                                                      20

<210> SEQ ID NO 19
<211> LENGTH: 20
<212> TYPE: RNA
<213> ORGANISM: Artificial Sequence
<220> FEATURE:
<223> OTHER INFORMATION: Synthetic Construct

<400> SEQUENCE: 19
acucauguga cugcuggaag                                                      20

<210> SEQ ID NO 20
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 20
acuggaaugg gaucuccagg                                              20

<210> SEQ ID NO 21
<211> LENGTH: 20
<212> TYPE: RNA
<213> ORGANISM: Artificial Sequence
<220> FEATURE:
<223> OTHER INFORMATION: Synthetic Construct

<400> SEQUENCE: 21
acuucucagu uuccuggcuc                                              20

<210> SEQ ID NO 22
<211> LENGTH: 20
<212> TYPE: RNA
<213> ORGANISM: Artificial Sequence
<220> FEATURE:
<223> OTHER INFORMATION: Synthetic Construct

<400> SEQUENCE: 22
agaaagaccu ccuuccuuuc                                              20

<210> SEQ ID NO 23
<211> LENGTH: 20
<212> TYPE: RNA
<213> ORGANISM: Artificial Sequence
<220> FEATURE:
<223> OTHER INFORMATION: Synthetic Construct

<400> SEQUENCE: 23
agaaagacuu ccuuccuuuc                                              20

<210> SEQ ID NO 24
<211> LENGTH: 20
<212> TYPE: RNA
<213> ORGANISM: Artificial Sequence
<220> FEATURE:
<223> OTHER INFORMATION: Synthetic Construct

<400> SEQUENCE: 24
agaccucagg uacccagagg                                              20

<210> SEQ ID NO 25
<211> LENGTH: 20
<212> TYPE: RNA
<213> ORGANISM: Artificial Sequence
<220> FEATURE:
<223> OTHER INFORMATION: Synthetic Construct

<400> SEQUENCE: 25
agacucaugu gacugcugga                                              20

<210> SEQ ID NO 26
<211> LENGTH: 20
<212> TYPE: RNA
<213> ORGANISM: Artificial Sequence
<220> FEATURE:
<223> OTHER INFORMATION: Synthetic Construct

<400> SEQUENCE: 26
agacucguga cugcuggaag                                              20

<210> SEQ ID NO 27
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 27
agaucagacu cgugacugcu                                               20

<210> SEQ ID NO 28
<211> LENGTH: 20
<212> TYPE: RNA
<213> ORGANISM: Artificial Sequence
<220> FEATURE:
<223> OTHER INFORMATION: Synthetic Construct

<400> SEQUENCE: 28
agcagcaaca gggccggggc                                               20

<210> SEQ ID NO 29
<211> LENGTH: 20
<212> TYPE: RNA
<213> ORGANISM: Artificial Sequence
<220> FEATURE:
<223> OTHER INFORMATION: Synthetic Construct

<400> SEQUENCE: 29
agcccugggu gacaccuguc                                               20

<210> SEQ ID NO 30
<211> LENGTH: 20
<212> TYPE: RNA
<213> ORGANISM: Artificial Sequence
<220> FEATURE:
<223> OTHER INFORMATION: Synthetic Construct

<400> SEQUENCE: 30
agccuaucag gggugagccc                                               20

<210> SEQ ID NO 31
<211> LENGTH: 20
<212> TYPE: RNA
<213> ORGANISM: Artificial Sequence
<220> FEATURE:
<223> OTHER INFORMATION: Synthetic Construct

<400> SEQUENCE: 31
agccugcagc cuuugcaguc                                               20

<210> SEQ ID NO 32
<211> LENGTH: 20
<212> TYPE: RNA
<213> ORGANISM: Artificial Sequence
<220> FEATURE:
<223> OTHER INFORMATION: Synthetic Construct

<400> SEQUENCE: 32
agccuuugca gucugaucag                                               20

<210> SEQ ID NO 33
<211> LENGTH: 20
<212> TYPE: RNA
<213> ORGANISM: Artificial Sequence
<220> FEATURE:
<223> OTHER INFORMATION: Synthetic Construct

<400> SEQUENCE: 33
```

```
aggcccagac cucccccagc                                              20

<210> SEQ ID NO 34
<211> LENGTH: 20
<212> TYPE: RNA
<213> ORGANISM: Artificial Sequence
<220> FEATURE:
<223> OTHER INFORMATION: Synthetic Construct

<400> SEQUENCE: 34
aggcccagac cucccucagc                                              20

<210> SEQ ID NO 35
<211> LENGTH: 20
<212> TYPE: RNA
<213> ORGANISM: Artificial Sequence
<220> FEATURE:
<223> OTHER INFORMATION: Synthetic Construct

<400> SEQUENCE: 35
aggcugggcc ucuggguacc                                              20

<210> SEQ ID NO 36
<211> LENGTH: 20
<212> TYPE: RNA
<213> ORGANISM: Artificial Sequence
<220> FEATURE:
<223> OTHER INFORMATION: Synthetic Construct

<400> SEQUENCE: 36
agggaggucu gggccuucca                                              20

<210> SEQ ID NO 37
<211> LENGTH: 20
<212> TYPE: RNA
<213> ORGANISM: Artificial Sequence
<220> FEATURE:
<223> OTHER INFORMATION: Synthetic Construct

<400> SEQUENCE: 37
agggcagggg caggggcag                                               20

<210> SEQ ID NO 38
<211> LENGTH: 20
<212> TYPE: RNA
<213> ORGANISM: Artificial Sequence
<220> FEATURE:
<223> OTHER INFORMATION: Synthetic Construct

<400> SEQUENCE: 38
agggcagggg uaggggcag                                               20

<210> SEQ ID NO 39
<211> LENGTH: 20
<212> TYPE: RNA
<213> ORGANISM: Artificial Sequence
<220> FEATURE:
<223> OTHER INFORMATION: Synthetic Construct

<400> SEQUENCE: 39
agggcugggc uuaucagccu                                              20

<210> SEQ ID NO 40
<211> LENGTH: 20
<212> TYPE: RNA
```

```
<213> ORGANISM: Artificial Sequence
<220> FEATURE:
<223> OTHER INFORMATION: Synthetic Construct

<400> SEQUENCE: 40
aggggcaggg ggcagaggcc                                               20

<210> SEQ ID NO 41
<211> LENGTH: 20
<212> TYPE: RNA
<213> ORGANISM: Artificial Sequence
<220> FEATURE:
<223> OTHER INFORMATION: Synthetic Construct

<400> SEQUENCE: 41
agggguaggg ggcagaggcc                                               20

<210> SEQ ID NO 42
<211> LENGTH: 20
<212> TYPE: RNA
<213> ORGANISM: Artificial Sequence
<220> FEATURE:
<223> OTHER INFORMATION: Synthetic Construct

<400> SEQUENCE: 42
aggguucacc ccugauaggc                                               20

<210> SEQ ID NO 43
<211> LENGTH: 20
<212> TYPE: RNA
<213> ORGANISM: Artificial Sequence
<220> FEATURE:
<223> OTHER INFORMATION: Synthetic Construct

<400> SEQUENCE: 43
agguacccag aggcccggcc                                               20

<210> SEQ ID NO 44
<211> LENGTH: 20
<212> TYPE: RNA
<213> ORGANISM: Artificial Sequence
<220> FEATURE:
<223> OTHER INFORMATION: Synthetic Construct

<400> SEQUENCE: 44
agguccuauc aguaaccugc                                               20

<210> SEQ ID NO 45
<211> LENGTH: 20
<212> TYPE: RNA
<213> ORGANISM: Artificial Sequence
<220> FEATURE:
<223> OTHER INFORMATION: Synthetic Construct

<400> SEQUENCE: 45
aguaaccugc ugagggaggu                                               20

<210> SEQ ID NO 46
<211> LENGTH: 20
<212> TYPE: RNA
<213> ORGANISM: Artificial Sequence
<220> FEATURE:
<223> OTHER INFORMATION: Synthetic Construct

<400> SEQUENCE: 46
aguaaccugc uggggaggu                                                20
```

```
<210> SEQ ID NO 47
<211> LENGTH: 20
<212> TYPE: RNA
<213> ORGANISM: Artificial Sequence
<220> FEATURE:
<223> OTHER INFORMATION: Synthetic Construct

<400> SEQUENCE: 47
agucccugau cagacugcaa                                               20

<210> SEQ ID NO 48
<211> LENGTH: 20
<212> TYPE: RNA
<213> ORGANISM: Artificial Sequence
<220> FEATURE:
<223> OTHER INFORMATION: Synthetic Construct

<400> SEQUENCE: 48
agugagcagc aacagggcca                                               20

<210> SEQ ID NO 49
<211> LENGTH: 20
<212> TYPE: RNA
<213> ORGANISM: Artificial Sequence
<220> FEATURE:
<223> OTHER INFORMATION: Synthetic Construct

<400> SEQUENCE: 49
agugagcagc aacagggccg                                               20

<210> SEQ ID NO 50
<211> LENGTH: 20
<212> TYPE: RNA
<213> ORGANISM: Artificial Sequence
<220> FEATURE:
<223> OTHER INFORMATION: Synthetic Construct

<400> SEQUENCE: 50
auagucucug ccgcugucuu                                               20

<210> SEQ ID NO 51
<211> LENGTH: 20
<212> TYPE: RNA
<213> ORGANISM: Artificial Sequence
<220> FEATURE:
<223> OTHER INFORMATION: Synthetic Construct

<400> SEQUENCE: 51
auaucccuau aaggcuggag                                               20

<210> SEQ ID NO 52
<211> LENGTH: 20
<212> TYPE: RNA
<213> ORGANISM: Artificial Sequence
<220> FEATURE:
<223> OTHER INFORMATION: Synthetic Construct

<400> SEQUENCE: 52
auaucccugu aaggcuggag                                               20

<210> SEQ ID NO 53
<211> LENGTH: 20
<212> TYPE: RNA
<213> ORGANISM: Artificial Sequence
<220> FEATURE:
```

<223> OTHER INFORMATION: Synthetic Construct

<400> SEQUENCE: 53
aucagacuca ugugacugcu                                         20

<210> SEQ ID NO 54
<211> LENGTH: 20
<212> TYPE: RNA
<213> ORGANISM: Artificial Sequence
<220> FEATURE:
<223> OTHER INFORMATION: Synthetic Construct

<400> SEQUENCE: 54
auccugaugc cucgcagucc                                         20

<210> SEQ ID NO 55
<211> LENGTH: 20
<212> TYPE: RNA
<213> ORGANISM: Artificial Sequence
<220> FEATURE:
<223> OTHER INFORMATION: Synthetic Construct

<400> SEQUENCE: 55
aucuggccuc cagccuuaca                                         20

<210> SEQ ID NO 56
<211> LENGTH: 20
<212> TYPE: RNA
<213> ORGANISM: Artificial Sequence
<220> FEATURE:
<223> OTHER INFORMATION: Synthetic Construct

<400> SEQUENCE: 56
aucuggccuc cagccuuaua                                         20

<210> SEQ ID NO 57
<211> LENGTH: 20
<212> TYPE: RNA
<213> ORGANISM: Artificial Sequence
<220> FEATURE:
<223> OTHER INFORMATION: Synthetic Construct

<400> SEQUENCE: 57
auggcagugg agaucagacu                                         20

<210> SEQ ID NO 58
<211> LENGTH: 20
<212> TYPE: RNA
<213> ORGANISM: Artificial Sequence
<220> FEATURE:
<223> OTHER INFORMATION: Synthetic Construct

<400> SEQUENCE: 58 auggccccu uccagcaguc                                          20

<210> SEQ ID NO 59
<211> LENGTH: 20
<212> TYPE: RNA
<213> ORGANISM: Artificial Sequence
<220> FEATURE:
<223> OTHER INFORMATION: Synthetic Construct

<400> SEQUENCE: 59
auggucugga uggagaaacc                                         20

```
<210> SEQ ID NO 60
<211> LENGTH: 20
<212> TYPE: RNA
<213> ORGANISM: Artificial Sequence
<220> FEATURE:
<223> OTHER INFORMATION: Synthetic Construct

<400> SEQUENCE: 60
auggucugga uggagaaacu                                                   20

<210> SEQ ID NO 61
<211> LENGTH: 20
<212> TYPE: RNA
<213> ORGANISM: Artificial Sequence
<220> FEATURE:
<223> OTHER INFORMATION: Synthetic Construct

<400> SEQUENCE: 61
augugcucaa agacagcggc                                                   20

<210> SEQ ID NO 62
<211> LENGTH: 20
<212> TYPE: RNA
<213> ORGANISM: Artificial Sequence
<220> FEATURE:
<223> OTHER INFORMATION: Synthetic Construct

<400> SEQUENCE: 62
caaaggcugc aggcuccgca                                                   20

<210> SEQ ID NO 63
<211> LENGTH: 20
<212> TYPE: RNA
<213> ORGANISM: Artificial Sequence
<220> FEATURE:
<223> OTHER INFORMATION: Synthetic Construct

<400> SEQUENCE: 63
caacuuagaa uaucccuaua                                                   20

<210> SEQ ID NO 64
<211> LENGTH: 20
<212> TYPE: RNA
<213> ORGANISM: Artificial Sequence
<220> FEATURE:
<223> OTHER INFORMATION: Synthetic Construct

<400> SEQUENCE: 64
caacuuagaa uaucccugua                                                   20

<210> SEQ ID NO 65
<211> LENGTH: 20
<212> TYPE: RNA
<213> ORGANISM: Artificial Sequence
<220> FEATURE:
<223> OTHER INFORMATION: Synthetic Construct

<400> SEQUENCE: 65
cacaugaguc ugaucuccac                                                   20

<210> SEQ ID NO 66
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 66
cagaccuccc ccagcagguu                                              20

<210> SEQ ID NO 67
<211> LENGTH: 20
<212> TYPE: RNA
<213> ORGANISM: Artificial Sequence
<220> FEATURE:
<223> OTHER INFORMATION: Synthetic Construct

<400> SEQUENCE: 67
cagaccuccc ucagcagguu                                              20

<210> SEQ ID NO 68
<211> LENGTH: 20
<212> TYPE: RNA
<213> ORGANISM: Artificial Sequence
<220> FEATURE:
<223> OTHER INFORMATION: Synthetic Construct

<400> SEQUENCE: 68
cagacucgug acugcuggaa                                              20

<210> SEQ ID NO 69
<211> LENGTH: 20
<212> TYPE: RNA
<213> ORGANISM: Artificial Sequence
<220> FEATURE:
<223> OTHER INFORMATION: Synthetic Construct

<400> SEQUENCE: 69
cagacugcaa aggcugcagg                                              20

<210> SEQ ID NO 70
<211> LENGTH: 20
<212> TYPE: RNA
<213> ORGANISM: Artificial Sequence
<220> FEATURE:
<223> OTHER INFORMATION: Synthetic Construct

<400> SEQUENCE: 70
cagaggccca gccuggggca                                              20

<210> SEQ ID NO 71
<211> LENGTH: 20
<212> TYPE: RNA
<213> ORGANISM: Artificial Sequence
<220> FEATURE:
<223> OTHER INFORMATION: Synthetic Construct

<400> SEQUENCE: 71
cagaggcccg gccuggggca                                              20

<210> SEQ ID NO 72
<211> LENGTH: 20
<212> TYPE: RNA
<213> ORGANISM: Artificial Sequence
<220> FEATURE:
<223> OTHER INFORMATION: Synthetic Construct

<400> SEQUENCE: 72
cagccuuugc agucugauca                                              20

<210> SEQ ID NO 73
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 73
caguccccga gccaggaaac                                                    20

<210> SEQ ID NO 74
<211> LENGTH: 20
<212> TYPE: RNA
<213> ORGANISM: Artificial Sequence
<220> FEATURE:
<223> OTHER INFORMATION: Synthetic Construct

<400> SEQUENCE: 74
cagucccuga gccaggaaac                                                    20

<210> SEQ ID NO 75
<211> LENGTH: 20
<212> TYPE: RNA
<213> ORGANISM: Artificial Sequence
<220> FEATURE:
<223> OTHER INFORMATION: Synthetic Construct

<400> SEQUENCE: 75
cagugagcag caacagggcc                                                    20

<210> SEQ ID NO 76
<211> LENGTH: 20
<212> TYPE: RNA
<213> ORGANISM: Artificial Sequence
<220> FEATURE:
<223> OTHER INFORMATION: Synthetic Construct

<400> SEQUENCE: 76
caguggagau cagacucaug                                                    20

<210> SEQ ID NO 77
<211> LENGTH: 20
<212> TYPE: RNA
<213> ORGANISM: Artificial Sequence
<220> FEATURE:
<223> OTHER INFORMATION: Synthetic Construct

<400> SEQUENCE: 77
caguuuccug gcucagggac                                                    20

<210> SEQ ID NO 78
<211> LENGTH: 20
<212> TYPE: RNA
<213> ORGANISM: Artificial Sequence
<220> FEATURE:
<223> OTHER INFORMATION: Synthetic Construct

<400> SEQUENCE: 78
caguuuccug gcucggggac                                                    20

<210> SEQ ID NO 79
<211> LENGTH: 20
<212> TYPE: RNA
<213> ORGANISM: Artificial Sequence
<220> FEATURE:
<223> OTHER INFORMATION: Synthetic Construct

<400> SEQUENCE: 79
```
cauagucucu gccgcugucu                                              20

<210> SEQ ID NO 80
<211> LENGTH: 20
<212> TYPE: RNA
<213> ORGANISM: Artificial Sequence
<220> FEATURE:
<223> OTHER INFORMATION: Synthetic Construct

<400> SEQUENCE: 80
cauuccaguu ucuccaucca                                              20

<210> SEQ ID NO 81
<211> LENGTH: 20
<212> TYPE: RNA
<213> ORGANISM: Artificial Sequence
<220> FEATURE:
<223> OTHER INFORMATION: Synthetic Construct

<400> SEQUENCE: 81
cauuccgguu ucuccaucca                                              20

<210> SEQ ID NO 82
<211> LENGTH: 20
<212> TYPE: RNA
<213> ORGANISM: Artificial Sequence
<220> FEATURE:
<223> OTHER INFORMATION: Synthetic Construct

<400> SEQUENCE: 82
ccagugagca gcaacagggc                                              20

<210> SEQ ID NO 83
<211> LENGTH: 20
<212> TYPE: RNA
<213> ORGANISM: Artificial Sequence
<220> FEATURE:
<223> OTHER INFORMATION: Synthetic Construct

<400> SEQUENCE: 83
ccauuccagu uucuccaucc                                              20

<210> SEQ ID NO 84
<211> LENGTH: 20
<212> TYPE: RNA
<213> ORGANISM: Artificial Sequence
<220> FEATURE:
<223> OTHER INFORMATION: Synthetic Construct

<400> SEQUENCE: 84
ccauuccggu uucuccaucc                                              20

<210> SEQ ID NO 85
<211> LENGTH: 20
<212> TYPE: RNA
<213> ORGANISM: Artificial Sequence
<220> FEATURE:
<223> OTHER INFORMATION: Synthetic Construct

<400> SEQUENCE: 85
cccagaggcc cagccugggg                                              20

<210> SEQ ID NO 86
<211> LENGTH: 20
<212> TYPE: RNA
<213> ORGANISM: Artificial Sequence
<220> FEATURE:
<223> OTHER INFORMATION: Synthetic Construct

<400> SEQUENCE: 86
cccccagcag guuacugaua                                          20

<210> SEQ ID NO 87
<211> LENGTH: 20
<212> TYPE: RNA
<213> ORGANISM: Artificial Sequence
<220> FEATURE:
<223> OTHER INFORMATION: Synthetic Construct

<400> SEQUENCE: 87
ccccuuccag cagucacgag                                          20

<210> SEQ ID NO 88
<211> LENGTH: 20
<212> TYPE: RNA
<213> ORGANISM: Artificial Sequence
<220> FEATURE:
<223> OTHER INFORMATION: Synthetic Construct

<400> SEQUENCE: 88
cccucagcag guuacugaua                                          20

<210> SEQ ID NO 89
<211> LENGTH: 20
<212> TYPE: RNA
<213> ORGANISM: Artificial Sequence
<220> FEATURE:
<223> OTHER INFORMATION: Synthetic Construct

<400> SEQUENCE: 89
cccuggcccu guugcugcuc                                          20

<210> SEQ ID NO 90
<211> LENGTH: 20
<212> TYPE: RNA
<213> ORGANISM: Artificial Sequence
<220> FEATURE:
<223> OTHER INFORMATION: Synthetic Construct

<400> SEQUENCE: 90
ccggaauggg aucuccaggc                                          20

<210> SEQ ID NO 91
<211> LENGTH: 20
<212> TYPE: RNA
<213> ORGANISM: Artificial Sequence
<220> FEATURE:
<223> OTHER INFORMATION: Synthetic Construct

<400> SEQUENCE: 91
ccggcccugu ugcugcucac                                          20

<210> SEQ ID NO 92
<211> LENGTH: 20
<212> TYPE: RNA
<213> ORGANISM: Artificial Sequence
<220> FEATURE:
<223> OTHER INFORMATION: Synthetic Construct

<400> SEQUENCE: 92
ccuaucaggg gugaacccug                                          20

```
<210> SEQ ID NO 93
<211> LENGTH: 20
<212> TYPE: RNA
<213> ORGANISM: Artificial Sequence
<220> FEATURE:
<223> OTHER INFORMATION: Synthetic Construct

<400> SEQUENCE: 93
ccuaucaggg gugagcccug                                                    20

<210> SEQ ID NO 94
<211> LENGTH: 20
<212> TYPE: RNA
<213> ORGANISM: Artificial Sequence
<220> FEATURE:
<223> OTHER INFORMATION: Synthetic Construct

<400> SEQUENCE: 94
ccuaucagua accugcugag                                                    20

<210> SEQ ID NO 95
<211> LENGTH: 20
<212> TYPE: RNA
<213> ORGANISM: Artificial Sequence
<220> FEATURE:
<223> OTHER INFORMATION: Synthetic Construct

<400> SEQUENCE: 95
ccuaucagua accugcuggg                                                    20

<210> SEQ ID NO 96
<211> LENGTH: 20
<212> TYPE: RNA
<213> ORGANISM: Artificial Sequence
<220> FEATURE:
<223> OTHER INFORMATION: Synthetic Construct

<400> SEQUENCE: 96
ccugccugga gaucccauuc                                                    20

<210> SEQ ID NO 97
<211> LENGTH: 20
<212> TYPE: RNA
<213> ORGANISM: Artificial Sequence
<220> FEATURE:
<223> OTHER INFORMATION: Synthetic Construct

<400> SEQUENCE: 97
ccuggaaggc ccagaccucc                                                    20

<210> SEQ ID NO 98
<211> LENGTH: 20
<212> TYPE: RNA
<213> ORGANISM: Artificial Sequence
<220> FEATURE:
<223> OTHER INFORMATION: Synthetic Construct

<400> SEQUENCE: 98
ccuuccagca gucacaugag                                                    20

<210> SEQ ID NO 99
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 99
ccuuccagca gucacgaguc                                              20

<210> SEQ ID NO 100
<211> LENGTH: 20
<212> TYPE: RNA
<213> ORGANISM: Artificial Sequence
<220> FEATURE:
<223> OTHER INFORMATION: Synthetic Construct

<400> SEQUENCE: 100
ccuugcccca ggccgggccu                                              20

<210> SEQ ID NO 101
<211> LENGTH: 20
<212> TYPE: RNA
<213> ORGANISM: Artificial Sequence
<220> FEATURE:
<223> OTHER INFORMATION: Synthetic Construct

<400> SEQUENCE: 101
ccuugcccca ggcugggccu                                              20

<210> SEQ ID NO 102
<211> LENGTH: 20
<212> TYPE: RNA
<213> ORGANISM: Artificial Sequence
<220> FEATURE:
<223> OTHER INFORMATION: Synthetic Construct

<400> SEQUENCE: 102
cggaauggga ucuccaggca                                              20

<210> SEQ ID NO 103
<211> LENGTH: 20
<212> TYPE: RNA
<213> ORGANISM: Artificial Sequence
<220> FEATURE:
<223> OTHER INFORMATION: Synthetic Construct

<400> SEQUENCE: 103
cuaccccugc ccucaacccc                                              20

<210> SEQ ID NO 104
<211> LENGTH: 20
<212> TYPE: RNA
<213> ORGANISM: Artificial Sequence
<220> FEATURE:
<223> OTHER INFORMATION: Synthetic Construct

<400> SEQUENCE: 104
cucagggacu gcgaggcauc                                              20

<210> SEQ ID NO 105
<211> LENGTH: 20
<212> TYPE: RNA
<213> ORGANISM: Artificial Sequence
<220> FEATURE:
<223> OTHER INFORMATION: Synthetic Construct

<400> SEQUENCE: 105
cucaugugac ugcuggaagg                                              20

<210> SEQ ID NO 106
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 106 cuccccagc agguuacuga                                                    20

<210> SEQ ID NO 107
<211> LENGTH: 20
<212> TYPE: RNA
<213> ORGANISM: Artificial Sequence
<220> FEATURE:
<223> OTHER INFORMATION: Synthetic Construct

<400> SEQUENCE: 107 cuccccucagc agguuacuga                                                  20

<210> SEQ ID NO 108
<211> LENGTH: 20
<212> TYPE: RNA
<213> ORGANISM: Artificial Sequence
<220> FEATURE:
<223> OTHER INFORMATION: Synthetic Construct

<400> SEQUENCE: 108
cucugccccc ugccccugcc                                                   20

<210> SEQ ID NO 109
<211> LENGTH: 20
<212> TYPE: RNA
<213> ORGANISM: Artificial Sequence
<220> FEATURE:
<223> OTHER INFORMATION: Synthetic Construct

<400> SEQUENCE: 109
cugccccugc ccucaacccc                                                   20

<210> SEQ ID NO 110
<211> LENGTH: 20
<212> TYPE: RNA
<213> ORGANISM: Artificial Sequence
<220> FEATURE:
<223> OTHER INFORMATION: Synthetic Construct

<400> SEQUENCE: 110
cuggaauggg aucuccaggc                                                   20

<210> SEQ ID NO 111
<211> LENGTH: 20
<212> TYPE: RNA
<213> ORGANISM: Artificial Sequence
<220> FEATURE:
<223> OTHER INFORMATION: Synthetic Construct

<400> SEQUENCE: 111
cuggauggag aaaccggaau                                                   20

<210> SEQ ID NO 112
<211> LENGTH: 20
<212> TYPE: RNA
<213> ORGANISM: Artificial Sequence
<220> FEATURE:
<223> OTHER INFORMATION: Synthetic Construct

<400> SEQUENCE: 112
```
cuggauggag aaacuggaau                                              20

<210> SEQ ID NO 113
<211> LENGTH: 20
<212> TYPE: RNA
<213> ORGANISM: Artificial Sequence
<220> FEATURE:
<223> OTHER INFORMATION: Synthetic Construct

<400> SEQUENCE: 113
cuggcccugu ugcugcucac                                              20

<210> SEQ ID NO 114
<211> LENGTH: 20
<212> TYPE: RNA
<213> ORGANISM: Artificial Sequence
<220> FEATURE:
<223> OTHER INFORMATION: Synthetic Construct

<400> SEQUENCE: 114
cugggguuga gggcaggggc                                              20

<210> SEQ ID NO 115
<211> LENGTH: 20
<212> TYPE: RNA
<213> ORGANISM: Artificial Sequence
<220> FEATURE:
<223> OTHER INFORMATION: Synthetic Construct

<400> SEQUENCE: 115
cugggguuga gggcaggggu                                              20

<210> SEQ ID NO 116
<211> LENGTH: 20
<212> TYPE: RNA
<213> ORGANISM: Artificial Sequence
<220> FEATURE:
<223> OTHER INFORMATION: Synthetic Construct

<400> SEQUENCE: 116
cuuacaggga uauucuaagu                                              20

<210> SEQ ID NO 117
<211> LENGTH: 20
<212> TYPE: RNA
<213> ORGANISM: Artificial Sequence
<220> FEATURE:
<223> OTHER INFORMATION: Synthetic Construct

<400> SEQUENCE: 117
cuuauaggga uauucuaagu                                              20

<210> SEQ ID NO 118
<211> LENGTH: 20
<212> TYPE: RNA
<213> ORGANISM: Artificial Sequence
<220> FEATURE:
<223> OTHER INFORMATION: Synthetic Construct

<400> SEQUENCE: 118
cuucucaguu uccuggcuca                                              20

<210> SEQ ID NO 119
<211> LENGTH: 20
<212> TYPE: RNA

<213> ORGANISM: Artificial Sequence
<220> FEATURE:
<223> OTHER INFORMATION: Synthetic Construct

<400> SEQUENCE: 119
cuucucccua aauccccgug                       20

<210> SEQ ID NO 120
<211> LENGTH: 20
<212> TYPE: RNA
<213> ORGANISM: Artificial Sequence
<220> FEATURE:
<223> OTHER INFORMATION: Synthetic Construct

<400> SEQUENCE: 120
cuugccccag gcugggccuc                       20

<210> SEQ ID NO 121
<211> LENGTH: 20
<212> TYPE: RNA
<213> ORGANISM: Artificial Sequence
<220> FEATURE:
<223> OTHER INFORMATION: Synthetic Construct

<400> SEQUENCE: 121
cuugcggagc cugcagccuu                       20

<210> SEQ ID NO 122
<211> LENGTH: 20
<212> TYPE: RNA
<213> ORGANISM: Artificial Sequence
<220> FEATURE:
<223> OTHER INFORMATION: Synthetic Construct

<400> SEQUENCE: 122
gaaaccggaa ugggaucucc                       20

<210> SEQ ID NO 123
<211> LENGTH: 20
<212> TYPE: RNA
<213> ORGANISM: Artificial Sequence
<220> FEATURE:
<223> OTHER INFORMATION: Synthetic Construct

<400> SEQUENCE: 123
gaaacuggaa ugggaucucc                       20

<210> SEQ ID NO 124
<211> LENGTH: 20
<212> TYPE: RNA
<213> ORGANISM: Artificial Sequence
<220> FEATURE:
<223> OTHER INFORMATION: Synthetic Construct

<400> SEQUENCE: 124
gaaaggaagg aggucuuucu                       20

<210> SEQ ID NO 125
<211> LENGTH: 20
<212> TYPE: RNA
<213> ORGANISM: Artificial Sequence
<220> FEATURE:
<223> OTHER INFORMATION: Synthetic Construct

<400> SEQUENCE: 125
gaagucuuuc uggacagagc                       20

<210> SEQ ID NO 126
<211> LENGTH: 20
<212> TYPE: RNA
<213> ORGANISM: Artificial Sequence
<220> FEATURE:
<223> OTHER INFORMATION: Synthetic Construct

<400> SEQUENCE: 126
gaauaucccu auaaggcugg                                               20

<210> SEQ ID NO 127
<211> LENGTH: 20
<212> TYPE: RNA
<213> ORGANISM: Artificial Sequence
<220> FEATURE:
<223> OTHER INFORMATION: Synthetic Construct

<400> SEQUENCE: 127
gaauaucccu guaaggcugg                                               20

<210> SEQ ID NO 128
<211> LENGTH: 20
<212> TYPE: RNA
<213> ORGANISM: Artificial Sequence
<220> FEATURE:
<223> OTHER INFORMATION: Synthetic Construct

<400> SEQUENCE: 128
gaccuccccc agcagguuac                                               20

<210> SEQ ID NO 129
<211> LENGTH: 20
<212> TYPE: RNA
<213> ORGANISM: Artificial Sequence
<220> FEATURE:
<223> OTHER INFORMATION: Synthetic Construct

<400> SEQUENCE: 129
gaccucccuc agcagguuac                                               20

<210> SEQ ID NO 130
<211> LENGTH: 20
<212> TYPE: RNA
<213> ORGANISM: Artificial Sequence
<220> FEATURE:
<223> OTHER INFORMATION: Synthetic Construct

<400> SEQUENCE: 130
gacucaugug acugcuggaa                                               20

<210> SEQ ID NO 131
<211> LENGTH: 20
<212> TYPE: RNA
<213> ORGANISM: Artificial Sequence
<220> FEATURE:
<223> OTHER INFORMATION: Synthetic Construct

<400> SEQUENCE: 131
gacuucucag uuuccuggcu                                               20

<210> SEQ ID NO 132
<211> LENGTH: 20
<212> TYPE: RNA
<213> ORGANISM: Artificial Sequence
<220> FEATURE:

<223> OTHER INFORMATION: Synthetic Construct

<400> SEQUENCE: 132
gagaaacugg aaugggaucu					20

<210> SEQ ID NO 133
<211> LENGTH: 20
<212> TYPE: RNA
<213> ORGANISM: Artificial Sequence
<220> FEATURE:
<223> OTHER INFORMATION: Synthetic Construct

<400> SEQUENCE: 133
gagaucagac ucgugacugc					20

<210> SEQ ID NO 134
<211> LENGTH: 20
<212> TYPE: RNA
<213> ORGANISM: Artificial Sequence
<220> FEATURE:
<223> OTHER INFORMATION: Synthetic Construct

<400> SEQUENCE: 134
gaggcugaua agcccagccc					20

<210> SEQ ID NO 135
<211> LENGTH: 20
<212> TYPE: RNA
<213> ORGANISM: Artificial Sequence
<220> FEATURE:
<223> OTHER INFORMATION: Synthetic Construct

<400> SEQUENCE: 135
gagggagguc ugggccuucc					20

<210> SEQ ID NO 136
<211> LENGTH: 20
<212> TYPE: RNA
<213> ORGANISM: Artificial Sequence
<220> FEATURE:
<223> OTHER INFORMATION: Synthetic Construct

<400> SEQUENCE: 136
gaggucuuuc uggacagagc					20

<210> SEQ ID NO 137
<211> LENGTH: 20
<212> TYPE: RNA
<213> ORGANISM: Artificial Sequence
<220> FEATURE:
<223> OTHER INFORMATION: Synthetic Construct

<400> SEQUENCE: 137
gaucagacug caaaggcugc					20

<210> SEQ ID NO 138
<211> LENGTH: 20
<212> TYPE: RNA
<213> ORGANISM: Artificial Sequence
<220> FEATURE:
<223> OTHER INFORMATION: Synthetic Construct

<400> SEQUENCE: 138
gauggucugg auggagaaac					20

```
<210> SEQ ID NO 139
<211> LENGTH: 20
<212> TYPE: RNA
<213> ORGANISM: Artificial Sequence
<220> FEATURE:
<223> OTHER INFORMATION: Synthetic Construct

<400> SEQUENCE: 139
gauuuaggga gaaagccccc                                               20

<210> SEQ ID NO 140
<211> LENGTH: 20
<212> TYPE: RNA
<213> ORGANISM: Artificial Sequence
<220> FEATURE:
<223> OTHER INFORMATION: Synthetic Construct

<400> SEQUENCE: 140
gauuuaggga gaaggccccc                                               20

<210> SEQ ID NO 141
<211> LENGTH: 20
<212> TYPE: RNA
<213> ORGANISM: Artificial Sequence
<220> FEATURE:
<223> OTHER INFORMATION: Synthetic Construct

<400> SEQUENCE: 141
gcagcaacag ggccagggcu                                               20

<210> SEQ ID NO 142
<211> LENGTH: 20
<212> TYPE: RNA
<213> ORGANISM: Artificial Sequence
<220> FEATURE:
<223> OTHER INFORMATION: Synthetic Construct

<400> SEQUENCE: 142
gcagcaacag ggccggggcu                                               20

<210> SEQ ID NO 143
<211> LENGTH: 20
<212> TYPE: RNA
<213> ORGANISM: Artificial Sequence
<220> FEATURE:
<223> OTHER INFORMATION: Synthetic Construct

<400> SEQUENCE: 143
gcagccuuug cagucugauc                                               20

<210> SEQ ID NO 144
<211> LENGTH: 20
<212> TYPE: RNA
<213> ORGANISM: Artificial Sequence
<220> FEATURE:
<223> OTHER INFORMATION: Synthetic Construct

<400> SEQUENCE: 144 gcaggggggca gaggccugug                                              20

<210> SEQ ID NO 145
<211> LENGTH: 20
<212> TYPE: RNA
<213> ORGANISM: Artificial Sequence
<220> FEATURE:
<223> OTHER INFORMATION: Synthetic Construct
```

<400> SEQUENCE: 145
gccacgggga uuuagggaga                                              20

<210> SEQ ID NO 146
<211> LENGTH: 20
<212> TYPE: RNA
<213> ORGANISM: Artificial Sequence
<220> FEATURE:
<223> OTHER INFORMATION: Synthetic Construct

<400> SEQUENCE: 146
gcccagccug gggcaaggcc                                              20

<210> SEQ ID NO 147
<211> LENGTH: 20
<212> TYPE: RNA
<213> ORGANISM: Artificial Sequence
<220> FEATURE:
<223> OTHER INFORMATION: Synthetic Construct

<400> SEQUENCE: 147
gcccccuucc agcagucaca                                              20

<210> SEQ ID NO 148
<211> LENGTH: 20
<212> TYPE: RNA
<213> ORGANISM: Artificial Sequence
<220> FEATURE:
<223> OTHER INFORMATION: Synthetic Construct

<400> SEQUENCE: 148
gcccggccug gggcaaggcc                                              20

<210> SEQ ID NO 149
<211> LENGTH: 20
<212> TYPE: RNA
<213> ORGANISM: Artificial Sequence
<220> FEATURE:
<223> OTHER INFORMATION: Synthetic Construct

<400> SEQUENCE: 149
gccgcugucu uugagcacau                                              20

<210> SEQ ID NO 150
<211> LENGTH: 20
<212> TYPE: RNA
<213> ORGANISM: Artificial Sequence
<220> FEATURE:
<223> OTHER INFORMATION: Synthetic Construct

<400> SEQUENCE: 150
gccgggccuc ugggu accug                                             20

<210> SEQ ID NO 151
<211> LENGTH: 20
<212> TYPE: RNA
<213> ORGANISM: Artificial Sequence
<220> FEATURE:
<223> OTHER INFORMATION: Synthetic Construct

<400> SEQUENCE: 151
gccuaucagg ggugaacccu                                              20

<210> SEQ ID NO 152
<211> LENGTH: 20

```
<212> TYPE: RNA
<213> ORGANISM: Artificial Sequence
<220> FEATURE:
<223> OTHER INFORMATION: Synthetic Construct

<400> SEQUENCE: 152
gccuaucagg ggugagcccu                                                    20

<210> SEQ ID NO 153
<211> LENGTH: 20
<212> TYPE: RNA
<213> ORGANISM: Artificial Sequence
<220> FEATURE:
<223> OTHER INFORMATION: Synthetic Construct

<400> SEQUENCE: 153
gccucgcagu ccccgagcca                                                    20

<210> SEQ ID NO 154
<211> LENGTH: 20
<212> TYPE: RNA
<213> ORGANISM: Artificial Sequence
<220> FEATURE:
<223> OTHER INFORMATION: Synthetic Construct

<400> SEQUENCE: 154
gccucgcagu cccugagcca                                                    20

<210> SEQ ID NO 155
<211> LENGTH: 20
<212> TYPE: RNA
<213> ORGANISM: Artificial Sequence
<220> FEATURE:
<223> OTHER INFORMATION: Synthetic Construct

<400> SEQUENCE: 155
gccuucuccc uaaauccccg                                                    20

<210> SEQ ID NO 156
<211> LENGTH: 20
<212> TYPE: RNA
<213> ORGANISM: Artificial Sequence
<220> FEATURE:
<223> OTHER INFORMATION: Synthetic Construct

<400> SEQUENCE: 156
gcgccccagc cuaucagggg                                                    20

<210> SEQ ID NO 157
<211> LENGTH: 20
<212> TYPE: RNA
<213> ORGANISM: Artificial Sequence
<220> FEATURE:
<223> OTHER INFORMATION: Synthetic Construct

<400> SEQUENCE: 157
gcggacaggu gucacccagg                                                    20

<210> SEQ ID NO 158
<211> LENGTH: 20
<212> TYPE: RNA
<213> ORGANISM: Artificial Sequence
<220> FEATURE:
<223> OTHER INFORMATION: Synthetic Construct

<400> SEQUENCE: 158
```

-continued gcucaccccu gauaggcugg          20

<210> SEQ ID NO 159
<211> LENGTH: 20
<212> TYPE: RNA
<213> ORGANISM: Artificial Sequence
<220> FEATURE:
<223> OTHER INFORMATION: Synthetic Construct

<400> SEQUENCE: 159
gcucagggac ugcgaggcau          20

<210> SEQ ID NO 160
<211> LENGTH: 20
<212> TYPE: RNA
<213> ORGANISM: Artificial Sequence
<220> FEATURE:
<223> OTHER INFORMATION: Synthetic Construct

<400> SEQUENCE: 160 gcucgggac ugcgaggcau          20

<210> SEQ ID NO 161
<211> LENGTH: 20
<212> TYPE: RNA
<213> ORGANISM: Artificial Sequence
<220> FEATURE:
<223> OTHER INFORMATION: Synthetic Construct

<400> SEQUENCE: 161
gcugggccuc uggguaccug          20

<210> SEQ ID NO 162
<211> LENGTH: 20
<212> TYPE: RNA
<213> ORGANISM: Artificial Sequence
<220> FEATURE:
<223> OTHER INFORMATION: Synthetic Construct

<400> SEQUENCE: 162
gcuucucccc uaaauccccg          20

<210> SEQ ID NO 163
<211> LENGTH: 20
<212> TYPE: RNA
<213> ORGANISM: Artificial Sequence
<220> FEATURE:
<223> OTHER INFORMATION: Synthetic Construct

<400> SEQUENCE: 163
ggaaaggaag gaagucuuuc          20

<210> SEQ ID NO 164
<211> LENGTH: 20
<212> TYPE: RNA
<213> ORGANISM: Artificial Sequence
<220> FEATURE:
<223> OTHER INFORMATION: Synthetic Construct

<400> SEQUENCE: 164
ggaaaggaag gaggucuuuc          20

<210> SEQ ID NO 165
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 165
ggaaggaagu cuuucuggac                                                   20

<210> SEQ ID NO 166
<211> LENGTH: 20
<212> TYPE: RNA
<213> ORGANISM: Artificial Sequence
<220> FEATURE:
<223> OTHER INFORMATION: Synthetic Construct

<400> SEQUENCE: 166
ggaaggaggu cuuucuggac                                                   20

<210> SEQ ID NO 167
<211> LENGTH: 20
<212> TYPE: RNA
<213> ORGANISM: Artificial Sequence
<220> FEATURE:
<223> OTHER INFORMATION: Synthetic Construct

<400> SEQUENCE: 167
ggacuagugc ccaguuacgu                                                   20

<210> SEQ ID NO 168
<211> LENGTH: 20
<212> TYPE: RNA
<213> ORGANISM: Artificial Sequence
<220> FEATURE:
<223> OTHER INFORMATION: Synthetic Construct

<400> SEQUENCE: 168
ggacuggugc ccaguuacgu                                                   20

<210> SEQ ID NO 169
<211> LENGTH: 20
<212> TYPE: RNA
<213> ORGANISM: Artificial Sequence
<220> FEATURE:
<223> OTHER INFORMATION: Synthetic Construct

<400> SEQUENCE: 169
ggagaaagcc ccccgauggu                                                   20

<210> SEQ ID NO 170
<211> LENGTH: 20
<212> TYPE: RNA
<213> ORGANISM: Artificial Sequence
<220> FEATURE:
<223> OTHER INFORMATION: Synthetic Construct

<400> SEQUENCE: 170
ggagaaggcc ccccgauggu                                                   20

<210> SEQ ID NO 171
<211> LENGTH: 20
<212> TYPE: RNA
<213> ORGANISM: Artificial Sequence
<220> FEATURE:
<223> OTHER INFORMATION: Synthetic Construct

<400> SEQUENCE: 171
ggagaccaac guaacugggc                                                   20
```

```
<210> SEQ ID NO 172
<211> LENGTH: 20
<212> TYPE: RNA
<213> ORGANISM: Artificial Sequence
<220> FEATURE:
<223> OTHER INFORMATION: Synthetic Construct

<400> SEQUENCE: 172
ggagccugca gccuuugcag                                                   20

<210> SEQ ID NO 173
<211> LENGTH: 20
<212> TYPE: RNA
<213> ORGANISM: Artificial Sequence
<220> FEATURE:
<223> OTHER INFORMATION: Synthetic Construct

<400> SEQUENCE: 173 ggcaggggc agaggccugu                                                    20

<210> SEQ ID NO 174
<211> LENGTH: 20
<212> TYPE: RNA
<213> ORGANISM: Artificial Sequence
<220> FEATURE:
<223> OTHER INFORMATION: Synthetic Construct

<400> SEQUENCE: 174
ggcaguggag aucagacuca                                                   20

<210> SEQ ID NO 175
<211> LENGTH: 20
<212> TYPE: RNA
<213> ORGANISM: Artificial Sequence
<220> FEATURE:
<223> OTHER INFORMATION: Synthetic Construct

<400> SEQUENCE: 175
ggcaguggag aucagacucg                                                   20

<210> SEQ ID NO 176
<211> LENGTH: 20
<212> TYPE: RNA
<213> ORGANISM: Artificial Sequence
<220> FEATURE:
<223> OTHER INFORMATION: Synthetic Construct

<400> SEQUENCE: 176
ggcccagccu ggggcaaggc                                                   20

<210> SEQ ID NO 177
<211> LENGTH: 20
<212> TYPE: RNA
<213> ORGANISM: Artificial Sequence
<220> FEATURE:
<223> OTHER INFORMATION: Synthetic Construct

<400> SEQUENCE: 177
ggcccccuuc cagcagucac                                                   20

<210> SEQ ID NO 178
<211> LENGTH: 20
<212> TYPE: RNA
<213> ORGANISM: Artificial Sequence
<220> FEATURE:
<223> OTHER INFORMATION: Synthetic Construct
```

-continued

<400> SEQUENCE: 178
ggcccggccu ggggcaaggc                                               20

<210> SEQ ID NO 179
<211> LENGTH: 20
<212> TYPE: RNA
<213> ORGANISM: Artificial Sequence
<220> FEATURE:
<223> OTHER INFORMATION: Synthetic Construct

<400> SEQUENCE: 179
ggcucacccc ugauaggcug                                               20

<210> SEQ ID NO 180
<211> LENGTH: 20
<212> TYPE: RNA
<213> ORGANISM: Artificial Sequence
<220> FEATURE:
<223> OTHER INFORMATION: Synthetic Construct

<400> SEQUENCE: 180
gggaggcuga uaagcccagc                                               20

<210> SEQ ID NO 181
<211> LENGTH: 20
<212> TYPE: RNA
<213> ORGANISM: Artificial Sequence
<220> FEATURE:
<223> OTHER INFORMATION: Synthetic Construct

<400> SEQUENCE: 181
gggcaggggg cagaggccug                                               20

<210> SEQ ID NO 182
<211> LENGTH: 20
<212> TYPE: RNA
<213> ORGANISM: Artificial Sequence
<220> FEATURE:
<223> OTHER INFORMATION: Synthetic Construct

<400> SEQUENCE: 182
gggccacggg gauuuaggga                                               20

<210> SEQ ID NO 183
<211> LENGTH: 20
<212> TYPE: RNA
<213> ORGANISM: Artificial Sequence
<220> FEATURE:
<223> OTHER INFORMATION: Synthetic Construct

<400> SEQUENCE: 183
gggccuucuc ccuaaauccc                                               20

<210> SEQ ID NO 184
<211> LENGTH: 20
<212> TYPE: RNA
<213> ORGANISM: Artificial Sequence
<220> FEATURE:
<223> OTHER INFORMATION: Synthetic Construct

<400> SEQUENCE: 184
gggcucaccc cugauaggcu                                               20

<210> SEQ ID NO 185

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 185
ggggaggucu gggccuucca                                               20

<210> SEQ ID NO 186
<211> LENGTH: 20
<212> TYPE: RNA
<213> ORGANISM: Artificial Sequence
<220> FEATURE:
<223> OTHER INFORMATION: Synthetic Construct

<400> SEQUENCE: 186
ggggcugggc uuaucagccu                                               20

<210> SEQ ID NO 187
<211> LENGTH: 20
<212> TYPE: RNA
<213> ORGANISM: Artificial Sequence
<220> FEATURE:
<223> OTHER INFORMATION: Synthetic Construct

<400> SEQUENCE: 187
gggggagguc ugggccuucc                                               20

<210> SEQ ID NO 188
<211> LENGTH: 20
<212> TYPE: RNA
<213> ORGANISM: Artificial Sequence
<220> FEATURE:
<223> OTHER INFORMATION: Synthetic Construct

<400> SEQUENCE: 188
gggguugagg gcaggggcag                                               20

<210> SEQ ID NO 189
<211> LENGTH: 20
<212> TYPE: RNA
<213> ORGANISM: Artificial Sequence
<220> FEATURE:
<223> OTHER INFORMATION: Synthetic Construct

<400> SEQUENCE: 189
gggguugagg gcagggguag                                               20

<210> SEQ ID NO 190
<211> LENGTH: 20
<212> TYPE: RNA
<213> ORGANISM: Artificial Sequence
<220> FEATURE:
<223> OTHER INFORMATION: Synthetic Construct

<400> SEQUENCE: 190 ggguagggg cagaggccug                                                20

<210> SEQ ID NO 191
<211> LENGTH: 20
<212> TYPE: RNA
<213> ORGANISM: Artificial Sequence
<220> FEATURE:
<223> OTHER INFORMATION: Synthetic Construct

<400> SEQUENCE: 191
```

```
ggguucaccc cugauaggcu                                              20

<210> SEQ ID NO 192
<211> LENGTH: 20
<212> TYPE: RNA
<213> ORGANISM: Artificial Sequence
<220> FEATURE:
<223> OTHER INFORMATION: Synthetic Construct

<400> SEQUENCE: 192
ggguugaggg cagggggcagg                                             20

<210> SEQ ID NO 193
<211> LENGTH: 20
<212> TYPE: RNA
<213> ORGANISM: Artificial Sequence
<220> FEATURE:
<223> OTHER INFORMATION: Synthetic Construct

<400> SEQUENCE: 193
ggguugaggg caggguagg                                               20

<210> SEQ ID NO 194
<211> LENGTH: 20
<212> TYPE: RNA
<213> ORGANISM: Artificial Sequence
<220> FEATURE:
<223> OTHER INFORMATION: Synthetic Construct

<400> SEQUENCE: 194
gguacccaga ggcccagccu                                              20

<210> SEQ ID NO 195
<211> LENGTH: 20
<212> TYPE: RNA
<213> ORGANISM: Artificial Sequence
<220> FEATURE:
<223> OTHER INFORMATION: Synthetic Construct

<400> SEQUENCE: 195
gguacccaga ggcccggccu                                              20

<210> SEQ ID NO 196
<211> LENGTH: 20
<212> TYPE: RNA
<213> ORGANISM: Artificial Sequence
<220> FEATURE:
<223> OTHER INFORMATION: Synthetic Construct

<400> SEQUENCE: 196 gguaggggc agaggccugu                                               20

<210> SEQ ID NO 197
<211> LENGTH: 20
<212> TYPE: RNA
<213> ORGANISM: Artificial Sequence
<220> FEATURE:
<223> OTHER INFORMATION: Synthetic Construct

<400> SEQUENCE: 197
gguccuauca guaaccugcu                                              20

<210> SEQ ID NO 198
<211> LENGTH: 20
<212> TYPE: RNA
```

```
<213> ORGANISM: Artificial Sequence
<220> FEATURE:
<223> OTHER INFORMATION: Synthetic Construct

<400> SEQUENCE: 198
ggugucaccc agggcucacc                                              20

<210> SEQ ID NO 199
<211> LENGTH: 20
<212> TYPE: RNA
<213> ORGANISM: Artificial Sequence
<220> FEATURE:
<223> OTHER INFORMATION: Synthetic Construct

<400> SEQUENCE: 199
ggugucaccc aggguucacc                                              20

<210> SEQ ID NO 200
<211> LENGTH: 20
<212> TYPE: RNA
<213> ORGANISM: Artificial Sequence
<220> FEATURE:
<223> OTHER INFORMATION: Synthetic Construct

<400> SEQUENCE: 200
gguucacccc ugauaggcug                                              20

<210> SEQ ID NO 201
<211> LENGTH: 20
<212> TYPE: RNA
<213> ORGANISM: Artificial Sequence
<220> FEATURE:
<223> OTHER INFORMATION: Synthetic Construct

<400> SEQUENCE: 201
gguucaggcc uugccccagg                                              20

<210> SEQ ID NO 202
<211> LENGTH: 20
<212> TYPE: RNA
<213> ORGANISM: Artificial Sequence
<220> FEATURE:
<223> OTHER INFORMATION: Synthetic Construct

<400> SEQUENCE: 202
guaaccugcu gagggagguc                                              20

<210> SEQ ID NO 203
<211> LENGTH: 20
<212> TYPE: RNA
<213> ORGANISM: Artificial Sequence
<220> FEATURE:
<223> OTHER INFORMATION: Synthetic Construct

<400> SEQUENCE: 203
guacccagag gcccagccug                                              20

<210> SEQ ID NO 204
<211> LENGTH: 20
<212> TYPE: RNA
<213> ORGANISM: Artificial Sequence
<220> FEATURE:
<223> OTHER INFORMATION: Synthetic Construct

<400> SEQUENCE: 204
guacccagag gcccggccug                                              20
```

<210> SEQ ID NO 205
<211> LENGTH: 20
<212> TYPE: RNA
<213> ORGANISM: Artificial Sequence
<220> FEATURE:
<223> OTHER INFORMATION: Synthetic Construct

<400> SEQUENCE: 205 guaggggca gaggccugug                                              20

<210> SEQ ID NO 206
<211> LENGTH: 20
<212> TYPE: RNA
<213> ORGANISM: Artificial Sequence
<220> FEATURE:
<223> OTHER INFORMATION: Synthetic Construct

<400> SEQUENCE: 206
gucacgaguc ugaucuccac                                             20

<210> SEQ ID NO 207
<211> LENGTH: 20
<212> TYPE: RNA
<213> ORGANISM: Artificial Sequence
<220> FEATURE:
<223> OTHER INFORMATION: Synthetic Construct

<400> SEQUENCE: 207
guccccgagc caggaaacug                                             20

<210> SEQ ID NO 208
<211> LENGTH: 20
<212> TYPE: RNA
<213> ORGANISM: Artificial Sequence
<220> FEATURE:
<223> OTHER INFORMATION: Synthetic Construct

<400> SEQUENCE: 208
gucccugagc caggaaacug                                             20

<210> SEQ ID NO 209
<211> LENGTH: 20
<212> TYPE: RNA
<213> ORGANISM: Artificial Sequence
<220> FEATURE:
<223> OTHER INFORMATION: Synthetic Construct

<400> SEQUENCE: 209
guccuaucag uaaccugcug                                             20

<210> SEQ ID NO 210
<211> LENGTH: 20
<212> TYPE: RNA
<213> ORGANISM: Artificial Sequence
<220> FEATURE:
<223> OTHER INFORMATION: Synthetic Construct

<400> SEQUENCE: 210
gucucugccg cugucuuuga                                             20

<210> SEQ ID NO 211
<211> LENGTH: 20
<212> TYPE: RNA
<213> ORGANISM: Artificial Sequence
<220> FEATURE:

<223> OTHER INFORMATION: Synthetic Construct

<400> SEQUENCE: 211
gugcucaaag acagcggcag                                               20

<210> SEQ ID NO 212
<211> LENGTH: 20
<212> TYPE: RNA
<213> ORGANISM: Artificial Sequence
<220> FEATURE:
<223> OTHER INFORMATION: Synthetic Construct

<400> SEQUENCE: 212
guggaugugc ucaaagacag                                               20

<210> SEQ ID NO 213
<211> LENGTH: 20
<212> TYPE: RNA
<213> ORGANISM: Artificial Sequence
<220> FEATURE:
<223> OTHER INFORMATION: Synthetic Construct

<400> SEQUENCE: 213
guucaccccu gauaggcugg                                               20

<210> SEQ ID NO 214
<211> LENGTH: 20
<212> TYPE: RNA
<213> ORGANISM: Artificial Sequence
<220> FEATURE:
<223> OTHER INFORMATION: Synthetic Construct

<400> SEQUENCE: 214
guucaggccu ugccccaggc                                               20

<210> SEQ ID NO 215
<211> LENGTH: 20
<212> TYPE: RNA
<213> ORGANISM: Artificial Sequence
<220> FEATURE:
<223> OTHER INFORMATION: Synthetic Construct

<400> SEQUENCE: 215
guuuccuggc ucagggacug                                               20

<210> SEQ ID NO 216
<211> LENGTH: 20
<212> TYPE: RNA
<213> ORGANISM: Artificial Sequence
<220> FEATURE:
<223> OTHER INFORMATION: Synthetic Construct

<400> SEQUENCE: 216
guuuccuggc ucggggacug                                               20

<210> SEQ ID NO 217
<211> LENGTH: 20
<212> TYPE: RNA
<213> ORGANISM: Artificial Sequence
<220> FEATURE:
<223> OTHER INFORMATION: Synthetic Construct

<400> SEQUENCE: 217
uaaccugcug agggaggucu                                               20

```
<210> SEQ ID NO 218
<211> LENGTH: 20
<212> TYPE: RNA
<213> ORGANISM: Artificial Sequence
<220> FEATURE:
<223> OTHER INFORMATION: Synthetic Construct

<400> SEQUENCE: 218
uaaccugcug ggggaggucu                                               20

<210> SEQ ID NO 219
<211> LENGTH: 20
<212> TYPE: RNA
<213> ORGANISM: Artificial Sequence
<220> FEATURE:
<223> OTHER INFORMATION: Synthetic Construct

<400> SEQUENCE: 219
uacagggaua uucuaaguug                                               20

<210> SEQ ID NO 220
<211> LENGTH: 20
<212> TYPE: RNA
<213> ORGANISM: Artificial Sequence
<220> FEATURE:
<223> OTHER INFORMATION: Synthetic Construct

<400> SEQUENCE: 220
uagaauaucc cuauaaggcu                                               20

<210> SEQ ID NO 221
<211> LENGTH: 20
<212> TYPE: RNA
<213> ORGANISM: Artificial Sequence
<220> FEATURE:
<223> OTHER INFORMATION: Synthetic Construct

<400> SEQUENCE: 221
uagaauaucc cuguaaggcu                                               20

<210> SEQ ID NO 222
<211> LENGTH: 20
<212> TYPE: RNA
<213> ORGANISM: Artificial Sequence
<220> FEATURE:
<223> OTHER INFORMATION: Synthetic Construct

<400> SEQUENCE: 222
uagucucugc cgcugucuuu                                               20

<210> SEQ ID NO 223
<211> LENGTH: 20
<212> TYPE: RNA
<213> ORGANISM: Artificial Sequence
<220> FEATURE:
<223> OTHER INFORMATION: Synthetic Construct

<400> SEQUENCE: 223
uauagggaua uucuaaguug                                               20

<210> SEQ ID NO 224
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 224
uaucaggggu gaacccuggg                                              20

<210> SEQ ID NO 225
<211> LENGTH: 20
<212> TYPE: RNA
<213> ORGANISM: Artificial Sequence
<220> FEATURE:
<223> OTHER INFORMATION: Synthetic Construct

<400> SEQUENCE: 225
uaucaggggu gagcccuggg                                              20

<210> SEQ ID NO 226
<211> LENGTH: 20
<212> TYPE: RNA
<213> ORGANISM: Artificial Sequence
<220> FEATURE:
<223> OTHER INFORMATION: Synthetic Construct

<400> SEQUENCE: 226
uaucaguaac cugcugaggg                                              20

<210> SEQ ID NO 227
<211> LENGTH: 20
<212> TYPE: RNA
<213> ORGANISM: Artificial Sequence
<220> FEATURE:
<223> OTHER INFORMATION: Synthetic Construct

<400> SEQUENCE: 227
uaucaguaac cugcuggggg                                              20

<210> SEQ ID NO 228
<211> LENGTH: 20
<212> TYPE: RNA
<213> ORGANISM: Artificial Sequence
<220> FEATURE:
<223> OTHER INFORMATION: Synthetic Construct

<400> SEQUENCE: 228
ucagacucgu gacugcugga                                              20

<210> SEQ ID NO 229
<211> LENGTH: 20
<212> TYPE: RNA
<213> ORGANISM: Artificial Sequence
<220> FEATURE:
<223> OTHER INFORMATION: Synthetic Construct

<400> SEQUENCE: 229
ucagggacug cgaggcauca                                              20

<210> SEQ ID NO 230
<211> LENGTH: 20
<212> TYPE: RNA
<213> ORGANISM: Artificial Sequence
<220> FEATURE:
<223> OTHER INFORMATION: Synthetic Construct

<400> SEQUENCE: 230
ucccauucca guuucuccau                                              20

<210> SEQ ID NO 231
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 231
ucccauuccg guuucuccau                                                    20

<210> SEQ ID NO 232
<211> LENGTH: 20
<212> TYPE: RNA
<213> ORGANISM: Artificial Sequence
<220> FEATURE:
<223> OTHER INFORMATION: Synthetic Construct

<400> SEQUENCE: 232
ucccuauaag gcuggaggcc                                                    20

<210> SEQ ID NO 233
<211> LENGTH: 20
<212> TYPE: RNA
<213> ORGANISM: Artificial Sequence
<220> FEATURE:
<223> OTHER INFORMATION: Synthetic Construct

<400> SEQUENCE: 233
ucccucagca gguuacugau                                                    20

<210> SEQ ID NO 234
<211> LENGTH: 20
<212> TYPE: RNA
<213> ORGANISM: Artificial Sequence
<220> FEATURE:
<223> OTHER INFORMATION: Synthetic Construct

<400> SEQUENCE: 234
ucccuguaag gcuggaggcc                                                    20

<210> SEQ ID NO 235
<211> LENGTH: 20
<212> TYPE: RNA
<213> ORGANISM: Artificial Sequence
<220> FEATURE:
<223> OTHER INFORMATION: Synthetic Construct

<400> SEQUENCE: 235
uccuaucagu aaccugcuga                                                    20

<210> SEQ ID NO 236
<211> LENGTH: 20
<212> TYPE: RNA
<213> ORGANISM: Artificial Sequence
<220> FEATURE:
<223> OTHER INFORMATION: Synthetic Construct

<400> SEQUENCE: 236
uccugaugcc ucgcaguccc                                                    20

<210> SEQ ID NO 237
<211> LENGTH: 20
<212> TYPE: RNA
<213> ORGANISM: Artificial Sequence
<220> FEATURE:
<223> OTHER INFORMATION: Synthetic Construct

<400> SEQUENCE: 237
```
ucggggacug cgaggcauca        20

<210> SEQ ID NO 238
<211> LENGTH: 20
<212> TYPE: RNA
<213> ORGANISM: Artificial Sequence
<220> FEATURE:
<223> OTHER INFORMATION: Synthetic Construct

<400> SEQUENCE: 238
ucuggaugga gaaacuggaa        20

<210> SEQ ID NO 239
<211> LENGTH: 20
<212> TYPE: RNA
<213> ORGANISM: Artificial Sequence
<220> FEATURE:
<223> OTHER INFORMATION: Synthetic Construct

<400> SEQUENCE: 239
ucuggccucc agccuuauag        20

<210> SEQ ID NO 240
<211> LENGTH: 20
<212> TYPE: RNA
<213> ORGANISM: Artificial Sequence
<220> FEATURE:
<223> OTHER INFORMATION: Synthetic Construct

<400> SEQUENCE: 240
ugagggcagg ggcagggggc        20

<210> SEQ ID NO 241
<211> LENGTH: 20
<212> TYPE: RNA
<213> ORGANISM: Artificial Sequence
<220> FEATURE:
<223> OTHER INFORMATION: Synthetic Construct

<400> SEQUENCE: 241
ugccucgcag uccccgagcc        20

<210> SEQ ID NO 242
<211> LENGTH: 20
<212> TYPE: RNA
<213> ORGANISM: Artificial Sequence
<220> FEATURE:
<223> OTHER INFORMATION: Synthetic Construct

<400> SEQUENCE: 242
ugccucgcag ucccugagcc        20

<210> SEQ ID NO 243
<211> LENGTH: 20
<212> TYPE: RNA
<213> ORGANISM: Artificial Sequence
<220> FEATURE:
<223> OTHER INFORMATION: Synthetic Construct

<400> SEQUENCE: 243
uggaaaggaa ggaagucuuu        20

<210> SEQ ID NO 244
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 244
uggaaaggaa ggaggucuuu                                              20

<210> SEQ ID NO 245
<211> LENGTH: 20
<212> TYPE: RNA
<213> ORGANISM: Artificial Sequence
<220> FEATURE:
<223> OTHER INFORMATION: Synthetic Construct

<400> SEQUENCE: 245 uggauggga ucuccaggca                                               20

<210> SEQ ID NO 246
<211> LENGTH: 20
<212> TYPE: RNA
<213> ORGANISM: Artificial Sequence
<220> FEATURE:
<223> OTHER INFORMATION: Synthetic Construct

<400> SEQUENCE: 246
uggagauccc auuccaguuu                                              20

<210> SEQ ID NO 247
<211> LENGTH: 20
<212> TYPE: RNA
<213> ORGANISM: Artificial Sequence
<220> FEATURE:
<223> OTHER INFORMATION: Synthetic Construct

<400> SEQUENCE: 247
uggagauccc auuccgguuu                                              20

<210> SEQ ID NO 248
<211> LENGTH: 20
<212> TYPE: RNA
<213> ORGANISM: Artificial Sequence
<220> FEATURE:
<223> OTHER INFORMATION: Synthetic Construct

<400> SEQUENCE: 248
uggauggaga aaccggaaug                                              20

<210> SEQ ID NO 249
<211> LENGTH: 20
<212> TYPE: RNA
<213> ORGANISM: Artificial Sequence
<220> FEATURE:
<223> OTHER INFORMATION: Synthetic Construct

<400> SEQUENCE: 249
uggauggaga aacuggaaug                                              20

<210> SEQ ID NO 250
<211> LENGTH: 20
<212> TYPE: RNA
<213> ORGANISM: Artificial Sequence
<220> FEATURE:
<223> OTHER INFORMATION: Synthetic Construct

<400> SEQUENCE: 250 uggccccuu ccagcaguca                                               20
```

<210> SEQ ID NO 251
<211> LENGTH: 20
<212> TYPE: RNA
<213> ORGANISM: Artificial Sequence
<220> FEATURE:
<223> OTHER INFORMATION: Synthetic Construct

<400> SEQUENCE: 251
ugggacuagu gcccaguuac                                                        20

<210> SEQ ID NO 252
<211> LENGTH: 20
<212> TYPE: RNA
<213> ORGANISM: Artificial Sequence
<220> FEATURE:
<223> OTHER INFORMATION: Synthetic Construct

<400> SEQUENCE: 252
ugggacuggu gcccaguuac                                                        20

<210> SEQ ID NO 253
<211> LENGTH: 20
<212> TYPE: RNA
<213> ORGANISM: Artificial Sequence
<220> FEATURE:
<223> OTHER INFORMATION: Synthetic Construct

<400> SEQUENCE: 253
ugggguugag ggcaggggca                                                        20

<210> SEQ ID NO 254
<211> LENGTH: 20
<212> TYPE: RNA
<213> ORGANISM: Artificial Sequence
<220> FEATURE:
<223> OTHER INFORMATION: Synthetic Construct

<400> SEQUENCE: 254
ugggguugag ggcaggggua                                                        20

<210> SEQ ID NO 255
<211> LENGTH: 20
<212> TYPE: RNA
<213> ORGANISM: Artificial Sequence
<220> FEATURE:
<223> OTHER INFORMATION: Synthetic Construct

<400> SEQUENCE: 255
ugucacccag gguucacccc                                                        20

<210> SEQ ID NO 256
<211> LENGTH: 20
<212> TYPE: RNA
<213> ORGANISM: Artificial Sequence
<220> FEATURE:
<223> OTHER INFORMATION: Synthetic Construct

<400> SEQUENCE: 256
uuagaauauc ccuauaaggc                                                        20

<210> SEQ ID NO 257
<211> LENGTH: 20
<212> TYPE: RNA
<213> ORGANISM: Artificial Sequence
<220> FEATURE:
<223> OTHER INFORMATION: Synthetic Construct

<400> SEQUENCE: 257
uuagaauauc ccuguaaggc                                    20

<210> SEQ ID NO 258
<211> LENGTH: 20
<212> TYPE: RNA
<213> ORGANISM: Artificial Sequence
<220> FEATURE:
<223> OTHER INFORMATION: Synthetic Construct

<400> SEQUENCE: 258
uuagggagaa agcccccccga                                   20

<210> SEQ ID NO 259
<211> LENGTH: 20
<212> TYPE: RNA
<213> ORGANISM: Artificial Sequence
<220> FEATURE:
<223> OTHER INFORMATION: Synthetic Construct

<400> SEQUENCE: 259
uuagggagaa ggcccccccga                                   20

<210> SEQ ID NO 260
<211> LENGTH: 20
<212> TYPE: RNA
<213> ORGANISM: Artificial Sequence
<220> FEATURE:
<223> OTHER INFORMATION: Synthetic Construct

<400> SEQUENCE: 260
uucaggccuu gccccaggcc                                    20

<210> SEQ ID NO 261
<211> LENGTH: 20
<212> TYPE: RNA
<213> ORGANISM: Artificial Sequence
<220> FEATURE:
<223> OTHER INFORMATION: Synthetic Construct

<400> SEQUENCE: 261
uucaggccuu gccccaggcu                                    20

<210> SEQ ID NO 262
<211> LENGTH: 20
<212> TYPE: RNA
<213> ORGANISM: Artificial Sequence
<220> FEATURE:
<223> OTHER INFORMATION: Synthetic Construct

<400> SEQUENCE: 262
uuccagcagu cacaugaguc                                    20

<210> SEQ ID NO 263
<211> LENGTH: 20
<212> TYPE: RNA
<213> ORGANISM: Artificial Sequence
<220> FEATURE:
<223> OTHER INFORMATION: Synthetic Construct

<400> SEQUENCE: 263
uuccuggcuc agggacugcg                                    20

<210> SEQ ID NO 264

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 264
uuccuggcuc ggggacugcg                                               20

<210> SEQ ID NO 265
<211> LENGTH: 20
<212> TYPE: RNA
<213> ORGANISM: Artificial Sequence
<220> FEATURE:
<223> OTHER INFORMATION: Synthetic Construct

<400> SEQUENCE: 265
uucucaguuu ccuggcucag                                               20

<210> SEQ ID NO 266
<211> LENGTH: 20
<212> TYPE: RNA
<213> ORGANISM: Artificial Sequence
<220> FEATURE:
<223> OTHER INFORMATION: Synthetic Construct

<400> SEQUENCE: 266
uucucaguuu ccuggcucgg                                               20

<210> SEQ ID NO 267
<211> LENGTH: 20
<212> TYPE: RNA
<213> ORGANISM: Artificial Sequence
<220> FEATURE:
<223> OTHER INFORMATION: Synthetic Construct

<400> SEQUENCE: 267
uugccccagg ccgggccucu                                               20

<210> SEQ ID NO 268
<211> LENGTH: 20
<212> TYPE: RNA
<213> ORGANISM: Artificial Sequence
<220> FEATURE:
<223> OTHER INFORMATION: Synthetic Construct

<400> SEQUENCE: 268
uugccccagg cugggccucu                                               20

<210> SEQ ID NO 269
<211> LENGTH: 20
<212> TYPE: RNA
<213> ORGANISM: Artificial Sequence
<220> FEATURE:
<223> OTHER INFORMATION: Synthetic Construct

<400> SEQUENCE: 269
uuucucccua aaucccgug                                                20

<210> SEQ ID NO 270
<211> LENGTH: 20
<212> TYPE: RNA
<213> ORGANISM: Artificial Sequence
<220> FEATURE:
<223> OTHER INFORMATION: Synthetic Construct

<400> SEQUENCE: 270
```

```
aaaaaggaga cagagcuggg                                              20

<210> SEQ ID NO 271
<211> LENGTH: 20
<212> TYPE: RNA
<213> ORGANISM: Artificial Sequence
<220> FEATURE:
<223> OTHER INFORMATION: Synthetic Construct

<400> SEQUENCE: 271
aaaaggagac agagcuggga                                              20

<210> SEQ ID NO 272
<211> LENGTH: 20
<212> TYPE: RNA
<213> ORGANISM: Artificial Sequence
<220> FEATURE:
<223> OTHER INFORMATION: Synthetic Construct

<400> SEQUENCE: 272
aaaccggaau gggaucucca                                              20

<210> SEQ ID NO 273
<211> LENGTH: 20
<212> TYPE: RNA
<213> ORGANISM: Artificial Sequence
<220> FEATURE:
<223> OTHER INFORMATION: Synthetic Construct

<400> SEQUENCE: 273
aaacugggac acauagucuc                                              20

<210> SEQ ID NO 274
<211> LENGTH: 20
<212> TYPE: RNA
<213> ORGANISM: Artificial Sequence
<220> FEATURE:
<223> OTHER INFORMATION: Synthetic Construct

<400> SEQUENCE: 274
aaagacagcu cgcagagacu                                              20

<210> SEQ ID NO 275
<211> LENGTH: 20
<212> TYPE: RNA
<213> ORGANISM: Artificial Sequence
<220> FEATURE:
<223> OTHER INFORMATION: Synthetic Construct

<400> SEQUENCE: 275 aaagccccccc gaugguuggc                                             20

<210> SEQ ID NO 276
<211> LENGTH: 20
<212> TYPE: RNA
<213> ORGANISM: Artificial Sequence
<220> FEATURE:
<223> OTHER INFORMATION: Synthetic Construct

<400> SEQUENCE: 276
aaaggaagga agucuuucug                                              20

<210> SEQ ID NO 277
<211> LENGTH: 20
<212> TYPE: RNA
```

<213> ORGANISM: Artificial Sequence
<220> FEATURE:
<223> OTHER INFORMATION: Synthetic Construct

<400> SEQUENCE: 277
aaaggaagga ggucuuucug                                                   20

<210> SEQ ID NO 278
<211> LENGTH: 20
<212> TYPE: RNA
<213> ORGANISM: Artificial Sequence
<220> FEATURE:
<223> OTHER INFORMATION: Synthetic Construct

<400> SEQUENCE: 278
aaaucuggcc uccagccuua                                                   20

<210> SEQ ID NO 279
<211> LENGTH: 20
<212> TYPE: RNA
<213> ORGANISM: Artificial Sequence
<220> FEATURE:
<223> OTHER INFORMATION: Synthetic Construct

<400> SEQUENCE: 279
aacagggcca gggcugggcu                                                   20

<210> SEQ ID NO 280
<211> LENGTH: 20
<212> TYPE: RNA
<213> ORGANISM: Artificial Sequence
<220> FEATURE:
<223> OTHER INFORMATION: Synthetic Construct

<400> SEQUENCE: 280
aacagggccg gggcugggcu                                                   20

<210> SEQ ID NO 281
<211> LENGTH: 20
<212> TYPE: RNA
<213> ORGANISM: Artificial Sequence
<220> FEATURE:
<223> OTHER INFORMATION: Synthetic Construct

<400> SEQUENCE: 281
aaccaucggg gggccuucuc                                                   20

<210> SEQ ID NO 282
<211> LENGTH: 20
<212> TYPE: RNA
<213> ORGANISM: Artificial Sequence
<220> FEATURE:
<223> OTHER INFORMATION: Synthetic Construct

<400> SEQUENCE: 282
aaccaucggg gggcuuucuc                                                   20

<210> SEQ ID NO 283
<211> LENGTH: 20
<212> TYPE: RNA
<213> ORGANISM: Artificial Sequence
<220> FEATURE:
<223> OTHER INFORMATION: Synthetic Construct

<400> SEQUENCE: 283
aaccggaaug ggaucuccag                                                   20

```
<210> SEQ ID NO 284
<211> LENGTH: 20
<212> TYPE: RNA
<213> ORGANISM: Artificial Sequence
<220> FEATURE:
<223> OTHER INFORMATION: Synthetic Construct

<400> SEQUENCE: 284
aaccugcuga gggaggucug                                                    20

<210> SEQ ID NO 285
<211> LENGTH: 20
<212> TYPE: RNA
<213> ORGANISM: Artificial Sequence
<220> FEATURE:
<223> OTHER INFORMATION: Synthetic Construct

<400> SEQUENCE: 285
aaccugcugg gggaggucug                                                    20

<210> SEQ ID NO 286
<211> LENGTH: 20
<212> TYPE: RNA
<213> ORGANISM: Artificial Sequence
<220> FEATURE:
<223> OTHER INFORMATION: Synthetic Construct

<400> SEQUENCE: 286
aacguaacug ggcacuaguc                                                    20

<210> SEQ ID NO 287
<211> LENGTH: 20
<212> TYPE: RNA
<213> ORGANISM: Artificial Sequence
<220> FEATURE:
<223> OTHER INFORMATION: Synthetic Construct

<400> SEQUENCE: 287
aacuggaaug ggaucuccag                                                    20

<210> SEQ ID NO 288
<211> LENGTH: 20
<212> TYPE: RNA
<213> ORGANISM: Artificial Sequence
<220> FEATURE:
<223> OTHER INFORMATION: Synthetic Construct

<400> SEQUENCE: 288
aacugggaca cauagucucu                                                    20

<210> SEQ ID NO 289
<211> LENGTH: 20
<212> TYPE: RNA
<213> ORGANISM: Artificial Sequence
<220> FEATURE:
<223> OTHER INFORMATION: Synthetic Construct

<400> SEQUENCE: 289
aacugggcac cagucccagc                                                    20

<210> SEQ ID NO 290
<211> LENGTH: 20
<212> TYPE: RNA
<213> ORGANISM: Artificial Sequence
<220> FEATURE:
```

<223> OTHER INFORMATION: Synthetic Construct

<400> SEQUENCE: 290
aacugggcac uagucccagc                                                   20

<210> SEQ ID NO 291
<211> LENGTH: 20
<212> TYPE: RNA
<213> ORGANISM: Artificial Sequence
<220> FEATURE:
<223> OTHER INFORMATION: Synthetic Construct

<400> SEQUENCE: 291
aacuuagaau aucccuauaa                                                   20

<210> SEQ ID NO 292
<211> LENGTH: 20
<212> TYPE: RNA
<213> ORGANISM: Artificial Sequence
<220> FEATURE:
<223> OTHER INFORMATION: Synthetic Construct

<400> SEQUENCE: 292
aacuuagaau aucccuguaa                                                   20

<210> SEQ ID NO 293
<211> LENGTH: 20
<212> TYPE: RNA
<213> ORGANISM: Artificial Sequence
<220> FEATURE:
<223> OTHER INFORMATION: Synthetic Construct

<400> SEQUENCE: 293
aagacagcgg cagagacuau                                                   20

<210> SEQ ID NO 294
<211> LENGTH: 20
<212> TYPE: RNA
<213> ORGANISM: Artificial Sequence
<220> FEATURE:
<223> OTHER INFORMATION: Synthetic Construct

<400> SEQUENCE: 294
aagacagcuc gcagagacua                                                   20

<210> SEQ ID NO 295
<211> LENGTH: 20
<212> TYPE: RNA
<213> ORGANISM: Artificial Sequence
<220> FEATURE:
<223> OTHER INFORMATION: Synthetic Construct

<400> SEQUENCE: 295
aagcccagcc cuggcccugu                                                   20

<210> SEQ ID NO 296
<211> LENGTH: 20
<212> TYPE: RNA
<213> ORGANISM: Artificial Sequence
<220> FEATURE:
<223> OTHER INFORMATION: Synthetic Construct

<400> SEQUENCE: 296 aagcccccg augguuggcu                                                    20

```
<210> SEQ ID NO 297
<211> LENGTH: 20
<212> TYPE: RNA
<213> ORGANISM: Artificial Sequence
<220> FEATURE:
<223> OTHER INFORMATION: Synthetic Construct

<400> SEQUENCE: 297
aagcugcagg cuccgcaagg                                              20

<210> SEQ ID NO 298
<211> LENGTH: 20
<212> TYPE: RNA
<213> ORGANISM: Artificial Sequence
<220> FEATURE:
<223> OTHER INFORMATION: Synthetic Construct

<400> SEQUENCE: 298
aaggaaggaa gucuuucugg                                              20

<210> SEQ ID NO 299
<211> LENGTH: 20
<212> TYPE: RNA
<213> ORGANISM: Artificial Sequence
<220> FEATURE:
<223> OTHER INFORMATION: Synthetic Construct

<400> SEQUENCE: 299
aaggaaggag gucuuucugg                                              20

<210> SEQ ID NO 300
<211> LENGTH: 20
<212> TYPE: RNA
<213> ORGANISM: Artificial Sequence
<220> FEATURE:
<223> OTHER INFORMATION: Synthetic Construct

<400> SEQUENCE: 300
aaggaagucu uucuggacag                                              20

<210> SEQ ID NO 301
<211> LENGTH: 20
<212> TYPE: RNA
<213> ORGANISM: Artificial Sequence
<220> FEATURE:
<223> OTHER INFORMATION: Synthetic Construct

<400> SEQUENCE: 301
aaggaggucu uucuggacag                                              20

<210> SEQ ID NO 302
<211> LENGTH: 20
<212> TYPE: RNA
<213> ORGANISM: Artificial Sequence
<220> FEATURE:
<223> OTHER INFORMATION: Synthetic Construct

<400> SEQUENCE: 302
aaggcccaga ccuccccag                                               20

<210> SEQ ID NO 303
<211> LENGTH: 20
<212> TYPE: RNA
<213> ORGANISM: Artificial Sequence
<220> FEATURE:
<223> OTHER INFORMATION: Synthetic Construct
```

<400> SEQUENCE: 303
aaggcccaga ccucccucag                                          20

<210> SEQ ID NO 304
<211> LENGTH: 20
<212> TYPE: RNA
<213> ORGANISM: Artificial Sequence
<220> FEATURE:
<223> OTHER INFORMATION: Synthetic Construct

<400> SEQUENCE: 304
aaggcccccc gaugguuggc                                          20

<210> SEQ ID NO 305
<211> LENGTH: 20
<212> TYPE: RNA
<213> ORGANISM: Artificial Sequence
<220> FEATURE:
<223> OTHER INFORMATION: Synthetic Construct

<400> SEQUENCE: 305
aagguucagg ccuugcccca                                          20

<210> SEQ ID NO 306
<211> LENGTH: 20
<212> TYPE: RNA
<213> ORGANISM: Artificial Sequence
<220> FEATURE:
<223> OTHER INFORMATION: Synthetic Construct

<400> SEQUENCE: 306
aagucccuga ucagacugca                                          20

<210> SEQ ID NO 307
<211> LENGTH: 20
<212> TYPE: RNA
<213> ORGANISM: Artificial Sequence
<220> FEATURE:
<223> OTHER INFORMATION: Synthetic Construct

<400> SEQUENCE: 307
aagucuuucu ggacagagcu                                          20

<210> SEQ ID NO 308
<211> LENGTH: 20
<212> TYPE: RNA
<213> ORGANISM: Artificial Sequence
<220> FEATURE:
<223> OTHER INFORMATION: Synthetic Construct

<400> SEQUENCE: 308
aauaucccua uaaggcugga                                          20

<210> SEQ ID NO 309
<211> LENGTH: 20
<212> TYPE: RNA
<213> ORGANISM: Artificial Sequence
<220> FEATURE:
<223> OTHER INFORMATION: Synthetic Construct

<400> SEQUENCE: 309
aauaucccug uaaggcugga                                          20

<210> SEQ ID NO 310
<211> LENGTH: 20

```
<212> TYPE: RNA
<213> ORGANISM: Artificial Sequence
<220> FEATURE:
<223> OTHER INFORMATION: Synthetic Construct

<400> SEQUENCE: 310
acaacuuaga auaucccuau                                               20

<210> SEQ ID NO 311
<211> LENGTH: 20
<212> TYPE: RNA
<213> ORGANISM: Artificial Sequence
<220> FEATURE:
<223> OTHER INFORMATION: Synthetic Construct

<400> SEQUENCE: 311
acaacuuaga auaucccugu                                               20

<210> SEQ ID NO 312
<211> LENGTH: 20
<212> TYPE: RNA
<213> ORGANISM: Artificial Sequence
<220> FEATURE:
<223> OTHER INFORMATION: Synthetic Construct

<400> SEQUENCE: 312
acacauaguc ucugccgcug                                               20

<210> SEQ ID NO 313
<211> LENGTH: 20
<212> TYPE: RNA
<213> ORGANISM: Artificial Sequence
<220> FEATURE:
<223> OTHER INFORMATION: Synthetic Construct

<400> SEQUENCE: 313
acacauaguc ucugcgagcu                                               20

<210> SEQ ID NO 314
<211> LENGTH: 20
<212> TYPE: RNA
<213> ORGANISM: Artificial Sequence
<220> FEATURE:
<223> OTHER INFORMATION: Synthetic Construct

<400> SEQUENCE: 314
acagagcugg gacuagugcc                                               20

<210> SEQ ID NO 315
<211> LENGTH: 20
<212> TYPE: RNA
<213> ORGANISM: Artificial Sequence
<220> FEATURE:
<223> OTHER INFORMATION: Synthetic Construct

<400> SEQUENCE: 315
acagagcugg gacuggugcc                                               20

<210> SEQ ID NO 316
<211> LENGTH: 20
<212> TYPE: RNA
<213> ORGANISM: Artificial Sequence
<220> FEATURE:
<223> OTHER INFORMATION: Synthetic Construct

<400> SEQUENCE: 316
```
acagaugguc uggauggaga                                             20

<210> SEQ ID NO 317
<211> LENGTH: 20
<212> TYPE: RNA
<213> ORGANISM: Artificial Sequence
<220> FEATURE:
<223> OTHER INFORMATION: Synthetic Construct

<400> SEQUENCE: 317
acagcggcag agacuaugug                                             20

<210> SEQ ID NO 318
<211> LENGTH: 20
<212> TYPE: RNA
<213> ORGANISM: Artificial Sequence
<220> FEATURE:
<223> OTHER INFORMATION: Synthetic Construct

<400> SEQUENCE: 318
acagcucgca gagacuaugu                                             20

<210> SEQ ID NO 319
<211> LENGTH: 20
<212> TYPE: RNA
<213> ORGANISM: Artificial Sequence
<220> FEATURE:
<223> OTHER INFORMATION: Synthetic Construct

<400> SEQUENCE: 319
acaggccucu gcccccuacc                                             20

<210> SEQ ID NO 320
<211> LENGTH: 20
<212> TYPE: RNA
<213> ORGANISM: Artificial Sequence
<220> FEATURE:
<223> OTHER INFORMATION: Synthetic Construct

<400> SEQUENCE: 320
acaggccucu gcccccugcc                                             20

<210> SEQ ID NO 321
<211> LENGTH: 20
<212> TYPE: RNA
<213> ORGANISM: Artificial Sequence
<220> FEATURE:
<223> OTHER INFORMATION: Synthetic Construct

<400> SEQUENCE: 321
acagguguca cccagggcuc                                             20

<210> SEQ ID NO 322
<211> LENGTH: 20
<212> TYPE: RNA
<213> ORGANISM: Artificial Sequence
<220> FEATURE:
<223> OTHER INFORMATION: Synthetic Construct

<400> SEQUENCE: 322
acagguguca cccaggguuc                                             20

<210> SEQ ID NO 323
<211> LENGTH: 20
<212> TYPE: RNA
<213> ORGANISM: Artificial Sequence
<220> FEATURE:
<223> OTHER INFORMATION: Synthetic Construct

<400> SEQUENCE: 323
acauagucuc ugccgcuguc                                                     20

<210> SEQ ID NO 324
<211> LENGTH: 20
<212> TYPE: RNA
<213> ORGANISM: Artificial Sequence
<220> FEATURE:
<223> OTHER INFORMATION: Synthetic Construct

<400> SEQUENCE: 324
acauagucuc ugcgagcugu                                                     20

<210> SEQ ID NO 325
<211> LENGTH: 20
<212> TYPE: RNA
<213> ORGANISM: Artificial Sequence
<220> FEATURE:
<223> OTHER INFORMATION: Synthetic Construct

<400> SEQUENCE: 325
acaugagucu gaucuccacu                                                     20

<210> SEQ ID NO 326
<211> LENGTH: 20
<212> TYPE: RNA
<213> ORGANISM: Artificial Sequence
<220> FEATURE:
<223> OTHER INFORMATION: Synthetic Construct

<400> SEQUENCE: 326
accaacguaa cugggcacca                                                     20

<210> SEQ ID NO 327
<211> LENGTH: 20
<212> TYPE: RNA
<213> ORGANISM: Artificial Sequence
<220> FEATURE:
<223> OTHER INFORMATION: Synthetic Construct

<400> SEQUENCE: 327
accaacguaa cugggcacua                                                     20

<210> SEQ ID NO 328
<211> LENGTH: 20
<212> TYPE: RNA
<213> ORGANISM: Artificial Sequence
<220> FEATURE:
<223> OTHER INFORMATION: Synthetic Construct

<400> SEQUENCE: 328
accaguccca gcucugucuc                                                     20

<210> SEQ ID NO 329
<211> LENGTH: 20
<212> TYPE: RNA
<213> ORGANISM: Artificial Sequence
<220> FEATURE:
<223> OTHER INFORMATION: Synthetic Construct

<400> SEQUENCE: 329
accagugagc agcaacaggg                                                     20

```
<210> SEQ ID NO 330
<211> LENGTH: 20
<212> TYPE: RNA
<213> ORGANISM: Artificial Sequence
<220> FEATURE:
<223> OTHER INFORMATION: Synthetic Construct

<400> SEQUENCE: 330
acccagaggc ccagccuggg                                           20

<210> SEQ ID NO 331
<211> LENGTH: 20
<212> TYPE: RNA
<213> ORGANISM: Artificial Sequence
<220> FEATURE:
<223> OTHER INFORMATION: Synthetic Construct

<400> SEQUENCE: 331
acccagaggc ccggccuggg                                           20

<210> SEQ ID NO 332
<211> LENGTH: 20
<212> TYPE: RNA
<213> ORGANISM: Artificial Sequence
<220> FEATURE:
<223> OTHER INFORMATION: Synthetic Construct

<400> SEQUENCE: 332
accccugccc ucaaccccag                                           20

<210> SEQ ID NO 333
<211> LENGTH: 20
<212> TYPE: RNA
<213> ORGANISM: Artificial Sequence
<220> FEATURE:
<223> OTHER INFORMATION: Synthetic Construct

<400> SEQUENCE: 333
acccugccug gagaucccau                                           20

<210> SEQ ID NO 334
<211> LENGTH: 20
<212> TYPE: RNA
<213> ORGANISM: Artificial Sequence
<220> FEATURE:
<223> OTHER INFORMATION: Synthetic Construct

<400> SEQUENCE: 334
acccuugcgg agccugcagc                                           20

<210> SEQ ID NO 335
<211> LENGTH: 20
<212> TYPE: RNA
<213> ORGANISM: Artificial Sequence
<220> FEATURE:
<223> OTHER INFORMATION: Synthetic Construct

<400> SEQUENCE: 335 accucccccca gcagguuacu                                          20

<210> SEQ ID NO 336
<211> LENGTH: 20
<212> TYPE: RNA
<213> ORGANISM: Artificial Sequence
<220> FEATURE:
<223> OTHER INFORMATION: Synthetic Construct
```

<400> SEQUENCE: 336
accucccuca gcagguuacu                                                    20

<210> SEQ ID NO 337
<211> LENGTH: 20
<212> TYPE: RNA
<213> ORGANISM: Artificial Sequence
<220> FEATURE:
<223> OTHER INFORMATION: Synthetic Construct

<400> SEQUENCE: 337
accugcugag ggaggucugg                                                    20

<210> SEQ ID NO 338
<211> LENGTH: 20
<212> TYPE: RNA
<213> ORGANISM: Artificial Sequence
<220> FEATURE:
<223> OTHER INFORMATION: Synthetic Construct

<400> SEQUENCE: 338
accugcuggg ggaggucugg                                                    20

<210> SEQ ID NO 339
<211> LENGTH: 20
<212> TYPE: RNA
<213> ORGANISM: Artificial Sequence
<220> FEATURE:
<223> OTHER INFORMATION: Synthetic Construct

<400> SEQUENCE: 339
acgagucuga ucuccacugc                                                    20

<210> SEQ ID NO 340
<211> LENGTH: 20
<212> TYPE: RNA
<213> ORGANISM: Artificial Sequence
<220> FEATURE:
<223> OTHER INFORMATION: Synthetic Construct

<400> SEQUENCE: 340
acggggauuu agggagaaag                                                    20

<210> SEQ ID NO 341
<211> LENGTH: 20
<212> TYPE: RNA
<213> ORGANISM: Artificial Sequence
<220> FEATURE:
<223> OTHER INFORMATION: Synthetic Construct

<400> SEQUENCE: 341
acggggauuu agggagaagg                                                    20

<210> SEQ ID NO 342
<211> LENGTH: 20
<212> TYPE: RNA
<213> ORGANISM: Artificial Sequence
<220> FEATURE:
<223> OTHER INFORMATION: Synthetic Construct

<400> SEQUENCE: 342
acguaacugg gcaccagucc                                                    20

<210> SEQ ID NO 343

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 343
acguaacugg gcacuagucc                                                 20

<210> SEQ ID NO 344
<211> LENGTH: 20
<212> TYPE: RNA
<213> ORGANISM: Artificial Sequence
<220> FEATURE:
<223> OTHER INFORMATION: Synthetic Construct

<400> SEQUENCE: 344
acuaguccca gcucugucuc                                                 20

<210> SEQ ID NO 345
<211> LENGTH: 20
<212> TYPE: RNA
<213> ORGANISM: Artificial Sequence
<220> FEATURE:
<223> OTHER INFORMATION: Synthetic Construct

<400> SEQUENCE: 345
acucgugacu gcuggaaggg                                                 20

<210> SEQ ID NO 346
<211> LENGTH: 20
<212> TYPE: RNA
<213> ORGANISM: Artificial Sequence
<220> FEATURE:
<223> OTHER INFORMATION: Synthetic Construct

<400> SEQUENCE: 346
acugcaaagg cugcaggcuc                                                 20

<210> SEQ ID NO 347
<211> LENGTH: 20
<212> TYPE: RNA
<213> ORGANISM: Artificial Sequence
<220> FEATURE:
<223> OTHER INFORMATION: Synthetic Construct

<400> SEQUENCE: 347
acugggacac auagucucug                                                 20

<210> SEQ ID NO 348
<211> LENGTH: 20
<212> TYPE: RNA
<213> ORGANISM: Artificial Sequence
<220> FEATURE:
<223> OTHER INFORMATION: Synthetic Construct

<400> SEQUENCE: 348
acugggcacc agucccagcu                                                 20

<210> SEQ ID NO 349
<211> LENGTH: 20
<212> TYPE: RNA
<213> ORGANISM: Artificial Sequence
<220> FEATURE:
<223> OTHER INFORMATION: Synthetic Construct

<400> SEQUENCE: 349
```
acugggcacu agucccagcu                                          20

<210> SEQ ID NO 350
<211> LENGTH: 20
<212> TYPE: RNA
<213> ORGANISM: Artificial Sequence
<220> FEATURE:
<223> OTHER INFORMATION: Synthetic Construct

<400> SEQUENCE: 350
acuggugccc aguuacguug                                          20

<210> SEQ ID NO 351
<211> LENGTH: 20
<212> TYPE: RNA
<213> ORGANISM: Artificial Sequence
<220> FEATURE:
<223> OTHER INFORMATION: Synthetic Construct

<400> SEQUENCE: 351
acuuagaaua ucccuauaag                                          20

<210> SEQ ID NO 352
<211> LENGTH: 20
<212> TYPE: RNA
<213> ORGANISM: Artificial Sequence
<220> FEATURE:
<223> OTHER INFORMATION: Synthetic Construct

<400> SEQUENCE: 352
acuuagaaua ucccuguaag                                          20

<210> SEQ ID NO 353
<211> LENGTH: 20
<212> TYPE: RNA
<213> ORGANISM: Artificial Sequence
<220> FEATURE:
<223> OTHER INFORMATION: Synthetic Construct

<400> SEQUENCE: 353
agaaaccgga augggaucuc                                          20

<210> SEQ ID NO 354
<211> LENGTH: 20
<212> TYPE: RNA
<213> ORGANISM: Artificial Sequence
<220> FEATURE:
<223> OTHER INFORMATION: Synthetic Construct

<400> SEQUENCE: 354
agaaacugga augggaucuc                                          20

<210> SEQ ID NO 355
<211> LENGTH: 20
<212> TYPE: RNA
<213> ORGANISM: Artificial Sequence
<220> FEATURE:
<223> OTHER INFORMATION: Synthetic Construct

<400> SEQUENCE: 355
agaaagcccc ccgaugguug                                          20

<210> SEQ ID NO 356
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 356
agaaggcccc ccgaugguug                                          20

<210> SEQ ID NO 357
<211> LENGTH: 20
<212> TYPE: RNA
<213> ORGANISM: Artificial Sequence
<220> FEATURE:
<223> OTHER INFORMATION: Synthetic Construct

<400> SEQUENCE: 357
agaauauccc uauaaggcug                                          20

<210> SEQ ID NO 358
<211> LENGTH: 20
<212> TYPE: RNA
<213> ORGANISM: Artificial Sequence
<220> FEATURE:
<223> OTHER INFORMATION: Synthetic Construct

<400> SEQUENCE: 358
agaauauccc uguaaggcug                                          20

<210> SEQ ID NO 359
<211> LENGTH: 20
<212> TYPE: RNA
<213> ORGANISM: Artificial Sequence
<220> FEATURE:
<223> OTHER INFORMATION: Synthetic Construct

<400> SEQUENCE: 359
agacagagcu gggacuagug                                          20

<210> SEQ ID NO 360
<211> LENGTH: 20
<212> TYPE: RNA
<213> ORGANISM: Artificial Sequence
<220> FEATURE:
<223> OTHER INFORMATION: Synthetic Construct

<400> SEQUENCE: 360
agacagcggc agagacuaug                                          20

<210> SEQ ID NO 361
<211> LENGTH: 20
<212> TYPE: RNA
<213> ORGANISM: Artificial Sequence
<220> FEATURE:
<223> OTHER INFORMATION: Synthetic Construct

<400> SEQUENCE: 361
agacagcucg cagagacuau                                          20

<210> SEQ ID NO 362
<211> LENGTH: 20
<212> TYPE: RNA
<213> ORGANISM: Artificial Sequence
<220> FEATURE:
<223> OTHER INFORMATION: Synthetic Construct

<400> SEQUENCE: 362
agaccaacgu aacugggcac                                          20
```

<210> SEQ ID NO 363
<211> LENGTH: 20
<212> TYPE: RNA
<213> ORGANISM: Artificial Sequence
<220> FEATURE:
<223> OTHER INFORMATION: Synthetic Construct

<400> SEQUENCE: 363
agaccucccc cagcagguua                                              20

<210> SEQ ID NO 364
<211> LENGTH: 20
<212> TYPE: RNA
<213> ORGANISM: Artificial Sequence
<220> FEATURE:
<223> OTHER INFORMATION: Synthetic Construct

<400> SEQUENCE: 364
agacugcaaa ggcugcaggc                                              20

<210> SEQ ID NO 365
<211> LENGTH: 20
<212> TYPE: RNA
<213> ORGANISM: Artificial Sequence
<220> FEATURE:
<223> OTHER INFORMATION: Synthetic Construct

<400> SEQUENCE: 365
agagcuggga cuagugccca                                              20

<210> SEQ ID NO 366
<211> LENGTH: 20
<212> TYPE: RNA
<213> ORGANISM: Artificial Sequence
<220> FEATURE:
<223> OTHER INFORMATION: Synthetic Construct

<400> SEQUENCE: 366
agagcuggga cuggugccca                                              20

<210> SEQ ID NO 367
<211> LENGTH: 20
<212> TYPE: RNA
<213> ORGANISM: Artificial Sequence
<220> FEATURE:
<223> OTHER INFORMATION: Synthetic Construct

<400> SEQUENCE: 367
agaggcccgg ccugggggcaa                                             20

<210> SEQ ID NO 368
<211> LENGTH: 20
<212> TYPE: RNA
<213> ORGANISM: Artificial Sequence
<220> FEATURE:
<223> OTHER INFORMATION: Synthetic Construct

<400> SEQUENCE: 368
agaucagacu caugugacug                                              20

<210> SEQ ID NO 369
<211> LENGTH: 20
<212> TYPE: RNA
<213> ORGANISM: Artificial Sequence
<220> FEATURE:

<223> OTHER INFORMATION: Synthetic Construct

<400> SEQUENCE: 369
agaucccauu ccaguuucuc                                                       20

<210> SEQ ID NO 370
<211> LENGTH: 20
<212> TYPE: RNA
<213> ORGANISM: Artificial Sequence
<220> FEATURE:
<223> OTHER INFORMATION: Synthetic Construct

<400> SEQUENCE: 370
agaucccauu ccgguuucuc                                                       20

<210> SEQ ID NO 371
<211> LENGTH: 20
<212> TYPE: RNA
<213> ORGANISM: Artificial Sequence
<220> FEATURE:
<223> OTHER INFORMATION: Synthetic Construct

<400> SEQUENCE: 371
agauggucug gauggagaaa                                                       20

<210> SEQ ID NO 372
<211> LENGTH: 20
<212> TYPE: RNA
<213> ORGANISM: Artificial Sequence
<220> FEATURE:
<223> OTHER INFORMATION: Synthetic Construct

<400> SEQUENCE: 372
agcaacaggg ccagggcugg                                                       20

<210> SEQ ID NO 373
<211> LENGTH: 20
<212> TYPE: RNA
<213> ORGANISM: Artificial Sequence
<220> FEATURE:
<223> OTHER INFORMATION: Synthetic Construct

<400> SEQUENCE: 373
agcagucaca ugagucugau                                                       20

<210> SEQ ID NO 374
<211> LENGTH: 20
<212> TYPE: RNA
<213> ORGANISM: Artificial Sequence
<220> FEATURE:
<223> OTHER INFORMATION: Synthetic Construct

<400> SEQUENCE: 374
agcagucacg agucugaucu                                                       20

<210> SEQ ID NO 375
<211> LENGTH: 20
<212> TYPE: RNA
<213> ORGANISM: Artificial Sequence
<220> FEATURE:
<223> OTHER INFORMATION: Synthetic Construct

<400> SEQUENCE: 375
agccaaccau cgggggggccu                                                      20

```
<210> SEQ ID NO 376
<211> LENGTH: 20
<212> TYPE: RNA
<213> ORGANISM: Artificial Sequence
<220> FEATURE:
<223> OTHER INFORMATION: Synthetic Construct

<400> SEQUENCE: 376
agccaaccau cgggggcuu                                                    20

<210> SEQ ID NO 377
<211> LENGTH: 20
<212> TYPE: RNA
<213> ORGANISM: Artificial Sequence
<220> FEATURE:
<223> OTHER INFORMATION: Synthetic Construct

<400> SEQUENCE: 377
agcccagccc cggcccuguu                                                   20

<210> SEQ ID NO 378
<211> LENGTH: 20
<212> TYPE: RNA
<213> ORGANISM: Artificial Sequence
<220> FEATURE:
<223> OTHER INFORMATION: Synthetic Construct

<400> SEQUENCE: 378
agcccagccc uggcccuguu                                                   20

<210> SEQ ID NO 379
<211> LENGTH: 20
<212> TYPE: RNA
<213> ORGANISM: Artificial Sequence
<220> FEATURE:
<223> OTHER INFORMATION: Synthetic Construct

<400> SEQUENCE: 379
agccccccga ugguuggcuc                                                   20

<210> SEQ ID NO 380
<211> LENGTH: 20
<212> TYPE: RNA
<213> ORGANISM: Artificial Sequence
<220> FEATURE:
<223> OTHER INFORMATION: Synthetic Construct

<400> SEQUENCE: 380
agccccggcc cuguugcugc                                                   20

<210> SEQ ID NO 381
<211> LENGTH: 20
<212> TYPE: RNA
<213> ORGANISM: Artificial Sequence
<220> FEATURE:
<223> OTHER INFORMATION: Synthetic Construct

<400> SEQUENCE: 381
agcccuggcc cuguugcugc                                                   20

<210> SEQ ID NO 382
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 382
agccuggggu ugagggcagg                                                 20

<210> SEQ ID NO 383
<211> LENGTH: 20
<212> TYPE: RNA
<213> ORGANISM: Artificial Sequence
<220> FEATURE:
<223> OTHER INFORMATION: Synthetic Construct

<400> SEQUENCE: 383
agccuuacag ggauauucua                                                 20

<210> SEQ ID NO 384
<211> LENGTH: 20
<212> TYPE: RNA
<213> ORGANISM: Artificial Sequence
<220> FEATURE:
<223> OTHER INFORMATION: Synthetic Construct

<400> SEQUENCE: 384
agccuuauag ggauauucua                                                 20

<210> SEQ ID NO 385
<211> LENGTH: 20
<212> TYPE: RNA
<213> ORGANISM: Artificial Sequence
<220> FEATURE:
<223> OTHER INFORMATION: Synthetic Construct

<400> SEQUENCE: 385
agcggcagag acuauguguc                                                 20

<210> SEQ ID NO 386
<211> LENGTH: 20
<212> TYPE: RNA
<213> ORGANISM: Artificial Sequence
<220> FEATURE:
<223> OTHER INFORMATION: Synthetic Construct

<400> SEQUENCE: 386
agcucgcaga gacuaugugu                                                 20

<210> SEQ ID NO 387
<211> LENGTH: 20
<212> TYPE: RNA
<213> ORGANISM: Artificial Sequence
<220> FEATURE:
<223> OTHER INFORMATION: Synthetic Construct

<400> SEQUENCE: 387
agcucugucc agaaagaccu                                                 20

<210> SEQ ID NO 388
<211> LENGTH: 20
<212> TYPE: RNA
<213> ORGANISM: Artificial Sequence
<220> FEATURE:
<223> OTHER INFORMATION: Synthetic Construct

<400> SEQUENCE: 388
agcucugucc agaaagacuu                                                 20

<210> SEQ ID NO 389
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 389
agcugcaggc uccgcaaggg                                               20

<210> SEQ ID NO 390
<211> LENGTH: 20
<212> TYPE: RNA
<213> ORGANISM: Artificial Sequence
<220> FEATURE:
<223> OTHER INFORMATION: Synthetic Construct

<400> SEQUENCE: 390
agcugggacu agugcccagu                                               20

<210> SEQ ID NO 391
<211> LENGTH: 20
<212> TYPE: RNA
<213> ORGANISM: Artificial Sequence
<220> FEATURE:
<223> OTHER INFORMATION: Synthetic Construct

<400> SEQUENCE: 391
agcugggacu ggugcccagu                                               20

<210> SEQ ID NO 392
<211> LENGTH: 20
<212> TYPE: RNA
<213> ORGANISM: Artificial Sequence
<220> FEATURE:
<223> OTHER INFORMATION: Synthetic Construct

<400> SEQUENCE: 392
aggaaggaag ucuuucugga                                               20

<210> SEQ ID NO 393
<211> LENGTH: 20
<212> TYPE: RNA
<213> ORGANISM: Artificial Sequence
<220> FEATURE:
<223> OTHER INFORMATION: Synthetic Construct

<400> SEQUENCE: 393
aggaaggagg ucuuucugga                                               20

<210> SEQ ID NO 394
<211> LENGTH: 20
<212> TYPE: RNA
<213> ORGANISM: Artificial Sequence
<220> FEATURE:
<223> OTHER INFORMATION: Synthetic Construct

<400> SEQUENCE: 394
aggaagucuu ucuggacaga                                               20

<210> SEQ ID NO 395
<211> LENGTH: 20
<212> TYPE: RNA
<213> ORGANISM: Artificial Sequence
<220> FEATURE:
<223> OTHER INFORMATION: Synthetic Construct

<400> SEQUENCE: 395
```
aggagacaga gcugggacug                                              20

<210> SEQ ID NO 396
<211> LENGTH: 20
<212> TYPE: RNA
<213> ORGANISM: Artificial Sequence
<220> FEATURE:
<223> OTHER INFORMATION: Synthetic Construct

<400> SEQUENCE: 396
aggaggucuu ucuggacaga                                              20

<210> SEQ ID NO 397
<211> LENGTH: 20
<212> TYPE: RNA
<213> ORGANISM: Artificial Sequence
<220> FEATURE:
<223> OTHER INFORMATION: Synthetic Construct

<400> SEQUENCE: 397
aggauggcag uggagaucag                                              20

<210> SEQ ID NO 398
<211> LENGTH: 20
<212> TYPE: RNA
<213> ORGANISM: Artificial Sequence
<220> FEATURE:
<223> OTHER INFORMATION: Synthetic Construct

<400> SEQUENCE: 398
aggcccagcc uggggcaagg                                              20

<210> SEQ ID NO 399
<211> LENGTH: 20
<212> TYPE: RNA
<213> ORGANISM: Artificial Sequence
<220> FEATURE:
<223> OTHER INFORMATION: Synthetic Construct

<400> SEQUENCE: 399 aggcccccg augguuggcu                                               20

<210> SEQ ID NO 400
<211> LENGTH: 20
<212> TYPE: RNA
<213> ORGANISM: Artificial Sequence
<220> FEATURE:
<223> OTHER INFORMATION: Synthetic Construct

<400> SEQUENCE: 400
aggcccggcc uggggcaagg                                              20

<210> SEQ ID NO 401
<211> LENGTH: 20
<212> TYPE: RNA
<213> ORGANISM: Artificial Sequence
<220> FEATURE:
<223> OTHER INFORMATION: Synthetic Construct

<400> SEQUENCE: 401
aggccucugc ccccuacccc                                              20

<210> SEQ ID NO 402
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 402
aggccucugc ccccugcccc                                              20

<210> SEQ ID NO 403
<211> LENGTH: 20
<212> TYPE: RNA
<213> ORGANISM: Artificial Sequence
<220> FEATURE:
<223> OTHER INFORMATION: Synthetic Construct

<400> SEQUENCE: 403
aggccuugcc ccaggccggg                                              20

<210> SEQ ID NO 404
<211> LENGTH: 20
<212> TYPE: RNA
<213> ORGANISM: Artificial Sequence
<220> FEATURE:
<223> OTHER INFORMATION: Synthetic Construct

<400> SEQUENCE: 404
aggccuugcc ccaggcuggg                                              20

<210> SEQ ID NO 405
<211> LENGTH: 20
<212> TYPE: RNA
<213> ORGANISM: Artificial Sequence
<220> FEATURE:
<223> OTHER INFORMATION: Synthetic Construct

<400> SEQUENCE: 405
aggcugauaa gcccagcccu                                              20

<210> SEQ ID NO 406
<211> LENGTH: 20
<212> TYPE: RNA
<213> ORGANISM: Artificial Sequence
<220> FEATURE:
<223> OTHER INFORMATION: Synthetic Construct

<400> SEQUENCE: 406
aggcugcagg cuccgcaagg                                              20

<210> SEQ ID NO 407
<211> LENGTH: 20
<212> TYPE: RNA
<213> ORGANISM: Artificial Sequence
<220> FEATURE:
<223> OTHER INFORMATION: Synthetic Construct

<400> SEQUENCE: 407
agggacugcg aggcaucagg                                              20

<210> SEQ ID NO 408
<211> LENGTH: 20
<212> TYPE: RNA
<213> ORGANISM: Artificial Sequence
<220> FEATURE:
<223> OTHER INFORMATION: Synthetic Construct

<400> SEQUENCE: 408
agggagaaag ccccccgaug                                              20
```

<210> SEQ ID NO 409
<211> LENGTH: 20
<212> TYPE: RNA
<213> ORGANISM: Artificial Sequence
<220> FEATURE:
<223> OTHER INFORMATION: Synthetic Construct

<400> SEQUENCE: 409
agggagccaa ccaucggggg                                                  20

<210> SEQ ID NO 410
<211> LENGTH: 20
<212> TYPE: RNA
<213> ORGANISM: Artificial Sequence
<220> FEATURE:
<223> OTHER INFORMATION: Synthetic Construct

<400> SEQUENCE: 410
agggccaggg cugggcuuau                                                  20

<210> SEQ ID NO 411
<211> LENGTH: 20
<212> TYPE: RNA
<213> ORGANISM: Artificial Sequence
<220> FEATURE:
<223> OTHER INFORMATION: Synthetic Construct

<400> SEQUENCE: 411
agggccgggg cugggcuuau                                                  20

<210> SEQ ID NO 412
<211> LENGTH: 20
<212> TYPE: RNA
<213> ORGANISM: Artificial Sequence
<220> FEATURE:
<223> OTHER INFORMATION: Synthetic Construct

<400> SEQUENCE: 412
aggggugagc ccugggugac                                                  20

<210> SEQ ID NO 413
<211> LENGTH: 20
<212> TYPE: RNA
<213> ORGANISM: Artificial Sequence
<220> FEATURE:
<223> OTHER INFORMATION: Synthetic Construct

<400> SEQUENCE: 413
aggucuuucu ggacagagcu                                                  20

<210> SEQ ID NO 414
<211> LENGTH: 20
<212> TYPE: RNA
<213> ORGANISM: Artificial Sequence
<220> FEATURE:
<223> OTHER INFORMATION: Synthetic Construct

<400> SEQUENCE: 414
aggugucacc cagggcucac                                                  20

<210> SEQ ID NO 415
<211> LENGTH: 20
<212> TYPE: RNA
<213> ORGANISM: Artificial Sequence
<220> FEATURE:
<223> OTHER INFORMATION: Synthetic Construct

```
<400> SEQUENCE: 415
agguucaggc cuugccccag                                              20

<210> SEQ ID NO 416
<211> LENGTH: 20
<212> TYPE: RNA
<213> ORGANISM: Artificial Sequence
<220> FEATURE:
<223> OTHER INFORMATION: Synthetic Construct

<400> SEQUENCE: 416
agucacauga gucugaucuc                                              20

<210> SEQ ID NO 417
<211> LENGTH: 20
<212> TYPE: RNA
<213> ORGANISM: Artificial Sequence
<220> FEATURE:
<223> OTHER INFORMATION: Synthetic Construct

<400> SEQUENCE: 417
agucacgagu cugaucucca                                              20

<210> SEQ ID NO 418
<211> LENGTH: 20
<212> TYPE: RNA
<213> ORGANISM: Artificial Sequence
<220> FEATURE:
<223> OTHER INFORMATION: Synthetic Construct

<400> SEQUENCE: 418
aguccccgag ccaggaaacu                                              20

<210> SEQ ID NO 419
<211> LENGTH: 20
<212> TYPE: RNA
<213> ORGANISM: Artificial Sequence
<220> FEATURE:
<223> OTHER INFORMATION: Synthetic Construct

<400> SEQUENCE: 419
agucccugag ccaggaaacu                                              20

<210> SEQ ID NO 420
<211> LENGTH: 20
<212> TYPE: RNA
<213> ORGANISM: Artificial Sequence
<220> FEATURE:
<223> OTHER INFORMATION: Synthetic Construct

<400> SEQUENCE: 420
agucucugcc gcugucuuug                                              20

<210> SEQ ID NO 421
<211> LENGTH: 20
<212> TYPE: RNA
<213> ORGANISM: Artificial Sequence
<220> FEATURE:
<223> OTHER INFORMATION: Synthetic Construct

<400> SEQUENCE: 421
agucucugcg agcugucuuu                                              20

<210> SEQ ID NO 422
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 422
agucuuucug gacagagcug                                                   20

<210> SEQ ID NO 423
<211> LENGTH: 20
<212> TYPE: RNA
<213> ORGANISM: Artificial Sequence
<220> FEATURE:
<223> OTHER INFORMATION: Synthetic Construct

<400> SEQUENCE: 423
agugcccagu uacguugguc                                                   20

<210> SEQ ID NO 424
<211> LENGTH: 20
<212> TYPE: RNA
<213> ORGANISM: Artificial Sequence
<220> FEATURE:
<223> OTHER INFORMATION: Synthetic Construct

<400> SEQUENCE: 424
aguggagauc agacucaugu                                                   20

<210> SEQ ID NO 425
<211> LENGTH: 20
<212> TYPE: RNA
<213> ORGANISM: Artificial Sequence
<220> FEATURE:
<223> OTHER INFORMATION: Synthetic Construct

<400> SEQUENCE: 425
aguggagauc agacucguga                                                   20

<210> SEQ ID NO 426
<211> LENGTH: 20
<212> TYPE: RNA
<213> ORGANISM: Artificial Sequence
<220> FEATURE:
<223> OTHER INFORMATION: Synthetic Construct

<400> SEQUENCE: 426 aguuccugg cucagggacu                                                    20

<210> SEQ ID NO 427
<211> LENGTH: 20
<212> TYPE: RNA
<213> ORGANISM: Artificial Sequence
<220> FEATURE:
<223> OTHER INFORMATION: Synthetic Construct

<400> SEQUENCE: 427 aguuccugg cucggggacu                                                    20

<210> SEQ ID NO 428
<211> LENGTH: 20
<212> TYPE: RNA
<213> ORGANISM: Artificial Sequence
<220> FEATURE:
<223> OTHER INFORMATION: Synthetic Construct

<400> SEQUENCE: 428
```

```
aguuucucca uccagaccau                                              20

<210> SEQ ID NO 429
<211> LENGTH: 20
<212> TYPE: RNA
<213> ORGANISM: Artificial Sequence
<220> FEATURE:
<223> OTHER INFORMATION: Synthetic Construct

<400> SEQUENCE: 429
auaagcccag ccccggcccu                                              20

<210> SEQ ID NO 430
<211> LENGTH: 20
<212> TYPE: RNA
<213> ORGANISM: Artificial Sequence
<220> FEATURE:
<223> OTHER INFORMATION: Synthetic Construct

<400> SEQUENCE: 430
auaagcccag cccuggcccu                                              20

<210> SEQ ID NO 431
<211> LENGTH: 20
<212> TYPE: RNA
<213> ORGANISM: Artificial Sequence
<220> FEATURE:
<223> OTHER INFORMATION: Synthetic Construct

<400> SEQUENCE: 431
auagggauau ucuaaguugu                                              20

<210> SEQ ID NO 432
<211> LENGTH: 20
<212> TYPE: RNA
<213> ORGANISM: Artificial Sequence
<220> FEATURE:
<223> OTHER INFORMATION: Synthetic Construct

<400> SEQUENCE: 432
auagucucug cgagcugucu                                              20

<210> SEQ ID NO 433
<211> LENGTH: 20
<212> TYPE: RNA
<213> ORGANISM: Artificial Sequence
<220> FEATURE:
<223> OTHER INFORMATION: Synthetic Construct

<400> SEQUENCE: 433
aucagacucg ugacugcugg                                              20

<210> SEQ ID NO 434
<211> LENGTH: 20
<212> TYPE: RNA
<213> ORGANISM: Artificial Sequence
<220> FEATURE:
<223> OTHER INFORMATION: Synthetic Construct

<400> SEQUENCE: 434
aucagacugc aaaggcugca                                              20

<210> SEQ ID NO 435
<211> LENGTH: 20
<212> TYPE: RNA
```

```
<213> ORGANISM: Artificial Sequence
<220> FEATURE:
<223> OTHER INFORMATION: Synthetic Construct

<400> SEQUENCE: 435
aucagcucug uccagaaaga                                                     20

<210> SEQ ID NO 436
<211> LENGTH: 20
<212> TYPE: RNA
<213> ORGANISM: Artificial Sequence
<220> FEATURE:
<223> OTHER INFORMATION: Synthetic Construct

<400> SEQUENCE: 436 aucagggug aacccugggu                                                      20

<210> SEQ ID NO 437
<211> LENGTH: 20
<212> TYPE: RNA
<213> ORGANISM: Artificial Sequence
<220> FEATURE:
<223> OTHER INFORMATION: Synthetic Construct

<400> SEQUENCE: 437
aucaguaacc ugcugaggga                                                     20

<210> SEQ ID NO 438
<211> LENGTH: 20
<212> TYPE: RNA
<213> ORGANISM: Artificial Sequence
<220> FEATURE:
<223> OTHER INFORMATION: Synthetic Construct

<400> SEQUENCE: 438
aucaguaacc ugcuggggga                                                     20

<210> SEQ ID NO 439
<211> LENGTH: 20
<212> TYPE: RNA
<213> ORGANISM: Artificial Sequence
<220> FEATURE:
<223> OTHER INFORMATION: Synthetic Construct

<400> SEQUENCE: 439
aucccacagg ccucugcccc                                                     20

<210> SEQ ID NO 440
<211> LENGTH: 20
<212> TYPE: RNA
<213> ORGANISM: Artificial Sequence
<220> FEATURE:
<223> OTHER INFORMATION: Synthetic Construct

<400> SEQUENCE: 440
aucccauucc aguuucucca                                                     20

<210> SEQ ID NO 441
<211> LENGTH: 20
<212> TYPE: RNA
<213> ORGANISM: Artificial Sequence
<220> FEATURE:
<223> OTHER INFORMATION: Synthetic Construct

<400> SEQUENCE: 441
aucccauucc gguuucucca                                                     20
```

<210> SEQ ID NO 442
<211> LENGTH: 20
<212> TYPE: RNA
<213> ORGANISM: Artificial Sequence
<220> FEATURE:
<223> OTHER INFORMATION: Synthetic Construct

<400> SEQUENCE: 442
aucccuauaa ggcuggaggc                                               20

<210> SEQ ID NO 443
<211> LENGTH: 20
<212> TYPE: RNA
<213> ORGANISM: Artificial Sequence
<220> FEATURE:
<223> OTHER INFORMATION: Synthetic Construct

<400> SEQUENCE: 443
aucggggggc cuucucccua                                               20

<210> SEQ ID NO 444
<211> LENGTH: 20
<212> TYPE: RNA
<213> ORGANISM: Artificial Sequence
<220> FEATURE:
<223> OTHER INFORMATION: Synthetic Construct

<400> SEQUENCE: 444
aucggggggc uuucucccua                                               20

<210> SEQ ID NO 445
<211> LENGTH: 20
<212> TYPE: RNA
<213> ORGANISM: Artificial Sequence
<220> FEATURE:
<223> OTHER INFORMATION: Synthetic Construct

<400> SEQUENCE: 445
augagucuga ucuccacugc                                               20

<210> SEQ ID NO 446
<211> LENGTH: 20
<212> TYPE: RNA
<213> ORGANISM: Artificial Sequence
<220> FEATURE:
<223> OTHER INFORMATION: Synthetic Construct

<400> SEQUENCE: 446
augccucgca gucccgagc                                                20

<210> SEQ ID NO 447
<211> LENGTH: 20
<212> TYPE: RNA
<213> ORGANISM: Artificial Sequence
<220> FEATURE:
<223> OTHER INFORMATION: Synthetic Construct

<400> SEQUENCE: 447
augccucgca gucccugagc                                               20

<210> SEQ ID NO 448
<211> LENGTH: 20
<212> TYPE: RNA
<213> ORGANISM: Artificial Sequence
<220> FEATURE:

<223> OTHER INFORMATION: Synthetic Construct

<400> SEQUENCE: 448
auggagaaac cggaauggga                                               20

<210> SEQ ID NO 449
<211> LENGTH: 20
<212> TYPE: RNA
<213> ORGANISM: Artificial Sequence
<220> FEATURE:
<223> OTHER INFORMATION: Synthetic Construct

<400> SEQUENCE: 449
auggagaaac uggaauggga                                               20

<210> SEQ ID NO 450
<211> LENGTH: 20
<212> TYPE: RNA
<213> ORGANISM: Artificial Sequence
<220> FEATURE:
<223> OTHER INFORMATION: Synthetic Construct

<400> SEQUENCE: 450
augugcucaa agacagcucg                                               20

<210> SEQ ID NO 451
<211> LENGTH: 20
<212> TYPE: RNA
<213> ORGANISM: Artificial Sequence
<220> FEATURE:
<223> OTHER INFORMATION: Synthetic Construct

<400> SEQUENCE: 451
auuccaguuu cuccauccag                                               20

<210> SEQ ID NO 452
<211> LENGTH: 20
<212> TYPE: RNA
<213> ORGANISM: Artificial Sequence
<220> FEATURE:
<223> OTHER INFORMATION: Synthetic Construct

<400> SEQUENCE: 452
auuccgguuu cuccauccag                                               20

<210> SEQ ID NO 453
<211> LENGTH: 20
<212> TYPE: RNA
<213> ORGANISM: Artificial Sequence
<220> FEATURE:
<223> OTHER INFORMATION: Synthetic Construct

<400> SEQUENCE: 453
auuuagggag aaagccccccc                                              20

<210> SEQ ID NO 454
<211> LENGTH: 20
<212> TYPE: RNA
<213> ORGANISM: Artificial Sequence
<220> FEATURE:
<223> OTHER INFORMATION: Synthetic Construct

<400> SEQUENCE: 454
auuuagggag aaggcccccc                                               20

```
<210> SEQ ID NO 455
<211> LENGTH: 20
<212> TYPE: RNA
<213> ORGANISM: Artificial Sequence
<220> FEATURE:
<223> OTHER INFORMATION: Synthetic Construct

<400> SEQUENCE: 455
caaagacagc ggcagagacu                                            20

<210> SEQ ID NO 456
<211> LENGTH: 20
<212> TYPE: RNA
<213> ORGANISM: Artificial Sequence
<220> FEATURE:
<223> OTHER INFORMATION: Synthetic Construct

<400> SEQUENCE: 456
caaagacagc ucgcagagac                                            20

<210> SEQ ID NO 457
<211> LENGTH: 20
<212> TYPE: RNA
<213> ORGANISM: Artificial Sequence
<220> FEATURE:
<223> OTHER INFORMATION: Synthetic Construct

<400> SEQUENCE: 457
caacagggcc agggcugggc                                            20

<210> SEQ ID NO 458
<211> LENGTH: 20
<212> TYPE: RNA
<213> ORGANISM: Artificial Sequence
<220> FEATURE:
<223> OTHER INFORMATION: Synthetic Construct

<400> SEQUENCE: 458
caacagggcc ggggcugggc                                            20

<210> SEQ ID NO 459
<211> LENGTH: 20
<212> TYPE: RNA
<213> ORGANISM: Artificial Sequence
<220> FEATURE:
<223> OTHER INFORMATION: Synthetic Construct

<400> SEQUENCE: 459
caaccaucgg ggggcuuucu                                            20

<210> SEQ ID NO 460
<211> LENGTH: 20
<212> TYPE: RNA
<213> ORGANISM: Artificial Sequence
<220> FEATURE:
<223> OTHER INFORMATION: Synthetic Construct

<400> SEQUENCE: 460
caacguaacu gggcaccagu                                            20

<210> SEQ ID NO 461
<211> LENGTH: 20
<212> TYPE: RNA
<213> ORGANISM: Artificial Sequence
<220> FEATURE:
<223> OTHER INFORMATION: Synthetic Construct
```

<400> SEQUENCE: 461
caacguaacu gggcacuagu                                                    20

<210> SEQ ID NO 462
<211> LENGTH: 20
<212> TYPE: RNA
<213> ORGANISM: Artificial Sequence
<220> FEATURE:
<223> OTHER INFORMATION: Synthetic Construct

<400> SEQUENCE: 462
cacaacuuag aauaucccua                                                    20

<210> SEQ ID NO 463
<211> LENGTH: 20
<212> TYPE: RNA
<213> ORGANISM: Artificial Sequence
<220> FEATURE:
<223> OTHER INFORMATION: Synthetic Construct

<400> SEQUENCE: 463
cacaacuuag aauaucccug                                                    20

<210> SEQ ID NO 464
<211> LENGTH: 20
<212> TYPE: RNA
<213> ORGANISM: Artificial Sequence
<220> FEATURE:
<223> OTHER INFORMATION: Synthetic Construct

<400> SEQUENCE: 464
cacaggccuc ugcccccuac                                                    20

<210> SEQ ID NO 465
<211> LENGTH: 20
<212> TYPE: RNA
<213> ORGANISM: Artificial Sequence
<220> FEATURE:
<223> OTHER INFORMATION: Synthetic Construct

<400> SEQUENCE: 465
cacaggccuc ugcccccugc                                                    20

<210> SEQ ID NO 466
<211> LENGTH: 20
<212> TYPE: RNA
<213> ORGANISM: Artificial Sequence
<220> FEATURE:
<223> OTHER INFORMATION: Synthetic Construct

<400> SEQUENCE: 466
cacauagucu cugccgcugu                                                    20

<210> SEQ ID NO 467
<211> LENGTH: 20
<212> TYPE: RNA
<213> ORGANISM: Artificial Sequence
<220> FEATURE:
<223> OTHER INFORMATION: Synthetic Construct

<400> SEQUENCE: 467
cacauagucu cugcgagcug                                                    20

<210> SEQ ID NO 468
<211> LENGTH: 20

```
<212> TYPE: RNA
<213> ORGANISM: Artificial Sequence
<220> FEATURE:
<223> OTHER INFORMATION: Synthetic Construct

<400> SEQUENCE: 468
caccaguccc agcucugucu                                                    20

<210> SEQ ID NO 469
<211> LENGTH: 20
<212> TYPE: RNA
<213> ORGANISM: Artificial Sequence
<220> FEATURE:
<223> OTHER INFORMATION: Synthetic Construct

<400> SEQUENCE: 469
cacccagggc ucaccccuga                                                    20

<210> SEQ ID NO 470
<211> LENGTH: 20
<212> TYPE: RNA
<213> ORGANISM: Artificial Sequence
<220> FEATURE:
<223> OTHER INFORMATION: Synthetic Construct

<400> SEQUENCE: 470
cacccagggu ucaccccuga                                                    20

<210> SEQ ID NO 471
<211> LENGTH: 20
<212> TYPE: RNA
<213> ORGANISM: Artificial Sequence
<220> FEATURE:
<223> OTHER INFORMATION: Synthetic Construct

<400> SEQUENCE: 471
cacccuugcg gagccugcag                                                    20

<210> SEQ ID NO 472
<211> LENGTH: 20
<212> TYPE: RNA
<213> ORGANISM: Artificial Sequence
<220> FEATURE:
<223> OTHER INFORMATION: Synthetic Construct

<400> SEQUENCE: 472
cacggggauu uagggagaag                                                    20

<210> SEQ ID NO 473
<211> LENGTH: 20
<212> TYPE: RNA
<213> ORGANISM: Artificial Sequence
<220> FEATURE:
<223> OTHER INFORMATION: Synthetic Construct

<400> SEQUENCE: 473
cacuaguccc agcucugucu                                                    20

<210> SEQ ID NO 474
<211> LENGTH: 20
<212> TYPE: RNA
<213> ORGANISM: Artificial Sequence
<220> FEATURE:
<223> OTHER INFORMATION: Synthetic Construct

<400> SEQUENCE: 474
```
cagaaagacc uccuuccuuu                                          20

<210> SEQ ID NO 475
<211> LENGTH: 20
<212> TYPE: RNA
<213> ORGANISM: Artificial Sequence
<220> FEATURE:
<223> OTHER INFORMATION: Synthetic Construct

<400> SEQUENCE: 475
cagaaagacu uccuuccuuu                                          20

<210> SEQ ID NO 476
<211> LENGTH: 20
<212> TYPE: RNA
<213> ORGANISM: Artificial Sequence
<220> FEATURE:
<223> OTHER INFORMATION: Synthetic Construct

<400> SEQUENCE: 476
cagacucaug ugacugcugg                                          20

<210> SEQ ID NO 477
<211> LENGTH: 20
<212> TYPE: RNA
<213> ORGANISM: Artificial Sequence
<220> FEATURE:
<223> OTHER INFORMATION: Synthetic Construct

<400> SEQUENCE: 477
cagagcuggg acuagugccc                                          20

<210> SEQ ID NO 478
<211> LENGTH: 20
<212> TYPE: RNA
<213> ORGANISM: Artificial Sequence
<220> FEATURE:
<223> OTHER INFORMATION: Synthetic Construct

<400> SEQUENCE: 478
cagagcuggg acuggugccc                                          20

<210> SEQ ID NO 479
<211> LENGTH: 20
<212> TYPE: RNA
<213> ORGANISM: Artificial Sequence
<220> FEATURE:
<223> OTHER INFORMATION: Synthetic Construct

<400> SEQUENCE: 479
cagauggucu ggauggagaa                                          20

<210> SEQ ID NO 480
<211> LENGTH: 20
<212> TYPE: RNA
<213> ORGANISM: Artificial Sequence
<220> FEATURE:
<223> OTHER INFORMATION: Synthetic Construct

<400> SEQUENCE: 480
cagcaacagg gccagggcug                                          20

<210> SEQ ID NO 481
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 481
cagcaacagg gccggggcug                                                    20

<210> SEQ ID NO 482
<211> LENGTH: 20
<212> TYPE: RNA
<213> ORGANISM: Artificial Sequence
<220> FEATURE:
<223> OTHER INFORMATION: Synthetic Construct

<400> SEQUENCE: 482
cagcagucac augagucuga                                                    20

<210> SEQ ID NO 483
<211> LENGTH: 20
<212> TYPE: RNA
<213> ORGANISM: Artificial Sequence
<220> FEATURE:
<223> OTHER INFORMATION: Synthetic Construct

<400> SEQUENCE: 483
cagcagucac gagucugauc                                                    20

<210> SEQ ID NO 484
<211> LENGTH: 20
<212> TYPE: RNA
<213> ORGANISM: Artificial Sequence
<220> FEATURE:
<223> OTHER INFORMATION: Synthetic Construct

<400> SEQUENCE: 484
cagccccggc ccuguugcug                                                    20

<210> SEQ ID NO 485
<211> LENGTH: 20
<212> TYPE: RNA
<213> ORGANISM: Artificial Sequence
<220> FEATURE:
<223> OTHER INFORMATION: Synthetic Construct

<400> SEQUENCE: 485
cagcccuggc ccuguugcug                                                    20

<210> SEQ ID NO 486
<211> LENGTH: 20
<212> TYPE: RNA
<213> ORGANISM: Artificial Sequence
<220> FEATURE:
<223> OTHER INFORMATION: Synthetic Construct

<400> SEQUENCE: 486
cagccuauca ggggugaacc                                                    20

<210> SEQ ID NO 487
<211> LENGTH: 20
<212> TYPE: RNA
<213> ORGANISM: Artificial Sequence
<220> FEATURE:
<223> OTHER INFORMATION: Synthetic Construct

<400> SEQUENCE: 487
cagccuauca ggggugagcc                                                    20
```

```
<210> SEQ ID NO 488
<211> LENGTH: 20
<212> TYPE: RNA
<213> ORGANISM: Artificial Sequence
<220> FEATURE:
<223> OTHER INFORMATION: Synthetic Construct

<400> SEQUENCE: 488
cagccugggg caaggccuga                                                   20

<210> SEQ ID NO 489
<211> LENGTH: 20
<212> TYPE: RNA
<213> ORGANISM: Artificial Sequence
<220> FEATURE:
<223> OTHER INFORMATION: Synthetic Construct

<400> SEQUENCE: 489
cagccugggg uugagggcag                                                   20

<210> SEQ ID NO 490
<211> LENGTH: 20
<212> TYPE: RNA
<213> ORGANISM: Artificial Sequence
<220> FEATURE:
<223> OTHER INFORMATION: Synthetic Construct

<400> SEQUENCE: 490
cagccuuaca gggauauucu                                                   20

<210> SEQ ID NO 491
<211> LENGTH: 20
<212> TYPE: RNA
<213> ORGANISM: Artificial Sequence
<220> FEATURE:
<223> OTHER INFORMATION: Synthetic Construct

<400> SEQUENCE: 491
cagccuuaua gggauauucu                                                   20

<210> SEQ ID NO 492
<211> LENGTH: 20
<212> TYPE: RNA
<213> ORGANISM: Artificial Sequence
<220> FEATURE:
<223> OTHER INFORMATION: Synthetic Construct

<400> SEQUENCE: 492
cagcggcaga gacuaugugu                                                   20

<210> SEQ ID NO 493
<211> LENGTH: 20
<212> TYPE: RNA
<213> ORGANISM: Artificial Sequence
<220> FEATURE:
<223> OTHER INFORMATION: Synthetic Construct

<400> SEQUENCE: 493
cagcucgcag agacuaugug                                                   20

<210> SEQ ID NO 494
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 494
cagcucuguc cagaaagacc                                         20

<210> SEQ ID NO 495
<211> LENGTH: 20
<212> TYPE: RNA
<213> ORGANISM: Artificial Sequence
<220> FEATURE:
<223> OTHER INFORMATION: Synthetic Construct

<400> SEQUENCE: 495
cagcucuguc cagaaagacu                                         20

<210> SEQ ID NO 496
<211> LENGTH: 20
<212> TYPE: RNA
<213> ORGANISM: Artificial Sequence
<220> FEATURE:
<223> OTHER INFORMATION: Synthetic Construct

<400> SEQUENCE: 496
caggccgggc cucuggguac                                         20

<210> SEQ ID NO 497
<211> LENGTH: 20
<212> TYPE: RNA
<213> ORGANISM: Artificial Sequence
<220> FEATURE:
<223> OTHER INFORMATION: Synthetic Construct

<400> SEQUENCE: 497
caggccucug cccccuaccc                                         20

<210> SEQ ID NO 498
<211> LENGTH: 20
<212> TYPE: RNA
<213> ORGANISM: Artificial Sequence
<220> FEATURE:
<223> OTHER INFORMATION: Synthetic Construct

<400> SEQUENCE: 498
caggccuugc cccaggccgg                                         20

<210> SEQ ID NO 499
<211> LENGTH: 20
<212> TYPE: RNA
<213> ORGANISM: Artificial Sequence
<220> FEATURE:
<223> OTHER INFORMATION: Synthetic Construct

<400> SEQUENCE: 499
caggccuugc cccaggcugg                                         20

<210> SEQ ID NO 500
<211> LENGTH: 20
<212> TYPE: RNA
<213> ORGANISM: Artificial Sequence
<220> FEATURE:
<223> OTHER INFORMATION: Synthetic Construct

<400> SEQUENCE: 500
caggcugggc cucuggguac                                         20

<210> SEQ ID NO 501
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 501
cagggacugc gaggcaucag                                               20

<210> SEQ ID NO 502
<211> LENGTH: 20
<212> TYPE: RNA
<213> ORGANISM: Artificial Sequence
<220> FEATURE:
<223> OTHER INFORMATION: Synthetic Construct

<400> SEQUENCE: 502
cagggauauu cuaaguugug                                               20

<210> SEQ ID NO 503
<211> LENGTH: 20
<212> TYPE: RNA
<213> ORGANISM: Artificial Sequence
<220> FEATURE:
<223> OTHER INFORMATION: Synthetic Construct

<400> SEQUENCE: 503
cagggccggg gcugggcuua                                               20

<210> SEQ ID NO 504
<211> LENGTH: 20
<212> TYPE: RNA
<213> ORGANISM: Artificial Sequence
<220> FEATURE:
<223> OTHER INFORMATION: Synthetic Construct

<400> SEQUENCE: 504
cagggcucac cccugauagg                                               20

<210> SEQ ID NO 505
<211> LENGTH: 20
<212> TYPE: RNA
<213> ORGANISM: Artificial Sequence
<220> FEATURE:
<223> OTHER INFORMATION: Synthetic Construct

<400> SEQUENCE: 505
cagggcuggg cuuaucagcc                                               20

<210> SEQ ID NO 506
<211> LENGTH: 20
<212> TYPE: RNA
<213> ORGANISM: Artificial Sequence
<220> FEATURE:
<223> OTHER INFORMATION: Synthetic Construct

<400> SEQUENCE: 506
caggggcagg gggcagaggc                                               20

<210> SEQ ID NO 507
<211> LENGTH: 20
<212> TYPE: RNA
<213> ORGANISM: Artificial Sequence
<220> FEATURE:
<223> OTHER INFORMATION: Synthetic Construct

<400> SEQUENCE: 507
```

-continued

```
caggggggcag aggccugugg                                              20

<210> SEQ ID NO 508
<211> LENGTH: 20
<212> TYPE: RNA
<213> ORGANISM: Artificial Sequence
<220> FEATURE:
<223> OTHER INFORMATION: Synthetic Construct

<400> SEQUENCE: 508 caggggguagg gggcagaggc                                              20

<210> SEQ ID NO 509
<211> LENGTH: 20
<212> TYPE: RNA
<213> ORGANISM: Artificial Sequence
<220> FEATURE:
<223> OTHER INFORMATION: Synthetic Construct

<400> SEQUENCE: 509
caggggugaa cccuggguga                                               20

<210> SEQ ID NO 510
<211> LENGTH: 20
<212> TYPE: RNA
<213> ORGANISM: Artificial Sequence
<220> FEATURE:
<223> OTHER INFORMATION: Synthetic Construct

<400> SEQUENCE: 510
caggggugag cccuggguga                                               20

<210> SEQ ID NO 511
<211> LENGTH: 20
<212> TYPE: RNA
<213> ORGANISM: Artificial Sequence
<220> FEATURE:
<223> OTHER INFORMATION: Synthetic Construct

<400> SEQUENCE: 511
caggguucac cccugauagg                                               20

<210> SEQ ID NO 512
<211> LENGTH: 20
<212> TYPE: RNA
<213> ORGANISM: Artificial Sequence
<220> FEATURE:
<223> OTHER INFORMATION: Synthetic Construct

<400> SEQUENCE: 512
cagguaccca gaggcccagc                                               20

<210> SEQ ID NO 513
<211> LENGTH: 20
<212> TYPE: RNA
<213> ORGANISM: Artificial Sequence
<220> FEATURE:
<223> OTHER INFORMATION: Synthetic Construct

<400> SEQUENCE: 513
cagguaccca gaggcccggc                                               20

<210> SEQ ID NO 514
<211> LENGTH: 20
<212> TYPE: RNA
```

```
<213> ORGANISM: Artificial Sequence
<220> FEATURE:
<223> OTHER INFORMATION: Synthetic Construct

<400> SEQUENCE: 514
cagguccuau caguaaccug                                                        20

<210> SEQ ID NO 515
<211> LENGTH: 20
<212> TYPE: RNA
<213> ORGANISM: Artificial Sequence
<220> FEATURE:
<223> OTHER INFORMATION: Synthetic Construct

<400> SEQUENCE: 515
caggugucac ccagggcuca                                                        20

<210> SEQ ID NO 516
<211> LENGTH: 20
<212> TYPE: RNA
<213> ORGANISM: Artificial Sequence
<220> FEATURE:
<223> OTHER INFORMATION: Synthetic Construct

<400> SEQUENCE: 516
caggugucac ccaggguuca                                                        20

<210> SEQ ID NO 517
<211> LENGTH: 20
<212> TYPE: RNA
<213> ORGANISM: Artificial Sequence
<220> FEATURE:
<223> OTHER INFORMATION: Synthetic Construct

<400> SEQUENCE: 517
caguaaccug cugagggagg                                                        20

<210> SEQ ID NO 518
<211> LENGTH: 20
<212> TYPE: RNA
<213> ORGANISM: Artificial Sequence
<220> FEATURE:
<223> OTHER INFORMATION: Synthetic Construct

<400> SEQUENCE: 518
caguaaccug cuggggagg                                                         20

<210> SEQ ID NO 519
<211> LENGTH: 20
<212> TYPE: RNA
<213> ORGANISM: Artificial Sequence
<220> FEATURE:
<223> OTHER INFORMATION: Synthetic Construct

<400> SEQUENCE: 519
cagucacaug agucugaucu                                                        20

<210> SEQ ID NO 520
<211> LENGTH: 20
<212> TYPE: RNA
<213> ORGANISM: Artificial Sequence
<220> FEATURE:
<223> OTHER INFORMATION: Synthetic Construct

<400> SEQUENCE: 520
cagucacgag ucugaucucc                                                        20
```

-continued

```
<210> SEQ ID NO 521
<211> LENGTH: 20
<212> TYPE: RNA
<213> ORGANISM: Artificial Sequence
<220> FEATURE:
<223> OTHER INFORMATION: Synthetic Construct

<400> SEQUENCE: 521
cagucccagc ucugucuccu                                                   20

<210> SEQ ID NO 522
<211> LENGTH: 20
<212> TYPE: RNA
<213> ORGANISM: Artificial Sequence
<220> FEATURE:
<223> OTHER INFORMATION: Synthetic Construct

<400> SEQUENCE: 522
caguggagau cagacucgug                                                   20

<210> SEQ ID NO 523
<211> LENGTH: 20
<212> TYPE: RNA
<213> ORGANISM: Artificial Sequence
<220> FEATURE:
<223> OTHER INFORMATION: Synthetic Construct

<400> SEQUENCE: 523
caguuucucc auccagacca                                                   20

<210> SEQ ID NO 524
<211> LENGTH: 20
<212> TYPE: RNA
<213> ORGANISM: Artificial Sequence
<220> FEATURE:
<223> OTHER INFORMATION: Synthetic Construct

<400> SEQUENCE: 524
cauagucucu gcgagcuguc                                                   20

<210> SEQ ID NO 525
<211> LENGTH: 20
<212> TYPE: RNA
<213> ORGANISM: Artificial Sequence
<220> FEATURE:
<223> OTHER INFORMATION: Synthetic Construct

<400> SEQUENCE: 525
caucagcucu guccagaaag                                                   20

<210> SEQ ID NO 526
<211> LENGTH: 20
<212> TYPE: RNA
<213> ORGANISM: Artificial Sequence
<220> FEATURE:
<223> OTHER INFORMATION: Synthetic Construct

<400> SEQUENCE: 526
caucccacag gccucugccc                                                   20

<210> SEQ ID NO 527
<211> LENGTH: 20
<212> TYPE: RNA
<213> ORGANISM: Artificial Sequence
<220> FEATURE:
```

<223> OTHER INFORMATION: Synthetic Construct

<400> SEQUENCE: 527
caucgggggg ccuucucccu                                                      20

<210> SEQ ID NO 528
<211> LENGTH: 20
<212> TYPE: RNA
<213> ORGANISM: Artificial Sequence
<220> FEATURE:
<223> OTHER INFORMATION: Synthetic Construct

<400> SEQUENCE: 528
caucgggggg cuuucucccu                                                      20

<210> SEQ ID NO 529
<211> LENGTH: 20
<212> TYPE: RNA
<213> ORGANISM: Artificial Sequence
<220> FEATURE:
<223> OTHER INFORMATION: Synthetic Construct

<400> SEQUENCE: 529
caugagucug aucuccacug                                                      20

<210> SEQ ID NO 530
<211> LENGTH: 20
<212> TYPE: RNA
<213> ORGANISM: Artificial Sequence
<220> FEATURE:
<223> OTHER INFORMATION: Synthetic Construct

<400> SEQUENCE: 530
cauggccccc uuccagcagu                                                      20

<210> SEQ ID NO 531
<211> LENGTH: 20
<212> TYPE: RNA
<213> ORGANISM: Artificial Sequence
<220> FEATURE:
<223> OTHER INFORMATION: Synthetic Construct

<400> SEQUENCE: 531
caugugacug cuggaagggg                                                      20

<210> SEQ ID NO 532
<211> LENGTH: 20
<212> TYPE: RNA
<213> ORGANISM: Artificial Sequence
<220> FEATURE:
<223> OTHER INFORMATION: Synthetic Construct

<400> SEQUENCE: 532
ccaaccaucg gggggccuuc                                                      20

<210> SEQ ID NO 533
<211> LENGTH: 20
<212> TYPE: RNA
<213> ORGANISM: Artificial Sequence
<220> FEATURE:
<223> OTHER INFORMATION: Synthetic Construct

<400> SEQUENCE: 533
ccaaccaucg gggggcuuuc                                                      20

```
<210> SEQ ID NO 534
<211> LENGTH: 20
<212> TYPE: RNA
<213> ORGANISM: Artificial Sequence
<220> FEATURE:
<223> OTHER INFORMATION: Synthetic Construct

<400> SEQUENCE: 534
ccaacguaac ugggcaccag                                              20

<210> SEQ ID NO 535
<211> LENGTH: 20
<212> TYPE: RNA
<213> ORGANISM: Artificial Sequence
<220> FEATURE:
<223> OTHER INFORMATION: Synthetic Construct

<400> SEQUENCE: 535
ccaacguaac ugggcacuag                                              20

<210> SEQ ID NO 536
<211> LENGTH: 20
<212> TYPE: RNA
<213> ORGANISM: Artificial Sequence
<220> FEATURE:
<223> OTHER INFORMATION: Synthetic Construct

<400> SEQUENCE: 536
ccacaggccu cugcccccug                                              20

<210> SEQ ID NO 537
<211> LENGTH: 20
<212> TYPE: RNA
<213> ORGANISM: Artificial Sequence
<220> FEATURE:
<223> OTHER INFORMATION: Synthetic Construct

<400> SEQUENCE: 537
ccacggggau uuagggagaa                                              20

<210> SEQ ID NO 538
<211> LENGTH: 20
<212> TYPE: RNA
<213> ORGANISM: Artificial Sequence
<220> FEATURE:
<223> OTHER INFORMATION: Synthetic Construct

<400> SEQUENCE: 538
ccagaaagac cuccuuccuu                                              20

<210> SEQ ID NO 539
<211> LENGTH: 20
<212> TYPE: RNA
<213> ORGANISM: Artificial Sequence
<220> FEATURE:
<223> OTHER INFORMATION: Synthetic Construct

<400> SEQUENCE: 539
ccagaaagac uuccuuccuu                                              20

<210> SEQ ID NO 540
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 540
ccagaccucc cccagcaggu                                              20

<210> SEQ ID NO 541
<211> LENGTH: 20
<212> TYPE: RNA
<213> ORGANISM: Artificial Sequence
<220> FEATURE:
<223> OTHER INFORMATION: Synthetic Construct

<400> SEQUENCE: 541
ccagaccucc cucagcaggu                                              20

<210> SEQ ID NO 542
<211> LENGTH: 20
<212> TYPE: RNA
<213> ORGANISM: Artificial Sequence
<220> FEATURE:
<223> OTHER INFORMATION: Synthetic Construct

<400> SEQUENCE: 542
ccagaggccc agccuggggc                                              20

<210> SEQ ID NO 543
<211> LENGTH: 20
<212> TYPE: RNA
<213> ORGANISM: Artificial Sequence
<220> FEATURE:
<223> OTHER INFORMATION: Synthetic Construct

<400> SEQUENCE: 543
ccagaggccc ggccuggggc                                              20

<210> SEQ ID NO 544
<211> LENGTH: 20
<212> TYPE: RNA
<213> ORGANISM: Artificial Sequence
<220> FEATURE:
<223> OTHER INFORMATION: Synthetic Construct

<400> SEQUENCE: 544
ccagcagguu acugauagga                                              20

<210> SEQ ID NO 545
<211> LENGTH: 20
<212> TYPE: RNA
<213> ORGANISM: Artificial Sequence
<220> FEATURE:
<223> OTHER INFORMATION: Synthetic Construct

<400> SEQUENCE: 545
ccagcaguca caugagucug                                              20

<210> SEQ ID NO 546
<211> LENGTH: 20
<212> TYPE: RNA
<213> ORGANISM: Artificial Sequence
<220> FEATURE:
<223> OTHER INFORMATION: Synthetic Construct

<400> SEQUENCE: 546
ccagccccgg cccuguugcu                                              20

<210> SEQ ID NO 547
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 547
ccagcccugg cccuguugcu                                              20

<210> SEQ ID NO 548
<211> LENGTH: 20
<212> TYPE: RNA
<213> ORGANISM: Artificial Sequence
<220> FEATURE:
<223> OTHER INFORMATION: Synthetic Construct

<400> SEQUENCE: 548
ccagccuauc aggggugaac                                              20

<210> SEQ ID NO 549
<211> LENGTH: 20
<212> TYPE: RNA
<213> ORGANISM: Artificial Sequence
<220> FEATURE:
<223> OTHER INFORMATION: Synthetic Construct

<400> SEQUENCE: 549
ccagccuauc aggggugagc                                              20

<210> SEQ ID NO 550
<211> LENGTH: 20
<212> TYPE: RNA
<213> ORGANISM: Artificial Sequence
<220> FEATURE:
<223> OTHER INFORMATION: Synthetic Construct

<400> SEQUENCE: 550
ccagccuggg gcaaggccug                                              20

<210> SEQ ID NO 551
<211> LENGTH: 20
<212> TYPE: RNA
<213> ORGANISM: Artificial Sequence
<220> FEATURE:
<223> OTHER INFORMATION: Synthetic Construct

<400> SEQUENCE: 551
ccagccuuau agggauauuc                                              20

<210> SEQ ID NO 552
<211> LENGTH: 20
<212> TYPE: RNA
<213> ORGANISM: Artificial Sequence
<220> FEATURE:
<223> OTHER INFORMATION: Synthetic Construct

<400> SEQUENCE: 552
ccaggccggg ccucugggua                                              20

<210> SEQ ID NO 553
<211> LENGTH: 20
<212> TYPE: RNA
<213> ORGANISM: Artificial Sequence
<220> FEATURE:
<223> OTHER INFORMATION: Synthetic Construct

<400> SEQUENCE: 553
```

```
ccaggcuggg ccucugggua                                              20

<210> SEQ ID NO 554
<211> LENGTH: 20
<212> TYPE: RNA
<213> ORGANISM: Artificial Sequence
<220> FEATURE:
<223> OTHER INFORMATION: Synthetic Construct

<400> SEQUENCE: 554
ccagggcuca ccccugauag                                              20

<210> SEQ ID NO 555
<211> LENGTH: 20
<212> TYPE: RNA
<213> ORGANISM: Artificial Sequence
<220> FEATURE:
<223> OTHER INFORMATION: Synthetic Construct

<400> SEQUENCE: 555
ccagggcugg gcuuaucagc                                              20

<210> SEQ ID NO 556
<211> LENGTH: 20
<212> TYPE: RNA
<213> ORGANISM: Artificial Sequence
<220> FEATURE:
<223> OTHER INFORMATION: Synthetic Construct

<400> SEQUENCE: 556
ccaggguuca ccccugauag                                              20

<210> SEQ ID NO 557
<211> LENGTH: 20
<212> TYPE: RNA
<213> ORGANISM: Artificial Sequence
<220> FEATURE:
<223> OTHER INFORMATION: Synthetic Construct

<400> SEQUENCE: 557
ccagucccag cucugucucc                                              20

<210> SEQ ID NO 558
<211> LENGTH: 20
<212> TYPE: RNA
<213> ORGANISM: Artificial Sequence
<220> FEATURE:
<223> OTHER INFORMATION: Synthetic Construct

<400> SEQUENCE: 558
ccaguuucuc cauccagacc                                              20

<210> SEQ ID NO 559
<211> LENGTH: 20
<212> TYPE: RNA
<213> ORGANISM: Artificial Sequence
<220> FEATURE:
<223> OTHER INFORMATION: Synthetic Construct

<400> SEQUENCE: 559
ccaucagcuc uguccagaaa                                              20

<210> SEQ ID NO 560
<211> LENGTH: 20
<212> TYPE: RNA
<213> ORGANISM: Artificial Sequence
```

<220> FEATURE:
<223> OTHER INFORMATION: Synthetic Construct

<400> SEQUENCE: 560
ccaucggggg gccuucuccc                                                       20

<210> SEQ ID NO 561
<211> LENGTH: 20
<212> TYPE: RNA
<213> ORGANISM: Artificial Sequence
<220> FEATURE:
<223> OTHER INFORMATION: Synthetic Construct

<400> SEQUENCE: 561
cccacaggcc ucugccccu                                                        20

<210> SEQ ID NO 562
<211> LENGTH: 20
<212> TYPE: RNA
<213> ORGANISM: Artificial Sequence
<220> FEATURE:
<223> OTHER INFORMATION: Synthetic Construct

<400> SEQUENCE: 562
cccagaccuc ccucagcagg                                                       20

<210> SEQ ID NO 563
<211> LENGTH: 20
<212> TYPE: RNA
<213> ORGANISM: Artificial Sequence
<220> FEATURE:
<223> OTHER INFORMATION: Synthetic Construct

<400> SEQUENCE: 563
cccagcaggu uacugauagg                                                       20

<210> SEQ ID NO 564
<211> LENGTH: 20
<212> TYPE: RNA
<213> ORGANISM: Artificial Sequence
<220> FEATURE:
<223> OTHER INFORMATION: Synthetic Construct

<400> SEQUENCE: 564
cccagccccg gcccuguugc                                                       20

<210> SEQ ID NO 565
<211> LENGTH: 20
<212> TYPE: RNA
<213> ORGANISM: Artificial Sequence
<220> FEATURE:
<223> OTHER INFORMATION: Synthetic Construct

<400> SEQUENCE: 565
cccagccuau cagggugaa                                                        20

<210> SEQ ID NO 566
<211> LENGTH: 20
<212> TYPE: RNA
<213> ORGANISM: Artificial Sequence
<220> FEATURE:
<223> OTHER INFORMATION: Synthetic Construct

<400> SEQUENCE: 566
cccagccugg ggcaaggccu                                                       20

<210> SEQ ID NO 567
<211> LENGTH: 20
<212> TYPE: RNA
<213> ORGANISM: Artificial Sequence
<220> FEATURE:
<223> OTHER INFORMATION: Synthetic Construct

<400> SEQUENCE: 567
cccaggccgg gccucugggu                                               20

<210> SEQ ID NO 568
<211> LENGTH: 20
<212> TYPE: RNA
<213> ORGANISM: Artificial Sequence
<220> FEATURE:
<223> OTHER INFORMATION: Synthetic Construct

<400> SEQUENCE: 568
cccagggcuc accccugaua                                               20

<210> SEQ ID NO 569
<211> LENGTH: 20
<212> TYPE: RNA
<213> ORGANISM: Artificial Sequence
<220> FEATURE:
<223> OTHER INFORMATION: Synthetic Construct

<400> SEQUENCE: 569
cccauuccag uuucuccauc                                               20

<210> SEQ ID NO 570
<211> LENGTH: 20
<212> TYPE: RNA
<213> ORGANISM: Artificial Sequence
<220> FEATURE:
<223> OTHER INFORMATION: Synthetic Construct

<400> SEQUENCE: 570
ccccagcagg uuacugauag                                               20

<210> SEQ ID NO 571
<211> LENGTH: 20
<212> TYPE: RNA
<213> ORGANISM: Artificial Sequence
<220> FEATURE:
<223> OTHER INFORMATION: Synthetic Construct

<400> SEQUENCE: 571
ccccagccua ucagggguga                                               20

<210> SEQ ID NO 572
<211> LENGTH: 20
<212> TYPE: RNA
<213> ORGANISM: Artificial Sequence
<220> FEATURE:
<223> OTHER INFORMATION: Synthetic Construct

<400> SEQUENCE: 572
ccccaggccg ggccucuggg                                               20

<210> SEQ ID NO 573
<211> LENGTH: 20
<212> TYPE: RNA
<213> ORGANISM: Artificial Sequence
<220> FEATURE:
<223> OTHER INFORMATION: Synthetic Construct

<400> SEQUENCE: 573
ccccaggcug ggccucuggg                                              20

<210> SEQ ID NO 574
<211> LENGTH: 20
<212> TYPE: RNA
<213> ORGANISM: Artificial Sequence
<220> FEATURE:
<223> OTHER INFORMATION: Synthetic Construct

<400> SEQUENCE: 574
cccccuaccc cugcccucaa                                              20

<210> SEQ ID NO 575
<211> LENGTH: 20
<212> TYPE: RNA
<213> ORGANISM: Artificial Sequence
<220> FEATURE:
<223> OTHER INFORMATION: Synthetic Construct

<400> SEQUENCE: 575
cccccugccc cugcccucaa                                              20

<210> SEQ ID NO 576
<211> LENGTH: 20
<212> TYPE: RNA
<213> ORGANISM: Artificial Sequence
<220> FEATURE:
<223> OTHER INFORMATION: Synthetic Construct

<400> SEQUENCE: 576
cccccuucca gcagucacau                                              20

<210> SEQ ID NO 577
<211> LENGTH: 20
<212> TYPE: RNA
<213> ORGANISM: Artificial Sequence
<220> FEATURE:
<223> OTHER INFORMATION: Synthetic Construct

<400> SEQUENCE: 577
cccccuucca gcagucacga                                              20

<210> SEQ ID NO 578
<211> LENGTH: 20
<212> TYPE: RNA
<213> ORGANISM: Artificial Sequence
<220> FEATURE:
<223> OTHER INFORMATION: Synthetic Construct

<400> SEQUENCE: 578
ccccgagcca ggaaacugag                                              20

<210> SEQ ID NO 579
<211> LENGTH: 20
<212> TYPE: RNA
<213> ORGANISM: Artificial Sequence
<220> FEATURE:
<223> OTHER INFORMATION: Synthetic Construct

<400> SEQUENCE: 579
ccccuacccc ugcccucaac                                              20

<210> SEQ ID NO 580

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 580
ccccugcccc ugcccucaac                                               20

<210> SEQ ID NO 581
<211> LENGTH: 20
<212> TYPE: RNA
<213> ORGANISM: Artificial Sequence
<220> FEATURE:
<223> OTHER INFORMATION: Synthetic Construct

<400> SEQUENCE: 581
ccccuuccag cagucacaug                                               20

<210> SEQ ID NO 582
<211> LENGTH: 20
<212> TYPE: RNA
<213> ORGANISM: Artificial Sequence
<220> FEATURE:
<223> OTHER INFORMATION: Synthetic Construct

<400> SEQUENCE: 582
cccgagccag gaaacugaga                                               20

<210> SEQ ID NO 583
<211> LENGTH: 20
<212> TYPE: RNA
<213> ORGANISM: Artificial Sequence
<220> FEATURE:
<223> OTHER INFORMATION: Synthetic Construct

<400> SEQUENCE: 583
cccggcccug uugcugcuca                                               20

<210> SEQ ID NO 584
<211> LENGTH: 20
<212> TYPE: RNA
<213> ORGANISM: Artificial Sequence
<220> FEATURE:
<223> OTHER INFORMATION: Synthetic Construct

<400> SEQUENCE: 584 cccuacccu gcccucaacc                                                20

<210> SEQ ID NO 585
<211> LENGTH: 20
<212> TYPE: RNA
<213> ORGANISM: Artificial Sequence
<220> FEATURE:
<223> OTHER INFORMATION: Synthetic Construct

<400> SEQUENCE: 585
cccuauaagg cuggaggcca                                               20

<210> SEQ ID NO 586
<211> LENGTH: 20
<212> TYPE: RNA
<213> ORGANISM: Artificial Sequence
<220> FEATURE:
<223> OTHER INFORMATION: Synthetic Construct

<400> SEQUENCE: 586
```
cccugagcca ggaaacugag                                                   20

<210> SEQ ID NO 587
<211> LENGTH: 20
<212> TYPE: RNA
<213> ORGANISM: Artificial Sequence
<220> FEATURE:
<223> OTHER INFORMATION: Synthetic Construct

<400> SEQUENCE: 587
cccugaucag acugcaaagg                                                   20

<210> SEQ ID NO 588
<211> LENGTH: 20
<212> TYPE: RNA
<213> ORGANISM: Artificial Sequence
<220> FEATURE:
<223> OTHER INFORMATION: Synthetic Construct

<400> SEQUENCE: 588
cccugccccu gcccucaacc                                                   20

<210> SEQ ID NO 589
<211> LENGTH: 20
<212> TYPE: RNA
<213> ORGANISM: Artificial Sequence
<220> FEATURE:
<223> OTHER INFORMATION: Synthetic Construct

<400> SEQUENCE: 589
cccugccugg agaucccauu                                                   20

<210> SEQ ID NO 590
<211> LENGTH: 20
<212> TYPE: RNA
<213> ORGANISM: Artificial Sequence
<220> FEATURE:
<223> OTHER INFORMATION: Synthetic Construct

<400> SEQUENCE: 590
cccuguaagg cuggaggcca                                                   20

<210> SEQ ID NO 591
<211> LENGTH: 20
<212> TYPE: RNA
<213> ORGANISM: Artificial Sequence
<220> FEATURE:
<223> OTHER INFORMATION: Synthetic Construct

<400> SEQUENCE: 591
cccuuccagc agucacauga                                                   20

<210> SEQ ID NO 592
<211> LENGTH: 20
<212> TYPE: RNA
<213> ORGANISM: Artificial Sequence
<220> FEATURE:
<223> OTHER INFORMATION: Synthetic Construct

<400> SEQUENCE: 592
cccuuccagc agucacgagu                                                   20

<210> SEQ ID NO 593
<211> LENGTH: 20
<212> TYPE: RNA

<213> ORGANISM: Artificial Sequence
<220> FEATURE:
<223> OTHER INFORMATION: Synthetic Construct

<400> SEQUENCE: 593
cccuugcgga gccugcagcc                                                  20

<210> SEQ ID NO 594
<211> LENGTH: 20
<212> TYPE: RNA
<213> ORGANISM: Artificial Sequence
<220> FEATURE:
<223> OTHER INFORMATION: Synthetic Construct

<400> SEQUENCE: 594
ccgagccagg aaacugagaa                                                  20

<210> SEQ ID NO 595
<211> LENGTH: 20
<212> TYPE: RNA
<213> ORGANISM: Artificial Sequence
<220> FEATURE:
<223> OTHER INFORMATION: Synthetic Construct

<400> SEQUENCE: 595
ccgcggacag gugucaccca                                                  20

<210> SEQ ID NO 596
<211> LENGTH: 20
<212> TYPE: RNA
<213> ORGANISM: Artificial Sequence
<220> FEATURE:
<223> OTHER INFORMATION: Synthetic Construct

<400> SEQUENCE: 596
ccgcugucuu ugagcacauc                                                  20

<210> SEQ ID NO 597
<211> LENGTH: 20
<212> TYPE: RNA
<213> ORGANISM: Artificial Sequence
<220> FEATURE:
<223> OTHER INFORMATION: Synthetic Construct

<400> SEQUENCE: 597
ccggccuggg gcaaggccug                                                  20

<210> SEQ ID NO 598
<211> LENGTH: 20
<212> TYPE: RNA
<213> ORGANISM: Artificial Sequence
<220> FEATURE:
<223> OTHER INFORMATION: Synthetic Construct

<400> SEQUENCE: 598
ccgggccucu ggguaccuga                                                  20

<210> SEQ ID NO 599
<211> LENGTH: 20
<212> TYPE: RNA
<213> ORGANISM: Artificial Sequence
<220> FEATURE:
<223> OTHER INFORMATION: Synthetic Construct

<400> SEQUENCE: 599
ccggggcugg gcuuaucagc                                                  20

```
<210> SEQ ID NO 600
<211> LENGTH: 20
<212> TYPE: RNA
<213> ORGANISM: Artificial Sequence
<220> FEATURE:
<223> OTHER INFORMATION: Synthetic Construct

<400> SEQUENCE: 600
ccgguuucuc cauccagacc                                               20

<210> SEQ ID NO 601
<211> LENGTH: 20
<212> TYPE: RNA
<213> ORGANISM: Artificial Sequence
<220> FEATURE:
<223> OTHER INFORMATION: Synthetic Construct

<400> SEQUENCE: 601
ccuauaaggc uggaggccag                                               20

<210> SEQ ID NO 602
<211> LENGTH: 20
<212> TYPE: RNA
<213> ORGANISM: Artificial Sequence
<220> FEATURE:
<223> OTHER INFORMATION: Synthetic Construct

<400> SEQUENCE: 602
ccucagcagg uuacugauag                                               20

<210> SEQ ID NO 603
<211> LENGTH: 20
<212> TYPE: RNA
<213> ORGANISM: Artificial Sequence
<220> FEATURE:
<223> OTHER INFORMATION: Synthetic Construct

<400> SEQUENCE: 603
ccucagguac ccagaggccc                                               20

<210> SEQ ID NO 604
<211> LENGTH: 20
<212> TYPE: RNA
<213> ORGANISM: Artificial Sequence
<220> FEATURE:
<223> OTHER INFORMATION: Synthetic Construct

<400> SEQUENCE: 604
ccuccagccu uacagggaua                                               20

<210> SEQ ID NO 605
<211> LENGTH: 20
<212> TYPE: RNA
<213> ORGANISM: Artificial Sequence
<220> FEATURE:
<223> OTHER INFORMATION: Synthetic Construct

<400> SEQUENCE: 605
ccuccagccu uauagggaua                                               20

<210> SEQ ID NO 606
<211> LENGTH: 20
<212> TYPE: RNA
<213> ORGANISM: Artificial Sequence
<220> FEATURE:
```

<223> OTHER INFORMATION: Synthetic Construct

<400> SEQUENCE: 606
ccucccccag cagguuacug                                          20

<210> SEQ ID NO 607
<211> LENGTH: 20
<212> TYPE: RNA
<213> ORGANISM: Artificial Sequence
<220> FEATURE:
<223> OTHER INFORMATION: Synthetic Construct

<400> SEQUENCE: 607
ccucccucag cagguuacug                                          20

<210> SEQ ID NO 608
<211> LENGTH: 20
<212> TYPE: RNA
<213> ORGANISM: Artificial Sequence
<220> FEATURE:
<223> OTHER INFORMATION: Synthetic Construct

<400> SEQUENCE: 608
ccucgcaguc ccugagccag                                          20

<210> SEQ ID NO 609
<211> LENGTH: 20
<212> TYPE: RNA
<213> ORGANISM: Artificial Sequence
<220> FEATURE:
<223> OTHER INFORMATION: Synthetic Construct

<400> SEQUENCE: 609
ccucugcccc cuaccccugc                                          20

<210> SEQ ID NO 610
<211> LENGTH: 20
<212> TYPE: RNA
<213> ORGANISM: Artificial Sequence
<220> FEATURE:
<223> OTHER INFORMATION: Synthetic Construct

<400> SEQUENCE: 610
ccucugcccc cugccccugc                                          20

<210> SEQ ID NO 611
<211> LENGTH: 20
<212> TYPE: RNA
<213> ORGANISM: Artificial Sequence
<220> FEATURE:
<223> OTHER INFORMATION: Synthetic Construct

<400> SEQUENCE: 611
ccugagccag gaaacugaga                                          20

<210> SEQ ID NO 612
<211> LENGTH: 20
<212> TYPE: RNA
<213> ORGANISM: Artificial Sequence
<220> FEATURE:
<223> OTHER INFORMATION: Synthetic Construct

<400> SEQUENCE: 612
ccugaucaga cugcaaaggc                                          20

-continued

```
<210> SEQ ID NO 613
<211> LENGTH: 20
<212> TYPE: RNA
<213> ORGANISM: Artificial Sequence
<220> FEATURE:
<223> OTHER INFORMATION: Synthetic Construct

<400> SEQUENCE: 613
ccugaugccu cgcagucccc                                                   20

<210> SEQ ID NO 614
<211> LENGTH: 20
<212> TYPE: RNA
<213> ORGANISM: Artificial Sequence
<220> FEATURE:
<223> OTHER INFORMATION: Synthetic Construct

<400> SEQUENCE: 614
ccugaugccu cgcagucccu                                                   20

<210> SEQ ID NO 615
<211> LENGTH: 20
<212> TYPE: RNA
<213> ORGANISM: Artificial Sequence
<220> FEATURE:
<223> OTHER INFORMATION: Synthetic Construct

<400> SEQUENCE: 615
ccugcagccu uugcagucug                                                   20

<210> SEQ ID NO 616
<211> LENGTH: 20
<212> TYPE: RNA
<213> ORGANISM: Artificial Sequence
<220> FEATURE:
<223> OTHER INFORMATION: Synthetic Construct

<400> SEQUENCE: 616
ccugccccug cccucaaccc                                                   20

<210> SEQ ID NO 617
<211> LENGTH: 20
<212> TYPE: RNA
<213> ORGANISM: Artificial Sequence
<220> FEATURE:
<223> OTHER INFORMATION: Synthetic Construct

<400> SEQUENCE: 617
ccugcugagg gaggucuggg                                                   20

<210> SEQ ID NO 618
<211> LENGTH: 20
<212> TYPE: RNA
<213> ORGANISM: Artificial Sequence
<220> FEATURE:
<223> OTHER INFORMATION: Synthetic Construct

<400> SEQUENCE: 618
ccugcugggg gaggucuggg                                                   20

<210> SEQ ID NO 619
<211> LENGTH: 20
<212> TYPE: RNA
<213> ORGANISM: Artificial Sequence
<220> FEATURE:
<223> OTHER INFORMATION: Synthetic Construct
```

-continued

```
<400> SEQUENCE: 619
ccuggagauc ccauuccagu                                               20

<210> SEQ ID NO 620
<211> LENGTH: 20
<212> TYPE: RNA
<213> ORGANISM: Artificial Sequence
<220> FEATURE:
<223> OTHER INFORMATION: Synthetic Construct

<400> SEQUENCE: 620
ccuggagauc ccauuccggu                                               20

<210> SEQ ID NO 621
<211> LENGTH: 20
<212> TYPE: RNA
<213> ORGANISM: Artificial Sequence
<220> FEATURE:
<223> OTHER INFORMATION: Synthetic Construct

<400> SEQUENCE: 621
ccuggcccug uugcugcuca                                               20

<210> SEQ ID NO 622
<211> LENGTH: 20
<212> TYPE: RNA
<213> ORGANISM: Artificial Sequence
<220> FEATURE:
<223> OTHER INFORMATION: Synthetic Construct

<400> SEQUENCE: 622
ccuggcucag ggacugcgag                                               20

<210> SEQ ID NO 623
<211> LENGTH: 20
<212> TYPE: RNA
<213> ORGANISM: Artificial Sequence
<220> FEATURE:
<223> OTHER INFORMATION: Synthetic Construct

<400> SEQUENCE: 623
ccuggcucgg ggacugcgag                                               20

<210> SEQ ID NO 624
<211> LENGTH: 20
<212> TYPE: RNA
<213> ORGANISM: Artificial Sequence
<220> FEATURE:
<223> OTHER INFORMATION: Synthetic Construct

<400> SEQUENCE: 624
ccugggguug agggcagggg                                               20

<210> SEQ ID NO 625
<211> LENGTH: 20
<212> TYPE: RNA
<213> ORGANISM: Artificial Sequence
<220> FEATURE:
<223> OTHER INFORMATION: Synthetic Construct

<400> SEQUENCE: 625
ccuguaaggc uggaggccag                                               20

<210> SEQ ID NO 626
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 626
ccuuacaggg auauucuaag                                               20

<210> SEQ ID NO 627
<211> LENGTH: 20
<212> TYPE: RNA
<213> ORGANISM: Artificial Sequence
<220> FEATURE:
<223> OTHER INFORMATION: Synthetic Construct

<400> SEQUENCE: 627
ccuuauaggg auauucuaag                                               20

<210> SEQ ID NO 628
<211> LENGTH: 20
<212> TYPE: RNA
<213> ORGANISM: Artificial Sequence
<220> FEATURE:
<223> OTHER INFORMATION: Synthetic Construct

<400> SEQUENCE: 628
ccuucucccu aaaucccgu                                                20

<210> SEQ ID NO 629
<211> LENGTH: 20
<212> TYPE: RNA
<213> ORGANISM: Artificial Sequence
<220> FEATURE:
<223> OTHER INFORMATION: Synthetic Construct

<400> SEQUENCE: 629
ccuugcggag ccugcagccu                                               20

<210> SEQ ID NO 630
<211> LENGTH: 20
<212> TYPE: RNA
<213> ORGANISM: Artificial Sequence
<220> FEATURE:
<223> OTHER INFORMATION: Synthetic Construct

<400> SEQUENCE: 630
ccuuugcagu cugaucaggg                                               20

<210> SEQ ID NO 631
<211> LENGTH: 20
<212> TYPE: RNA
<213> ORGANISM: Artificial Sequence
<220> FEATURE:
<223> OTHER INFORMATION: Synthetic Construct

<400> SEQUENCE: 631
cgagccagga aacugagaag                                               20

<210> SEQ ID NO 632
<211> LENGTH: 20
<212> TYPE: RNA
<213> ORGANISM: Artificial Sequence
<220> FEATURE:
<223> OTHER INFORMATION: Synthetic Construct

<400> SEQUENCE: 632
```
cgagcugucu uugagcacau 20

<210> SEQ ID NO 633
<211> LENGTH: 20
<212> TYPE: RNA
<213> ORGANISM: Artificial Sequence
<220> FEATURE:
<223> OTHER INFORMATION: Synthetic Construct

<400> SEQUENCE: 633
cgagucugau cuccacugcc 20

<210> SEQ ID NO 634
<211> LENGTH: 20
<212> TYPE: RNA
<213> ORGANISM: Artificial Sequence
<220> FEATURE:
<223> OTHER INFORMATION: Synthetic Construct

<400> SEQUENCE: 634
cgcagagacu auguguccca 20

<210> SEQ ID NO 635
<211> LENGTH: 20
<212> TYPE: RNA
<213> ORGANISM: Artificial Sequence
<220> FEATURE:
<223> OTHER INFORMATION: Synthetic Construct

<400> SEQUENCE: 635
cgcagucccc gagccaggaa 20

<210> SEQ ID NO 636
<211> LENGTH: 20
<212> TYPE: RNA
<213> ORGANISM: Artificial Sequence
<220> FEATURE:
<223> OTHER INFORMATION: Synthetic Construct

<400> SEQUENCE: 636
cgcagucccu gagccaggaa 20

<210> SEQ ID NO 637
<211> LENGTH: 20
<212> TYPE: RNA
<213> ORGANISM: Artificial Sequence
<220> FEATURE:
<223> OTHER INFORMATION: Synthetic Construct

<400> SEQUENCE: 637
cgccccagcc uaucaggggu 20

<210> SEQ ID NO 638
<211> LENGTH: 20
<212> TYPE: RNA
<213> ORGANISM: Artificial Sequence
<220> FEATURE:
<223> OTHER INFORMATION: Synthetic Construct

<400> SEQUENCE: 638
cgcggacagg ugucacccag 20

<210> SEQ ID NO 639
<211> LENGTH: 20
<212> TYPE: RNA
<213> ORGANISM: Artificial Sequence -continued
<220> FEATURE:
<223> OTHER INFORMATION: Synthetic Construct

<400> SEQUENCE: 639
cgcugucuuu gagcacaucc                                               20

<210> SEQ ID NO 640
<211> LENGTH: 20
<212> TYPE: RNA
<213> ORGANISM: Artificial Sequence
<220> FEATURE:
<223> OTHER INFORMATION: Synthetic Construct

<400> SEQUENCE: 640
cggacaggug ucacccaggg                                               20

<210> SEQ ID NO 641
<211> LENGTH: 20
<212> TYPE: RNA
<213> ORGANISM: Artificial Sequence
<220> FEATURE:
<223> OTHER INFORMATION: Synthetic Construct

<400> SEQUENCE: 641
cggagccugc agccuuugca                                               20

<210> SEQ ID NO 642
<211> LENGTH: 20
<212> TYPE: RNA
<213> ORGANISM: Artificial Sequence
<220> FEATURE:
<223> OTHER INFORMATION: Synthetic Construct

<400> SEQUENCE: 642
cggcagagac uauguguccc                                               20

<210> SEQ ID NO 643
<211> LENGTH: 20
<212> TYPE: RNA
<213> ORGANISM: Artificial Sequence
<220> FEATURE:
<223> OTHER INFORMATION: Synthetic Construct

<400> SEQUENCE: 643
cggcccuguu gcugcucacu                                               20

<210> SEQ ID NO 644
<211> LENGTH: 20
<212> TYPE: RNA
<213> ORGANISM: Artificial Sequence
<220> FEATURE:
<223> OTHER INFORMATION: Synthetic Construct

<400> SEQUENCE: 644
cggccugggg caaggccuga                                               20

<210> SEQ ID NO 645
<211> LENGTH: 20
<212> TYPE: RNA
<213> ORGANISM: Artificial Sequence
<220> FEATURE:
<223> OTHER INFORMATION: Synthetic Construct

<400> SEQUENCE: 645
cgggccucug gguaccugag                                               20

```
<210> SEQ ID NO 646
<211> LENGTH: 20
<212> TYPE: RNA
<213> ORGANISM: Artificial Sequence
<220> FEATURE:
<223> OTHER INFORMATION: Synthetic Construct

<400> SEQUENCE: 646
cggggacugc gaggcaucag                                                   20

<210> SEQ ID NO 647
<211> LENGTH: 20
<212> TYPE: RNA
<213> ORGANISM: Artificial Sequence
<220> FEATURE:
<223> OTHER INFORMATION: Synthetic Construct

<400> SEQUENCE: 647
cggggauuua gggagaaagc                                                   20

<210> SEQ ID NO 648
<211> LENGTH: 20
<212> TYPE: RNA
<213> ORGANISM: Artificial Sequence
<220> FEATURE:
<223> OTHER INFORMATION: Synthetic Construct

<400> SEQUENCE: 648
cggggauuua gggagaaggc                                                   20

<210> SEQ ID NO 649
<211> LENGTH: 20
<212> TYPE: RNA
<213> ORGANISM: Artificial Sequence
<220> FEATURE:
<223> OTHER INFORMATION: Synthetic Construct

<400> SEQUENCE: 649
cggggcuggg cuuaucagcc                                                   20

<210> SEQ ID NO 650
<211> LENGTH: 20
<212> TYPE: RNA
<213> ORGANISM: Artificial Sequence
<220> FEATURE:
<223> OTHER INFORMATION: Synthetic Construct

<400> SEQUENCE: 650 cgggggggccu ucucccuaaa                                                   20

<210> SEQ ID NO 651
<211> LENGTH: 20
<212> TYPE: RNA
<213> ORGANISM: Artificial Sequence
<220> FEATURE:
<223> OTHER INFORMATION: Synthetic Construct

<400> SEQUENCE: 651 cgggggggcuu ucucccuaaa                                                   20

<210> SEQ ID NO 652
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 652
cgguuucucc auccagacca                                              20

<210> SEQ ID NO 653
<211> LENGTH: 20
<212> TYPE: RNA
<213> ORGANISM: Artificial Sequence
<220> FEATURE:
<223> OTHER INFORMATION: Synthetic Construct

<400> SEQUENCE: 653
cguaacuggg caccaguccc                                              20

<210> SEQ ID NO 654
<211> LENGTH: 20
<212> TYPE: RNA
<213> ORGANISM: Artificial Sequence
<220> FEATURE:
<223> OTHER INFORMATION: Synthetic Construct

<400> SEQUENCE: 654
cguaacuggg cacuaguccc                                              20

<210> SEQ ID NO 655
<211> LENGTH: 20
<212> TYPE: RNA
<213> ORGANISM: Artificial Sequence
<220> FEATURE:
<223> OTHER INFORMATION: Synthetic Construct

<400> SEQUENCE: 655
cgugacugcu ggaaggggc                                               20

<210> SEQ ID NO 656
<211> LENGTH: 20
<212> TYPE: RNA
<213> ORGANISM: Artificial Sequence
<220> FEATURE:
<223> OTHER INFORMATION: Synthetic Construct

<400> SEQUENCE: 656
cguggaugug cucaaagaca                                              20

<210> SEQ ID NO 657
<211> LENGTH: 20
<212> TYPE: RNA
<213> ORGANISM: Artificial Sequence
<220> FEATURE:
<223> OTHER INFORMATION: Synthetic Construct

<400> SEQUENCE: 657
cuagucccag cucugucucc                                              20

<210> SEQ ID NO 658
<211> LENGTH: 20
<212> TYPE: RNA
<213> ORGANISM: Artificial Sequence
<220> FEATURE:
<223> OTHER INFORMATION: Synthetic Construct

<400> SEQUENCE: 658
cuagugccca guuacguugg                                              20

<210> SEQ ID NO 659
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 659
cuaucagggg ugaacccugg                                              20

<210> SEQ ID NO 660
<211> LENGTH: 20
<212> TYPE: RNA
<213> ORGANISM: Artificial Sequence
<220> FEATURE:
<223> OTHER INFORMATION: Synthetic Construct

<400> SEQUENCE: 660
cuaucagggg ugagcccugg                                              20

<210> SEQ ID NO 661
<211> LENGTH: 20
<212> TYPE: RNA
<213> ORGANISM: Artificial Sequence
<220> FEATURE:
<223> OTHER INFORMATION: Synthetic Construct

<400> SEQUENCE: 661
cuaucaguaa ccugcugagg                                              20

<210> SEQ ID NO 662
<211> LENGTH: 20
<212> TYPE: RNA
<213> ORGANISM: Artificial Sequence
<220> FEATURE:
<223> OTHER INFORMATION: Synthetic Construct

<400> SEQUENCE: 662
cuaucaguaa ccugcugggg                                              20

<210> SEQ ID NO 663
<211> LENGTH: 20
<212> TYPE: RNA
<213> ORGANISM: Artificial Sequence
<220> FEATURE:
<223> OTHER INFORMATION: Synthetic Construct

<400> SEQUENCE: 663
cuauccugau gccucgcagu                                              20

<210> SEQ ID NO 664
<211> LENGTH: 20
<212> TYPE: RNA
<213> ORGANISM: Artificial Sequence
<220> FEATURE:
<223> OTHER INFORMATION: Synthetic Construct

<400> SEQUENCE: 664
cucaaagaca gcggcagaga                                              20

<210> SEQ ID NO 665
<211> LENGTH: 20
<212> TYPE: RNA
<213> ORGANISM: Artificial Sequence
<220> FEATURE:
<223> OTHER INFORMATION: Synthetic Construct

<400> SEQUENCE: 665
```
cucaaagaca gcucgcagag                                              20

<210> SEQ ID NO 666
<211> LENGTH: 20
<212> TYPE: RNA
<213> ORGANISM: Artificial Sequence
<220> FEATURE:
<223> OTHER INFORMATION: Synthetic Construct

<400> SEQUENCE: 666
cucaccccug auaggcuggg                                              20

<210> SEQ ID NO 667
<211> LENGTH: 20
<212> TYPE: RNA
<213> ORGANISM: Artificial Sequence
<220> FEATURE:
<223> OTHER INFORMATION: Synthetic Construct

<400> SEQUENCE: 667
cucagguacc cagaggccca                                              20

<210> SEQ ID NO 668
<211> LENGTH: 20
<212> TYPE: RNA
<213> ORGANISM: Artificial Sequence
<220> FEATURE:
<223> OTHER INFORMATION: Synthetic Construct

<400> SEQUENCE: 668
cucaguuucc uggcucaggg                                              20

<210> SEQ ID NO 669
<211> LENGTH: 20
<212> TYPE: RNA
<213> ORGANISM: Artificial Sequence
<220> FEATURE:
<223> OTHER INFORMATION: Synthetic Construct

<400> SEQUENCE: 669
cucaguuucc uggcucgggg                                              20

<210> SEQ ID NO 670
<211> LENGTH: 20
<212> TYPE: RNA
<213> ORGANISM: Artificial Sequence
<220> FEATURE:
<223> OTHER INFORMATION: Synthetic Construct

<400> SEQUENCE: 670
cuccagccuu acagggauau                                              20

<210> SEQ ID NO 671
<211> LENGTH: 20
<212> TYPE: RNA
<213> ORGANISM: Artificial Sequence
<220> FEATURE:
<223> OTHER INFORMATION: Synthetic Construct

<400> SEQUENCE: 671
cuccagccuu auagggauau                                              20

<210> SEQ ID NO 672
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 672
cuccuggaag gcccagaccu                                              20

<210> SEQ ID NO 673
<211> LENGTH: 20
<212> TYPE: RNA
<213> ORGANISM: Artificial Sequence
<220> FEATURE:
<223> OTHER INFORMATION: Synthetic Construct

<400> SEQUENCE: 673
cucgcagaga cuaugugucc                                              20

<210> SEQ ID NO 674
<211> LENGTH: 20
<212> TYPE: RNA
<213> ORGANISM: Artificial Sequence
<220> FEATURE:
<223> OTHER INFORMATION: Synthetic Construct

<400> SEQUENCE: 674
cucgcagucc ccgagccagg                                              20

<210> SEQ ID NO 675
<211> LENGTH: 20
<212> TYPE: RNA
<213> ORGANISM: Artificial Sequence
<220> FEATURE:
<223> OTHER INFORMATION: Synthetic Construct

<400> SEQUENCE: 675
cucgcagucc cugagccagg                                              20

<210> SEQ ID NO 676
<211> LENGTH: 20
<212> TYPE: RNA
<213> ORGANISM: Artificial Sequence
<220> FEATURE:
<223> OTHER INFORMATION: Synthetic Construct

<400> SEQUENCE: 676
cucgugacug cuggaagggg                                              20

<210> SEQ ID NO 677
<211> LENGTH: 20
<212> TYPE: RNA
<213> ORGANISM: Artificial Sequence
<220> FEATURE:
<223> OTHER INFORMATION: Synthetic Construct

<400> SEQUENCE: 677
cucugccgcu gucuuugagc                                              20

<210> SEQ ID NO 678
<211> LENGTH: 20
<212> TYPE: RNA
<213> ORGANISM: Artificial Sequence
<220> FEATURE:
<223> OTHER INFORMATION: Synthetic Construct

<400> SEQUENCE: 678
cucugcgagc ugucuuugag                                              20
```

<210> SEQ ID NO 679
<211> LENGTH: 20
<212> TYPE: RNA
<213> ORGANISM: Artificial Sequence
<220> FEATURE:
<223> OTHER INFORMATION: Synthetic Construct

<400> SEQUENCE: 679
cucuguccag aaagaccucc                                               20

<210> SEQ ID NO 680
<211> LENGTH: 20
<212> TYPE: RNA
<213> ORGANISM: Artificial Sequence
<220> FEATURE:
<223> OTHER INFORMATION: Synthetic Construct

<400> SEQUENCE: 680
cucuguccag aaagacuucc                                               20

<210> SEQ ID NO 681
<211> LENGTH: 20
<212> TYPE: RNA
<213> ORGANISM: Artificial Sequence
<220> FEATURE:
<223> OTHER INFORMATION: Synthetic Construct

<400> SEQUENCE: 681
cugagccagg aaacugagaa                                               20

<210> SEQ ID NO 682
<211> LENGTH: 20
<212> TYPE: RNA
<213> ORGANISM: Artificial Sequence
<220> FEATURE:
<223> OTHER INFORMATION: Synthetic Construct

<400> SEQUENCE: 682
cugagggagg ucugggccuu                                               20

<210> SEQ ID NO 683
<211> LENGTH: 20
<212> TYPE: RNA
<213> ORGANISM: Artificial Sequence
<220> FEATURE:
<223> OTHER INFORMATION: Synthetic Construct

<400> SEQUENCE: 683
cugauaagcc cagccccggc                                               20

<210> SEQ ID NO 684
<211> LENGTH: 20
<212> TYPE: RNA
<213> ORGANISM: Artificial Sequence
<220> FEATURE:
<223> OTHER INFORMATION: Synthetic Construct

<400> SEQUENCE: 684
cugaucagac ugcaaaggcu                                               20

<210> SEQ ID NO 685
<211> LENGTH: 20
<212> TYPE: RNA
<213> ORGANISM: Artificial Sequence
<220> FEATURE:

<223> OTHER INFORMATION: Synthetic Construct

<400> SEQUENCE: 685
cugaugccuc gcaguccccg                                                    20

<210> SEQ ID NO 686
<211> LENGTH: 20
<212> TYPE: RNA
<213> ORGANISM: Artificial Sequence
<220> FEATURE:
<223> OTHER INFORMATION: Synthetic Construct

<400> SEQUENCE: 686
cugaugccuc gcagucccug                                                    20

<210> SEQ ID NO 687
<211> LENGTH: 20
<212> TYPE: RNA
<213> ORGANISM: Artificial Sequence
<220> FEATURE:
<223> OTHER INFORMATION: Synthetic Construct

<400> SEQUENCE: 687
cugcaaaggc ugcaggcucc                                                    20

<210> SEQ ID NO 688
<211> LENGTH: 20
<212> TYPE: RNA
<213> ORGANISM: Artificial Sequence
<220> FEATURE:
<223> OTHER INFORMATION: Synthetic Construct

<400> SEQUENCE: 688
cugcagccuu ugcagucuga                                                    20

<210> SEQ ID NO 689
<211> LENGTH: 20
<212> TYPE: RNA
<213> ORGANISM: Artificial Sequence
<220> FEATURE:
<223> OTHER INFORMATION: Synthetic Construct

<400> SEQUENCE: 689 cugccccua ccccugcccu                                                     20

<210> SEQ ID NO 690
<211> LENGTH: 20
<212> TYPE: RNA
<213> ORGANISM: Artificial Sequence
<220> FEATURE:
<223> OTHER INFORMATION: Synthetic Construct

<400> SEQUENCE: 690
cugcccccug ccccugcccu                                                    20

<210> SEQ ID NO 691
<211> LENGTH: 20
<212> TYPE: RNA
<213> ORGANISM: Artificial Sequence
<220> FEATURE:
<223> OTHER INFORMATION: Synthetic Construct

<400> SEQUENCE: 691
cugccgcugu cuuugagcac                                                    20

```
<210> SEQ ID NO 692
<211> LENGTH: 20
<212> TYPE: RNA
<213> ORGANISM: Artificial Sequence
<220> FEATURE:
<223> OTHER INFORMATION: Synthetic Construct

<400> SEQUENCE: 692
cugccuggag aucccauucc                                                   20

<210> SEQ ID NO 693
<211> LENGTH: 20
<212> TYPE: RNA
<213> ORGANISM: Artificial Sequence
<220> FEATURE:
<223> OTHER INFORMATION: Synthetic Construct

<400> SEQUENCE: 693
cugcgagcug ucuuugagca                                                   20

<210> SEQ ID NO 694
<211> LENGTH: 20
<212> TYPE: RNA
<213> ORGANISM: Artificial Sequence
<220> FEATURE:
<223> OTHER INFORMATION: Synthetic Construct

<400> SEQUENCE: 694
cugcuggggg aggucugggc                                                   20

<210> SEQ ID NO 695
<211> LENGTH: 20
<212> TYPE: RNA
<213> ORGANISM: Artificial Sequence
<220> FEATURE:
<223> OTHER INFORMATION: Synthetic Construct

<400> SEQUENCE: 695
cuggaaggcc cagaccuccc                                                   20

<210> SEQ ID NO 696
<211> LENGTH: 20
<212> TYPE: RNA
<213> ORGANISM: Artificial Sequence
<220> FEATURE:
<223> OTHER INFORMATION: Synthetic Construct

<400> SEQUENCE: 696
cuggagaucc cauuccaguu                                                   20

<210> SEQ ID NO 697
<211> LENGTH: 20
<212> TYPE: RNA
<213> ORGANISM: Artificial Sequence
<220> FEATURE:
<223> OTHER INFORMATION: Synthetic Construct

<400> SEQUENCE: 697
cuggccucca gccuuacagg                                                   20

<210> SEQ ID NO 698
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 698
cuggccucca gccuuauagg                                               20

<210> SEQ ID NO 699
<211> LENGTH: 20
<212> TYPE: RNA
<213> ORGANISM: Artificial Sequence
<220> FEATURE:
<223> OTHER INFORMATION: Synthetic Construct

<400> SEQUENCE: 699
cuggcucagg gacugcgagg                                               20

<210> SEQ ID NO 700
<211> LENGTH: 20
<212> TYPE: RNA
<213> ORGANISM: Artificial Sequence
<220> FEATURE:
<223> OTHER INFORMATION: Synthetic Construct

<400> SEQUENCE: 700
cuggcucggg gacugcgagg                                               20

<210> SEQ ID NO 701
<211> LENGTH: 20
<212> TYPE: RNA
<213> ORGANISM: Artificial Sequence
<220> FEATURE:
<223> OTHER INFORMATION: Synthetic Construct

<400> SEQUENCE: 701
cugggacaca uagucucugc                                               20

<210> SEQ ID NO 702
<211> LENGTH: 20
<212> TYPE: RNA
<213> ORGANISM: Artificial Sequence
<220> FEATURE:
<223> OTHER INFORMATION: Synthetic Construct

<400> SEQUENCE: 702
cugggacuag ugcccaguua                                               20

<210> SEQ ID NO 703
<211> LENGTH: 20
<212> TYPE: RNA
<213> ORGANISM: Artificial Sequence
<220> FEATURE:
<223> OTHER INFORMATION: Synthetic Construct

<400> SEQUENCE: 703
cugggcacca gucccagcuc                                               20

<210> SEQ ID NO 704
<211> LENGTH: 20
<212> TYPE: RNA
<213> ORGANISM: Artificial Sequence
<220> FEATURE:
<223> OTHER INFORMATION: Synthetic Construct

<400> SEQUENCE: 704
cugggcacua gucccagcuc                                               20

<210> SEQ ID NO 705
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 705 cugggcucu ggguaccuga                                              20

<210> SEQ ID NO 706
<211> LENGTH: 20
<212> TYPE: RNA
<213> ORGANISM: Artificial Sequence
<220> FEATURE:
<223> OTHER INFORMATION: Synthetic Construct

<400> SEQUENCE: 706
cuggugccca guuacguugg                                             20

<210> SEQ ID NO 707
<211> LENGTH: 20
<212> TYPE: RNA
<213> ORGANISM: Artificial Sequence
<220> FEATURE:
<223> OTHER INFORMATION: Synthetic Construct

<400> SEQUENCE: 707
cuguccagaa agaccuccuu                                             20

<210> SEQ ID NO 708
<211> LENGTH: 20
<212> TYPE: RNA
<213> ORGANISM: Artificial Sequence
<220> FEATURE:
<223> OTHER INFORMATION: Synthetic Construct

<400> SEQUENCE: 708
cuguccagaa agacuuccuu                                             20

<210> SEQ ID NO 709
<211> LENGTH: 20
<212> TYPE: RNA
<213> ORGANISM: Artificial Sequence
<220> FEATURE:
<223> OTHER INFORMATION: Synthetic Construct

<400> SEQUENCE: 709
cuuagaauau cccuauaagg                                             20

<210> SEQ ID NO 710
<211> LENGTH: 20
<212> TYPE: RNA
<213> ORGANISM: Artificial Sequence
<220> FEATURE:
<223> OTHER INFORMATION: Synthetic Construct

<400> SEQUENCE: 710
cuuccagcag ucacaugagu                                             20

<210> SEQ ID NO 711
<211> LENGTH: 20
<212> TYPE: RNA
<213> ORGANISM: Artificial Sequence
<220> FEATURE:
<223> OTHER INFORMATION: Synthetic Construct

<400> SEQUENCE: 711
```

-continued cuuccagcag ucacgagucu                                          20

<210> SEQ ID NO 712
<211> LENGTH: 20
<212> TYPE: RNA
<213> ORGANISM: Artificial Sequence
<220> FEATURE:
<223> OTHER INFORMATION: Synthetic Construct

<400> SEQUENCE: 712
cuuucacaac uuagaauauc                                          20

<210> SEQ ID NO 713
<211> LENGTH: 20
<212> TYPE: RNA
<213> ORGANISM: Artificial Sequence
<220> FEATURE:
<223> OTHER INFORMATION: Synthetic Construct

<400> SEQUENCE: 713
cuuucucccu aaauccccgu                                          20

<210> SEQ ID NO 714
<211> LENGTH: 20
<212> TYPE: RNA
<213> ORGANISM: Artificial Sequence
<220> FEATURE:
<223> OTHER INFORMATION: Synthetic Construct

<400> SEQUENCE: 714
cuuugcaguc ugaucaggga                                          20

<210> SEQ ID NO 715
<211> LENGTH: 20
<212> TYPE: RNA
<213> ORGANISM: Artificial Sequence
<220> FEATURE:
<223> OTHER INFORMATION: Synthetic Construct

<400> SEQUENCE: 715
gaacccuggg ugacaccugu                                          20

<210> SEQ ID NO 716
<211> LENGTH: 20
<212> TYPE: RNA
<213> ORGANISM: Artificial Sequence
<220> FEATURE:
<223> OTHER INFORMATION: Synthetic Construct

<400> SEQUENCE: 716
gaaggaaguc uuucuggaca                                          20

<210> SEQ ID NO 717
<211> LENGTH: 20
<212> TYPE: RNA
<213> ORGANISM: Artificial Sequence
<220> FEATURE:
<223> OTHER INFORMATION: Synthetic Construct

<400> SEQUENCE: 717
gaaggagguc uuucuggaca                                          20

<210> SEQ ID NO 718
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 718
gaaggcccag accucccca                                              20

<210> SEQ ID NO 719
<211> LENGTH: 20
<212> TYPE: RNA
<213> ORGANISM: Artificial Sequence
<220> FEATURE:
<223> OTHER INFORMATION: Synthetic Construct

<400> SEQUENCE: 719
gaaggccccc cgaugguugg                                             20

<210> SEQ ID NO 720
<211> LENGTH: 20
<212> TYPE: RNA
<213> ORGANISM: Artificial Sequence
<220> FEATURE:
<223> OTHER INFORMATION: Synthetic Construct

<400> SEQUENCE: 720
gaagucccug aucagacugc                                             20

<210> SEQ ID NO 721
<211> LENGTH: 20
<212> TYPE: RNA
<213> ORGANISM: Artificial Sequence
<220> FEATURE:
<223> OTHER INFORMATION: Synthetic Construct

<400> SEQUENCE: 721
gacacauagu cucugccgcu                                             20

<210> SEQ ID NO 722
<211> LENGTH: 20
<212> TYPE: RNA
<213> ORGANISM: Artificial Sequence
<220> FEATURE:
<223> OTHER INFORMATION: Synthetic Construct

<400> SEQUENCE: 722
gacacauagu cucugcgagc                                             20

<210> SEQ ID NO 723
<211> LENGTH: 20
<212> TYPE: RNA
<213> ORGANISM: Artificial Sequence
<220> FEATURE:
<223> OTHER INFORMATION: Synthetic Construct

<400> SEQUENCE: 723
gacagagcug ggacuagugc                                             20

<210> SEQ ID NO 724
<211> LENGTH: 20
<212> TYPE: RNA
<213> ORGANISM: Artificial Sequence
<220> FEATURE:
<223> OTHER INFORMATION: Synthetic Construct

<400> SEQUENCE: 724
gacagagcug ggacuggugc                                             20
```

```
<210> SEQ ID NO 725
<211> LENGTH: 20
<212> TYPE: RNA
<213> ORGANISM: Artificial Sequence
<220> FEATURE:
<223> OTHER INFORMATION: Synthetic Construct

<400> SEQUENCE: 725
gacagcggca gagacuaugu                                            20

<210> SEQ ID NO 726
<211> LENGTH: 20
<212> TYPE: RNA
<213> ORGANISM: Artificial Sequence
<220> FEATURE:
<223> OTHER INFORMATION: Synthetic Construct

<400> SEQUENCE: 726
gacagcucgc agagacuaug                                            20

<210> SEQ ID NO 727
<211> LENGTH: 20
<212> TYPE: RNA
<213> ORGANISM: Artificial Sequence
<220> FEATURE:
<223> OTHER INFORMATION: Synthetic Construct

<400> SEQUENCE: 727
gacagguguc acccagggcu                                            20

<210> SEQ ID NO 728
<211> LENGTH: 20
<212> TYPE: RNA
<213> ORGANISM: Artificial Sequence
<220> FEATURE:
<223> OTHER INFORMATION: Synthetic Construct

<400> SEQUENCE: 728
gacagguguc acccaggguu                                            20

<210> SEQ ID NO 729
<211> LENGTH: 20
<212> TYPE: RNA
<213> ORGANISM: Artificial Sequence
<220> FEATURE:
<223> OTHER INFORMATION: Synthetic Construct

<400> SEQUENCE: 729
gaccaacgua acugggcacc                                            20

<210> SEQ ID NO 730
<211> LENGTH: 20
<212> TYPE: RNA
<213> ORGANISM: Artificial Sequence
<220> FEATURE:
<223> OTHER INFORMATION: Synthetic Construct

<400> SEQUENCE: 730
gaccaacgua acugggcacu                                            20

<210> SEQ ID NO 731
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 731
gaccagugag cagcaacagg                                              20

<210> SEQ ID NO 732
<211> LENGTH: 20
<212> TYPE: RNA
<213> ORGANISM: Artificial Sequence
<220> FEATURE:
<223> OTHER INFORMATION: Synthetic Construct

<400> SEQUENCE: 732
gaccucaggu acccagaggc                                              20

<210> SEQ ID NO 733
<211> LENGTH: 20
<212> TYPE: RNA
<213> ORGANISM: Artificial Sequence
<220> FEATURE:
<223> OTHER INFORMATION: Synthetic Construct

<400> SEQUENCE: 733
gacuagugcc caguuacguu                                              20

<210> SEQ ID NO 734
<211> LENGTH: 20
<212> TYPE: RNA
<213> ORGANISM: Artificial Sequence
<220> FEATURE:
<223> OTHER INFORMATION: Synthetic Construct

<400> SEQUENCE: 734
gacugcaaag gcugcaggcu                                              20

<210> SEQ ID NO 735
<211> LENGTH: 20
<212> TYPE: RNA
<213> ORGANISM: Artificial Sequence
<220> FEATURE:
<223> OTHER INFORMATION: Synthetic Construct

<400> SEQUENCE: 735
gacuggugcc caguuacguu                                              20

<210> SEQ ID NO 736
<211> LENGTH: 20
<212> TYPE: RNA
<213> ORGANISM: Artificial Sequence
<220> FEATURE:
<223> OTHER INFORMATION: Synthetic Construct

<400> SEQUENCE: 736
gagaaagccc cccgaugguu                                              20

<210> SEQ ID NO 737
<211> LENGTH: 20
<212> TYPE: RNA
<213> ORGANISM: Artificial Sequence
<220> FEATURE:
<223> OTHER INFORMATION: Synthetic Construct

<400> SEQUENCE: 737
gagaaggccc cccgaugguu                                              20

<210> SEQ ID NO 738
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 738
gagacagagc ugggacuagu                                               20

<210> SEQ ID NO 739
<211> LENGTH: 20
<212> TYPE: RNA
<213> ORGANISM: Artificial Sequence
<220> FEATURE:
<223> OTHER INFORMATION: Synthetic Construct

<400> SEQUENCE: 739
gagacagagc ugggacuggu                                               20

<210> SEQ ID NO 740
<211> LENGTH: 20
<212> TYPE: RNA
<213> ORGANISM: Artificial Sequence
<220> FEATURE:
<223> OTHER INFORMATION: Synthetic Construct

<400> SEQUENCE: 740
gagaccaacg uaacugggca                                               20

<210> SEQ ID NO 741
<211> LENGTH: 20
<212> TYPE: RNA
<213> ORGANISM: Artificial Sequence
<220> FEATURE:
<223> OTHER INFORMATION: Synthetic Construct

<400> SEQUENCE: 741
gagaucagac ucaugugacu                                               20

<210> SEQ ID NO 742
<211> LENGTH: 20
<212> TYPE: RNA
<213> ORGANISM: Artificial Sequence
<220> FEATURE:
<223> OTHER INFORMATION: Synthetic Construct

<400> SEQUENCE: 742
gagaucccau uccaguuucu                                               20

<210> SEQ ID NO 743
<211> LENGTH: 20
<212> TYPE: RNA
<213> ORGANISM: Artificial Sequence
<220> FEATURE:
<223> OTHER INFORMATION: Synthetic Construct

<400> SEQUENCE: 743
gagaucccau uccgguuucu                                               20

<210> SEQ ID NO 744
<211> LENGTH: 20
<212> TYPE: RNA
<213> ORGANISM: Artificial Sequence
<220> FEATURE:
<223> OTHER INFORMATION: Synthetic Construct

<400> SEQUENCE: 744
```
gagcagcaac agggccaggg                                            20

<210> SEQ ID NO 745
<211> LENGTH: 20
<212> TYPE: RNA
<213> ORGANISM: Artificial Sequence
<220> FEATURE:
<223> OTHER INFORMATION: Synthetic Construct

<400> SEQUENCE: 745
gagcagcaac agggccgggg                                            20

<210> SEQ ID NO 746
<211> LENGTH: 20
<212> TYPE: RNA
<213> ORGANISM: Artificial Sequence
<220> FEATURE:
<223> OTHER INFORMATION: Synthetic Construct

<400> SEQUENCE: 746
gagccaacca ucgggggggcc                                           20

<210> SEQ ID NO 747
<211> LENGTH: 20
<212> TYPE: RNA
<213> ORGANISM: Artificial Sequence
<220> FEATURE:
<223> OTHER INFORMATION: Synthetic Construct

<400> SEQUENCE: 747
gagccaacca ucgggggggcu                                           20

<210> SEQ ID NO 748
<211> LENGTH: 20
<212> TYPE: RNA
<213> ORGANISM: Artificial Sequence
<220> FEATURE:
<223> OTHER INFORMATION: Synthetic Construct

<400> SEQUENCE: 748
gagcccuggg ugacaccugu                                            20

<210> SEQ ID NO 749
<211> LENGTH: 20
<212> TYPE: RNA
<213> ORGANISM: Artificial Sequence
<220> FEATURE:
<223> OTHER INFORMATION: Synthetic Construct

<400> SEQUENCE: 749
gagccugcag ccuuugcagu                                            20

<210> SEQ ID NO 750
<211> LENGTH: 20
<212> TYPE: RNA
<213> ORGANISM: Artificial Sequence
<220> FEATURE:
<223> OTHER INFORMATION: Synthetic Construct

<400> SEQUENCE: 750
gagcugggac uggugcccag                                            20

<210> SEQ ID NO 751
<211> LENGTH: 20
<212> TYPE: RNA

<213> ORGANISM: Artificial Sequence
<220> FEATURE:
<223> OTHER INFORMATION: Synthetic Construct

<400> SEQUENCE: 751
gagcugucuu ugagcacauc                                        20

<210> SEQ ID NO 752
<211> LENGTH: 20
<212> TYPE: RNA
<213> ORGANISM: Artificial Sequence
<220> FEATURE:
<223> OTHER INFORMATION: Synthetic Construct

<400> SEQUENCE: 752
gaggcccagc cugggcaag                                         20

<210> SEQ ID NO 753
<211> LENGTH: 20
<212> TYPE: RNA
<213> ORGANISM: Artificial Sequence
<220> FEATURE:
<223> OTHER INFORMATION: Synthetic Construct

<400> SEQUENCE: 753
gaggcccggc cugggcaag                                         20

<210> SEQ ID NO 754
<211> LENGTH: 20
<212> TYPE: RNA
<213> ORGANISM: Artificial Sequence
<220> FEATURE:
<223> OTHER INFORMATION: Synthetic Construct

<400> SEQUENCE: 754
gagggcaggg gcagggggca                                        20

<210> SEQ ID NO 755
<211> LENGTH: 20
<212> TYPE: RNA
<213> ORGANISM: Artificial Sequence
<220> FEATURE:
<223> OTHER INFORMATION: Synthetic Construct

<400> SEQUENCE: 755
gagggcaggg guaggggggca                                       20

<210> SEQ ID NO 756
<211> LENGTH: 20
<212> TYPE: RNA
<213> ORGANISM: Artificial Sequence
<220> FEATURE:
<223> OTHER INFORMATION: Synthetic Construct

<400> SEQUENCE: 756
gagucugauc uccacugcca                                        20

<210> SEQ ID NO 757
<211> LENGTH: 20
<212> TYPE: RNA
<213> ORGANISM: Artificial Sequence
<220> FEATURE:
<223> OTHER INFORMATION: Synthetic Construct

<400> SEQUENCE: 757
gauaagccca gccccggccc                                        20

<210> SEQ ID NO 758
<211> LENGTH: 20
<212> TYPE: RNA
<213> ORGANISM: Artificial Sequence
<220> FEATURE:
<223> OTHER INFORMATION: Synthetic Construct

<400> SEQUENCE: 758
gauaagccca gcccuggccc                                               20

<210> SEQ ID NO 759
<211> LENGTH: 20
<212> TYPE: RNA
<213> ORGANISM: Artificial Sequence
<220> FEATURE:
<223> OTHER INFORMATION: Synthetic Construct

<400> SEQUENCE: 759
gaucagacuc gugacugcug                                               20

<210> SEQ ID NO 760
<211> LENGTH: 20
<212> TYPE: RNA
<213> ORGANISM: Artificial Sequence
<220> FEATURE:
<223> OTHER INFORMATION: Synthetic Construct

<400> SEQUENCE: 760
gaucccauuc cgguuucucc                                               20

<210> SEQ ID NO 761
<211> LENGTH: 20
<212> TYPE: RNA
<213> ORGANISM: Artificial Sequence
<220> FEATURE:
<223> OTHER INFORMATION: Synthetic Construct

<400> SEQUENCE: 761
gaugccucgc aguccccgag                                               20

<210> SEQ ID NO 762
<211> LENGTH: 20
<212> TYPE: RNA
<213> ORGANISM: Artificial Sequence
<220> FEATURE:
<223> OTHER INFORMATION: Synthetic Construct

<400> SEQUENCE: 762
gaugccucgc agucccugag                                               20

<210> SEQ ID NO 763
<211> LENGTH: 20
<212> TYPE: RNA
<213> ORGANISM: Artificial Sequence
<220> FEATURE:
<223> OTHER INFORMATION: Synthetic Construct

<400> SEQUENCE: 763
gauggagaaa ccggaauggg                                               20

<210> SEQ ID NO 764
<211> LENGTH: 20
<212> TYPE: RNA
<213> ORGANISM: Artificial Sequence
<220> FEATURE:

<223> OTHER INFORMATION: Synthetic Construct

<400> SEQUENCE: 764
gauggagaaa cuggaauggg                                           20

<210> SEQ ID NO 765
<211> LENGTH: 20
<212> TYPE: RNA
<213> ORGANISM: Artificial Sequence
<220> FEATURE:
<223> OTHER INFORMATION: Synthetic Construct

<400> SEQUENCE: 765
gauggcagug gagaucagac                                           20

<210> SEQ ID NO 766
<211> LENGTH: 20
<212> TYPE: RNA
<213> ORGANISM: Artificial Sequence
<220> FEATURE:
<223> OTHER INFORMATION: Synthetic Construct

<400> SEQUENCE: 766
gaugugcuca aagacagcgg                                           20

<210> SEQ ID NO 767
<211> LENGTH: 20
<212> TYPE: RNA
<213> ORGANISM: Artificial Sequence
<220> FEATURE:
<223> OTHER INFORMATION: Synthetic Construct

<400> SEQUENCE: 767
gaugugcuca aagacagcuc                                           20

<210> SEQ ID NO 768
<211> LENGTH: 20
<212> TYPE: RNA
<213> ORGANISM: Artificial Sequence
<220> FEATURE:
<223> OTHER INFORMATION: Synthetic Construct

<400> SEQUENCE: 768
gcaaaggcug caggcuccgc                                           20

<210> SEQ ID NO 769
<211> LENGTH: 20
<212> TYPE: RNA
<213> ORGANISM: Artificial Sequence
<220> FEATURE:
<223> OTHER INFORMATION: Synthetic Construct

<400> SEQUENCE: 769
gcaacagggc cagggcuggg                                           20

<210> SEQ ID NO 770
<211> LENGTH: 20
<212> TYPE: RNA
<213> ORGANISM: Artificial Sequence
<220> FEATURE:
<223> OTHER INFORMATION: Synthetic Construct

<400> SEQUENCE: 770
gcaacagggc cggggcuggg                                           20

<210> SEQ ID NO 771
<211> LENGTH: 20
<212> TYPE: RNA
<213> ORGANISM: Artificial Sequence
<220> FEATURE:
<223> OTHER INFORMATION: Synthetic Construct

<400> SEQUENCE: 771
gcaccagucc cagcucuguc                                               20

<210> SEQ ID NO 772
<211> LENGTH: 20
<212> TYPE: RNA
<213> ORGANISM: Artificial Sequence
<220> FEATURE:
<223> OTHER INFORMATION: Synthetic Construct

<400> SEQUENCE: 772
gcacccuugc ggagccugca                                               20

<210> SEQ ID NO 773
<211> LENGTH: 20
<212> TYPE: RNA
<213> ORGANISM: Artificial Sequence
<220> FEATURE:
<223> OTHER INFORMATION: Synthetic Construct

<400> SEQUENCE: 773
gcagggguag ggggcagagg                                               20

<210> SEQ ID NO 774
<211> LENGTH: 20
<212> TYPE: RNA
<213> ORGANISM: Artificial Sequence
<220> FEATURE:
<223> OTHER INFORMATION: Synthetic Construct

<400> SEQUENCE: 774
gcagucacau gagucugauc                                               20

<210> SEQ ID NO 775
<211> LENGTH: 20
<212> TYPE: RNA
<213> ORGANISM: Artificial Sequence
<220> FEATURE:
<223> OTHER INFORMATION: Synthetic Construct

<400> SEQUENCE: 775
gcagucacga gucugaucuc                                               20

<210> SEQ ID NO 776
<211> LENGTH: 20
<212> TYPE: RNA
<213> ORGANISM: Artificial Sequence
<220> FEATURE:
<223> OTHER INFORMATION: Synthetic Construct

<400> SEQUENCE: 776
gcaguccccg agccaggaaa                                               20

<210> SEQ ID NO 777
<211> LENGTH: 20
<212> TYPE: RNA
<213> ORGANISM: Artificial Sequence
<220> FEATURE:
<223> OTHER INFORMATION: Synthetic Construct

<400> SEQUENCE: 777
gcagucccug agccaggaaa                                                         20

<210> SEQ ID NO 778
<211> LENGTH: 20
<212> TYPE: RNA
<213> ORGANISM: Artificial Sequence
<220> FEATURE:
<223> OTHER INFORMATION: Synthetic Construct

<400> SEQUENCE: 778
gcaguggaga ucagacucgu                                                         20

<210> SEQ ID NO 779
<211> LENGTH: 20
<212> TYPE: RNA
<213> ORGANISM: Artificial Sequence
<220> FEATURE:
<223> OTHER INFORMATION: Synthetic Construct

<400> SEQUENCE: 779
gccaaccauc gggggggccuu                                                        20

<210> SEQ ID NO 780
<211> LENGTH: 20
<212> TYPE: RNA
<213> ORGANISM: Artificial Sequence
<220> FEATURE:
<223> OTHER INFORMATION: Synthetic Construct

<400> SEQUENCE: 780
gccaaccauc gggggggcuuu                                                        20

<210> SEQ ID NO 781
<211> LENGTH: 20
<212> TYPE: RNA
<213> ORGANISM: Artificial Sequence
<220> FEATURE:
<223> OTHER INFORMATION: Synthetic Construct

<400> SEQUENCE: 781
gccagggcug ggcuuaucag                                                         20

<210> SEQ ID NO 782
<211> LENGTH: 20
<212> TYPE: RNA
<213> ORGANISM: Artificial Sequence
<220> FEATURE:
<223> OTHER INFORMATION: Synthetic Construct

<400> SEQUENCE: 782
gcccagaccu cccccagcag                                                         20

<210> SEQ ID NO 783
<211> LENGTH: 20
<212> TYPE: RNA
<213> ORGANISM: Artificial Sequence
<220> FEATURE:
<223> OTHER INFORMATION: Synthetic Construct

<400> SEQUENCE: 783
gcccagaccu ccccucagcag                                                        20

<210> SEQ ID NO 784
<211> LENGTH: 20

```
<212> TYPE: RNA
<213> ORGANISM: Artificial Sequence
<220> FEATURE:
<223> OTHER INFORMATION: Synthetic Construct

<400> SEQUENCE: 784
gcccagcccc ggcccuguug                                              20

<210> SEQ ID NO 785
<211> LENGTH: 20
<212> TYPE: RNA
<213> ORGANISM: Artificial Sequence
<220> FEATURE:
<223> OTHER INFORMATION: Synthetic Construct

<400> SEQUENCE: 785
gcccagcccu ggcccuguug                                              20

<210> SEQ ID NO 786
<211> LENGTH: 20
<212> TYPE: RNA
<213> ORGANISM: Artificial Sequence
<220> FEATURE:
<223> OTHER INFORMATION: Synthetic Construct

<400> SEQUENCE: 786
gccccagccu aucaggggug                                              20

<210> SEQ ID NO 787
<211> LENGTH: 20
<212> TYPE: RNA
<213> ORGANISM: Artificial Sequence
<220> FEATURE:
<223> OTHER INFORMATION: Synthetic Construct

<400> SEQUENCE: 787
gccccaggcc gggccucugg                                              20

<210> SEQ ID NO 788
<211> LENGTH: 20
<212> TYPE: RNA
<213> ORGANISM: Artificial Sequence
<220> FEATURE:
<223> OTHER INFORMATION: Synthetic Construct

<400> SEQUENCE: 788
gccccaggcu gggccucugg                                              20

<210> SEQ ID NO 789
<211> LENGTH: 20
<212> TYPE: RNA
<213> ORGANISM: Artificial Sequence
<220> FEATURE:
<223> OTHER INFORMATION: Synthetic Construct

<400> SEQUENCE: 789
gcccccuacc ccugcccuca                                              20

<210> SEQ ID NO 790
<211> LENGTH: 20
<212> TYPE: RNA
<213> ORGANISM: Artificial Sequence
<220> FEATURE:
<223> OTHER INFORMATION: Synthetic Construct

<400> SEQUENCE: 790
```
gcccccugcc ccugcccuca                                          20

<210> SEQ ID NO 791
<211> LENGTH: 20
<212> TYPE: RNA
<213> ORGANISM: Artificial Sequence
<220> FEATURE:
<223> OTHER INFORMATION: Synthetic Construct

<400> SEQUENCE: 791
gccccggccc uguugcugcu                                          20

<210> SEQ ID NO 792
<211> LENGTH: 20
<212> TYPE: RNA
<213> ORGANISM: Artificial Sequence
<220> FEATURE:
<223> OTHER INFORMATION: Synthetic Construct

<400> SEQUENCE: 792
gcccuggccc uguugcugcu                                          20

<210> SEQ ID NO 793
<211> LENGTH: 20
<212> TYPE: RNA
<213> ORGANISM: Artificial Sequence
<220> FEATURE:
<223> OTHER INFORMATION: Synthetic Construct

<400> SEQUENCE: 793
gcccugggug acaccugucc                                          20

<210> SEQ ID NO 794
<211> LENGTH: 20
<212> TYPE: RNA
<213> ORGANISM: Artificial Sequence
<220> FEATURE:
<223> OTHER INFORMATION: Synthetic Construct

<400> SEQUENCE: 794
gccggggcug ggcuuaucag                                          20

<210> SEQ ID NO 795
<211> LENGTH: 20
<212> TYPE: RNA
<213> ORGANISM: Artificial Sequence
<220> FEATURE:
<223> OTHER INFORMATION: Synthetic Construct

<400> SEQUENCE: 795
gccuccagcc uuacagggau                                          20

<210> SEQ ID NO 796
<211> LENGTH: 20
<212> TYPE: RNA
<213> ORGANISM: Artificial Sequence
<220> FEATURE:
<223> OTHER INFORMATION: Synthetic Construct

<400> SEQUENCE: 796
gccuccagcc uuauagggau                                          20

<210> SEQ ID NO 797
<211> LENGTH: 20
<212> TYPE: RNA
<213> ORGANISM: Artificial Sequence -continued
<220> FEATURE:
<223> OTHER INFORMATION: Synthetic Construct

<400> SEQUENCE: 797
gccucugccc ccuaccccug                                           20

<210> SEQ ID NO 798
<211> LENGTH: 20
<212> TYPE: RNA
<213> ORGANISM: Artificial Sequence
<220> FEATURE:
<223> OTHER INFORMATION: Synthetic Construct

<400> SEQUENCE: 798
gccucugccc ccugccccug                                           20

<210> SEQ ID NO 799
<211> LENGTH: 20
<212> TYPE: RNA
<213> ORGANISM: Artificial Sequence
<220> FEATURE:
<223> OTHER INFORMATION: Synthetic Construct

<400> SEQUENCE: 799
gccugcagcc uuugcagucu                                           20

<210> SEQ ID NO 800
<211> LENGTH: 20
<212> TYPE: RNA
<213> ORGANISM: Artificial Sequence
<220> FEATURE:
<223> OTHER INFORMATION: Synthetic Construct

<400> SEQUENCE: 800
gccuggagau cccauuccag                                           20

<210> SEQ ID NO 801
<211> LENGTH: 20
<212> TYPE: RNA
<213> ORGANISM: Artificial Sequence
<220> FEATURE:
<223> OTHER INFORMATION: Synthetic Construct

<400> SEQUENCE: 801
gccuggagau cccauuccgg                                           20

<210> SEQ ID NO 802
<211> LENGTH: 20
<212> TYPE: RNA
<213> ORGANISM: Artificial Sequence
<220> FEATURE:
<223> OTHER INFORMATION: Synthetic Construct

<400> SEQUENCE: 802 gccuggguu gagggcaggg                                            20

<210> SEQ ID NO 803
<211> LENGTH: 20
<212> TYPE: RNA
<213> ORGANISM: Artificial Sequence
<220> FEATURE:
<223> OTHER INFORMATION: Synthetic Construct

<400> SEQUENCE: 803
gccuuacagg gauauucuaa                                           20

```
<210> SEQ ID NO 804
<211> LENGTH: 20
<212> TYPE: RNA
<213> ORGANISM: Artificial Sequence
<220> FEATURE:
<223> OTHER INFORMATION: Synthetic Construct

<400> SEQUENCE: 804
gccuuauagg gauauucuaa                                                   20

<210> SEQ ID NO 805
<211> LENGTH: 20
<212> TYPE: RNA
<213> ORGANISM: Artificial Sequence
<220> FEATURE:
<223> OTHER INFORMATION: Synthetic Construct

<400> SEQUENCE: 805
gccuugcccc aggccgggcc                                                   20

<210> SEQ ID NO 806
<211> LENGTH: 20
<212> TYPE: RNA
<213> ORGANISM: Artificial Sequence
<220> FEATURE:
<223> OTHER INFORMATION: Synthetic Construct

<400> SEQUENCE: 806
gccuugcccc aggcugggcc                                                   20

<210> SEQ ID NO 807
<211> LENGTH: 20
<212> TYPE: RNA
<213> ORGANISM: Artificial Sequence
<220> FEATURE:
<223> OTHER INFORMATION: Synthetic Construct

<400> SEQUENCE: 807
gccuuugcag ucugaucagg                                                   20

<210> SEQ ID NO 808
<211> LENGTH: 20
<212> TYPE: RNA
<213> ORGANISM: Artificial Sequence
<220> FEATURE:
<223> OTHER INFORMATION: Synthetic Construct

<400> SEQUENCE: 808
gcgagcuguc uuugagcaca                                                   20

<210> SEQ ID NO 809
<211> LENGTH: 20
<212> TYPE: RNA
<213> ORGANISM: Artificial Sequence
<220> FEATURE:
<223> OTHER INFORMATION: Synthetic Construct

<400> SEQUENCE: 809
gcggagccug cagccuuugc                                                   20

<210> SEQ ID NO 810
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 810
gcggcagaga cuauguqucc                                              20

<210> SEQ ID NO 811
<211> LENGTH: 20
<212> TYPE: RNA
<213> ORGANISM: Artificial Sequence
<220> FEATURE:
<223> OTHER INFORMATION: Synthetic Construct

<400> SEQUENCE: 811
gcucaaagac agcggcagag                                              20

<210> SEQ ID NO 812
<211> LENGTH: 20
<212> TYPE: RNA
<213> ORGANISM: Artificial Sequence
<220> FEATURE:
<223> OTHER INFORMATION: Synthetic Construct

<400> SEQUENCE: 812
gcucaaagac agcucgcaga                                              20

<210> SEQ ID NO 813
<211> LENGTH: 20
<212> TYPE: RNA
<213> ORGANISM: Artificial Sequence
<220> FEATURE:
<223> OTHER INFORMATION: Synthetic Construct

<400> SEQUENCE: 813
gcucgcagag acuauguguc                                              20

<210> SEQ ID NO 814
<211> LENGTH: 20
<212> TYPE: RNA
<213> ORGANISM: Artificial Sequence
<220> FEATURE:
<223> OTHER INFORMATION: Synthetic Construct

<400> SEQUENCE: 814
gcucugucca gaaagaccuc                                              20

<210> SEQ ID NO 815
<211> LENGTH: 20
<212> TYPE: RNA
<213> ORGANISM: Artificial Sequence
<220> FEATURE:
<223> OTHER INFORMATION: Synthetic Construct

<400> SEQUENCE: 815
gcucugucca gaaagacuuc                                              20

<210> SEQ ID NO 816
<211> LENGTH: 20
<212> TYPE: RNA
<213> ORGANISM: Artificial Sequence
<220> FEATURE:
<223> OTHER INFORMATION: Synthetic Construct

<400> SEQUENCE: 816
gcugagggag gucugggccu                                              20

<210> SEQ ID NO 817
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 817
gcugauaagc ccagccccgg                                              20

<210> SEQ ID NO 818
<211> LENGTH: 20
<212> TYPE: RNA
<213> ORGANISM: Artificial Sequence
<220> FEATURE:
<223> OTHER INFORMATION: Synthetic Construct

<400> SEQUENCE: 818
gcugauaagc ccagcccugg                                              20

<210> SEQ ID NO 819
<211> LENGTH: 20
<212> TYPE: RNA
<213> ORGANISM: Artificial Sequence
<220> FEATURE:
<223> OTHER INFORMATION: Synthetic Construct

<400> SEQUENCE: 819
gcugggacua gugcccaguu                                              20

<210> SEQ ID NO 820
<211> LENGTH: 20
<212> TYPE: RNA
<213> ORGANISM: Artificial Sequence
<220> FEATURE:
<223> OTHER INFORMATION: Synthetic Construct

<400> SEQUENCE: 820
gcugggacug gugcccaguu                                              20

<210> SEQ ID NO 821
<211> LENGTH: 20
<212> TYPE: RNA
<213> ORGANISM: Artificial Sequence
<220> FEATURE:
<223> OTHER INFORMATION: Synthetic Construct

<400> SEQUENCE: 821 gcuggggag gucugggccu                                               20

<210> SEQ ID NO 822
<211> LENGTH: 20
<212> TYPE: RNA
<213> ORGANISM: Artificial Sequence
<220> FEATURE:
<223> OTHER INFORMATION: Synthetic Construct

<400> SEQUENCE: 822
ggaaggccca gaccuccccc                                              20

<210> SEQ ID NO 823
<211> LENGTH: 20
<212> TYPE: RNA
<213> ORGANISM: Artificial Sequence
<220> FEATURE:
<223> OTHER INFORMATION: Synthetic Construct

<400> SEQUENCE: 823
```
ggaaggccca gaccucccuc                                                    20

<210> SEQ ID NO 824
<211> LENGTH: 20
<212> TYPE: RNA
<213> ORGANISM: Artificial Sequence
<220> FEATURE:
<223> OTHER INFORMATION: Synthetic Construct

<400> SEQUENCE: 824
ggacacauag ucucugccgc                                                    20

<210> SEQ ID NO 825
<211> LENGTH: 20
<212> TYPE: RNA
<213> ORGANISM: Artificial Sequence
<220> FEATURE:
<223> OTHER INFORMATION: Synthetic Construct

<400> SEQUENCE: 825
ggacacauag ucucugcgag                                                    20

<210> SEQ ID NO 826
<211> LENGTH: 20
<212> TYPE: RNA
<213> ORGANISM: Artificial Sequence
<220> FEATURE:
<223> OTHER INFORMATION: Synthetic Construct

<400> SEQUENCE: 826
ggacaggugu cacccagggc                                                    20

<210> SEQ ID NO 827
<211> LENGTH: 20
<212> TYPE: RNA
<213> ORGANISM: Artificial Sequence
<220> FEATURE:
<223> OTHER INFORMATION: Synthetic Construct

<400> SEQUENCE: 827
ggacaggugu cacccagggu                                                    20

<210> SEQ ID NO 828
<211> LENGTH: 20
<212> TYPE: RNA
<213> ORGANISM: Artificial Sequence
<220> FEATURE:
<223> OTHER INFORMATION: Synthetic Construct

<400> SEQUENCE: 828
ggacuucuca guuccuggc                                                     20

<210> SEQ ID NO 829
<211> LENGTH: 20
<212> TYPE: RNA
<213> ORGANISM: Artificial Sequence
<220> FEATURE:
<223> OTHER INFORMATION: Synthetic Construct

<400> SEQUENCE: 829
ggagaaaccg gaaugggauc                                                    20

<210> SEQ ID NO 830
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 830
ggagaaacug gaaugggauc                                              20

<210> SEQ ID NO 831
<211> LENGTH: 20
<212> TYPE: RNA
<213> ORGANISM: Artificial Sequence
<220> FEATURE:
<223> OTHER INFORMATION: Synthetic Construct

<400> SEQUENCE: 831
ggagacagag cugggacuag                                              20

<210> SEQ ID NO 832
<211> LENGTH: 20
<212> TYPE: RNA
<213> ORGANISM: Artificial Sequence
<220> FEATURE:
<223> OTHER INFORMATION: Synthetic Construct

<400> SEQUENCE: 832
ggagacagag cugggacugg                                              20

<210> SEQ ID NO 833
<211> LENGTH: 20
<212> TYPE: RNA
<213> ORGANISM: Artificial Sequence
<220> FEATURE:
<223> OTHER INFORMATION: Synthetic Construct

<400> SEQUENCE: 833
ggagaucaga cucaugugac                                              20

<210> SEQ ID NO 834
<211> LENGTH: 20
<212> TYPE: RNA
<213> ORGANISM: Artificial Sequence
<220> FEATURE:
<223> OTHER INFORMATION: Synthetic Construct

<400> SEQUENCE: 834
ggagauccca uuccaguuuc                                              20

<210> SEQ ID NO 835
<211> LENGTH: 20
<212> TYPE: RNA
<213> ORGANISM: Artificial Sequence
<220> FEATURE:
<223> OTHER INFORMATION: Synthetic Construct

<400> SEQUENCE: 835
ggagauccca uuccgguuuc                                              20

<210> SEQ ID NO 836
<211> LENGTH: 20
<212> TYPE: RNA
<213> ORGANISM: Artificial Sequence
<220> FEATURE:
<223> OTHER INFORMATION: Synthetic Construct

<400> SEQUENCE: 836
ggagccaacc aucggggggc                                              20
```

```
<210> SEQ ID NO 837
<211> LENGTH: 20
<212> TYPE: RNA
<213> ORGANISM: Artificial Sequence
<220> FEATURE:
<223> OTHER INFORMATION: Synthetic Construct

<400> SEQUENCE: 837
ggaggcugau aagcccagcc                                              20

<210> SEQ ID NO 838
<211> LENGTH: 20
<212> TYPE: RNA
<213> ORGANISM: Artificial Sequence
<220> FEATURE:
<223> OTHER INFORMATION: Synthetic Construct

<400> SEQUENCE: 838
ggaggucuuu cuggacagag                                              20

<210> SEQ ID NO 839
<211> LENGTH: 20
<212> TYPE: RNA
<213> ORGANISM: Artificial Sequence
<220> FEATURE:
<223> OTHER INFORMATION: Synthetic Construct

<400> SEQUENCE: 839
ggauggagaa accggaaugg                                              20

<210> SEQ ID NO 840
<211> LENGTH: 20
<212> TYPE: RNA
<213> ORGANISM: Artificial Sequence
<220> FEATURE:
<223> OTHER INFORMATION: Synthetic Construct

<400> SEQUENCE: 840
ggauggcagu ggagaucaga                                              20

<210> SEQ ID NO 841
<211> LENGTH: 20
<212> TYPE: RNA
<213> ORGANISM: Artificial Sequence
<220> FEATURE:
<223> OTHER INFORMATION: Synthetic Construct

<400> SEQUENCE: 841
ggaugugcuc aaagacagcg                                              20

<210> SEQ ID NO 842
<211> LENGTH: 20
<212> TYPE: RNA
<213> ORGANISM: Artificial Sequence
<220> FEATURE:
<223> OTHER INFORMATION: Synthetic Construct

<400> SEQUENCE: 842
ggaugugcuc aaagacagcu                                              20

<210> SEQ ID NO 843
<211> LENGTH: 20
<212> TYPE: RNA
<213> ORGANISM: Artificial Sequence
<220> FEATURE:
```

-continued

```
<223> OTHER INFORMATION: Synthetic Construct

<400> SEQUENCE: 843
ggauuuaggg agaaagcccc                                              20

<210> SEQ ID NO 844
<211> LENGTH: 20
<212> TYPE: RNA
<213> ORGANISM: Artificial Sequence
<220> FEATURE:
<223> OTHER INFORMATION: Synthetic Construct

<400> SEQUENCE: 844
ggauuuaggg agaaggcccc                                              20

<210> SEQ ID NO 845
<211> LENGTH: 20
<212> TYPE: RNA
<213> ORGANISM: Artificial Sequence
<220> FEATURE:
<223> OTHER INFORMATION: Synthetic Construct

<400> SEQUENCE: 845
ggcaccaguc ccagcucugu                                              20

<210> SEQ ID NO 846
<211> LENGTH: 20
<212> TYPE: RNA
<213> ORGANISM: Artificial Sequence
<220> FEATURE:
<223> OTHER INFORMATION: Synthetic Construct

<400> SEQUENCE: 846
ggcacuaguc ccagcucugu                                              20

<210> SEQ ID NO 847
<211> LENGTH: 20
<212> TYPE: RNA
<213> ORGANISM: Artificial Sequence
<220> FEATURE:
<223> OTHER INFORMATION: Synthetic Construct

<400> SEQUENCE: 847
ggcagagacu auguguccca                                              20

<210> SEQ ID NO 848
<211> LENGTH: 20
<212> TYPE: RNA
<213> ORGANISM: Artificial Sequence
<220> FEATURE:
<223> OTHER INFORMATION: Synthetic Construct

<400> SEQUENCE: 848
ggcaggggca gggggcagag                                              20

<210> SEQ ID NO 849
<211> LENGTH: 20
<212> TYPE: RNA
<213> ORGANISM: Artificial Sequence
<220> FEATURE:
<223> OTHER INFORMATION: Synthetic Construct

<400> SEQUENCE: 849
ggcaggggua gggggcagag                                              20
```

```
<210> SEQ ID NO 850
<211> LENGTH: 20
<212> TYPE: RNA
<213> ORGANISM: Artificial Sequence
<220> FEATURE:
<223> OTHER INFORMATION: Synthetic Construct

<400> SEQUENCE: 850
ggccacgggg auuuagggag                                                    20

<210> SEQ ID NO 851
<211> LENGTH: 20
<212> TYPE: RNA
<213> ORGANISM: Artificial Sequence
<220> FEATURE:
<223> OTHER INFORMATION: Synthetic Construct

<400> SEQUENCE: 851
ggccagggcu gggcuuauca                                                    20

<210> SEQ ID NO 852
<211> LENGTH: 20
<212> TYPE: RNA
<213> ORGANISM: Artificial Sequence
<220> FEATURE:
<223> OTHER INFORMATION: Synthetic Construct

<400> SEQUENCE: 852
ggcccagacc uccccagca                                                     20

<210> SEQ ID NO 853
<211> LENGTH: 20
<212> TYPE: RNA
<213> ORGANISM: Artificial Sequence
<220> FEATURE:
<223> OTHER INFORMATION: Synthetic Construct

<400> SEQUENCE: 853
ggcccagacc ucccucagca                                                    20

<210> SEQ ID NO 854
<211> LENGTH: 20
<212> TYPE: RNA
<213> ORGANISM: Artificial Sequence
<220> FEATURE:
<223> OTHER INFORMATION: Synthetic Construct

<400> SEQUENCE: 854
ggccgggccu cuggguaccu                                                    20

<210> SEQ ID NO 855
<211> LENGTH: 20
<212> TYPE: RNA
<213> ORGANISM: Artificial Sequence
<220> FEATURE:
<223> OTHER INFORMATION: Synthetic Construct

<400> SEQUENCE: 855
ggccuccagc cuuacaggga                                                    20

<210> SEQ ID NO 856
<211> LENGTH: 20
<212> TYPE: RNA
<213> ORGANISM: Artificial Sequence
<220> FEATURE:
<223> OTHER INFORMATION: Synthetic Construct
```

<400> SEQUENCE: 856
ggccuccagc cuuauaggga                                          20

<210> SEQ ID NO 857
<211> LENGTH: 20
<212> TYPE: RNA
<213> ORGANISM: Artificial Sequence
<220> FEATURE:
<223> OTHER INFORMATION: Synthetic Construct

<400> SEQUENCE: 857
ggccucugcc cccuaccccu                                          20

<210> SEQ ID NO 858
<211> LENGTH: 20
<212> TYPE: RNA
<213> ORGANISM: Artificial Sequence
<220> FEATURE:
<223> OTHER INFORMATION: Synthetic Construct

<400> SEQUENCE: 858
ggccucugcc cccugccccu                                          20

<210> SEQ ID NO 859
<211> LENGTH: 20
<212> TYPE: RNA
<213> ORGANISM: Artificial Sequence
<220> FEATURE:
<223> OTHER INFORMATION: Synthetic Construct

<400> SEQUENCE: 859
ggccuggggc aaggccugaa                                          20

<210> SEQ ID NO 860
<211> LENGTH: 20
<212> TYPE: RNA
<213> ORGANISM: Artificial Sequence
<220> FEATURE:
<223> OTHER INFORMATION: Synthetic Construct

<400> SEQUENCE: 860
ggccuucucc cuaaaucccc                                          20

<210> SEQ ID NO 861
<211> LENGTH: 20
<212> TYPE: RNA
<213> ORGANISM: Artificial Sequence
<220> FEATURE:
<223> OTHER INFORMATION: Synthetic Construct

<400> SEQUENCE: 861
ggccuugccc caggccgggc                                          20

<210> SEQ ID NO 862
<211> LENGTH: 20
<212> TYPE: RNA
<213> ORGANISM: Artificial Sequence
<220> FEATURE:
<223> OTHER INFORMATION: Synthetic Construct

<400> SEQUENCE: 862
ggcucaggga cugcgaggca                                          20

<210> SEQ ID NO 863
<211> LENGTH: 20

```
<212> TYPE: RNA
<213> ORGANISM: Artificial Sequence
<220> FEATURE:
<223> OTHER INFORMATION: Synthetic Construct

<400> SEQUENCE: 863
ggcucgggga cugcgaggca                                           20

<210> SEQ ID NO 864
<211> LENGTH: 20
<212> TYPE: RNA
<213> ORGANISM: Artificial Sequence
<220> FEATURE:
<223> OTHER INFORMATION: Synthetic Construct

<400> SEQUENCE: 864
ggcugauaag cccagccccg                                           20

<210> SEQ ID NO 865
<211> LENGTH: 20
<212> TYPE: RNA
<213> ORGANISM: Artificial Sequence
<220> FEATURE:
<223> OTHER INFORMATION: Synthetic Construct

<400> SEQUENCE: 865
ggcugauaag cccagcccug                                           20

<210> SEQ ID NO 866
<211> LENGTH: 20
<212> TYPE: RNA
<213> ORGANISM: Artificial Sequence
<220> FEATURE:
<223> OTHER INFORMATION: Synthetic Construct

<400> SEQUENCE: 866
ggcugcaggc uccgcaaggg                                           20

<210> SEQ ID NO 867
<211> LENGTH: 20
<212> TYPE: RNA
<213> ORGANISM: Artificial Sequence
<220> FEATURE:
<223> OTHER INFORMATION: Synthetic Construct

<400> SEQUENCE: 867
ggcugggccu cuggguaccu                                           20

<210> SEQ ID NO 868
<211> LENGTH: 20
<212> TYPE: RNA
<213> ORGANISM: Artificial Sequence
<220> FEATURE:
<223> OTHER INFORMATION: Synthetic Construct

<400> SEQUENCE: 868
ggcuuucucc cuaaaucccc                                           20

<210> SEQ ID NO 869
<211> LENGTH: 20
<212> TYPE: RNA
<213> ORGANISM: Artificial Sequence
<220> FEATURE:
<223> OTHER INFORMATION: Synthetic Construct

<400> SEQUENCE: 869
```
gggacacaua gucucugccg                                        20

<210> SEQ ID NO 870
<211> LENGTH: 20
<212> TYPE: RNA
<213> ORGANISM: Artificial Sequence
<220> FEATURE:
<223> OTHER INFORMATION: Synthetic Construct

<400> SEQUENCE: 870
gggacacaua gucucugcga                                        20

<210> SEQ ID NO 871
<211> LENGTH: 20
<212> TYPE: RNA
<213> ORGANISM: Artificial Sequence
<220> FEATURE:
<223> OTHER INFORMATION: Synthetic Construct

<400> SEQUENCE: 871
gggacuagug cccaguuacg                                        20

<210> SEQ ID NO 872
<211> LENGTH: 20
<212> TYPE: RNA
<213> ORGANISM: Artificial Sequence
<220> FEATURE:
<223> OTHER INFORMATION: Synthetic Construct

<400> SEQUENCE: 872
gggacuggug cccaguuacg                                        20

<210> SEQ ID NO 873
<211> LENGTH: 20
<212> TYPE: RNA
<213> ORGANISM: Artificial Sequence
<220> FEATURE:
<223> OTHER INFORMATION: Synthetic Construct

<400> SEQUENCE: 873
gggacuucuc aguuccugg                                         20

<210> SEQ ID NO 874
<211> LENGTH: 20
<212> TYPE: RNA
<213> ORGANISM: Artificial Sequence
<220> FEATURE:
<223> OTHER INFORMATION: Synthetic Construct

<400> SEQUENCE: 874
gggagaaagc cccccgaugg                                        20

<210> SEQ ID NO 875
<211> LENGTH: 20
<212> TYPE: RNA
<213> ORGANISM: Artificial Sequence
<220> FEATURE:
<223> OTHER INFORMATION: Synthetic Construct

<400> SEQUENCE: 875
gggagaaggc cccccgaugg                                        20

<210> SEQ ID NO 876
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 876
gggagccaac caucgggggg                                                    20

<210> SEQ ID NO 877
<211> LENGTH: 20
<212> TYPE: RNA
<213> ORGANISM: Artificial Sequence
<220> FEATURE:
<223> OTHER INFORMATION: Synthetic Construct

<400> SEQUENCE: 877
gggauuuagg gagaaagccc                                                    20

<210> SEQ ID NO 878
<211> LENGTH: 20
<212> TYPE: RNA
<213> ORGANISM: Artificial Sequence
<220> FEATURE:
<223> OTHER INFORMATION: Synthetic Construct

<400> SEQUENCE: 878
gggauuuagg gagaaggccc                                                    20

<210> SEQ ID NO 879
<211> LENGTH: 20
<212> TYPE: RNA
<213> ORGANISM: Artificial Sequence
<220> FEATURE:
<223> OTHER INFORMATION: Synthetic Construct

<400> SEQUENCE: 879
gggcaccagu cccagcucug                                                    20

<210> SEQ ID NO 880
<211> LENGTH: 20
<212> TYPE: RNA
<213> ORGANISM: Artificial Sequence
<220> FEATURE:
<223> OTHER INFORMATION: Synthetic Construct

<400> SEQUENCE: 880
gggcacuagu cccagcucug                                                    20

<210> SEQ ID NO 881
<211> LENGTH: 20
<212> TYPE: RNA
<213> ORGANISM: Artificial Sequence
<220> FEATURE:
<223> OTHER INFORMATION: Synthetic Construct

<400> SEQUENCE: 881
gggcaggggc aggggggcaga                                                   20

<210> SEQ ID NO 882
<211> LENGTH: 20
<212> TYPE: RNA
<213> ORGANISM: Artificial Sequence
<220> FEATURE:
<223> OTHER INFORMATION: Synthetic Construct

<400> SEQUENCE: 882
gggcaggggu aggggggcaga                                                   20
```

<210> SEQ ID NO 883
<211> LENGTH: 20
<212> TYPE: RNA
<213> ORGANISM: Artificial Sequence
<220> FEATURE:
<223> OTHER INFORMATION: Synthetic Construct

<400> SEQUENCE: 883
gggccagggc ugggcuuauc                                          20

<210> SEQ ID NO 884
<211> LENGTH: 20
<212> TYPE: RNA
<213> ORGANISM: Artificial Sequence
<220> FEATURE:
<223> OTHER INFORMATION: Synthetic Construct

<400> SEQUENCE: 884
gggccggggc ugggcuuauc                                          20

<210> SEQ ID NO 885
<211> LENGTH: 20
<212> TYPE: RNA
<213> ORGANISM: Artificial Sequence
<220> FEATURE:
<223> OTHER INFORMATION: Synthetic Construct

<400> SEQUENCE: 885
ggggacugcg aggcaucagg                                          20

<210> SEQ ID NO 886
<211> LENGTH: 20
<212> TYPE: RNA
<213> ORGANISM: Artificial Sequence
<220> FEATURE:
<223> OTHER INFORMATION: Synthetic Construct

<400> SEQUENCE: 886
ggggauuuag ggagaaagcc                                          20

<210> SEQ ID NO 887
<211> LENGTH: 20
<212> TYPE: RNA
<213> ORGANISM: Artificial Sequence
<220> FEATURE:
<223> OTHER INFORMATION: Synthetic Construct

<400> SEQUENCE: 887
ggggcagggg gcagaggccu                                          20

<210> SEQ ID NO 888
<211> LENGTH: 20
<212> TYPE: RNA
<213> ORGANISM: Artificial Sequence
<220> FEATURE:
<223> OTHER INFORMATION: Synthetic Construct

<400> SEQUENCE: 888
ggggccuucu cccuaaaucc                                          20

<210> SEQ ID NO 889
<211> LENGTH: 20
<212> TYPE: RNA
<213> ORGANISM: Artificial Sequence
<220> FEATURE:
<223> OTHER INFORMATION: Synthetic Construct

<400> SEQUENCE: 889
ggggcuuucu cccuaaauucc                                          20

<210> SEQ ID NO 890
<211> LENGTH: 20
<212> TYPE: RNA
<213> ORGANISM: Artificial Sequence
<220> FEATURE:
<223> OTHER INFORMATION: Synthetic Construct

<400> SEQUENCE: 890
gggggccuuc ucccuaaauc                                           20

<210> SEQ ID NO 891
<211> LENGTH: 20
<212> TYPE: RNA
<213> ORGANISM: Artificial Sequence
<220> FEATURE:
<223> OTHER INFORMATION: Synthetic Construct

<400> SEQUENCE: 891
gggggcuuuc ucccuaaauc                                           20

<210> SEQ ID NO 892
<211> LENGTH: 20
<212> TYPE: RNA
<213> ORGANISM: Artificial Sequence
<220> FEATURE:
<223> OTHER INFORMATION: Synthetic Construct

<400> SEQUENCE: 892
ggggggcuuu cucccuaaau                                           20

<210> SEQ ID NO 893
<211> LENGTH: 20
<212> TYPE: RNA
<213> ORGANISM: Artificial Sequence
<220> FEATURE:
<223> OTHER INFORMATION: Synthetic Construct

<400> SEQUENCE: 893 gggguagaacc cugggugaca                                          20

<210> SEQ ID NO 894
<211> LENGTH: 20
<212> TYPE: RNA
<213> ORGANISM: Artificial Sequence
<220> FEATURE:
<223> OTHER INFORMATION: Synthetic Construct

<400> SEQUENCE: 894 gggguagagcc cugggugaca                                          20

<210> SEQ ID NO 895
<211> LENGTH: 20
<212> TYPE: RNA
<213> ORGANISM: Artificial Sequence
<220> FEATURE:
<223> OTHER INFORMATION: Synthetic Construct

<400> SEQUENCE: 895 ggggugaaccc ugggugacac                                          20

<210> SEQ ID NO 896

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 896
gggugagccc ugggugacac                                              20

<210> SEQ ID NO 897
<211> LENGTH: 20
<212> TYPE: RNA
<213> ORGANISM: Artificial Sequence
<220> FEATURE:
<223> OTHER INFORMATION: Synthetic Construct

<400> SEQUENCE: 897
ggucuggaug gagaaaccgg                                              20

<210> SEQ ID NO 898
<211> LENGTH: 20
<212> TYPE: RNA
<213> ORGANISM: Artificial Sequence
<220> FEATURE:
<223> OTHER INFORMATION: Synthetic Construct

<400> SEQUENCE: 898
ggucuggaug gagaaacugg                                              20

<210> SEQ ID NO 899
<211> LENGTH: 20
<212> TYPE: RNA
<213> ORGANISM: Artificial Sequence
<220> FEATURE:
<223> OTHER INFORMATION: Synthetic Construct

<400> SEQUENCE: 899
ggucuuucug gacagagcug                                              20

<210> SEQ ID NO 900
<211> LENGTH: 20
<212> TYPE: RNA
<213> ORGANISM: Artificial Sequence
<220> FEATURE:
<223> OTHER INFORMATION: Synthetic Construct

<400> SEQUENCE: 900
ggugaacccu gggugacacc                                              20

<210> SEQ ID NO 901
<211> LENGTH: 20
<212> TYPE: RNA
<213> ORGANISM: Artificial Sequence
<220> FEATURE:
<223> OTHER INFORMATION: Synthetic Construct

<400> SEQUENCE: 901
ggugagcccu gggugacacc                                              20

<210> SEQ ID NO 902
<211> LENGTH: 20
<212> TYPE: RNA
<213> ORGANISM: Artificial Sequence
<220> FEATURE:
<223> OTHER INFORMATION: Synthetic Construct

<400> SEQUENCE: 902
```
gguugagggc agggguaggg    20

<210> SEQ ID NO 903
<211> LENGTH: 20
<212> TYPE: RNA
<213> ORGANISM: Artificial Sequence
<220> FEATURE:
<223> OTHER INFORMATION: Synthetic Construct

<400> SEQUENCE: 903
guaacugggc accaguccca    20

<210> SEQ ID NO 904
<211> LENGTH: 20
<212> TYPE: RNA
<213> ORGANISM: Artificial Sequence
<220> FEATURE:
<223> OTHER INFORMATION: Synthetic Construct

<400> SEQUENCE: 904
gucacaugag ucugaucucc    20

<210> SEQ ID NO 905
<211> LENGTH: 20
<212> TYPE: RNA
<213> ORGANISM: Artificial Sequence
<220> FEATURE:
<223> OTHER INFORMATION: Synthetic Construct

<400> SEQUENCE: 905
gucacccagg gcucacccu    20

<210> SEQ ID NO 906
<211> LENGTH: 20
<212> TYPE: RNA
<213> ORGANISM: Artificial Sequence
<220> FEATURE:
<223> OTHER INFORMATION: Synthetic Construct

<400> SEQUENCE: 906
gucacccagg guucacccu    20

<210> SEQ ID NO 907
<211> LENGTH: 20
<212> TYPE: RNA
<213> ORGANISM: Artificial Sequence
<220> FEATURE:
<223> OTHER INFORMATION: Synthetic Construct

<400> SEQUENCE: 907
guccagaaag accuccuucc    20

<210> SEQ ID NO 908
<211> LENGTH: 20
<212> TYPE: RNA
<213> ORGANISM: Artificial Sequence
<220> FEATURE:
<223> OTHER INFORMATION: Synthetic Construct

<400> SEQUENCE: 908
gucccugauc agacugcaaa    20

<210> SEQ ID NO 909
<211> LENGTH: 20
<212> TYPE: RNA

<213> ORGANISM: Artificial Sequence
<220> FEATURE:
<223> OTHER INFORMATION: Synthetic Construct

<400> SEQUENCE: 909
gucucugcga gcugucuuug                    20

<210> SEQ ID NO 910
<211> LENGTH: 20
<212> TYPE: RNA
<213> ORGANISM: Artificial Sequence
<220> FEATURE:
<223> OTHER INFORMATION: Synthetic Construct

<400> SEQUENCE: 910
gucuggaugg agaaaccgga                    20

<210> SEQ ID NO 911
<211> LENGTH: 20
<212> TYPE: RNA
<213> ORGANISM: Artificial Sequence
<220> FEATURE:
<223> OTHER INFORMATION: Synthetic Construct

<400> SEQUENCE: 911
gucuggaugg agaaacugga                    20

<210> SEQ ID NO 912
<211> LENGTH: 20
<212> TYPE: RNA
<213> ORGANISM: Artificial Sequence
<220> FEATURE:
<223> OTHER INFORMATION: Synthetic Construct

<400> SEQUENCE: 912
gugaacccug ggugacaccu                    20

<210> SEQ ID NO 913
<211> LENGTH: 20
<212> TYPE: RNA
<213> ORGANISM: Artificial Sequence
<220> FEATURE:
<223> OTHER INFORMATION: Synthetic Construct

<400> SEQUENCE: 913
gugagcagca acagggccag                    20

<210> SEQ ID NO 914
<211> LENGTH: 20
<212> TYPE: RNA
<213> ORGANISM: Artificial Sequence
<220> FEATURE:
<223> OTHER INFORMATION: Synthetic Construct

<400> SEQUENCE: 914
gugagcagca acagggccgg                    20

<210> SEQ ID NO 915
<211> LENGTH: 20
<212> TYPE: RNA
<213> ORGANISM: Artificial Sequence
<220> FEATURE:
<223> OTHER INFORMATION: Synthetic Construct

<400> SEQUENCE: 915
gugagcccug ggugacaccu                    20

<210> SEQ ID NO 916
<211> LENGTH: 20
<212> TYPE: RNA
<213> ORGANISM: Artificial Sequence
<220> FEATURE:
<223> OTHER INFORMATION: Synthetic Construct

<400> SEQUENCE: 916
gugcucaaag acagcucgca                                               20

<210> SEQ ID NO 917
<211> LENGTH: 20
<212> TYPE: RNA
<213> ORGANISM: Artificial Sequence
<220> FEATURE:
<223> OTHER INFORMATION: Synthetic Construct

<400> SEQUENCE: 917
guggagauca gacucaugug                                               20

<210> SEQ ID NO 918
<211> LENGTH: 20
<212> TYPE: RNA
<213> ORGANISM: Artificial Sequence
<220> FEATURE:
<223> OTHER INFORMATION: Synthetic Construct

<400> SEQUENCE: 918
guggagauca gacucgugac                                               20

<210> SEQ ID NO 919
<211> LENGTH: 20
<212> TYPE: RNA
<213> ORGANISM: Artificial Sequence
<220> FEATURE:
<223> OTHER INFORMATION: Synthetic Construct

<400> SEQUENCE: 919
gugucaccca gggcucaccc                                               20

<210> SEQ ID NO 920
<211> LENGTH: 20
<212> TYPE: RNA
<213> ORGANISM: Artificial Sequence
<220> FEATURE:
<223> OTHER INFORMATION: Synthetic Construct

<400> SEQUENCE: 920
gugucaccca ggguucaccc                                               20

<210> SEQ ID NO 921
<211> LENGTH: 20
<212> TYPE: RNA
<213> ORGANISM: Artificial Sequence
<220> FEATURE:
<223> OTHER INFORMATION: Synthetic Construct

<400> SEQUENCE: 921
guugagggca ggggcagggg                                               20

<210> SEQ ID NO 922
<211> LENGTH: 20
<212> TYPE: RNA
<213> ORGANISM: Artificial Sequence
<220> FEATURE:

<223> OTHER INFORMATION: Synthetic Construct

<400> SEQUENCE: 922
guugagggca gggguagggg                                                    20

<210> SEQ ID NO 923
<211> LENGTH: 20
<212> TYPE: RNA
<213> ORGANISM: Artificial Sequence
<220> FEATURE:
<223> OTHER INFORMATION: Synthetic Construct

<400> SEQUENCE: 923
uaacugggca ccagucccag                                                    20

<210> SEQ ID NO 924
<211> LENGTH: 20
<212> TYPE: RNA
<213> ORGANISM: Artificial Sequence
<220> FEATURE:
<223> OTHER INFORMATION: Synthetic Construct

<400> SEQUENCE: 924
uaacugggca cuagucccag                                                    20

<210> SEQ ID NO 925
<211> LENGTH: 20
<212> TYPE: RNA
<213> ORGANISM: Artificial Sequence
<220> FEATURE:
<223> OTHER INFORMATION: Synthetic Construct

<400> SEQUENCE: 925
uaagcccagc cccggcccug                                                    20

<210> SEQ ID NO 926
<211> LENGTH: 20
<212> TYPE: RNA
<213> ORGANISM: Artificial Sequence
<220> FEATURE:
<223> OTHER INFORMATION: Synthetic Construct

<400> SEQUENCE: 926
uaagcccagc ccuggcccug                                                    20

<210> SEQ ID NO 927
<211> LENGTH: 20
<212> TYPE: RNA
<213> ORGANISM: Artificial Sequence
<220> FEATURE:
<223> OTHER INFORMATION: Synthetic Construct

<400> SEQUENCE: 927
uacccagagg cccagccugg                                                    20

<210> SEQ ID NO 928
<211> LENGTH: 20
<212> TYPE: RNA
<213> ORGANISM: Artificial Sequence
<220> FEATURE:
<223> OTHER INFORMATION: Synthetic Construct

<400> SEQUENCE: 928
uacccagagg cccggccugg                                                    20

```
<210> SEQ ID NO 929
<211> LENGTH: 20
<212> TYPE: RNA
<213> ORGANISM: Artificial Sequence
<220> FEATURE:
<223> OTHER INFORMATION: Synthetic Construct

<400> SEQUENCE: 929
uaccccugcc cucaacccca                                              20

<210> SEQ ID NO 930
<211> LENGTH: 20
<212> TYPE: RNA
<213> ORGANISM: Artificial Sequence
<220> FEATURE:
<223> OTHER INFORMATION: Synthetic Construct

<400> SEQUENCE: 930
uagggagaaa gccccccgau                                              20

<210> SEQ ID NO 931
<211> LENGTH: 20
<212> TYPE: RNA
<213> ORGANISM: Artificial Sequence
<220> FEATURE:
<223> OTHER INFORMATION: Synthetic Construct

<400> SEQUENCE: 931
uagggagaag gccccccgau                                              20

<210> SEQ ID NO 932
<211> LENGTH: 20
<212> TYPE: RNA
<213> ORGANISM: Artificial Sequence
<220> FEATURE:
<223> OTHER INFORMATION: Synthetic Construct

<400> SEQUENCE: 932
uagggagcca accaucgggg                                              20

<210> SEQ ID NO 933
<211> LENGTH: 20
<212> TYPE: RNA
<213> ORGANISM: Artificial Sequence
<220> FEATURE:
<223> OTHER INFORMATION: Synthetic Construct

<400> SEQUENCE: 933
uagggauauu cuaaguugug                                              20

<210> SEQ ID NO 934
<211> LENGTH: 20
<212> TYPE: RNA
<213> ORGANISM: Artificial Sequence
<220> FEATURE:
<223> OTHER INFORMATION: Synthetic Construct

<400> SEQUENCE: 934 uaggggggcag aggccugugg                                             20

<210> SEQ ID NO 935
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 935
uagucccagc ucugucuccu                                              20

<210> SEQ ID NO 936
<211> LENGTH: 20
<212> TYPE: RNA
<213> ORGANISM: Artificial Sequence
<220> FEATURE:
<223> OTHER INFORMATION: Synthetic Construct

<400> SEQUENCE: 936
uagucucugc gagcugucuu                                              20

<210> SEQ ID NO 937
<211> LENGTH: 20
<212> TYPE: RNA
<213> ORGANISM: Artificial Sequence
<220> FEATURE:
<223> OTHER INFORMATION: Synthetic Construct

<400> SEQUENCE: 937
uagugcccag uuacguuggu                                              20

<210> SEQ ID NO 938
<211> LENGTH: 20
<212> TYPE: RNA
<213> ORGANISM: Artificial Sequence
<220> FEATURE:
<223> OTHER INFORMATION: Synthetic Construct

<400> SEQUENCE: 938
uaucccuaua aggcuggagg                                              20

<210> SEQ ID NO 939
<211> LENGTH: 20
<212> TYPE: RNA
<213> ORGANISM: Artificial Sequence
<220> FEATURE:
<223> OTHER INFORMATION: Synthetic Construct

<400> SEQUENCE: 939
uaucccugua aggcuggagg                                              20

<210> SEQ ID NO 940
<211> LENGTH: 20
<212> TYPE: RNA
<213> ORGANISM: Artificial Sequence
<220> FEATURE:
<223> OTHER INFORMATION: Synthetic Construct

<400> SEQUENCE: 940
uauccugaug ccucgcaguc                                              20

<210> SEQ ID NO 941
<211> LENGTH: 20
<212> TYPE: RNA
<213> ORGANISM: Artificial Sequence
<220> FEATURE:
<223> OTHER INFORMATION: Synthetic Construct

<400> SEQUENCE: 941
ucaaagacag cggcagagac                                              20

<210> SEQ ID NO 942
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 942
ucaaagacag cucgcagaga                                            20

<210> SEQ ID NO 943
<211> LENGTH: 20
<212> TYPE: RNA
<213> ORGANISM: Artificial Sequence
<220> FEATURE:
<223> OTHER INFORMATION: Synthetic Construct

<400> SEQUENCE: 943
ucacaacuua gaauaucccu                                            20

<210> SEQ ID NO 944
<211> LENGTH: 20
<212> TYPE: RNA
<213> ORGANISM: Artificial Sequence
<220> FEATURE:
<223> OTHER INFORMATION: Synthetic Construct

<400> SEQUENCE: 944
ucacccaggg cucaccccug                                            20

<210> SEQ ID NO 945
<211> LENGTH: 20
<212> TYPE: RNA
<213> ORGANISM: Artificial Sequence
<220> FEATURE:
<223> OTHER INFORMATION: Synthetic Construct

<400> SEQUENCE: 945
ucacccaggg uucaccccug                                            20

<210> SEQ ID NO 946
<211> LENGTH: 20
<212> TYPE: RNA
<213> ORGANISM: Artificial Sequence
<220> FEATURE:
<223> OTHER INFORMATION: Synthetic Construct

<400> SEQUENCE: 946
ucacgagucu gaucuccacu                                            20

<210> SEQ ID NO 947
<211> LENGTH: 20
<212> TYPE: RNA
<213> ORGANISM: Artificial Sequence
<220> FEATURE:
<223> OTHER INFORMATION: Synthetic Construct

<400> SEQUENCE: 947
ucagacucau gugacugcug                                            20

<210> SEQ ID NO 948
<211> LENGTH: 20
<212> TYPE: RNA
<213> ORGANISM: Artificial Sequence
<220> FEATURE:
<223> OTHER INFORMATION: Synthetic Construct

<400> SEQUENCE: 948
```
ucagacugca aaggcugcag                                              20

<210> SEQ ID NO 949
<211> LENGTH: 20
<212> TYPE: RNA
<213> ORGANISM: Artificial Sequence
<220> FEATURE:
<223> OTHER INFORMATION: Synthetic Construct

<400> SEQUENCE: 949
ucagcagguu acugauagga                                              20

<210> SEQ ID NO 950
<211> LENGTH: 20
<212> TYPE: RNA
<213> ORGANISM: Artificial Sequence
<220> FEATURE:
<223> OTHER INFORMATION: Synthetic Construct

<400> SEQUENCE: 950
ucagcucugu ccagaaagac                                              20

<210> SEQ ID NO 951
<211> LENGTH: 20
<212> TYPE: RNA
<213> ORGANISM: Artificial Sequence
<220> FEATURE:
<223> OTHER INFORMATION: Synthetic Construct

<400> SEQUENCE: 951
ucaggccuug ccccaggccg                                              20

<210> SEQ ID NO 952
<211> LENGTH: 20
<212> TYPE: RNA
<213> ORGANISM: Artificial Sequence
<220> FEATURE:
<223> OTHER INFORMATION: Synthetic Construct

<400> SEQUENCE: 952
ucaggccuug ccccaggcug                                              20

<210> SEQ ID NO 953
<211> LENGTH: 20
<212> TYPE: RNA
<213> ORGANISM: Artificial Sequence
<220> FEATURE:
<223> OTHER INFORMATION: Synthetic Construct

<400> SEQUENCE: 953
ucagggguga acccugggug                                              20

<210> SEQ ID NO 954
<211> LENGTH: 20
<212> TYPE: RNA
<213> ORGANISM: Artificial Sequence
<220> FEATURE:
<223> OTHER INFORMATION: Synthetic Construct

<400> SEQUENCE: 954
ucagggguga gcccugggug                                              20

<210> SEQ ID NO 955
<211> LENGTH: 20
<212> TYPE: RNA
<213> ORGANISM: Artificial Sequence -continued

```
<220> FEATURE:
<223> OTHER INFORMATION: Synthetic Construct

<400> SEQUENCE: 955
ucagguaccc agaggcccag                                                    20

<210> SEQ ID NO 956
<211> LENGTH: 20
<212> TYPE: RNA
<213> ORGANISM: Artificial Sequence
<220> FEATURE:
<223> OTHER INFORMATION: Synthetic Construct

<400> SEQUENCE: 956
ucagguaccc agaggcccgg                                                    20

<210> SEQ ID NO 957
<211> LENGTH: 20
<212> TYPE: RNA
<213> ORGANISM: Artificial Sequence
<220> FEATURE:
<223> OTHER INFORMATION: Synthetic Construct

<400> SEQUENCE: 957
ucaguaaccu gcuggggag                                                     20

<210> SEQ ID NO 958
<211> LENGTH: 20
<212> TYPE: RNA
<213> ORGANISM: Artificial Sequence
<220> FEATURE:
<223> OTHER INFORMATION: Synthetic Construct

<400> SEQUENCE: 958
ucaguuuccu ggcucaggga                                                    20

<210> SEQ ID NO 959
<211> LENGTH: 20
<212> TYPE: RNA
<213> ORGANISM: Artificial Sequence
<220> FEATURE:
<223> OTHER INFORMATION: Synthetic Construct

<400> SEQUENCE: 959
ucaguuuccu ggcucgggga                                                    20

<210> SEQ ID NO 960
<211> LENGTH: 20
<212> TYPE: RNA
<213> ORGANISM: Artificial Sequence
<220> FEATURE:
<223> OTHER INFORMATION: Synthetic Construct

<400> SEQUENCE: 960
uccagaaaga ccuccuuccu                                                    20

<210> SEQ ID NO 961
<211> LENGTH: 20
<212> TYPE: RNA
<213> ORGANISM: Artificial Sequence
<220> FEATURE:
<223> OTHER INFORMATION: Synthetic Construct

<400> SEQUENCE: 961
uccagaaaga cuuccuuccu                                                    20
```

```
<210> SEQ ID NO 962
<211> LENGTH: 20
<212> TYPE: RNA
<213> ORGANISM: Artificial Sequence
<220> FEATURE:
<223> OTHER INFORMATION: Synthetic Construct

<400> SEQUENCE: 962
uccagcaguc acgagucuga                                                    20

<210> SEQ ID NO 963
<211> LENGTH: 20
<212> TYPE: RNA
<213> ORGANISM: Artificial Sequence
<220> FEATURE:
<223> OTHER INFORMATION: Synthetic Construct

<400> SEQUENCE: 963
uccagccuua cagggauauu                                                    20

<210> SEQ ID NO 964
<211> LENGTH: 20
<212> TYPE: RNA
<213> ORGANISM: Artificial Sequence
<220> FEATURE:
<223> OTHER INFORMATION: Synthetic Construct

<400> SEQUENCE: 964
uccagccuua uagggauauu                                                    20

<210> SEQ ID NO 965
<211> LENGTH: 20
<212> TYPE: RNA
<213> ORGANISM: Artificial Sequence
<220> FEATURE:
<223> OTHER INFORMATION: Synthetic Construct

<400> SEQUENCE: 965
ucccacaggc cucugccccc                                                    20

<210> SEQ ID NO 966
<211> LENGTH: 20
<212> TYPE: RNA
<213> ORGANISM: Artificial Sequence
<220> FEATURE:
<223> OTHER INFORMATION: Synthetic Construct

<400> SEQUENCE: 966
ucccugagcc aggaaacuga                                                    20

<210> SEQ ID NO 967
<211> LENGTH: 20
<212> TYPE: RNA
<213> ORGANISM: Artificial Sequence
<220> FEATURE:
<223> OTHER INFORMATION: Synthetic Construct

<400> SEQUENCE: 967
ucccugauca gacugcaaag                                                    20

<210> SEQ ID NO 968
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 968
uccgguuucu ccauccagac                                              20

<210> SEQ ID NO 969
<211> LENGTH: 20
<212> TYPE: RNA
<213> ORGANISM: Artificial Sequence
<220> FEATURE:
<223> OTHER INFORMATION: Synthetic Construct

<400> SEQUENCE: 969
uccuggaagg cccagaccuc                                              20

<210> SEQ ID NO 970
<211> LENGTH: 20
<212> TYPE: RNA
<213> ORGANISM: Artificial Sequence
<220> FEATURE:
<223> OTHER INFORMATION: Synthetic Construct

<400> SEQUENCE: 970
uccuggcuca gggacugcga                                              20

<210> SEQ ID NO 971
<211> LENGTH: 20
<212> TYPE: RNA
<213> ORGANISM: Artificial Sequence
<220> FEATURE:
<223> OTHER INFORMATION: Synthetic Construct

<400> SEQUENCE: 971
uccuggcucg gggacugcga                                              20

<210> SEQ ID NO 972
<211> LENGTH: 20
<212> TYPE: RNA
<213> ORGANISM: Artificial Sequence
<220> FEATURE:
<223> OTHER INFORMATION: Synthetic Construct

<400> SEQUENCE: 972
ucgcagagac uauguguccc                                              20

<210> SEQ ID NO 973
<211> LENGTH: 20
<212> TYPE: RNA
<213> ORGANISM: Artificial Sequence
<220> FEATURE:
<223> OTHER INFORMATION: Synthetic Construct

<400> SEQUENCE: 973
ucgcaguccc cgagccagga                                              20

<210> SEQ ID NO 974
<211> LENGTH: 20
<212> TYPE: RNA
<213> ORGANISM: Artificial Sequence
<220> FEATURE:
<223> OTHER INFORMATION: Synthetic Construct

<400> SEQUENCE: 974
ucgcaguccc ugagccagga                                              20

<210> SEQ ID NO 975
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 975 ucgggggggcc uucucccuaa                                              20

<210> SEQ ID NO 976
<211> LENGTH: 20
<212> TYPE: RNA
<213> ORGANISM: Artificial Sequence
<220> FEATURE:
<223> OTHER INFORMATION: Synthetic Construct

<400> SEQUENCE: 976 ucgggggggcu uucucccuaa                                              20

<210> SEQ ID NO 977
<211> LENGTH: 20
<212> TYPE: RNA
<213> ORGANISM: Artificial Sequence
<220> FEATURE:
<223> OTHER INFORMATION: Synthetic Construct

<400> SEQUENCE: 977
ucgugacugc uggaaggggg                                               20

<210> SEQ ID NO 978
<211> LENGTH: 20
<212> TYPE: RNA
<213> ORGANISM: Artificial Sequence
<220> FEATURE:
<223> OTHER INFORMATION: Synthetic Construct

<400> SEQUENCE: 978
ucucaguuuc cuggcucagg                                               20

<210> SEQ ID NO 979
<211> LENGTH: 20
<212> TYPE: RNA
<213> ORGANISM: Artificial Sequence
<220> FEATURE:
<223> OTHER INFORMATION: Synthetic Construct

<400> SEQUENCE: 979
ucucaguuuc cuggcucggg                                               20

<210> SEQ ID NO 980
<211> LENGTH: 20
<212> TYPE: RNA
<213> ORGANISM: Artificial Sequence
<220> FEATURE:
<223> OTHER INFORMATION: Synthetic Construct

<400> SEQUENCE: 980
ucucugccgc ugucuuugag                                               20

<210> SEQ ID NO 981
<211> LENGTH: 20
<212> TYPE: RNA
<213> ORGANISM: Artificial Sequence
<220> FEATURE:
<223> OTHER INFORMATION: Synthetic Construct

<400> SEQUENCE: 981
```
ucucugcgag cugucuuuga                                           20

<210> SEQ ID NO 982
<211> LENGTH: 20
<212> TYPE: RNA
<213> ORGANISM: Artificial Sequence
<220> FEATURE:
<223> OTHER INFORMATION: Synthetic Construct

<400> SEQUENCE: 982 ucugccccu accccugccc                                            20

<210> SEQ ID NO 983
<211> LENGTH: 20
<212> TYPE: RNA
<213> ORGANISM: Artificial Sequence
<220> FEATURE:
<223> OTHER INFORMATION: Synthetic Construct

<400> SEQUENCE: 983 ucugccccu gccccugccc                                            20

<210> SEQ ID NO 984
<211> LENGTH: 20
<212> TYPE: RNA
<213> ORGANISM: Artificial Sequence
<220> FEATURE:
<223> OTHER INFORMATION: Synthetic Construct

<400> SEQUENCE: 984
ucugccgcug ucuuugagca                                           20

<210> SEQ ID NO 985
<211> LENGTH: 20
<212> TYPE: RNA
<213> ORGANISM: Artificial Sequence
<220> FEATURE:
<223> OTHER INFORMATION: Synthetic Construct

<400> SEQUENCE: 985
ucugcgagcu gucuuugagc                                           20

<210> SEQ ID NO 986
<211> LENGTH: 20
<212> TYPE: RNA
<213> ORGANISM: Artificial Sequence
<220> FEATURE:
<223> OTHER INFORMATION: Synthetic Construct

<400> SEQUENCE: 986
ucuguccaga aagaccuccu                                           20

<210> SEQ ID NO 987
<211> LENGTH: 20
<212> TYPE: RNA
<213> ORGANISM: Artificial Sequence
<220> FEATURE:
<223> OTHER INFORMATION: Synthetic Construct

<400> SEQUENCE: 987
ucuguccaga aagacuuccu                                           20

<210> SEQ ID NO 988
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 988
ugaacccugg gugacaccug                                              20

<210> SEQ ID NO 989
<211> LENGTH: 20
<212> TYPE: RNA
<213> ORGANISM: Artificial Sequence
<220> FEATURE:
<223> OTHER INFORMATION: Synthetic Construct

<400> SEQUENCE: 989
ugagcagcaa cagggccagg                                              20

<210> SEQ ID NO 990
<211> LENGTH: 20
<212> TYPE: RNA
<213> ORGANISM: Artificial Sequence
<220> FEATURE:
<223> OTHER INFORMATION: Synthetic Construct

<400> SEQUENCE: 990
ugagcagcaa cagggccggg                                              20

<210> SEQ ID NO 991
<211> LENGTH: 20
<212> TYPE: RNA
<213> ORGANISM: Artificial Sequence
<220> FEATURE:
<223> OTHER INFORMATION: Synthetic Construct

<400> SEQUENCE: 991
ugagccagga aacugagaag                                              20

<210> SEQ ID NO 992
<211> LENGTH: 20
<212> TYPE: RNA
<213> ORGANISM: Artificial Sequence
<220> FEATURE:
<223> OTHER INFORMATION: Synthetic Construct

<400> SEQUENCE: 992
ugagggaggu cugggccuuc                                              20

<210> SEQ ID NO 993
<211> LENGTH: 20
<212> TYPE: RNA
<213> ORGANISM: Artificial Sequence
<220> FEATURE:
<223> OTHER INFORMATION: Synthetic Construct

<400> SEQUENCE: 993
ugagucugau cuccacugcc                                              20

<210> SEQ ID NO 994
<211> LENGTH: 20
<212> TYPE: RNA
<213> ORGANISM: Artificial Sequence
<220> FEATURE:
<223> OTHER INFORMATION: Synthetic Construct

<400> SEQUENCE: 994
ugauaagccc agccccggcc                                              20
```

<210> SEQ ID NO 995
<211> LENGTH: 20
<212> TYPE: RNA
<213> ORGANISM: Artificial Sequence
<220> FEATURE:
<223> OTHER INFORMATION: Synthetic Construct

<400> SEQUENCE: 995
ugauaagccc agcccuggcc                                              20

<210> SEQ ID NO 996
<211> LENGTH: 20
<212> TYPE: RNA
<213> ORGANISM: Artificial Sequence
<220> FEATURE:
<223> OTHER INFORMATION: Synthetic Construct

<400> SEQUENCE: 996
ugaucagacu gcaaaggcug                                              20

<210> SEQ ID NO 997
<211> LENGTH: 20
<212> TYPE: RNA
<213> ORGANISM: Artificial Sequence
<220> FEATURE:
<223> OTHER INFORMATION: Synthetic Construct

<400> SEQUENCE: 997
ugaugccucg caguccccga                                              20

<210> SEQ ID NO 998
<211> LENGTH: 20
<212> TYPE: RNA
<213> ORGANISM: Artificial Sequence
<220> FEATURE:
<223> OTHER INFORMATION: Synthetic Construct

<400> SEQUENCE: 998
ugaugccucg caguccuga                                               20

<210> SEQ ID NO 999
<211> LENGTH: 20
<212> TYPE: RNA
<213> ORGANISM: Artificial Sequence
<220> FEATURE:
<223> OTHER INFORMATION: Synthetic Construct

<400> SEQUENCE: 999
ugcaaaggcu gcaggcuccg                                              20

<210> SEQ ID NO 1000
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1000
ugcacccuug cggagccugc                                              20

<210> SEQ ID NO 1001
<211> LENGTH: 20
<212> TYPE: RNA
<213> ORGANISM: Artificial Sequence
<220> FEATURE:

<223> OTHER INFORMATION: Synthetic Construct

<400> SEQUENCE: 1001
ugcagccuuu gcagucugau                                         20

<210> SEQ ID NO 1002
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1002
ugccccaggc cgggccucug                                         20

<210> SEQ ID NO 1003
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1003
ugccccaggc ugggccucug                                         20

<210> SEQ ID NO 1004
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1004
ugcccccuac cccugcccuc                                         20

<210> SEQ ID NO 1005
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1005
ugccccugcc cucaacccca                                         20

<210> SEQ ID NO 1006
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1006
ugccgcuguc uuugagcaca                                         20

<210> SEQ ID NO 1007
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1007
ugccuggaga ucccauuccg                                         20

```
<210> SEQ ID NO 1008
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1008
ugcgagcugu cuuugagcac                                               20

<210> SEQ ID NO 1009
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1009
ugcggagccu gcagccuuug                                               20

<210> SEQ ID NO 1010
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1010
ugcucaaaga cagcggcaga                                               20

<210> SEQ ID NO 1011
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1011
ugcucaaaga cagcucgcag                                               20

<210> SEQ ID NO 1012
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1012
ugcugaggga ggucugggcc                                               20

<210> SEQ ID NO 1013
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1013
ugcuggggga ggucugggcc                                               20

<210> SEQ ID NO 1014
<211> LENGTH: 20
<212> TYPE: RNA
<213> ORGANISM: Artificial Sequence
<220> FEATURE:
<223> OTHER INFORMATION: Synthetic Construct
```

<400> SEQUENCE: 1014
uggaaggccc agaccucccc                                              20

<210> SEQ ID NO 1015
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1015
uggaaggccc agaccuccccu                                             20

<210> SEQ ID NO 1016
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1016
uggagaaacc ggaaugggau                                              20

<210> SEQ ID NO 1017
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1017
uggagaaacu ggaaugggau                                              20

<210> SEQ ID NO 1018
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1018
uggagaccaa cguaacuggg                                              20

<210> SEQ ID NO 1019
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1019
uggagaucag acucauguga                                              20

<210> SEQ ID NO 1020
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1020
uggagaucag acucgugacu                                              20

<210> SEQ ID NO 1021
<211> LENGTH: 20

```
<212> TYPE: RNA
<213> ORGANISM: Artificial Sequence
<220> FEATURE:
<223> OTHER INFORMATION: Synthetic Construct

<400> SEQUENCE: 1021
uggaugugcu caaagacagc                                               20

<210> SEQ ID NO 1022
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1022
uggcagugga gaucagacuc                                               20

<210> SEQ ID NO 1023
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1023
uggccuccag ccuuacaggg                                               20

<210> SEQ ID NO 1024
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1024
uggccuccag ccuuauaggg                                               20

<210> SEQ ID NO 1025
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1025
uggcucaggg acugcgaggc                                               20

<210> SEQ ID NO 1026
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1026
uggcucgggg acugcgaggc                                               20

<210> SEQ ID NO 1027
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1027
```
ugggacacau agucucugcc                                               20

<210> SEQ ID NO 1028
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1028
ugggacacau agucucugcg                                               20

<210> SEQ ID NO 1029
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1029
ugggaggcug auaagcccag                                               20

<210> SEQ ID NO 1030
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1030
ugggcacuag ucccagcucu                                               20

<210> SEQ ID NO 1031
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1031
ugggccucug gguaccugag                                               20

<210> SEQ ID NO 1032
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1032 uggggggaggu cugggccuuc                                              20

<210> SEQ ID NO 1033
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1033
uggucuggau ggagaaaccg                                               20

<210> SEQ ID NO 1034
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 1034
uggucuggau ggagaaacug                                               20

<210> SEQ ID NO 1035
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1035
uggugcccag uuacguuggu                                               20

<210> SEQ ID NO 1036
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1036
uguccagaaa gaccuccuuc                                               20

<210> SEQ ID NO 1037
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1037
uguccagaaa gacuuccuuc                                               20

<210> SEQ ID NO 1038
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1038
ugugcucaaa gacagcggca                                               20

<210> SEQ ID NO 1039
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1039
ugugcucaaa gacagcucgc                                               20

<210> SEQ ID NO 1040
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1040
uuacagggau auucuaaguu                                               20
```

```
<210> SEQ ID NO 1041
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1041
uuauagggau auucuaaguu                                                    20

<210> SEQ ID NO 1042
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1042
uucacaacuu agaauauccc                                                    20

<210> SEQ ID NO 1043
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1043
uucaccccug auaggcuggg                                                    20

<210> SEQ ID NO 1044
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1044
uuccagcagu cacgagucug                                                    20

<210> SEQ ID NO 1045
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1045
uuccaguuuc uccauccaga                                                    20

<210> SEQ ID NO 1046
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1046
uuccgguuuc uccauccaga                                                    20

<210> SEQ ID NO 1047
<211> LENGTH: 20
<212> TYPE: RNA
<213> ORGANISM: Artificial Sequence
<220> FEATURE:
<223> OTHER INFORMATION: Synthetic Construct
```

-continued

<400> SEQUENCE: 1047
uugagggcag gggcaggggg                                               20

<210> SEQ ID NO 1048
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1048
uugagggcag ggguaggggg                                               20

<210> SEQ ID NO 1049
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1049
uugcggagcc ugcagccuuu                                               20

<210> SEQ ID NO 1050
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1050
uuggaaagga aggaagucuu                                               20

<210> SEQ ID NO 1051
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1051
uuggaaagga aggaggucuu                                               20

<210> SEQ ID NO 1052
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1052
uuuagggaga aggcccccog                                               20

<210> SEQ ID NO 1053
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1053
uuucacaacu uagaauaucc                                               20

<210> SEQ ID NO 1054

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1054
uuuccuggcu cagggacugc                                              20

<210> SEQ ID NO 1055
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1055
uuuggaaagg aaggaagucu                                              20

<210> SEQ ID NO 1056
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1056
uuuggaaagg aaggaggucu                                              20

<210> SEQ ID NO 1057
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1057
cuugccccag gccgggccuc                                              20

<210> SEQ ID NO 1058
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1058
ucuggaugga gaaaccggaa                                              20

<210> SEQ ID NO 1059
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1059
aaaagcugca ggcuccgcaa                                              20

<210> SEQ ID NO 1060
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1060
```
aaagacagca gcagagacua                                            20

<210> SEQ ID NO 1061
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1061
accuccuucc uuuccaaaau                                            20

<210> SEQ ID NO 1062
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1062
acuaauauuu uggaaaggaa                                            20

<210> SEQ ID NO 1063
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1063
acuuccuucc uuuccaaaau                                            20

<210> SEQ ID NO 1064
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1064
agcagcaaca gggccagggc                                            20

<210> SEQ ID NO 1065
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1065
agccuaucag gggugaaccc                                            20

<210> SEQ ID NO 1066
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1066
agccugcagc uuuugcaguc                                            20

<210> SEQ ID NO 1067
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 1067
agcuuuugca gucugaucag                                              20

<210> SEQ ID NO 1068
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1068
aggccgggcc ucuggguacc                                              20

<210> SEQ ID NO 1069
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1069
agggcucacc ccugauaggc                                              20

<210> SEQ ID NO 1070
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1070
agguacccag aggcccagcc                                              20

<210> SEQ ID NO 1071
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1071
auagucucug cugcugucuu                                              20

<210> SEQ ID NO 1072
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1072
augugcucaa agacagcagc                                              20

<210> SEQ ID NO 1073
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1073
caaaagcugc aggcuccgca                                              20
```

<210> SEQ ID NO 1074
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1074
cagacugcaa aagcugcagg                                               20

<210> SEQ ID NO 1075
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1075
cagcuuuugc agucugauca                                               20

<210> SEQ ID NO 1076
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1076
cauagucucu gcugcugucu                                               20

<210> SEQ ID NO 1077
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1077
cccagaggcc cggccugggg                                               20

<210> SEQ ID NO 1078
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1078
ccccggcccu guugcugcuc                                               20

<210> SEQ ID NO 1079
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1079
cucggggacu gcgaggcauc                                               20

<210> SEQ ID NO 1080
<211> LENGTH: 20
<212> TYPE: RNA
<213> ORGANISM: Artificial Sequence
<220> FEATURE:

<223> OTHER INFORMATION: Synthetic Construct

<400> SEQUENCE: 1080
cucugccccc uaccccugcc                                            20

<210> SEQ ID NO 1081
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1081
cuucucaguu uccuggcucg                                            20

<210> SEQ ID NO 1082
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1082
cuugcggagc cugcagcuuu                                            20

<210> SEQ ID NO 1083
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1083
gaaaggaagg aagucuuucu                                            20

<210> SEQ ID NO 1084
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1084
gacucgugac ugcuggaagg                                            20

<210> SEQ ID NO 1085
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1085
gagaaaccgg aaugggaucu                                            20

<210> SEQ ID NO 1086
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1086
gaucagacuc augugacugc                                            20

```
<210> SEQ ID NO 1087
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1087
gaucagacug caaaagcugc                                               20

<210> SEQ ID NO 1088
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1088
gcagcuuuug cagucugauc                                               20

<210> SEQ ID NO 1089
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1089
gcugcugucu uugagcacau                                               20

<210> SEQ ID NO 1090
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1090
ggagccugca gcuuuugcag                                               20

<210> SEQ ID NO 1091
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1091
gggcuuucuc ccuaaauccc                                               20

<210> SEQ ID NO 1092
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1092
guaaccugcu gggggagguc                                               20

<210> SEQ ID NO 1093
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 1093
gucucugcug cugucuuuga                                               20

<210> SEQ ID NO 1094
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1094
gugcucaaag acagcagcag                                               20

<210> SEQ ID NO 1095
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1095
uaauauuuug gaaaggaagg                                               20

<210> SEQ ID NO 1096
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1096
uagucucugc ugcugucuuu                                               20

<210> SEQ ID NO 1097
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1097 uccccagca gguuacugau                                                20

<210> SEQ ID NO 1098
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1098
uccuaucagu aaccugcugg                                               20

<210> SEQ ID NO 1099
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1099
ucuggccucc agccuuacag                                               20

<210> SEQ ID NO 1100
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 1100
ugagggcagg gguagggggc                                                        20

<210> SEQ ID NO 1101
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1101
ugucacccag ggcucacccc                                                        20

<210> SEQ ID NO 1102
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1102
aaaaucuggc cuccagccuu                                                        20

<210> SEQ ID NO 1103
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1103
aaacuggaau gggaucucca                                                        20

<210> SEQ ID NO 1104
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1104
aaagaccucc uuccuuucca                                                        20

<210> SEQ ID NO 1105
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1105
aaagacuucc uuccuuucca                                                        20

<210> SEQ ID NO 1106
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1106
```

| aacguaacug ggcaccaguc | 20 |

<210> SEQ ID NO 1107
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1107

| aagacagcag cagagacuau | 20 |

<210> SEQ ID NO 1108
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1108

| aagaccuccu uccuuuccaa | 20 |

<210> SEQ ID NO 1109
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1109

| aagacuuccu uccuuuccaa | 20 |

<210> SEQ ID NO 1110
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1110

| aagcccagcc ccggcccugu | 20 |

<210> SEQ ID NO 1111
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1111

| aauauuuugg aaaggaagga | 20 |

<210> SEQ ID NO 1112
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1112

| acacauaguc ucugcugcug | 20 |

<210> SEQ ID NO 1113
<211> LENGTH: 20
<212> TYPE: RNA
<213> ORGANISM: Artificial Sequence

```
<220> FEATURE:
<223> OTHER INFORMATION: Synthetic Construct

<400> SEQUENCE: 1113
acagcagcag agacuaugug                                               20

<210> SEQ ID NO 1114
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1114
acagggauau ucuaaguugu                                               20

<210> SEQ ID NO 1115
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1115
acauagucuc ugcugcuguc                                               20

<210> SEQ ID NO 1116
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1116
accagucuga ucuccacugc                                               20

<210> SEQ ID NO 1117
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1117
acccugggug acaccugucc                                               20

<210> SEQ ID NO 1118
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1118
acuagugccc aguuacguug                                               20

<210> SEQ ID NO 1119
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1119
acugcaaaag cugcaggcuc                                               20
```

```
<210> SEQ ID NO 1120
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1120
acuggugacu gcuggaaggg                                               20

<210> SEQ ID NO 1121
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1121
agacagagcu gggacuggug                                               20

<210> SEQ ID NO 1122
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1122
agacagcagc agagacuaug                                               20

<210> SEQ ID NO 1123
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1123
agaccucccu cagcagguua                                               20

<210> SEQ ID NO 1124
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1124
agaccuccuu ccuuuccaaa                                               20

<210> SEQ ID NO 1125
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1125
agacugcaaa agcugcaggc                                               20

<210> SEQ ID NO 1126
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 1126
agacuggugs cugcuggaag                                               20

<210> SEQ ID NO 1127
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1127
agacuuccuu ccuuuccaaa                                               20

<210> SEQ ID NO 1128
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1128
agaggcccag ccugggggcaa                                              20

<210> SEQ ID NO 1129
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1129
agaucagacu ggugacugcu                                               20

<210> SEQ ID NO 1130
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1130
agcaacaggg ccggggcugg                                               20

<210> SEQ ID NO 1131
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1131
agcagagacu auguguccca                                               20

<210> SEQ ID NO 1132
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1132
agcagcagag acuauguguc                                               20

<210> SEQ ID NO 1133
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1133
agcagucacc agucugaucu                                               20

<210> SEQ ID NO 1134
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1134
agccuggggc aaggccugaa                                               20

<210> SEQ ID NO 1135
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1135
aggagacaga gcugggacua                                               20

<210> SEQ ID NO 1136
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1136
aggcugauaa gcccagcccc                                               20

<210> SEQ ID NO 1137
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1137
agggagaagg ccccccgaug                                               20

<210> SEQ ID NO 1138
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1138
aggggugaac ccuggguagc                                               20

<210> SEQ ID NO 1139
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1139
```
aggugucacc caggguucac 20

<210> SEQ ID NO 1140
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1140
agucaccagu cugaucucca 20

<210> SEQ ID NO 1141
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1141
agucucugcu gcugucuuug 20

<210> SEQ ID NO 1142
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1142
aguggagauc agacugguga 20

<210> SEQ ID NO 1143
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1143
auaaggcugg aggccagauu 20

<210> SEQ ID NO 1144
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1144
auauuuugga aaggaaggaa 20

<210> SEQ ID NO 1145
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1145
auauuuugga aaggaaggag 20

<210> SEQ ID NO 1146
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 1146
aucagacugc aaaagcugca                                              20

<210> SEQ ID NO 1147
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1147
aucagacugg ugacugcugg                                              20

<210> SEQ ID NO 1148
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1148
aucaggggug agcccugggu                                              20

<210> SEQ ID NO 1149
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1149
aucccuguaa ggcuggaggc                                              20

<210> SEQ ID NO 1150
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1150
auuuuggaaa ggaaggaagu                                              20

<210> SEQ ID NO 1151
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1151
auuuuggaaa ggaaggaggu                                              20

<210> SEQ ID NO 1152
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1152
caaagacagc agcagagacu                                              20
```

<210> SEQ ID NO 1153
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1153
caaccaucgg ggggccuucu                                          20

<210> SEQ ID NO 1154
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1154
cacauagucu cugcugcugu                                          20

<210> SEQ ID NO 1155
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1155
caccagucug aucuccacug                                          20

<210> SEQ ID NO 1156
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1156
cacgagucug aucuccacug                                          20

<210> SEQ ID NO 1157
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1157
cacggggauu uagggagaaa                                          20

<210> SEQ ID NO 1158
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1158
cagacuggug acugcuggaa                                          20

<210> SEQ ID NO 1159
<211> LENGTH: 20
<212> TYPE: RNA
<213> ORGANISM: Artificial Sequence
<220> FEATURE:

<223> OTHER INFORMATION: Synthetic Construct

<400> SEQUENCE: 1159
cagcagagac uauguguccc                                                         20

<210> SEQ ID NO 1160
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1160
cagcagcaga gacuaugugu                                                         20

<210> SEQ ID NO 1161
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1161
cagcagucac cagucugauc                                                         20

<210> SEQ ID NO 1162
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1162
caggccucug cccccugccc                                                         20

<210> SEQ ID NO 1163
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1163
cagggccagg gcugggcuua                                                         20

<210> SEQ ID NO 1164
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1164
cagucaccag ucugaucucc                                                         20

<210> SEQ ID NO 1165
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1165
cagucugauc uccacugcca                                                         20

```
<210> SEQ ID NO 1166
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1166
caguggagau cagacuggug                                                   20

<210> SEQ ID NO 1167
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1167
ccacaggccu cugcccccua                                                   20

<210> SEQ ID NO 1168
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1168
ccagcaguca ccagucugau                                                   20

<210> SEQ ID NO 1169
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1169
ccagcaguca cgagucugau                                                   20

<210> SEQ ID NO 1170
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1170
ccagccuuac agggauauuc                                                   20

<210> SEQ ID NO 1171
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1171
ccagucugau cuccacugcc                                                   20

<210> SEQ ID NO 1172
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 1172
ccaucggggg gcuuucuccc                                              20

<210> SEQ ID NO 1173
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1173
cccagaccuc ccccagcagg                                              20

<210> SEQ ID NO 1174
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1174
cccagcccug gcccuguugc                                              20

<210> SEQ ID NO 1175
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1175
cccagccuau caggggugag                                              20

<210> SEQ ID NO 1176
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1176
cccaggcugg gccucugggu                                              20

<210> SEQ ID NO 1177
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1177
cccaggguuc accccugaua                                              20

<210> SEQ ID NO 1178
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1178
cccauuccgg uuucuccauc                                              20

<210> SEQ ID NO 1179
<211> LENGTH: 20
```

```
<212> TYPE: RNA
<213> ORGANISM: Artificial Sequence
<220> FEATURE:
<223> OTHER INFORMATION: Synthetic Construct

<400> SEQUENCE: 1179
cccccuucca gcagucacca                                               20

<210> SEQ ID NO 1180
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1180
ccccuuccag cagucaccag                                               20

<210> SEQ ID NO 1181
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1181
cccggccugg ggcaaggccu                                               20

<210> SEQ ID NO 1182
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1182
cccugaucag acugcaaaag                                               20

<210> SEQ ID NO 1183
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1183
cccuuccagc agucaccagu                                               20

<210> SEQ ID NO 1184
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1184
cccuugcgga gccugcagcu                                               20

<210> SEQ ID NO 1185
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1185
```
ccuaccccug cccucaaccc                                                   20

<210> SEQ ID NO 1186
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1186
ccuccuuccu uuccaaaaua                                                   20

<210> SEQ ID NO 1187
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1187
ccucgcaguc cccgagccag                                                   20

<210> SEQ ID NO 1188
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1188
ccugaucaga cugcaaaagc                                                   20

<210> SEQ ID NO 1189
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1189
ccugcagcuu uugcagucug                                                   20

<210> SEQ ID NO 1190
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1190
ccuuccagca gucaccaguc                                                   20

<210> SEQ ID NO 1191
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1191
ccuugcggag ccugcagcuu                                                   20

<210> SEQ ID NO 1192
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1192
cggagccugc agcuuuugca          20

<210> SEQ ID NO 1193
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1193
cuaauauuuu ggaaaggaag          20

<210> SEQ ID NO 1194
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1194
cuauaaggcu ggaggccaga          20

<210> SEQ ID NO 1195
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1195
cucaaagaca gcagcagaga          20

<210> SEQ ID NO 1196
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1196
cucagcaggu uacugauagg          20

<210> SEQ ID NO 1197
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1197
cucagguacc cagaggcccg          20

<210> SEQ ID NO 1198
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1198
cuccuuccuu uccaaaauau          20

```
<210> SEQ ID NO 1199
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1199
cucugcugcu gucuuugagc                                                   20

<210> SEQ ID NO 1200
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1200
cugauaagcc cagcccuggc                                                   20

<210> SEQ ID NO 1201
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1201
cugaucagac ugcaaaagcu                                                   20

<210> SEQ ID NO 1202
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1202
cugcaaaagc ugcaggcucc                                                   20

<210> SEQ ID NO 1203
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1203
cugcagcuuu ugcagucuga                                                   20

<210> SEQ ID NO 1204
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1204
cugcugaggg aggucugggc                                                   20

<210> SEQ ID NO 1205
<211> LENGTH: 20
<212> TYPE: RNA
<213> ORGANISM: Artificial Sequence
<220> FEATURE:
<223> OTHER INFORMATION: Synthetic Construct
```

```
<400> SEQUENCE: 1205
cugcugcugu cuuugagcac                                               20

<210> SEQ ID NO 1206
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1206
cugcugucuu ugagcacauc                                               20

<210> SEQ ID NO 1207
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1207
cuggagaucc cauuccgguu                                               20

<210> SEQ ID NO 1208
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1208
cugggacugg ugcccaguua                                               20

<210> SEQ ID NO 1209
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1209 cuggggagg ucugggccuu                                                20

<210> SEQ ID NO 1210
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1210
cuggugacug cuggaagggg                                               20

<210> SEQ ID NO 1211
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1211
cuguaaggcu ggaggccaga                                               20

<210> SEQ ID NO 1212
```

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1212
cuuagaauau cccuguaagg                                               20

<210> SEQ ID NO 1213
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1213
cuuccagcag ucaccagucu                                               20

<210> SEQ ID NO 1214
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1214
cuuccuuccu uuccaaaaua                                               20

<210> SEQ ID NO 1215
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1215
cuuuugcagu cugaucaggg                                               20

<210> SEQ ID NO 1216
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1216
gaaagaccuc cuuccuuucc                                               20

<210> SEQ ID NO 1217
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1217
gaaagacuuc cuuccuuucc                                               20

<210> SEQ ID NO 1218
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1218
```
gaaagccccc cgaugguugg          20

<210> SEQ ID NO 1219
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1219
gaaggcccag accucccuca          20

<210> SEQ ID NO 1220
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1220
gacacauagu cucugcugcu          20

<210> SEQ ID NO 1221
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1221
gacagcagca gagacuaugu          20

<210> SEQ ID NO 1222
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1222
gaccuccuuc cuuuccaaaa          20

<210> SEQ ID NO 1223
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1223
gacugcaaaa gcugcaggcu          20

<210> SEQ ID NO 1224
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1224
gacuggugac ugcuggaagg          20

<210> SEQ ID NO 1225
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 1225
gacuuccuuc cuuuccaaaa                                               20

<210> SEQ ID NO 1226
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1226
gagaucagac uggugacugc                                               20

<210> SEQ ID NO 1227
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1227
gagccugcag cuuuugcagu                                               20

<210> SEQ ID NO 1228
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1228
gagcugggac uagugcccag                                               20

<210> SEQ ID NO 1229
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1229
gaucagacug gugacugcug                                               20

<210> SEQ ID NO 1230
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1230
gaucccauuc caguuucucc                                               20

<210> SEQ ID NO 1231
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1231
gaugugcuca aagacagcag                                               20
```

<210> SEQ ID NO 1232
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1232
gcaaaagcug caggcuccgc                                            20

<210> SEQ ID NO 1233
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1233 gcacuaqucc cagcucuguc                                            20

<210> SEQ ID NO 1234
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1234
gcagcagaga cuaugugucc                                            20

<210> SEQ ID NO 1235
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1235
gcaggggcag ggggcagagg                                            20

<210> SEQ ID NO 1236
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1236
gcagucacca gucugaucuc                                            20

<210> SEQ ID NO 1237
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1237
gcaguggaga ucagacucau                                            20

<210> SEQ ID NO 1238
<211> LENGTH: 20
<212> TYPE: RNA
<213> ORGANISM: Artificial Sequence
<220> FEATURE:

```
<223> OTHER INFORMATION: Synthetic Construct

<400> SEQUENCE: 1238
gcaguggaga ucagacuggu                                           20

<210> SEQ ID NO 1239
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1239
gcccccuucc agcagucacc                                           20

<210> SEQ ID NO 1240
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1240
gcccccuucc agcagucacg                                           20

<210> SEQ ID NO 1241
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1241
gccccugccc ucaaccccag                                           20

<210> SEQ ID NO 1242
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1242
gccugcagcu uuugcagucu                                           20

<210> SEQ ID NO 1243
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1243
gcggagccug cagcuuuugc                                           20

<210> SEQ ID NO 1244
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1244
gcucaaagac agcagcagag                                           20
```

```
<210> SEQ ID NO 1245
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1245
gcuuuugcag ucugaucagg                                          20

<210> SEQ ID NO 1246
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1246
ggaagucuuu cuggacagag                                          20

<210> SEQ ID NO 1247
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1247
ggacacauag ucucugcugc                                          20

<210> SEQ ID NO 1248
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1248
ggagaucaga cucgugacug                                          20

<210> SEQ ID NO 1249
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1249
ggagaucaga cuggugacug                                          20

<210> SEQ ID NO 1250
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1250
ggauggagaa acuggaaugg                                          20

<210> SEQ ID NO 1251
<211> LENGTH: 20
<212> TYPE: RNA
<213> ORGANISM: Artificial Sequence
<220> FEATURE:
<223> OTHER INFORMATION: Synthetic Construct
```

<400> SEQUENCE: 1251
ggaugugcuc aaagacagca                                               20

<210> SEQ ID NO 1252
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1252
ggcaguggag aucagacugg                                               20

<210> SEQ ID NO 1253
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1253 ggcccccga ugguuggcuc                                                20

<210> SEQ ID NO 1254
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1254
ggccggggcu gggcuuauca                                               20

<210> SEQ ID NO 1255
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1255
ggccuugccc caggcugggc                                               20

<210> SEQ ID NO 1256
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1256
gggacacaua gucucugcug                                               20

<210> SEQ ID NO 1257
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1257
ggggauuuag ggagaaggcc                                               20

<210> SEQ ID NO 1258
<211> LENGTH: 20

```
<212> TYPE: RNA
<213> ORGANISM: Artificial Sequence
<220> FEATURE:
<223> OTHER INFORMATION: Synthetic Construct

<400> SEQUENCE: 1258 gggggggccuu cucccuaaau                                              20

<210> SEQ ID NO 1259
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1259
gggguagggg gcagaggccu                                               20

<210> SEQ ID NO 1260
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1260
ggugacugcu ggaaggggc                                                20

<210> SEQ ID NO 1261
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1261
ggugcccagu uacguugguc                                               20

<210> SEQ ID NO 1262
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1262
gguugagggc aggggcaggg                                               20

<210> SEQ ID NO 1263
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1263
gguuucucca uccagaccau                                               20

<210> SEQ ID NO 1264
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1264
```

```
guaaaaucug gccuccagcc                                           20

<210> SEQ ID NO 1265
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1265
guaacugggc acuaguccca                                           20

<210> SEQ ID NO 1266
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1266
guaaggcugg aggccagauu                                           20

<210> SEQ ID NO 1267
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1267
gucaccaguc ugaucuccac                                           20

<210> SEQ ID NO 1268
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1268
guccagaaag acuuccuucc                                           20

<210> SEQ ID NO 1269
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1269
guggagauca gacuggugac                                           20

<210> SEQ ID NO 1270
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1270
uaaaaucugg ccuccagccu                                           20

<210> SEQ ID NO 1271
<211> LENGTH: 20
<212> TYPE: RNA
<213> ORGANISM: Artificial Sequence
```

```
<220> FEATURE:
<223> OTHER INFORMATION: Synthetic Construct

<400> SEQUENCE: 1271
uauaaggcug gaggccagau                                               20

<210> SEQ ID NO 1272
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1272
uauuuuggaa aggaaggaag                                               20

<210> SEQ ID NO 1273
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1273
uauuuuggaa aggaaggagg                                               20

<210> SEQ ID NO 1274
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1274
ucaaagacag cagcagagac                                               20

<210> SEQ ID NO 1275
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1275
ucacaugagu cugaucucca                                               20

<210> SEQ ID NO 1276
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1276
ucaccagucu gaucuccacu                                               20

<210> SEQ ID NO 1277
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1277
ucagacugca aaagcugcag                                               20
```

<210> SEQ ID NO 1278
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1278
ucagacuggu gacugcugga					20

<210> SEQ ID NO 1279
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1279
ucaguaaccu gcugagggag					20

<210> SEQ ID NO 1280
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1280
ucaugugacu gcuggaaggg					20

<210> SEQ ID NO 1281
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1281
uccagcaguc acaugagucu					20

<210> SEQ ID NO 1282
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1282
uccagcaguc accagucuga					20

<210> SEQ ID NO 1283
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1283
uccaguuucu ccauccagac					20

<210> SEQ ID NO 1284
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1284
uccccgagcc aggaaacuga                                               20

<210> SEQ ID NO 1285
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1285
ucccugauca gacugcaaaa                                               20

<210> SEQ ID NO 1286
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1286
ucucugcugc ugucuuugag                                               20

<210> SEQ ID NO 1287
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1287
ucugcugcug ucuuugagca                                               20

<210> SEQ ID NO 1288
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1288
ugagcccugg gugacaccug                                               20

<210> SEQ ID NO 1289
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1289
ugaucagacu gcaaaagcug                                               20

<210> SEQ ID NO 1290
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1290
ugcaaaagcu gcaggcuccg                                               20

<210> SEQ ID NO 1291

```
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1291
ugcagcuuuu gcagucugau                                               20

<210> SEQ ID NO 1292
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1292
ugcccccugc cccugcccuc                                               20

<210> SEQ ID NO 1293
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1293
ugccuggaga ucccauucca                                               20

<210> SEQ ID NO 1294
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1294
ugcggagccu gcagcuuuug                                               20

<210> SEQ ID NO 1295
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1295
ugcucaaaga cagcagcaga                                               20

<210> SEQ ID NO 1296
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1296
ugcugcuguc uuugagcaca                                               20

<210> SEQ ID NO 1297
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1297
```
ugcugucuuu gagcacaucc                                              20

<210> SEQ ID NO 1298
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1298
uggagaucag acuggugacu                                              20

<210> SEQ ID NO 1299
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1299
uggcagugga gaucagacug                                              20

<210> SEQ ID NO 1300
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1300
uggcccuguu gcugcucacu                                              20

<210> SEQ ID NO 1301
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1301
ugggacacau agucucugcu                                              20

<210> SEQ ID NO 1302
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1302
ugggcaccag ucccagcucu                                              20

<210> SEQ ID NO 1303
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1303
uggugacugc uggaaggggg                                              20

<210> SEQ ID NO 1304
<211> LENGTH: 20
<212> TYPE: RNA

```
<213> ORGANISM: Artificial Sequence
<220> FEATURE:
<223> OTHER INFORMATION: Synthetic Construct

<400> SEQUENCE: 1304
uguaaggcug gaggccagau                                                    20

<210> SEQ ID NO 1305
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1305
ugugcucaaa gacagcagca                                                    20

<210> SEQ ID NO 1306
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1306
uuccagcagu caccagucug                                                    20

<210> SEQ ID NO 1307
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1307
uuccuuccuu uccaaaauau                                                    20

<210> SEQ ID NO 1308
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1308
uugcggagcc ugcagcuuuu                                                    20

<210> SEQ ID NO 1309
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1309
uuuagggaga aagcccccg                                                     20

<210> SEQ ID NO 1310
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1310
uuuccuggcu cggggacugc                                                    20
```

```
<210> SEQ ID NO 1311
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1311
uuuugcaguc ugaucaggga                                               20

<210> SEQ ID NO 1312
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1312
uuuuggaaag gaaggaaguc                                               20

<210> SEQ ID NO 1313
<211> LENGTH: 20
<212> TYPE: RNA
<213> ORGANISM: Artificial Sequence
<220> FEATURE:
<223> OTHER INFORMATION: Synthetic Construct

<400> SEQUENCE: 1313
uuuuggaaag gaaggagguc                                               20
```